Figure 1:
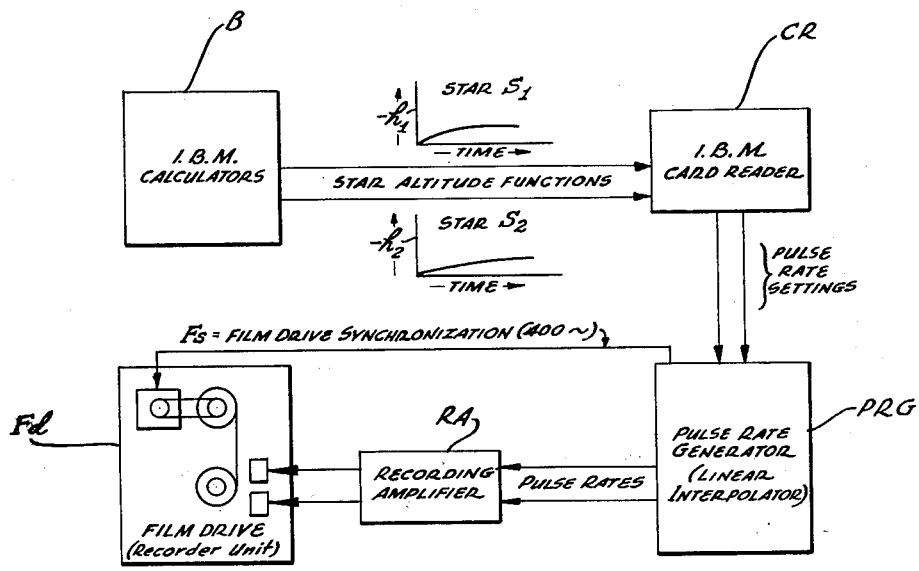

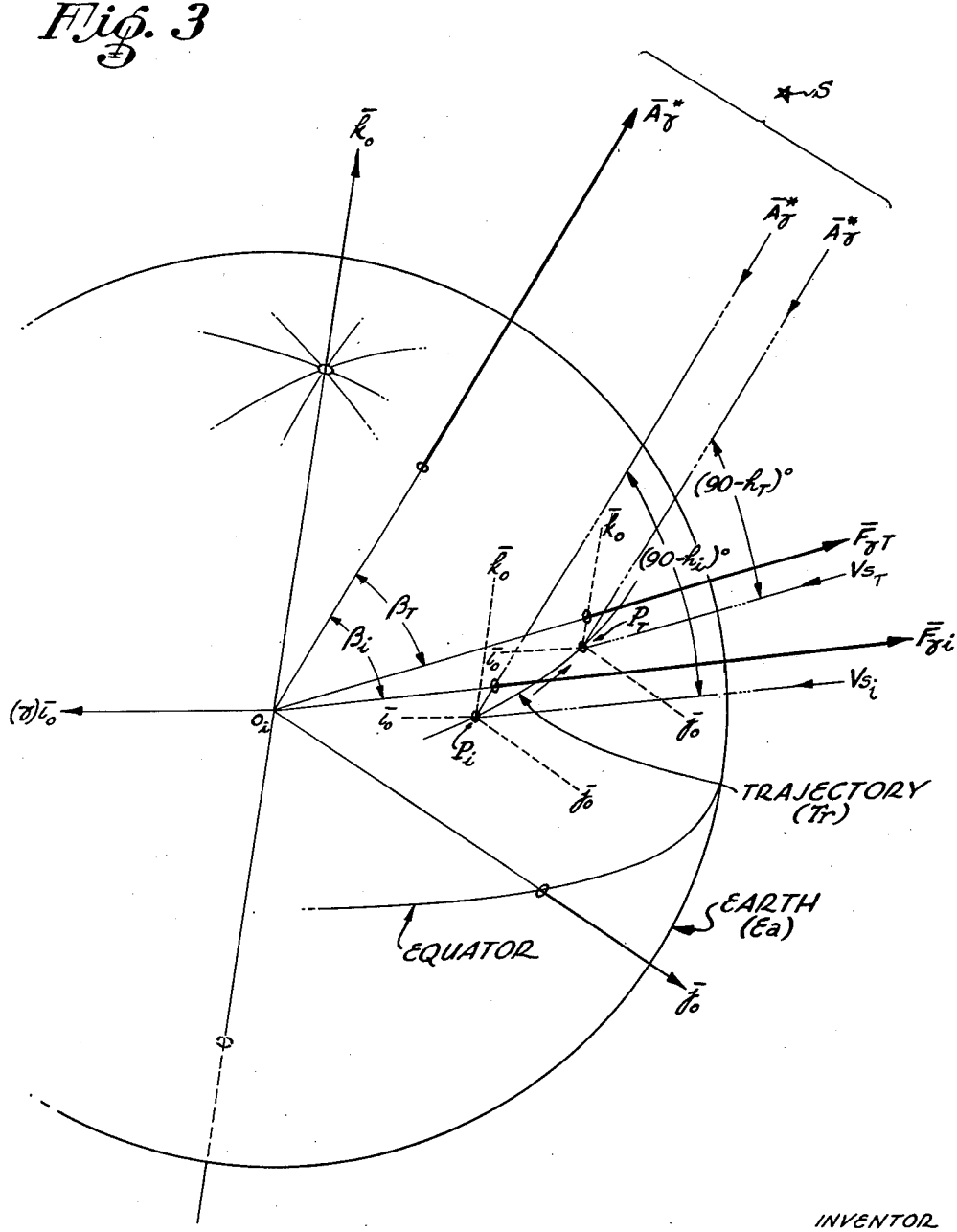

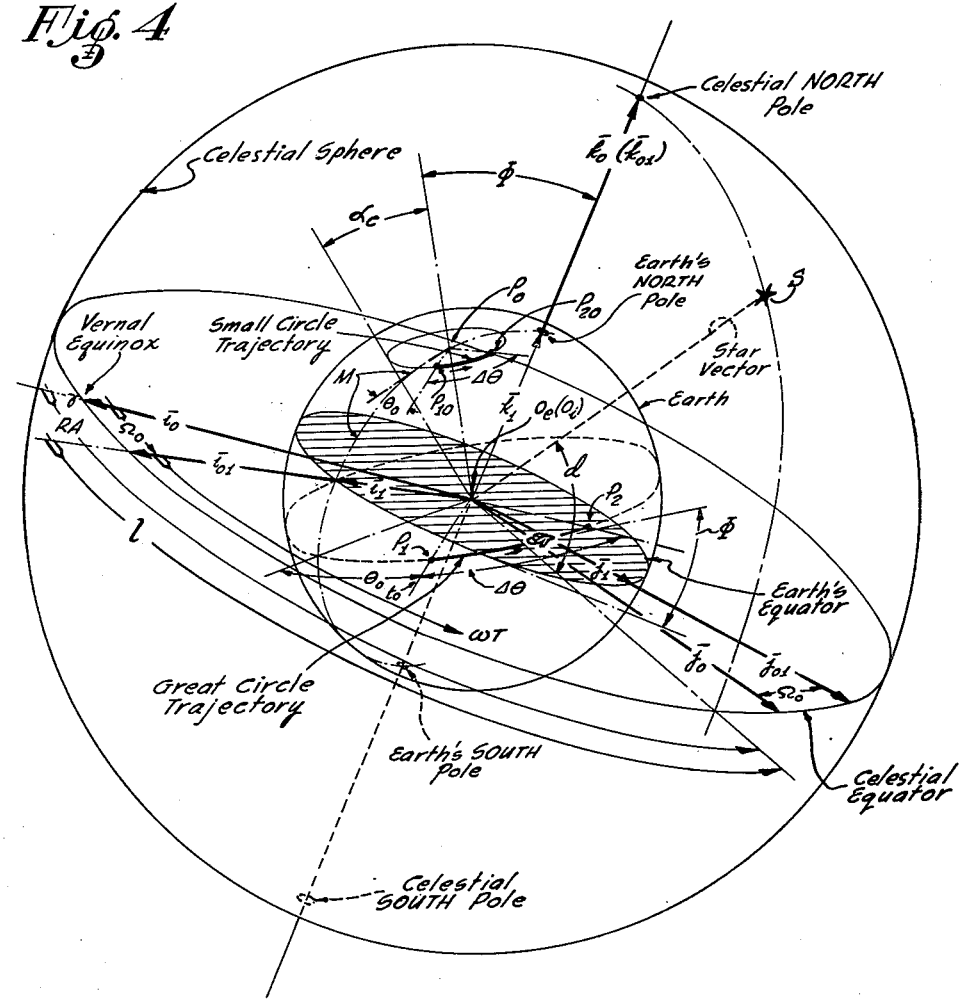

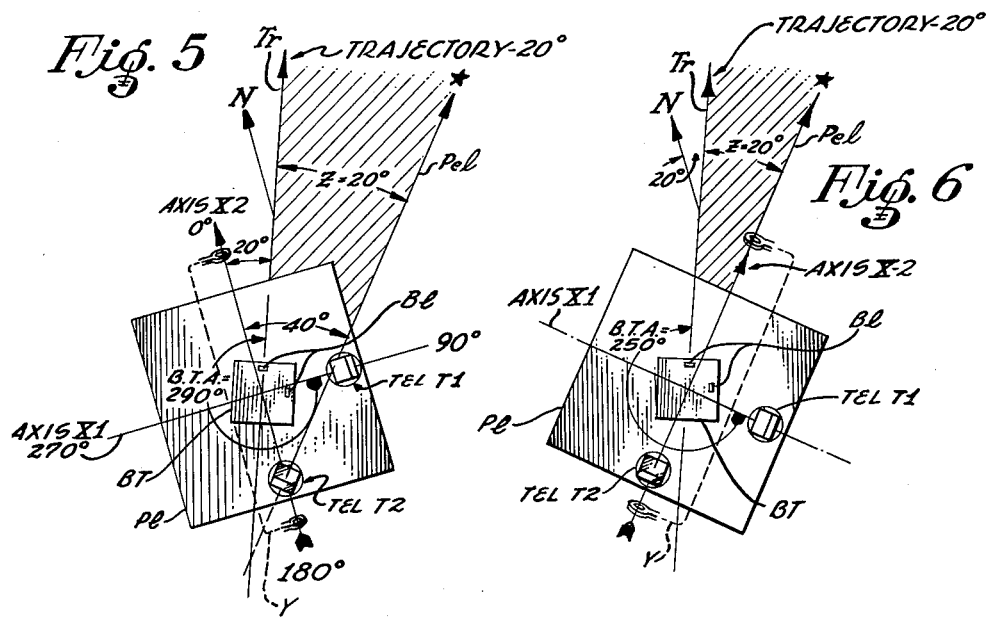
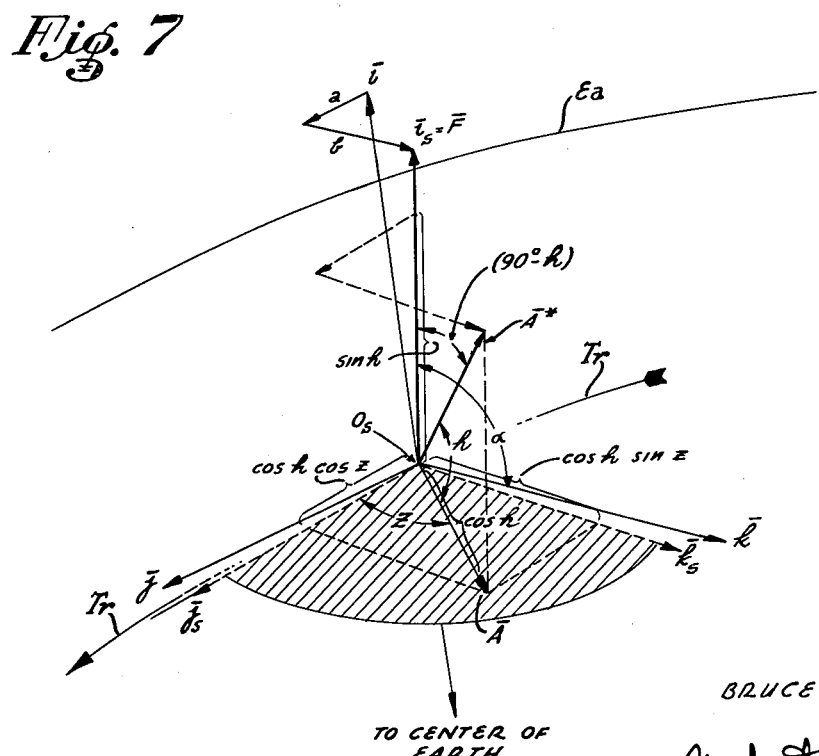

April 3, 1962

B. E. DIXSON 3,027,841

GUIDANCE SYSTEM

Filed Oct. 13, 1952

39 Sheets-Sheet 5

INVENTOR
BRUCE E. DIXSON

BY Herbert E. Medcalf
HIS PATENT ATTORNEY

April 3, 1962 B. E. DIXSON 3,027,841
GUIDANCE SYSTEM
Filed Oct. 13, 1952 39 Sheets-Sheet 6

INVENTOR
BRUCE E. DIXSON

HIS PATENT ATTORNEY

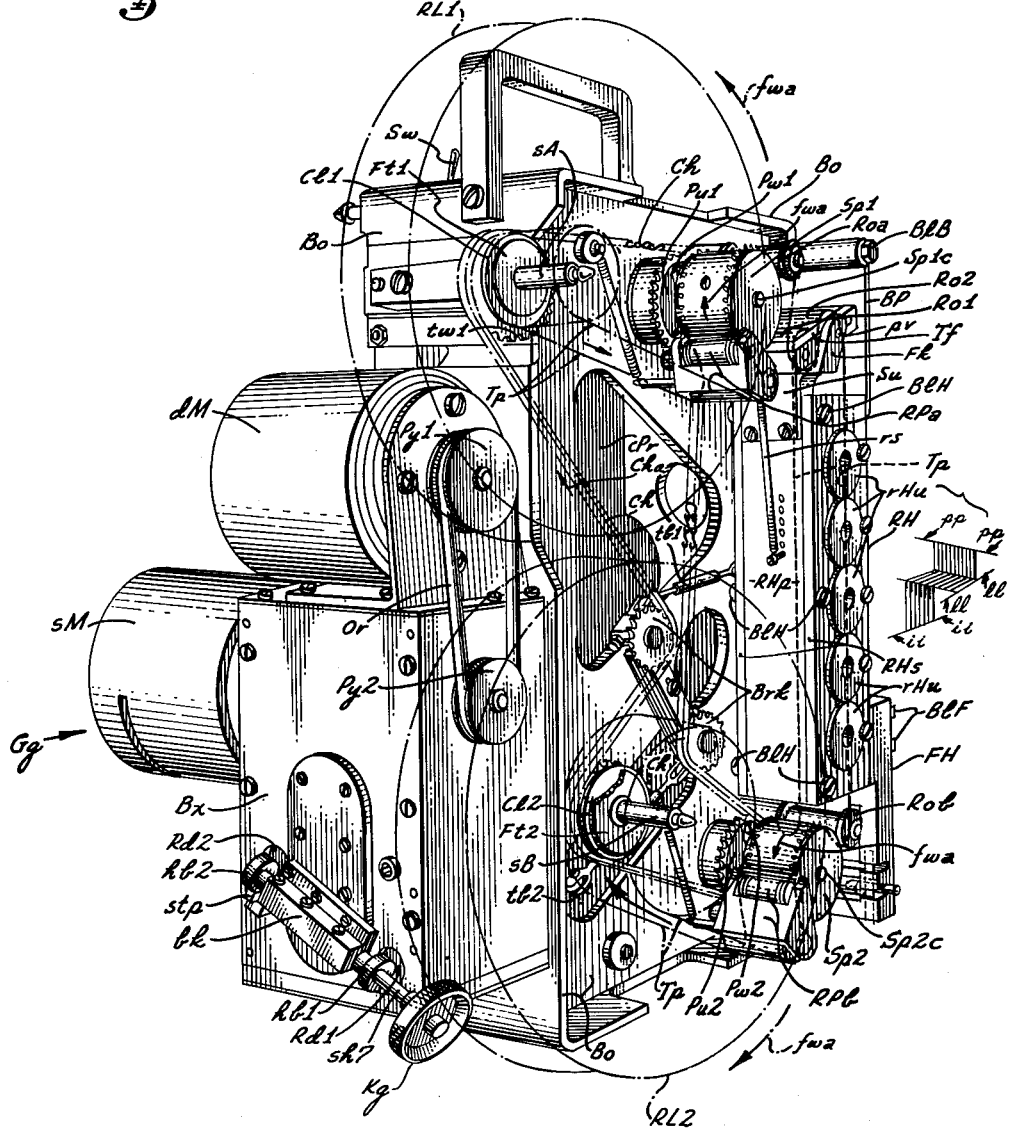

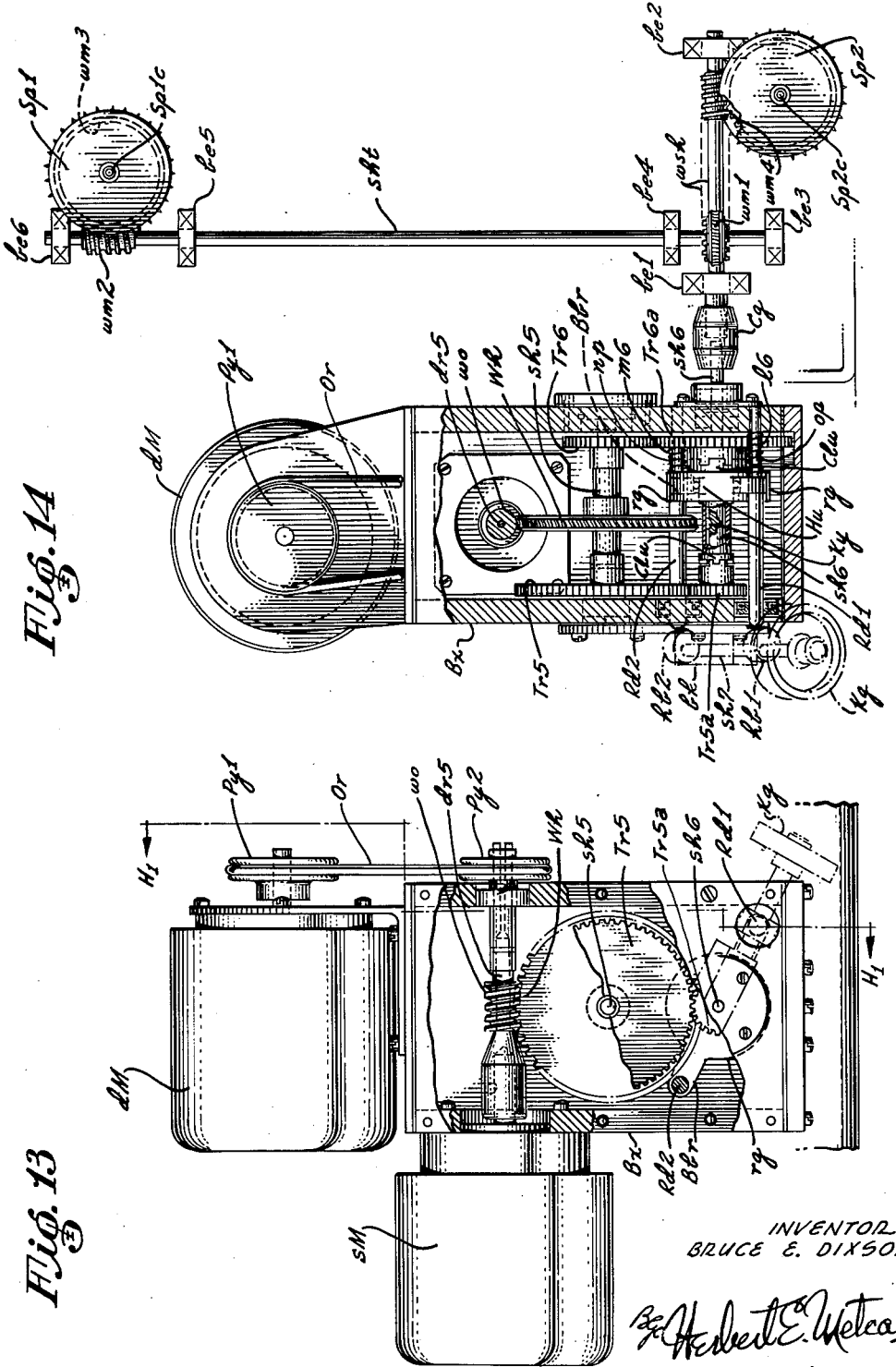

April 3, 1962 B. E. DIXSON 3,027,841
GUIDANCE SYSTEM
Filed Oct. 13, 1952 39 Sheets-Sheet 9
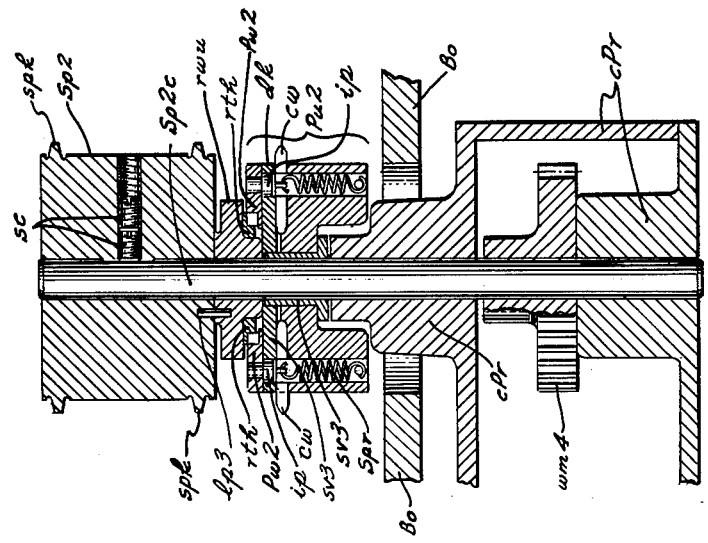
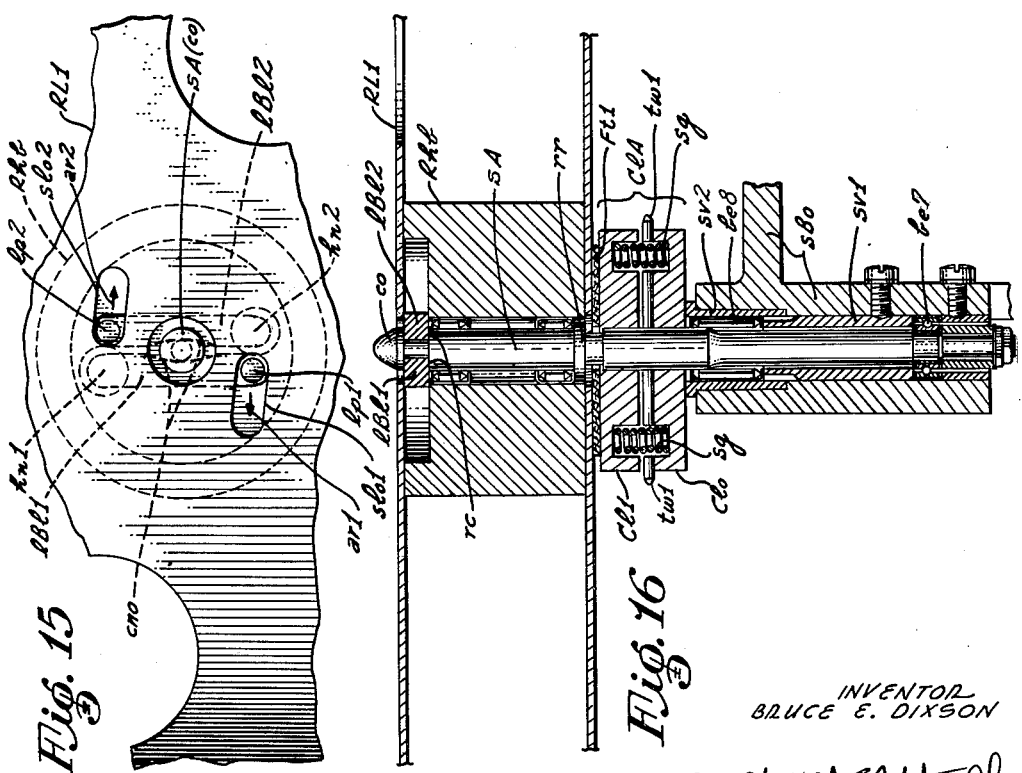
INVENTOR
BRUCE E. DIXSON
HIS PATENT ATTORNEY

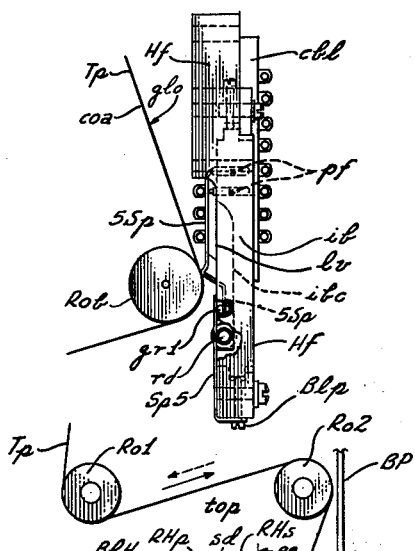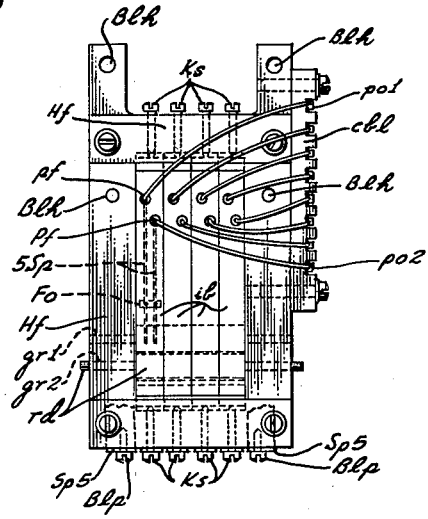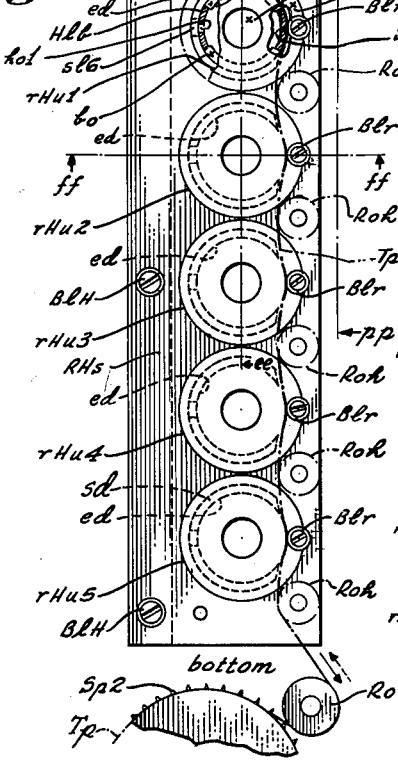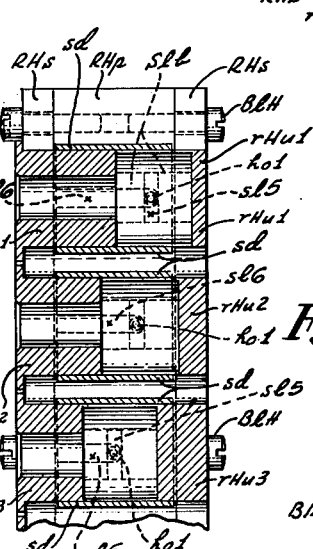

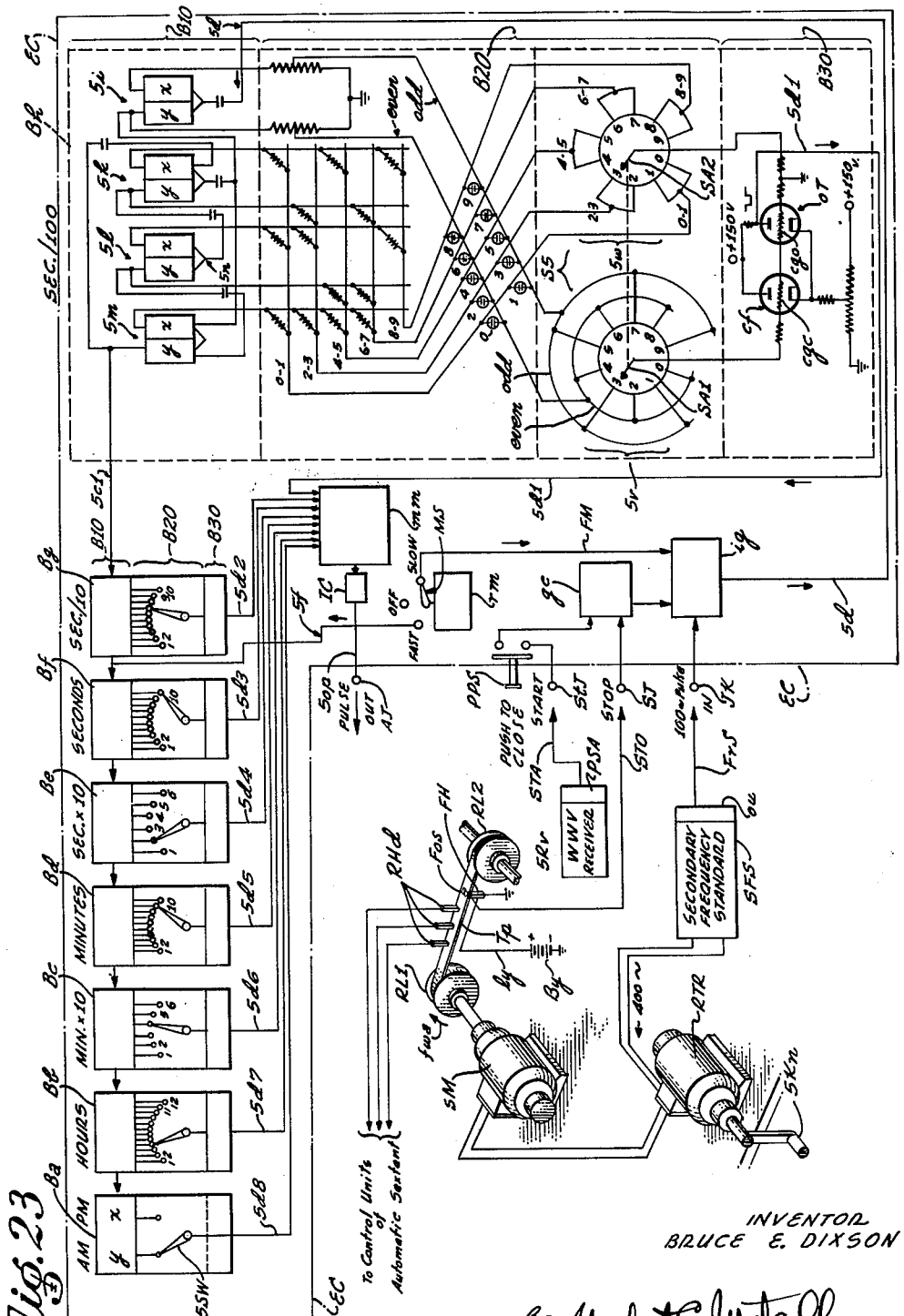

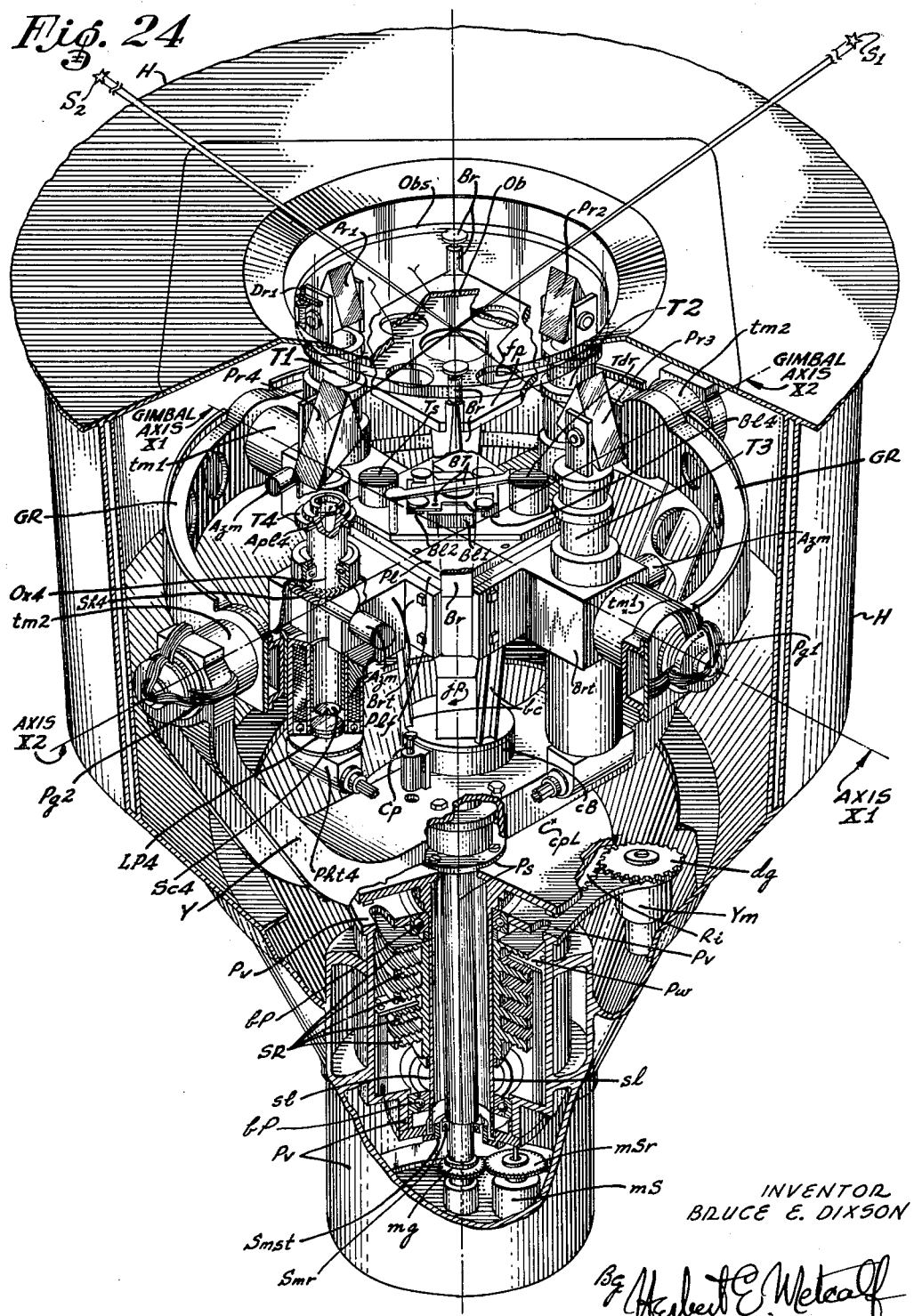

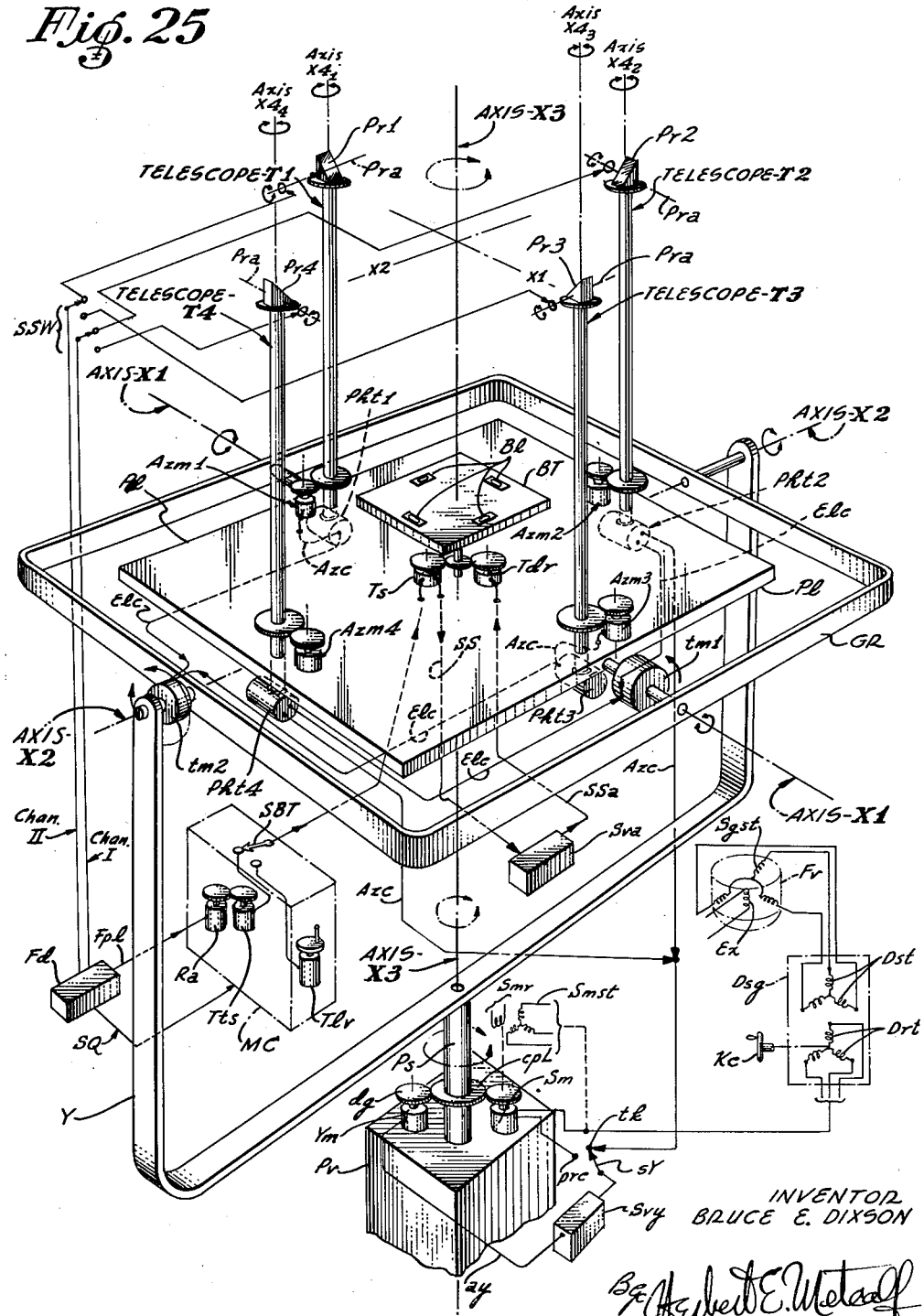

April 3, 1962  B. E. DIXSON  3,027,841
GUIDANCE SYSTEM
Filed Oct. 13, 1952  39 Sheets-Sheet 14

INVENTOR
BRUCE E. DIXSON

HIS PATENT ATTORNEY

April 3, 1962 B. E. DIXSON 3,027,841
GUIDANCE SYSTEM
Filed Oct. 13, 1952 39 Sheets-Sheet 15
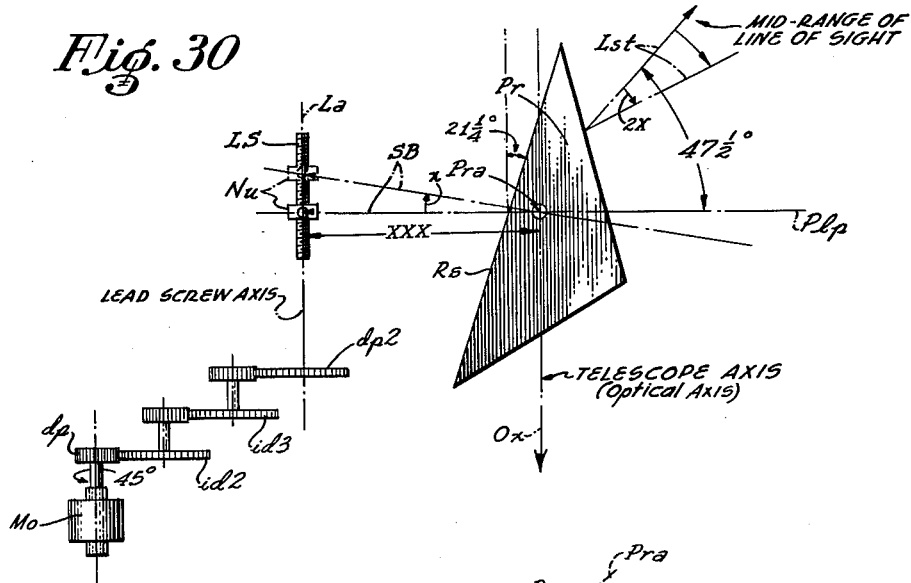
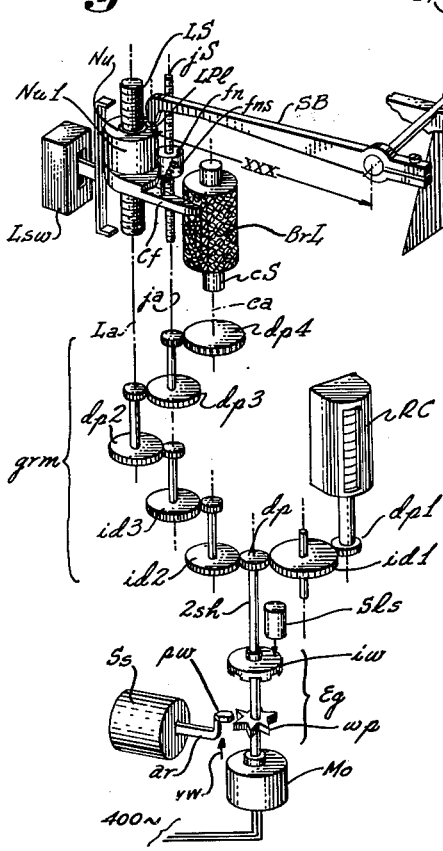
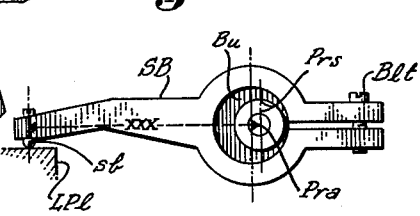
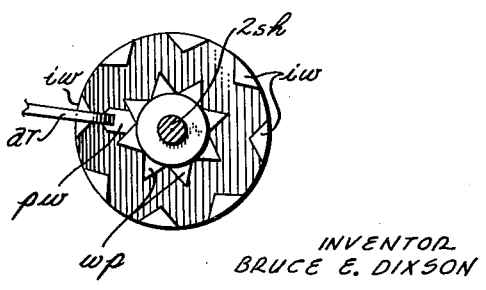
INVENTOR
BRUCE E. DIXSON
PATENT ATTORNEY

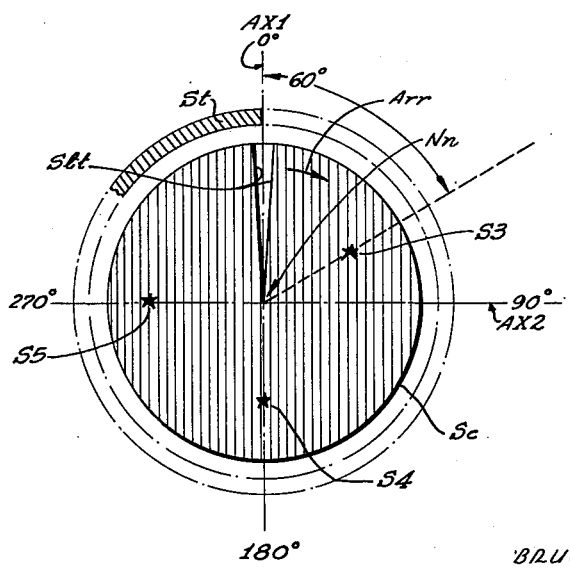

April 3, 1962 — B. E. DIXSON — 3,027,841
GUIDANCE SYSTEM
Filed Oct. 13, 1952 — 39 Sheets-Sheet 17
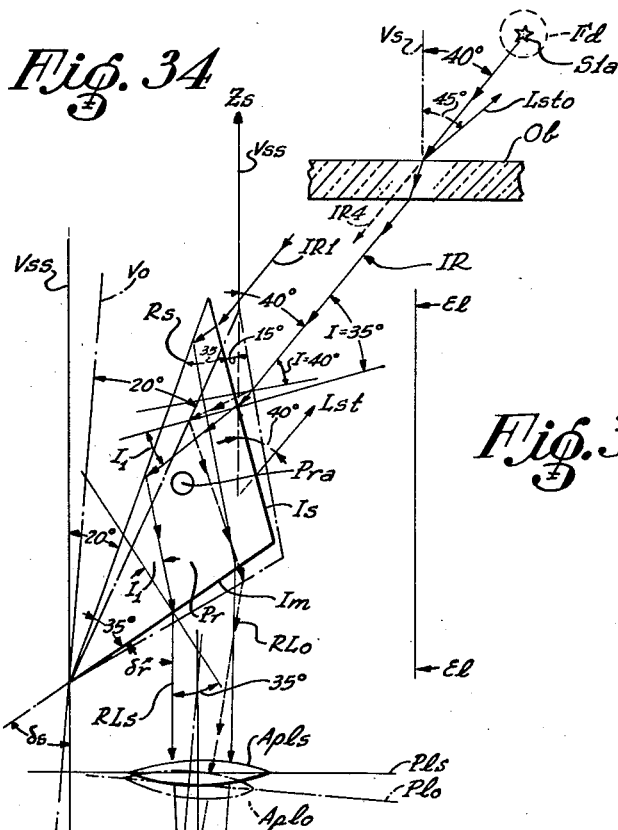
Fig. 34
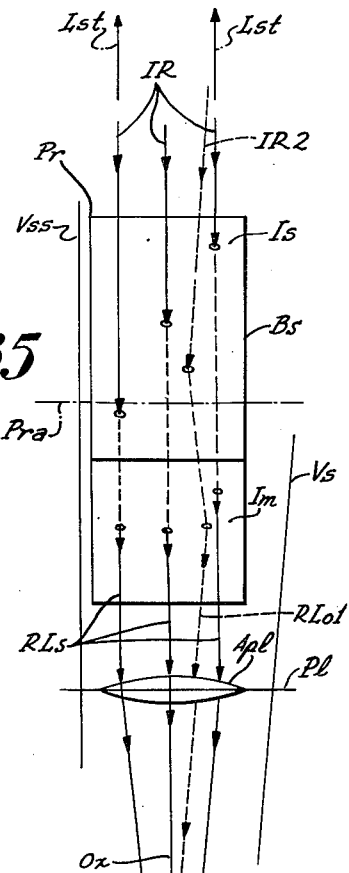
Fig. 35
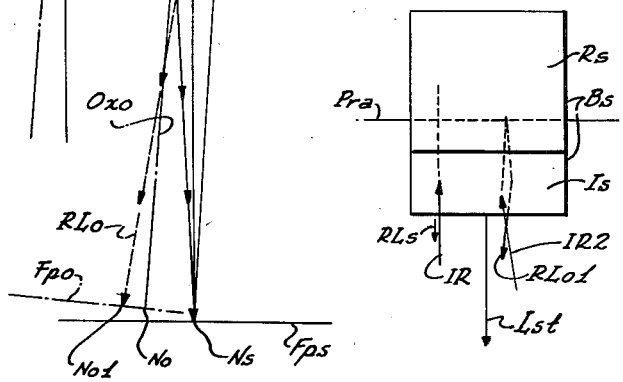
Fig. 36
INVENTOR
BRUCE E. DIXSON
HIS PATENT ATTORNEY

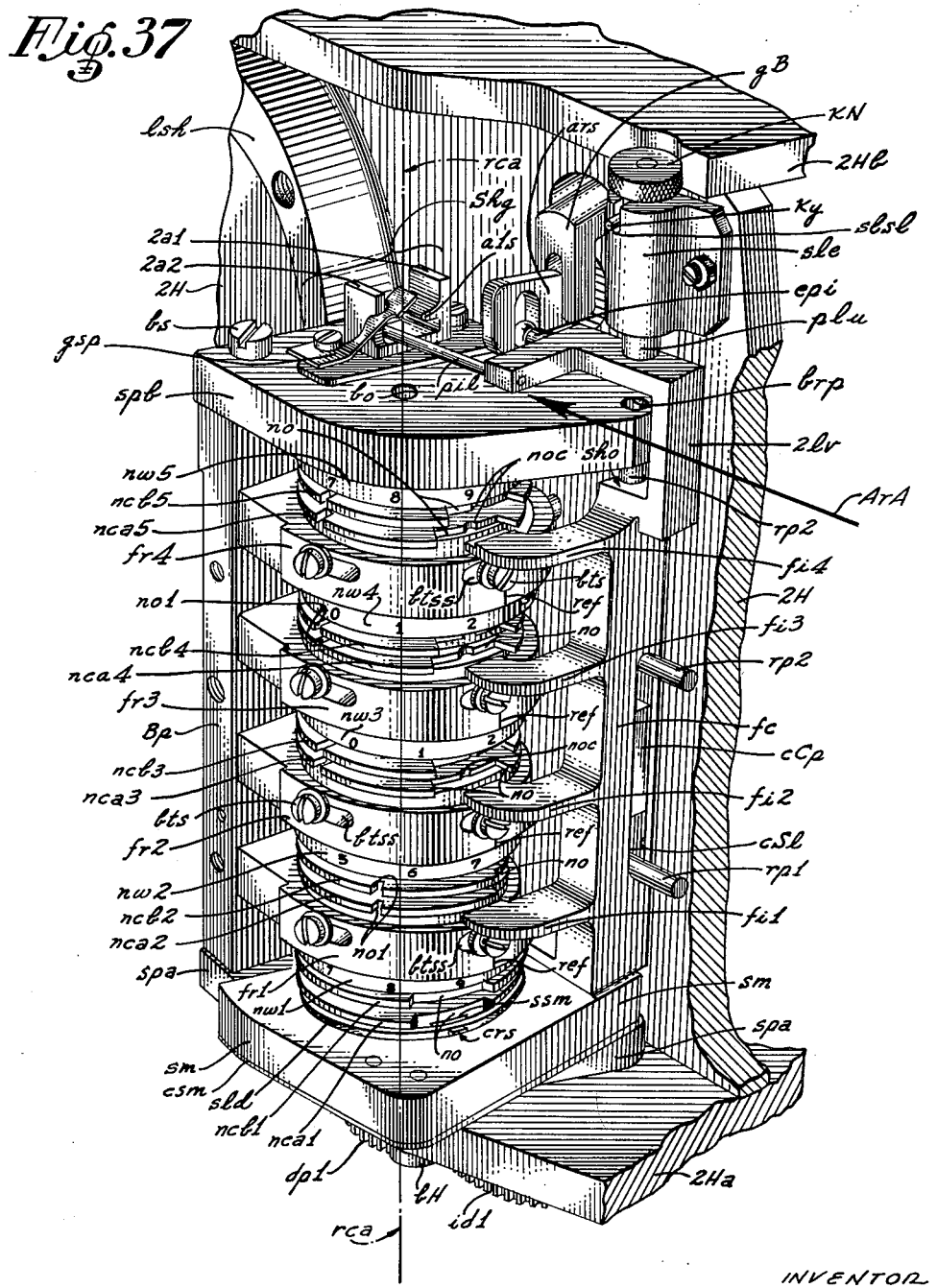

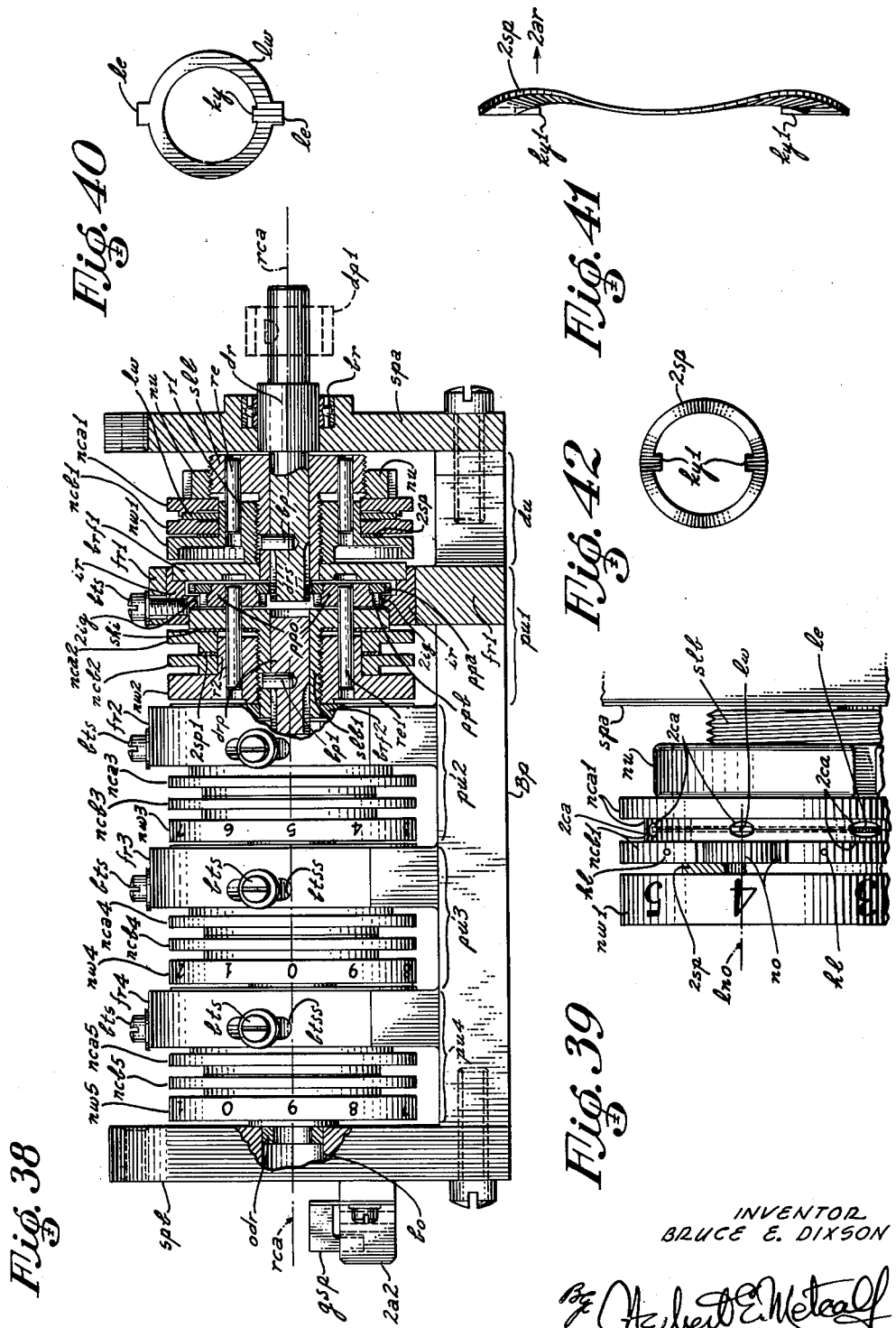

April 3, 1962   B. E. DIXSON   3,027,841
GUIDANCE SYSTEM
Filed Oct. 13, 1952   39 Sheets-Sheet 20

INVENTOR
BRUCE E. DIXSON
HIS PATENT ATTORNEY

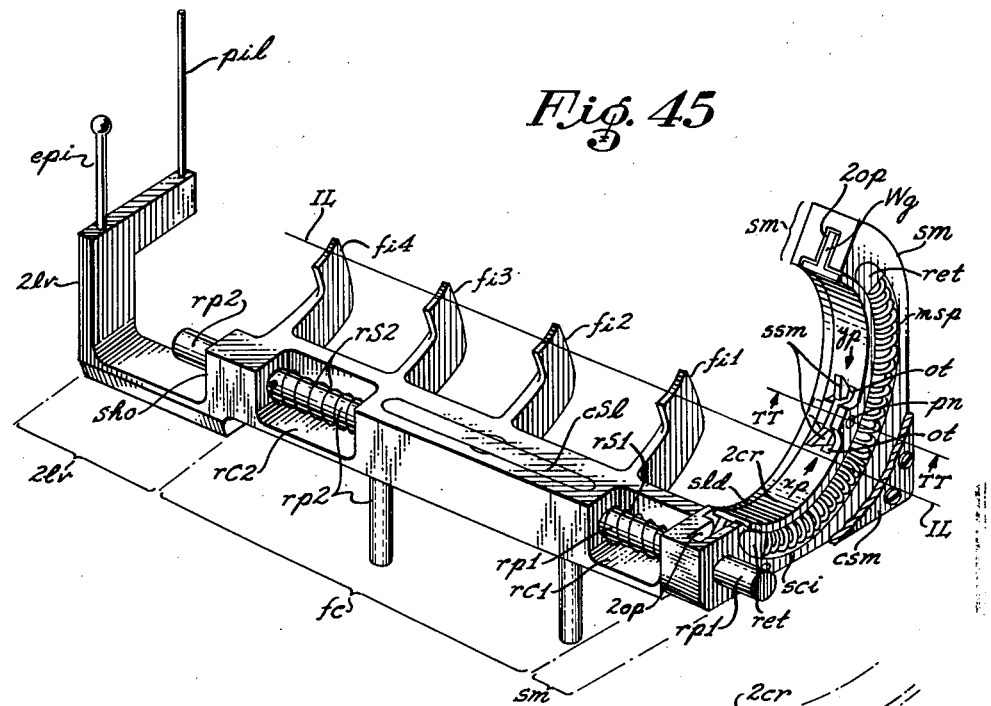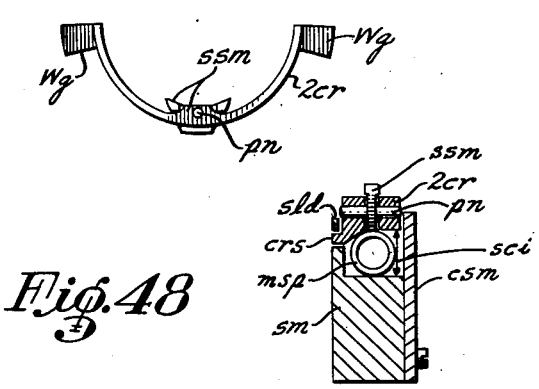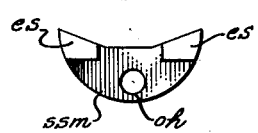

April 3, 1962

B. E. DIXSON 3,027,841

GUIDANCE SYSTEM

Filed Oct. 13, 1952

39 Sheets-Sheet 22

INVENTOR
BRUCE E. DIXSON
HIS PATENT ATTORNEY

April 3, 1962   B. E. DIXSON   3,027,841
GUIDANCE SYSTEM
Filed Oct. 13, 1952   39 Sheets-Sheet 23
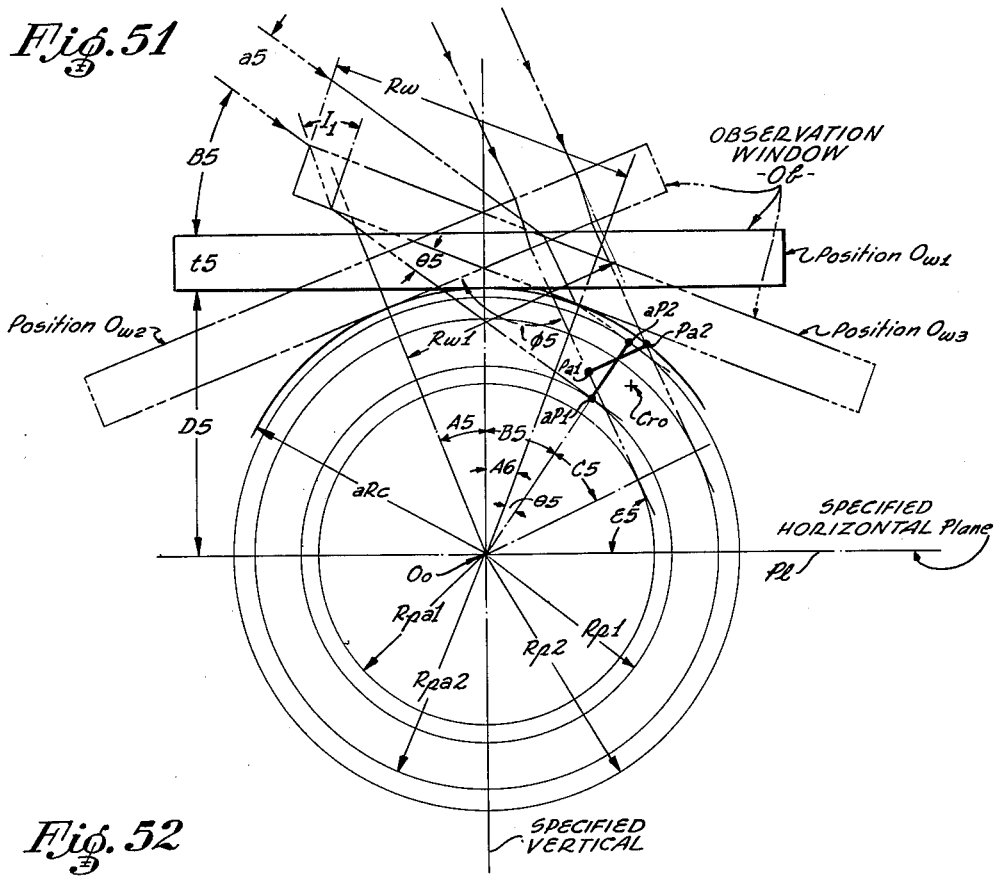
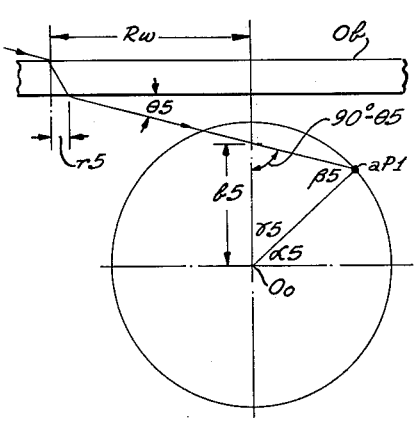
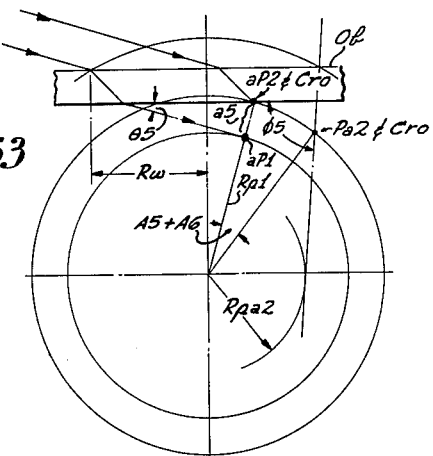
INVENTOR
BRUCE E. DIXSON
HIS PATENT ATTORNEY

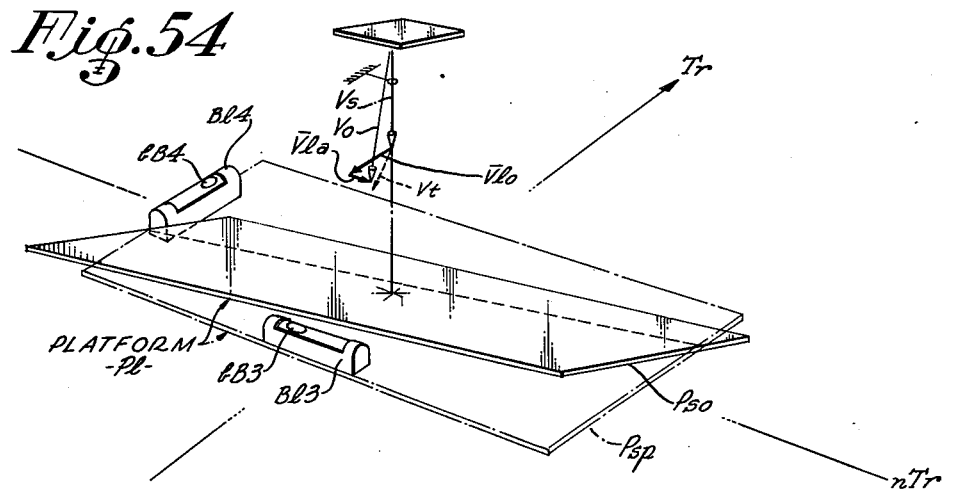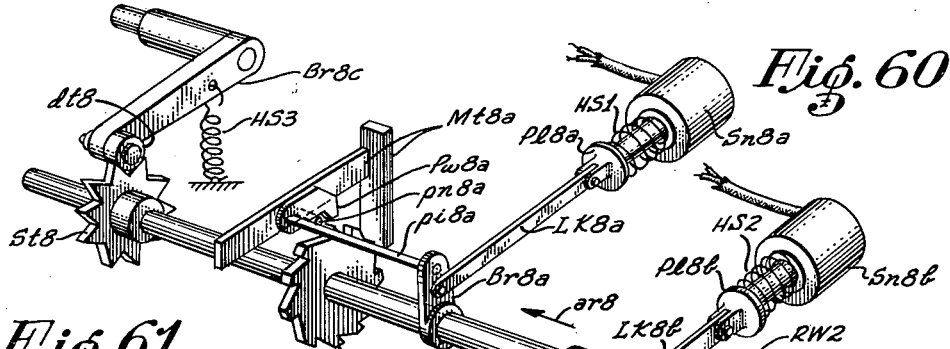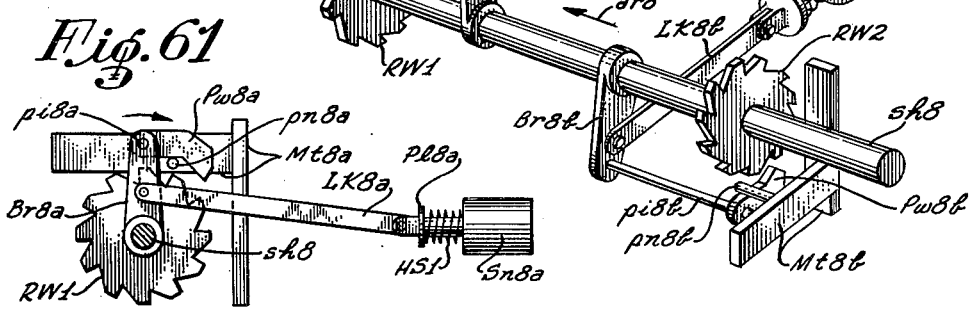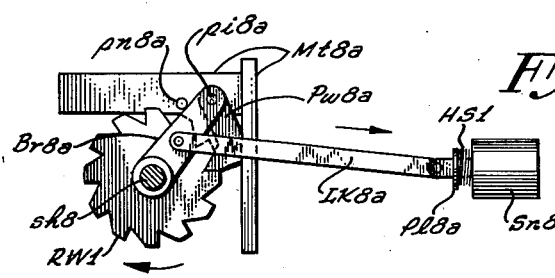

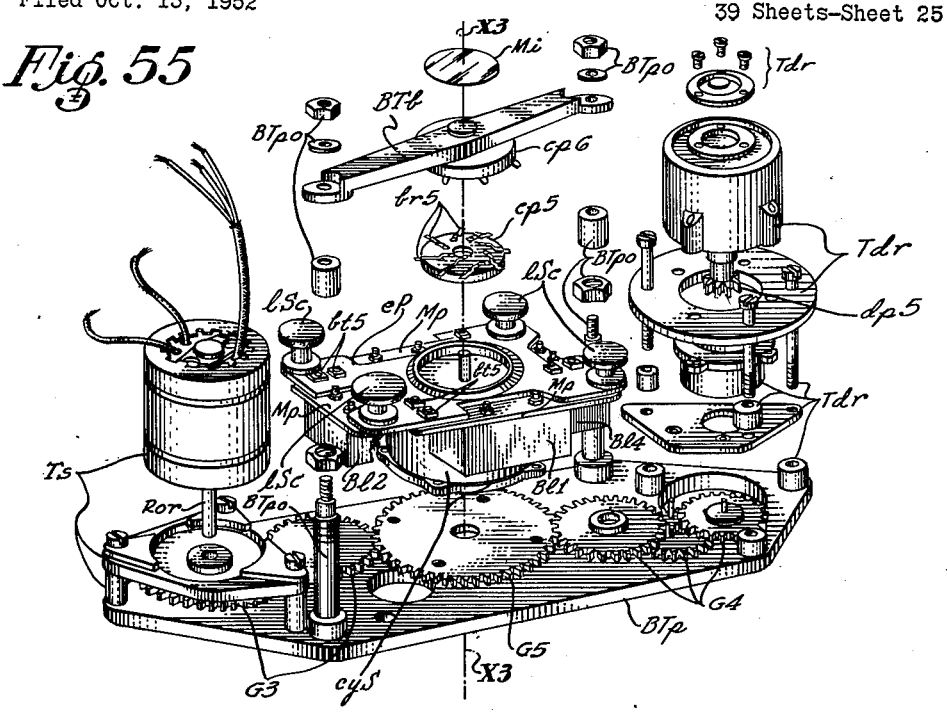
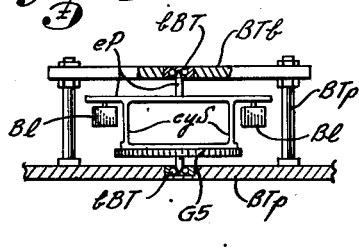
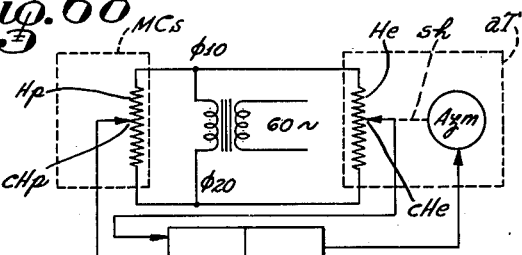
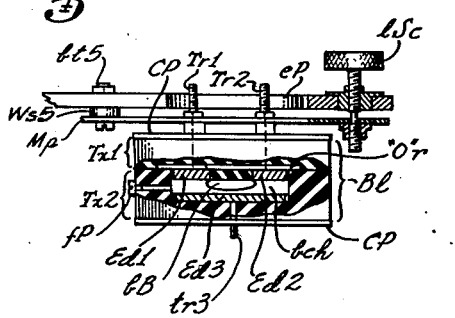
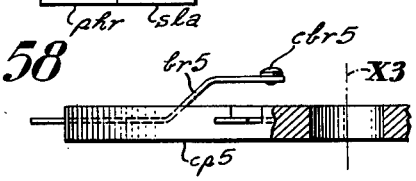
INVENTOR
BRUCE E. DIXSON
HIS PATENT ATTORNEY

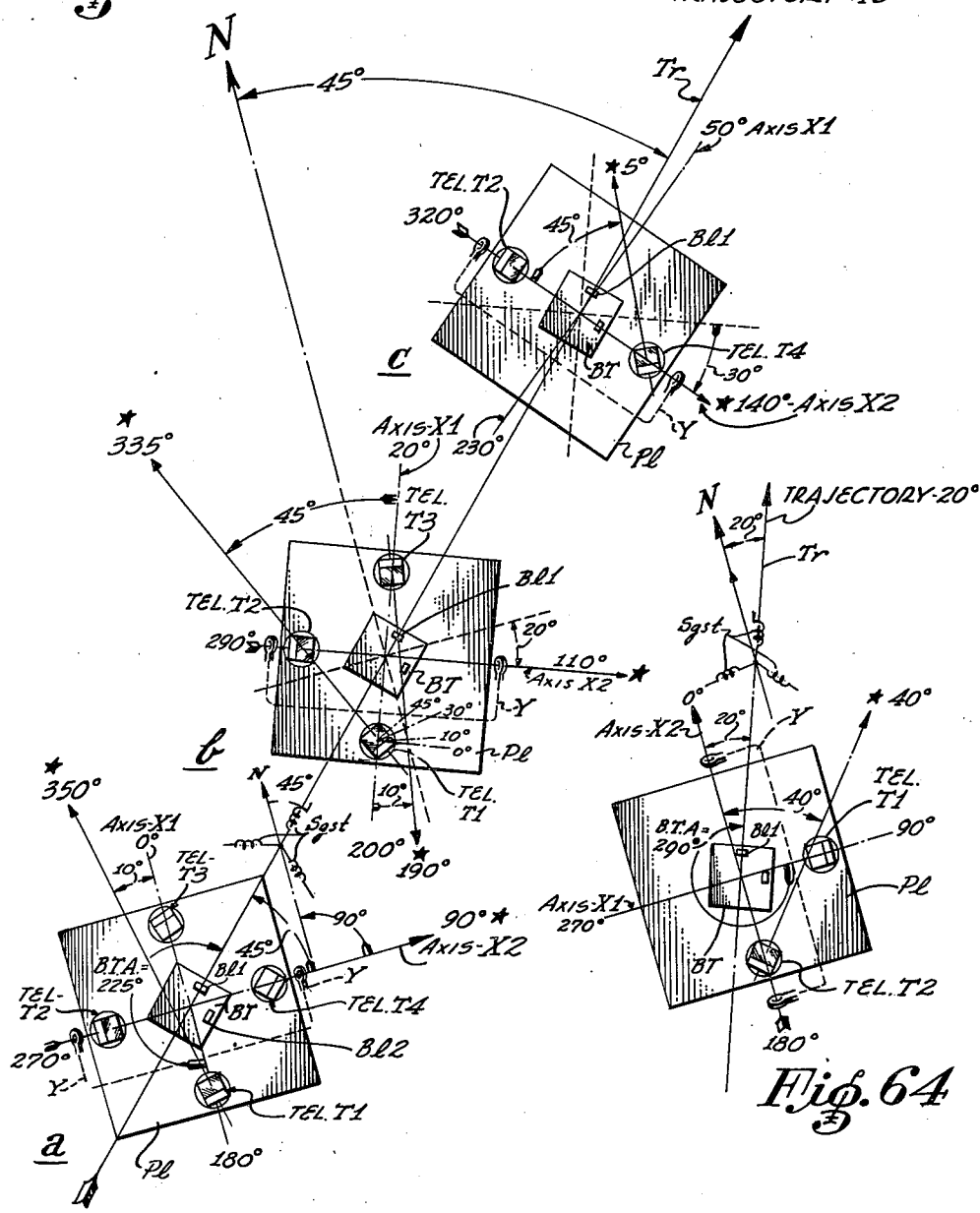

INVENTOR
BRUCE E. DIXSON
HIS PATENT ATTORNEY

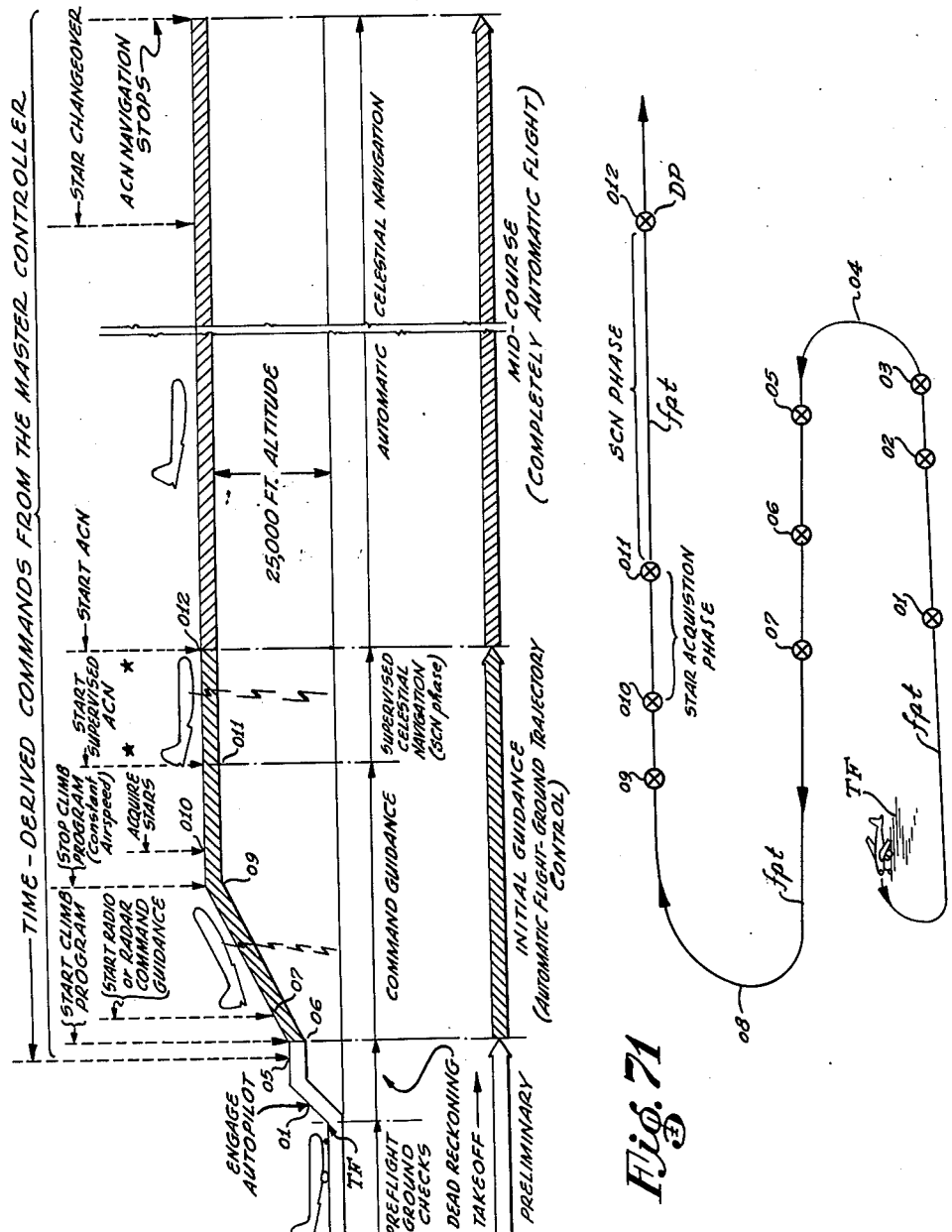

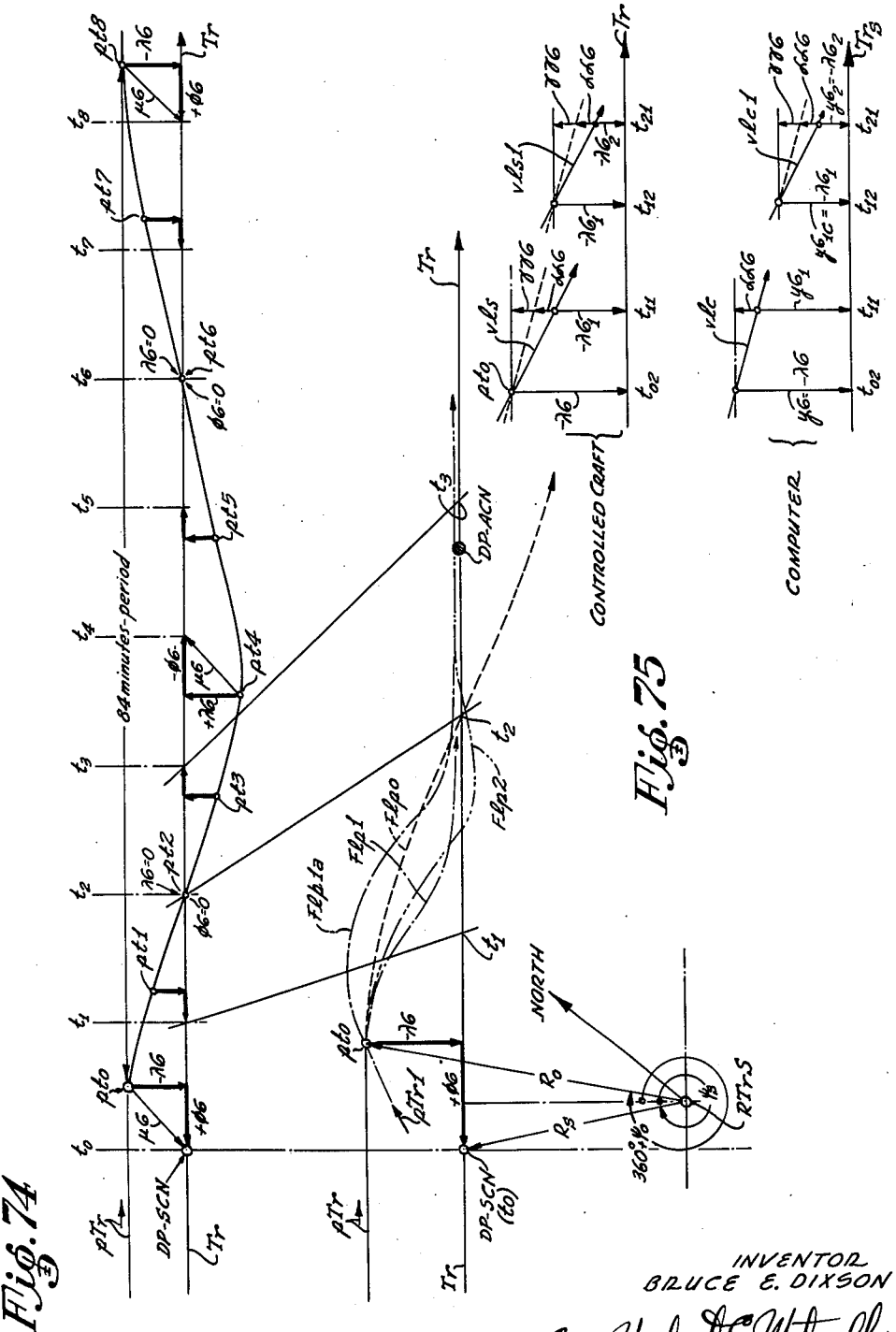

April 3, 1962  B. E. DIXSON  3,027,841
GUIDANCE SYSTEM
Filed Oct. 13, 1952  39 Sheets-Sheet 34

INVENTOR
BRUCE E. DIXSON
HIS PATENT ATTORNEY

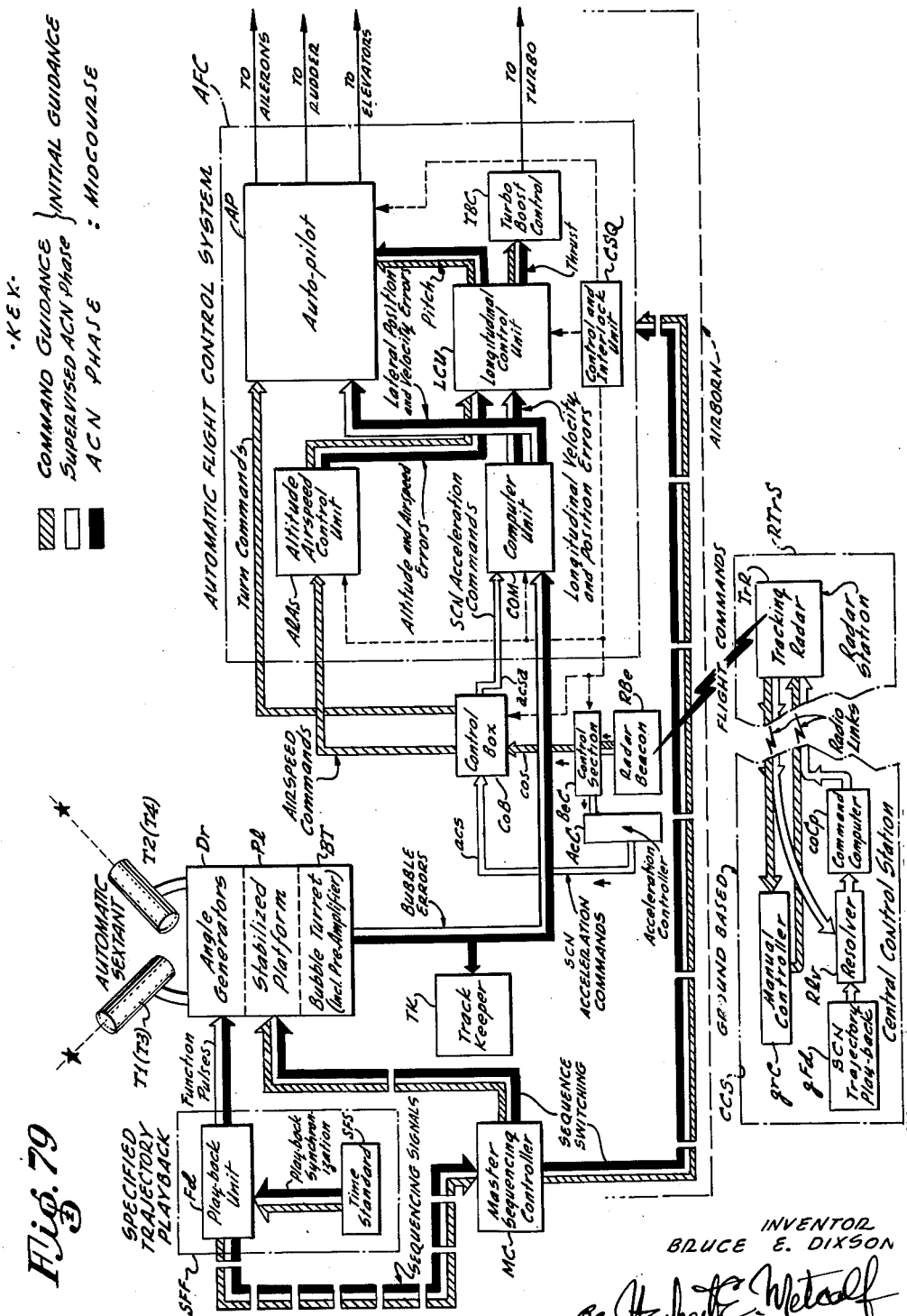

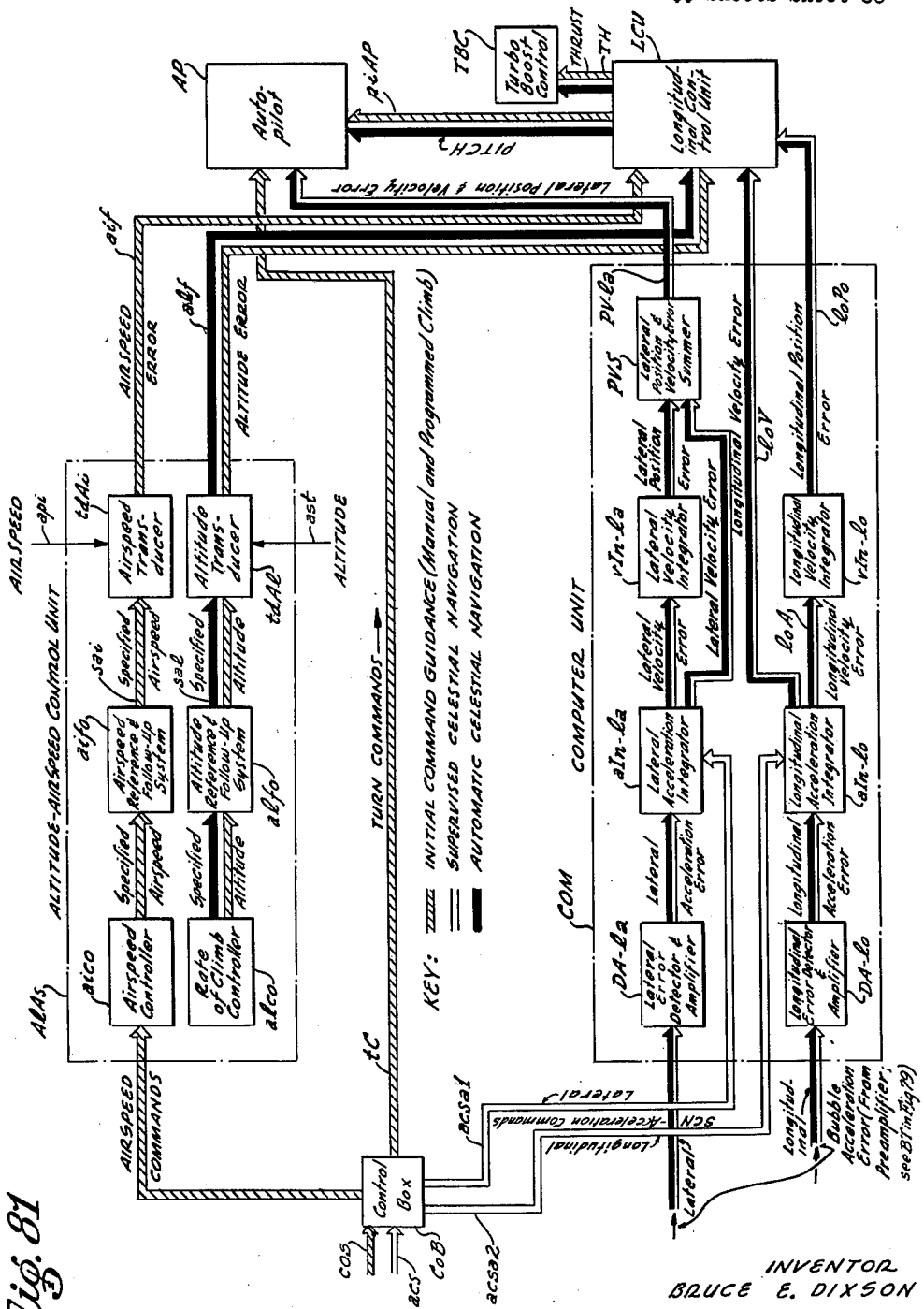

April 3, 1962
B. E. DIXSON
3,027,841
GUIDANCE SYSTEM
Filed Oct. 13, 1952
39 Sheets-Sheet 37
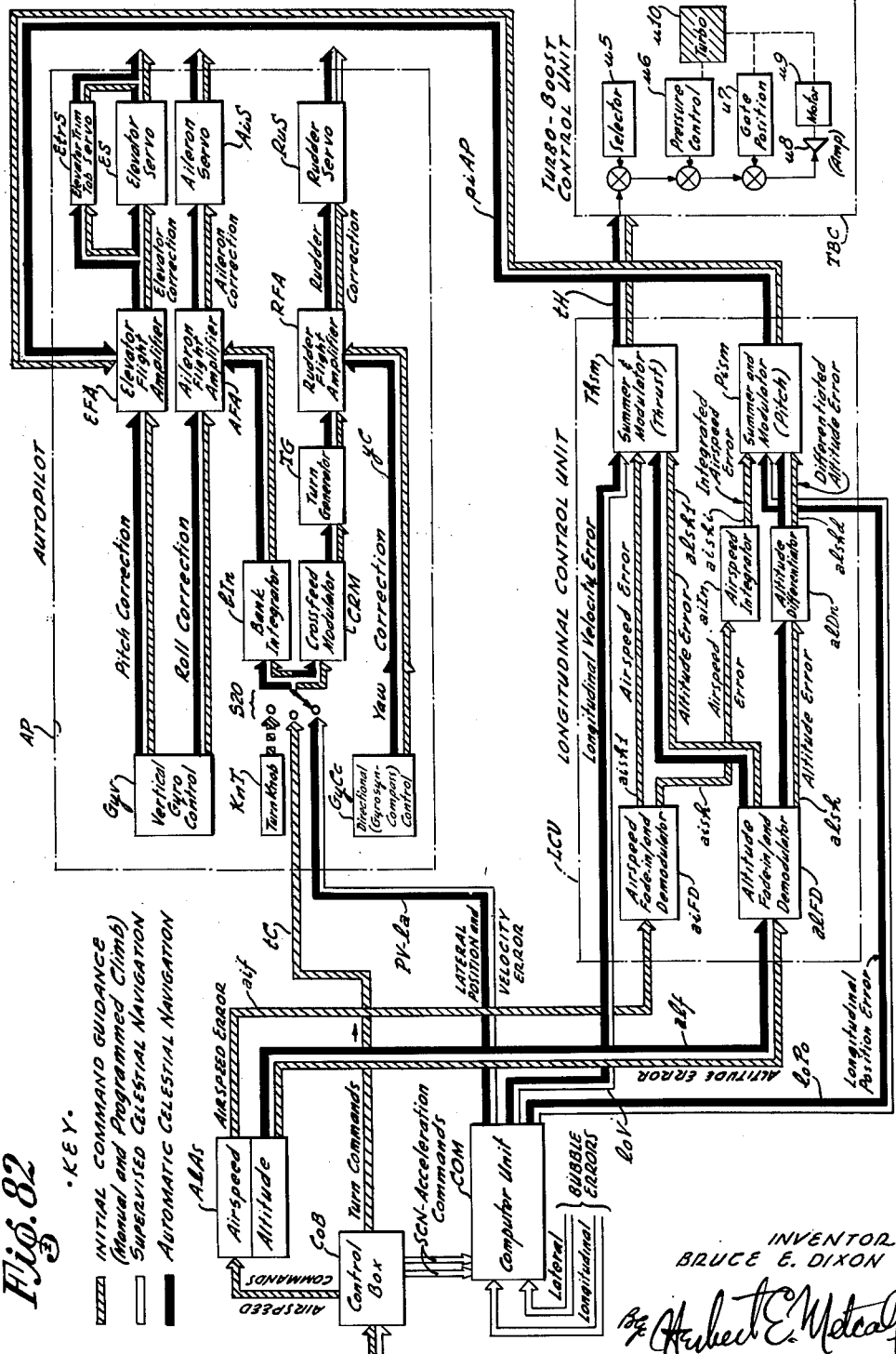
INVENTOR
BRUCE E. DIXON
HIS PATENT ATTORNEY

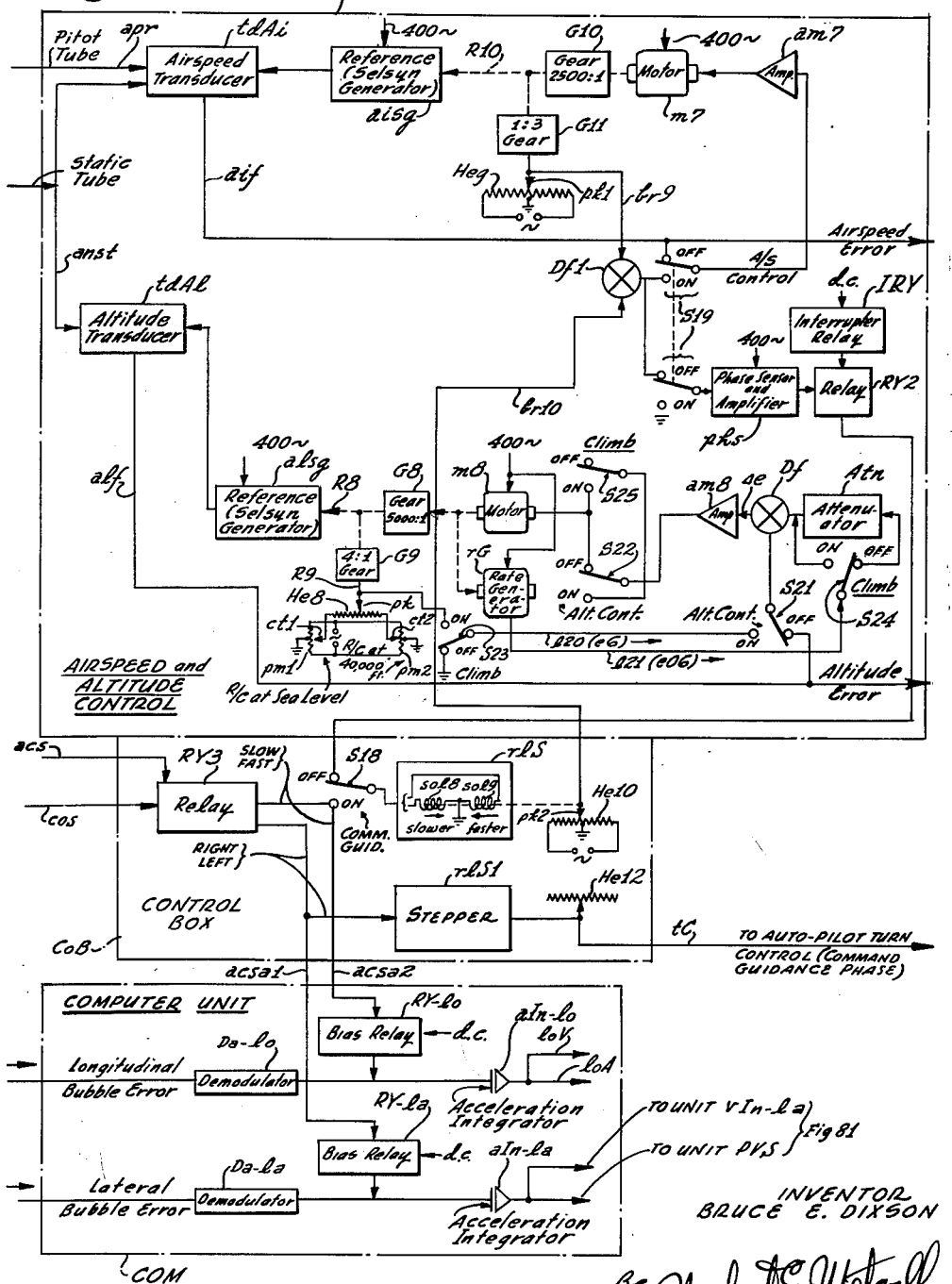

April 3, 1962 B. E. DIXSON 3,027,841
GUIDANCE SYSTEM
Filed Oct. 13, 1952 39 Sheets-Sheet 39

INVENTOR:
BRUCE E. DIXSON
By Herbert E. Metcalf
HIS PATENT ATTORNEY

# United States Patent Office 3,027,841
Patented Apr. 3, 1962

3,027,841
GUIDANCE SYSTEM
Bruce E. Dixson, Vashon, Wash., assignor to Northrop Corporation, Hawthorne, Calif., a corporation of California
Filed Oct. 13, 1952, Ser. No. 314,449
14 Claims. (Cl. 102—50)

The present invention relates to automatic celestial navigation systems and more particularly to an automatic stellar guidance system and the practical instrumentation thereof, wherein pre-computed data which specify the direction of the so-called dynamic vertical as a function of time for every instant of a pre-determined, time-scheduled flight path are carried aboard the navigated craft and compared with the vertical observed during this scheduled flight, the directional differences between the specified and the observed verticals yielding control signals which are utilized to automatically correct the craft's deviations from the scheduled trajectory.

It is a matter of geometry and trigonometry to show that an observer on earth who can establish, at his location, the vertical or gravity line and a minimum of two starlines joining his observation point with two suitable stars, and who can, at a given instant, measure the angles subtended by the vertical and each of these starlines, is in a position to determine his relative position with respect to the earth. In navigation, this position is referred to as a "celestial fix."

It is well known in the art that, on the basis of these measurements, there can be established and catalogued for ready reference an astronomical coordinate system covering the earth with a grid of latitude and longitude, which can be made unique and standard by the introduction of a standard prime meridian and a standard time.

In past decades, navigators have employed relatively simple methods of determining their position in accordance with the above broad principles. These methods are sufficiently accurate for use in slow moving craft, such as seagoing ships and slow aircraft. The procedure followed therein is to keep the heading and speed of the vessel approximately constant by the use of magnetic or gyroscopic compasses and suitable speed measuring instruments, thus holding acceleration forces more or less at equilibrium during the period of observation. The average position of a plumb-bob line or its equivalent during this period then is accepted to indicate the direction of gravity. By observing the angles formed between this gravity line and the starline of each of two suitably located stars, the instantaneous geographical position of the craft can be computed with the aid of the well known Nautical Almanac and a chronometer (= celestial fix).

In modern aircraft there is a growing need for celestial navigation means which can operate automatically and substantially continuously during a flight so as to obtain a series of such celestial fixes, the information gained from these fixes being adapted to set the steering and propulsion controls of the craft to guide it automatically along a predetermined path.

Such automatic navigation means are desirable because the increasing speeds and uncertainty of motion of aircraft require a corresponding speed and certainty of the navigator in obtaining the series of fixes, and because the accuracy of a human navigator and pilot under these conditions is not as great as can be obtained with automatic instruments. Furthermore, certain types of aircraft are unsuited for human occupancy and must, therefore, be reliably guided by automatic instruments. Automatic methods alone give promise of solving the more obstinate problems of navigation in the polar regions, for example.

Accordingly, it is a first basic object of this invention to provide means for automatically establishing continuous celestial fixes aboard the craft to be navigated.

It should be noted that, in early celestial navigation, attempts to find the true vertical direction by the average plumb-bob line did not have to take into account corrections due to true accelerations, since these accelerations were small in comparison with the prevailing accuracy of measurement. In the navigation of a high speed craft, however, these corrections become appreciable in comparison with the accuracy required for automatic celestial navigation. This brings out the salient fact that, strictly speaking, the concept of an "artificial horizon" and arguments concerning such a device are incorrect if they are intended to create the impression that the true vertical at a moving point can be accurately determined when the trajectory of the point is unknown.

Most schemes for automatic celestial navigation propose to determine the true direction of the gravity acceleration by constraining the navigated craft to negligible vertical accelerations and by analyzing the horizontal accelerations as they occur during flight. In this way, the effect of the horizontal accelerations can be taken into account in correcting the direction of the observed gravity vertical so as to obtain the so-called true vertical.

In the present invention the problem is approached from another direction: instead of analyzing the horizontal accelerations as they occur, a time schedule of horizontal accelerations, choosing their magnitudes, directions and times of occurrence, is specified ahead of time. This is merely another way of saying that the trajectory which the craft must fly is exactly specified prior to the actual flight. By pre-computing these horizontal accelerations (and by practically eliminating the vertical accelerations) the direction of the resultant of all horizontal accelerations and, with it, the direction of the normal thereto, which may be suitably called the "dynamic" vertical, is predetermined for every instant along the trajectory. Thus, the timewise history of the direction of the dynamic vertical on board a craft moving in the specified manner along a definite trajectory is known.

If, then, this specified dynamic vertical can be physically established on board the craft, the direction of the apparent vertical, as observed aboard the craft during flight, can be compared with it. Any divergence of the direction of the observed vertical from that of the specified dynamic vertical must be the result of instantaneous errors in either the horizontal accelerations or in the local gravity acceleration forces acting on the craft, or in a combination of both.

If, at any instant, the vertical observed on board coincides with the vertical specified for that instant, the craft is either at the specified position on the trajectory or it is accelerating towards that position. If the specified initial conditions are met at the beginning of the trajectory the errors will be zero at that point, and subsequent errors in the direction of the local gravity acceleration can only arise from errors in the direction and magnitude of the horizontal accelerations. Therefore, if the initial errors are zero, it is possible to counteract the unwanted components of horizontal acceleration by equal and opposite accelerations imposed by the control system of the craft.

According to the beforesaid, it is therefore one object of this invention to provide a means and method for defining the motion of a craft between two pre-determined points at constant altitude above the surface of the earth, by specifying for each successive instant of said motion the direction of the dynamic vertical which is uniquely representative of the pre-determined nature of motion of the craft at that instant.

Another object of this invention is to provide a means and method of determining deviations of the actual motion of a craft from a pre-determined motion, by comparing the verticals observed during the actual motion with the dynamic verticals which uniquely define the desired motion and which are carried aboard the craft as a pre-computed, continuous timewise reference.

Based on these two fundamental concepts, the present invention provides time-specified airborne intelligence which makes possible the automatic guidance of a craft along a pre-determined trajectory.

Assuming perfect horizontal accelerometers and a perfect control system, any horizontal acceleration errors will be immediately corrected, and the craft will fly in exactly the manner specified. However, if the control system and the accelerometers are not perfectly or instantaneously accurate in counteracting errors, then the motion of the craft deviates from the specified motion in such a way that the craft will oscillate about its specified moving position with a period of approximately 84 minutes, as if it were an undamped earth's radius pendulum. The exact form of these oscillations depends upon the characteristics of the accelerometers and of the control system. Similar oscillations occur if the specified initial conditions for the automatic flight are not met accurately and if the control system thereupon endeavors constantly to correct these initial errors. Hence, in order to minimize such oscillations, it is necessary to adhere as closely as possible to the time specified initial conditions of position and motion (direction and velocity) and to correct any subsequent horizontal acceleration errors with all possible speed and accuracy.

It is, accordingly, a further object of this invention to establish and implement a system which aims at nullifying initial trajectory errors immediately prior to the onset of full automatic navigation control and thus to eliminate, as far as possible, 84 minute oscillations which arise from these initial trajectory errors.

It is important at this point to emphasize that the present invention works around a null or reference direction which is represented by the pre-determined or pre-specified dynamic vertical. Any corrective action taken by the craft to reduce the acceleration errors relative to this direction, automatically reduces the range of accelerations over which the accelerometers must work. These acceleration errors can be integrated continuously to give the actual displacement of the craft from its specified moving position (provided, of course, the initial error conditions are taken into account). In continuously computing and recording these displacement errors relative to the specified course, the characteristics of the before-mentioned earth's radius pendulum oscillations, which appear as periodic perturbations upon the ideal trajectory, are thus automatically determined.

Continuous accurate knowledge of the craft's actual position, relative to its specified position, may be used in two ways, viz., either to correct the displacement error continuously, or to make a final correction at the end of the trajectory. In general, accurate knowledge of the displacement errors has almost as much practical value as the possession and use of a perfect system which will permit no errors to occur.

The practical realization of a guidance system utilizing the pre-computed intelligence of a time-specified trajectory hinges primarily on the physical establishment of the specified dynamic vertical on board the navigated craft. For reasons of accuracy and simplicity, the present invention establishes this direction in relation to the apparent lines to two selected stars. Since it is necessary to measure the acceleration errors in a horizontal plane which is normal to the specified dynamic vertical, this "dynamic" horizontal plane is conveniently established by specifying the altitude angles of two starlines above this plane, the azimuth separation of these starlines being held as closely to 90° as practicable. If the starlines are held by star-trackers, and if the specified altitude angles are physically laid off between the trackers and a controlled plane or platform, the normal to this platform becomes the specified dynamic vertical. For any given track and time schedule, the star altitudes relative to the dynamic horizontal plane may be computed for every instant of flight from available astronomical data. In one form, the apparatus provided is a device which contains a freely-gimballed platform upon which are mounted star trackers and angle setting devices. The latter control the angles between the platform and the star trackers according to the computed star altitude schedule, and the normal to the platform under these conditions will be maintained in the direction of the specified dynamic vertical as long as the star trackers are aimed at their corresponding stars, irrespective of the instantaneous position or motion of the craft. Any difference between the direction of this normal to the specified horizontal plane or platform and the apparent vertical, such as it is actually observed aboard the craft at any instant, appears in the form of horizontal acceleration error components in the specified plane of the platform. Acceleration-sensitive devices are supported in a plane parallel to this specified plane in order to be able to detect these horizontal acceleration errors. From the latter, acceleration correction signals are derived which are injected into the craft's control system as equal and opposite accelerations, so as to correct the craft's motion and thereby to reduce the acceleration error signals to zero.

It should be noted that, by aligning this controlled platform with respect to the specified star altitude lines, a pelorus line can be provided for referencing the azimuth direction of the craft. It is true that this pelorus line will be an apparent pelorus line; however, it can readily be shown that such a pelorus line is at least as reliable as any compass line for adjusting aircraft heading.

The resultant of all acceleration errors in the specified horizontal plane of the platform, upon which the acceleration-sensitive devices are mounted, is conveniently resolved into longitudinal and lateral components. Obviously, such acceleration error components do not yield trustworthy information as to the sense and magnitude of error unless the signal pick-off devices, destined to furnish longitudinal or lateral acceleration error signals, are correctly aligned parallel with and normal to the craft's longitudinal motion throughout the entire projected flight. To permit such an alignment, the assembly carrying the acceleration-sensitive devices must be free to rotate relative to the controlled platform and yet remain in a plane parallel thereto at all times. The present invention proposes a system in which the above-cited pelorus line of one of the tracked stars serves as a basic azimuth reference. A pre-computed airborne source of trajectory azimuth data, defining the angle subtended between this pelorus line and the specified direction of flight as a function of time, constantly operates to maintain the acceleration error pickoff devices in correct azimuth alignment with the trajectory.

In accordance with this brief analysis, it is one further object of the present invention to physically establish a plane normal to the specified dynamic vertical aboard the craft by laying-off pre-computed star altitude angles from the lines of sight of two tracking telescopes, thus establishing an airborne dynamic horizontal plane which continuously and automatically serves as a reference plane for measurements of acceleration errors in this plane.

It is still another object of this invention to provide a means and method for originating continuous acceleration error signals aboard a craft which can be utilized for automatically correcting the motion of this craft along a pre-specified trajectory.

An additional object of this invention is to create a means and method for providing acceleration signals which constitute deviations from pre-specified accelerations, only the differences in acceleration, not the total accelerations, being measured for the purpose of detecting the error components in the motion of the guided craft.

Another object of this invention is the provision of a method, and of airborne apparatus, for maintaining acceleration error sensitive devices automatically in azimuth-alignment with a specified trajectory.

It is important to note that basically the computed input intelligence of this system, which establishes the time-specified trajectory, is also the sole reference by which the output intelligence is derived, this output intelligence being in the form of signals useable for automatically navigating a craft along that trajectory. In other words, the complete system constitutes a single-loop null-seeking servo system and can thus be inherently more accurate than any other system which is not null-seeking or which includes more than one servo loop (the usual case).

Hence, it is a further object of this invention to provide a means and method for obtaining a readily useable control intelligence for automatically correcting deviations of a guided craft from a pre-specified trajectory through the use of but a single-loop null-seeking servo system.

In order to enhance the usefulness and versatility of the automatic celestial navigation system under specification herein, it is highly desirable to make provisions for automatic star-changeovers during flight and thus to increase the range over which this system can be made to operate continuously. Such provisions, in one form, call for a duplicate set of tracking telescopes, for resetting mechanisms on each of the four telescopes used in the set-up of the platform assembly, and for memory or data-storing devices capable of actuating these resetting mechanisms at the proper time during a scheduled flight.

In the system herein specified, automatic celestial navigation begins only after the craft has reached the altitude and condition of motion scheduled for the initial portion of a particular flight. In addition, a definite departure point and a definite departure time are set in the described system for the initiation of such a flight. The craft should reach this departure point at the specified time and should, at that time, move in the correct direction and at the correct speed, and fly at the scheduled altitude, if subsequent motions of the craft under automatic control of this navigation system are to be successfully executed. Manifestly, these preliminary flight requisites cannot be satisfied by any mode of operation of the stellar guidance system proper, but must be fulfilled by means external to this system and, yet, in close adaptation to the anticipated mode of operation of all units under control of this system. Hence, all preliminary guidance operations are subjected to a time schedule closely "pre-fitted" to that of the stellar guidance phase, and all airborne platform controlling units, including tracking telescopes, altitude and azimuth-angle setting devices, resetting mechanisms, etc., as well as the acceleration sensitive pick-offs on the platform and other pertinent component units, are kept in readiness, during this preliminary period, for the particular functions which they are scheduled to perform at the onset of the celestial guidance phase of flight and at a subsequent star-changeover points. While it is true that the various platform-supported units can be pre-set ahead of time into their operating positions relative to the platform which they must occupy at the moment of the craft's arrival at the departure point, it is obviously desirable to make special provisions for holding the platform as nearly as possible within the scheduled horizontal plane during, and particularly in the last portion of, the so-called pre-celestial phase of flight between take-off point and the onset of automatic celestial navigation. If this control is performed judiciously and with due regard also to the azimuth orientation of the platform, the system will be ready to operate on schedule when automatic celestial navigation control begins. The star-images must appear within the optical fields of the telescopes before the tracking servo systems of the telescopes can begin to function properly. Special means for pre-celestial platform control are therefore incorporated in the presently described automatic celestial navigation system, which preferably make use of the acceleration sensitive properties of the same devices which later serve to detect acceleration errors of the craft during the celestial guidance phase of the flight. With the exception of a flux valve control for azimuth orientation of the platform, no additional airborne equipment is needed for pre-celestial platform control. In particular, the use of directional and vertical gyros for platform stabilization is not required.

It is evident that any multiple-function control system of the nature of the proposed automatic celestial navigation system calls for a stringent timing and synchronizing procedure through all phases of the guidance program in order to obtain the required accuracy of performance. All airborne functions are to be accurately coordinated in their proper time-sequence. To this end, auxiliary airborne equipment has been incorporated in the present invention which, in one form, consists preferably of a sequencing unit containing multiple-position stepping switches and a patchboard upon which the program of operation can be preset prior to the flight, as well as of a centralized unit in the form of a switchboard for surveying all automatic control action and for facilitating certain manual operations during pre-setting procedures. The latter (switchboard) unit also affords visual observation and auxiliary control actions during pre-celestial and automatic celestial flight control, in case the guided craft is manned by observers, as may be desirable in some instances. Automatic actuation of this airborne sequencing equipment in compliance with a pre-computed time-program is carried out by sequence pulses whose time-wise record is kept aboard by the same memory device which also preserves the star altitude function intelligence. These sequence pulses are released in chronological order in precise synchronism with the actual time of their scheduled occurrence.

In accordance with the above-cited contentions, it is an additional object of the present invention to extend the continuous range of operation of this automatic stellar navigation system by providing airborne automatic star-changeover circuitry which permits repeated re-positioning of each star tracker to a new reference star during one and the same automatic flight.

A further object of this invention lies in the implementation of a method of preliminary stabilization of the platform without the aid of gyroscopic devices.

Still another object of this invention is the method of programming, sequencing and relative-synchronizing of all airborne automatic functions in combination with an airborne time-scheduled source of flight intelligence.

The entire airborne assembly of apparatus directly concerned with or dependent on the above described platform control, including star tracking telescopes, angle setting and re-setting mechanisms, acceleration sensitive units and their separate azimuth drives, as well as the necessary gimbal system for support of the platform assembly, is combined in one single, compact structure which is deemed to be an automatic sextant pelorus navigator. Henceforth, for brevity, this device will be called an "automatic sextant." The combination of stepping relays, patchboards and instrument panel for the time-sequencing of all airborne functions will be designated as a "master controller." The Automatic Celestial Navigation system (ACN system), defined by the above-enumerated general objectives of the present invention, hereinafter will be referred to as the "Northrop Celonav System" (Celonav being contracted from Celestial Navigation) or as the "Northrop ACN System," Northrop Aircraft, Inc., being the assignee of this application.

Certain terms used in the ensuing specification are herewith defined as follows:

*Trajectory.*—A course on or over the surface of the earth between two or more geographic locations and specified in terms of position and motion along it as a function of elapsed time.

*Specified trajectory.*—A particular interesting trajectory along which it is intended to navigate an air or surface craft.

*Time specified trajectory.*—A specified trajectory whose terms are functions of specified time.

*Existing trajectory.*—The actual trajectory of any navigated craft at any instant of observation.

*Specified time.*—Civil or standard time selected for any instant along a time-specified trajectory.

*Absolute direction.*—A direction established with respect to a stellar (inertial) coordinate system.

*Specified on-board plumb bob or specified dynamic vertical.*—An on-board plumb bob whose direction is determined by the surrounding force field of the specified trajectory. This direction is computed in advance from the known specified conditions and constitutes one part of the ACN supply intelligence, the other being specified time.

Since the optical axis of any one of the telescopes that are mounted on the airborne platform structure is held in fixed alignment normal to the portion of the platform structure which is representative of a horizontal reference plane, any physical portion of the telescope structure that remains permanently in a fixed position parallel to this optical axis can be taken as a physical representation of the vertical to the platform reference plane. Only if the conditions outlined in column 71, lines 1 to 23, and/or column 100 of this specification are fulfilled, can the optical axis of one of the telescopes be considered representative of the specified dynamic vertical. The expression "physically establishing the specified dynamic vertical aboard the craft" applies exclusively to these conditions. It is equivalent to the expression "physically establishing a specified dynamically balanced horizontal plane aboard the craft" since both these references, namely the specified horizontal plane and the specified normal thereto, are physically established only if the two specified dynamic star altitude angles which apply to a particular specified or computed dynamic vertical, are physically established between the sighting prisms of two telescopes and the reference plane of the supporting platform structure which is common to both telescopes, and if these same two telescopes are simultaneously tracking the two specified stars.

*Existing on-board plumb bob or observed vertical.*—An on-board plumb bob whose direction is determined by the surrounding force field of an existing trajectory. This direction is not known in advance and must be observed at the specified time. (=An apparent vertical whose intersection with the celestial sphere defines the apparent zenith.)

*Static vertical.*—A "true" vertical or gravity line at a stationary observation point on earth.

*Specified apparent horizontal plane or specified (dynamic) horizontal plane (specified artificial horizon, dynamically balanced horizontal plane).*—A plane normal to the line of direction of a specified on-board plumb bob or normal to the dynamic vertical.

*Existing or observed horizontal plane.*—A plane normal to the existing on-board plumb bob or normal to the observed vertical.

*Static horizontal plane.*—A plane normal to the static vertical.

*Starline.*—Imaginary straight line joining point of observation with an interesting navigation star.

*Apparent star altitude.*—The complement of the angle between the line of direction of an on-board plumb bob and the line of direction of a star, this complement being formed against the normal to the observed vertical. (=The angle subtended between a starline and the observed horizontal plane.)

*Specified apparent start altitude or specified dynamic star altitude.*—The complement of the angle between the line of direction of a time-specified dynamic vertical and the direction of a specified starline, this complement being formed against the normal to the specified dynamic vertical. (=The angle subtended between the specified starline and the specified horizontal plane.)

*Starting point.*—Geographic location from which journey of the craft begins (= launching or take-off point).

*Departure point.*—The initial point on the time-specified trajectory where automatic celestial navigation begins.

*Prime star.*—Navigation star being tracked by the telescope which, during tracking functions, remains in fixed azimuth relation to the supporting platform.

*Azimuth separation of navigation stars.*—The smaller angle of intersection between the projections of two starlines onto a horizontal plane.

Additional terms will be defined in the process of disclosure of the pertinent features and functions.

The automatic sextant and the Northrop ACN system incorporated therein utilize a unique relationship found to exist between the heavenly bodies, a plumb bob aboard a craft and any time-specified trajectory of that craft on or over the surface of the earth. The navigational concepts, developed from this relationship and expressed in the essential objectives of the invention enumerated in the preceding paragraphs, are summarized below. The theoretical soundness of these concepts and all deductions derived therefrom can be proven and, wherever feasible and needed, such proof, or the essential aspects thereof, will be included in the ensuing analyses of the applied principles:

(a) Motion in any interesting trajectory between two or more points on or over the surface of the earth can be specified as a function of time in terms of the absolute direction of a plumb bob aboard a craft moving along that trajectory.

(b) The direction of the on-board plumb bob is determined by the surrounding force field which is composed of forces due to the earth's gravity, the earth's motion in space, forces due to the motion of the craft about the rotating earth and due to the acceleration of the craft with respect to the earth, etc. All these forces are known at any point along a given time-specified trajectory.

(c) From existing astronomical data for a specified time, the direction of the plumb bob for any time specified trajectory can be defined by its angular relationship to two star lines, preferably in terms of specified apparent star altitudes.

(d) Intelligence in the form of two specified apparent star altitudes for each point of position along a time-specified trajectory, properly stored and released at the correct instants of time, constitutes the complete information necessary for establishing on board the navigated craft a specified apparent horizontal plane for each instant of said time-specified flight. This plane, by definition, is always normal to the line of direction of the time-specified on-board plumb bob throughout the scheduled flight. Azimuth angles in this plane can be indexed against the apparent lines of bearings of the selected navigational star.

(e) Automatic celestial navigation can be performed by detecting aboard the navigated craft the instantaneous deviation in the direction of the existing on-board plumb bob from that of the specified on-board plumb bob, provided the craft is equipped with means for re-establishing aboard the craft, at every successive instant of the scheduled flight, the pre-computed direction of the specified plumb bob in the form of a star-slaved specified horizontal plane, and provided that deviations of the existing plum bob direction from the specified direction can be suitably detected in this plane throughout the ACN phase of flight.

(f) Whenever the existing plumb bob direction is coincident with the specified plumb bob direction and a condition of zero deviation is thereby established, the navigated craft is either at the specified position, moving in the specified direction of the trajectory at the specified time and speed, or it is accelerating toward that position.

(g) If, at any time, along a time-specified trajectory, the craft digresses from the specified position or motion, and its subsequent motion is controlled in such a manner as to maintain a condition of zero deviation wherein the existing plumb bob position and the specified plumb bob position remain coincident, then the navigated craft will swing about the specified moving position as if it were a simple pendulum of a length equal to the earth's radius.

The present invention will be more fully understood by reference to the ensuing specification and appended drawings which have been conveniently arranged in two principal groups, one group covering all functions concerned with the supply and storage of trajectory intelligence, and the second group describing methods and means for deriving from this stored trajectory intelligence the necessary control intelligence for automatic guidance of a craft. More specifically, in this second group or division, a detailed functional description is given of a preferred execution of an automatic sextant for nighttime operation. To this latter principal division is added a division on "Supervised Celestial Navigation" including a summary on the subject of "Initial Guidance" (supervised celestial navigation or the "SCN phase" of flight is concerned with the elimination of 84 minute oscillations due to initial trajectory errors) and a division on "Automatic Flight Control" in which a summary description is submitted of a preferred system and means for automatic control of a craft in accordance with the dictates of the Northrop Celonav System and method. While not directly related to the specific subject matter of the present invention, inclusion of this last division is deemed desirable for a fuller understanding of the overall control problems involved. All problems and systems involving the so-called "terminal guidance" phase of flight are entirely omitted from this specification and form no part of the present invention.

In accordance with the abovesaid, the appended drawings are listed below within the frame-work of a table of contents in which the Roman numerals and lower-case letters refer to the divisions and subdivisions or sections, respectively, of the descriptive text material which accompanies these illustrations and which is arranged in the order outlined above. An introductory division precedes the principal specification in which the general layout of the trajectory data supply system and of the structure of the night-time automatic sextant is summarily outlined.

This specification includes, in part, subject matter contained principally in the assignee's following prior filed U.S. patent applications and referred to in various sections of the ensuing text:

(1) Ser. No. 133,816—Binary Incremental Slope Computer, filed December 19, 1949, now Patent No. 2,921,740;
(2) Ser. No. 139,984—Electronic Clock and Intervalometer, filed January 23, 1950, now Patent No. 2,958,179;
(3) Ser. No. 124,334—Electronic Counting Device, filed October 29, 1949, now Patent No. 2,620,440;
(4) Ser. No. 152,043—Pigtails, filed March 27, 1950, now Patent No. 2,702,889;
(5) Ser. No. 88,148—Angle Setting Device, filed April 18, 1949, now Patent No. 2,940,172;
(6) Ser. No. 81,222—Automatic Star Tracker and Sextant, filed March 14, 1949, now Patent No. 2,931,910;
(7) Ser. No. 101,068—Secondary Observation Window, filed June 24, 1949, now Patent No. 2,962,925;
(8) Ser. No. 171,790—Paralleling Lens System, filed July 3, 1950, now Patent No. 2,571,308;
(9) Ser. No. 81,221—Light Chopper, filed March 14, 1949, now Patent No. 2,972,812;
(10) Ser. No. 66,370—Linear Bubble Level Signal Device, filed December 20, 1948, now Patent No. 2,713,727;
(11) Ser. No. 50,770—Bubble Level Condition Indicator, filed September 23, 1948, now Patent No. 2,713,726.

DIVISION II—TABLE OF CONTENTS

Division I. Introduction (supra).
Division II. Table of contents.
Division IIA. List of divisions and sections with description of figures pertinent thereto.
Division III. General description of trajectory data supply system and of nighttime automatic sextant.
Division IV. Computation and recording of trajectory data.
Division V. Detailed functional description of nighttime automatic sextant.
Division VI. Supervised celestial navigation including summary on initial guidance.
Division VII. Automatic flight control system.

DIVISION IIA—LIST OF DIVISIONS AND SECTIONS WITH DESCRIPTION OF FIGURES PERTINENT THERETO

In Divisions I, II, IIA and III—No figures.

IN DIVISION IV—COMPUTATION AND RECORDING OF TRAJECTORY DATA

*Section (a)—Computation of Stellar Altitude Angles*

Figure 2:
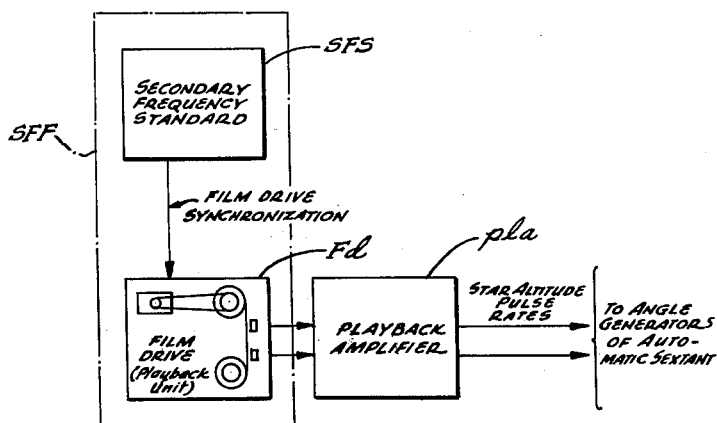

FIG. 1—General flow diagram of ground facilities for computation and recording of trajectory data.
FIG. 2—General flow diagram of airborne facilities for playback of computed trajectory data.
FIG. 3—Graphic interpretation of vector set-up for defining star altitude angles.
FIG. 4—Graphic display of essential trajectory parameters and coordinate systems used in the process of star altitude computation.

*Section (b)—Computation of Bubble Turret Azimuth Angles*

FIG. 5—Diagram showing relationship between trajectory, platform-azimuth angle and bubble turret-azimuth angle.
FIG. 6—Same as FIG. 5, showing in addition how the telescope setting on the platform affects the bubble turret azimuth angle.
FIG. 7—Graph showing vector set-up for defining azimuth angle between trajectory and starline-projection onto specified horizontal plane.

*Section (c)—Generation of Pulse Rates*
*(Digital electronic linear interpolator)*

Figure 8:
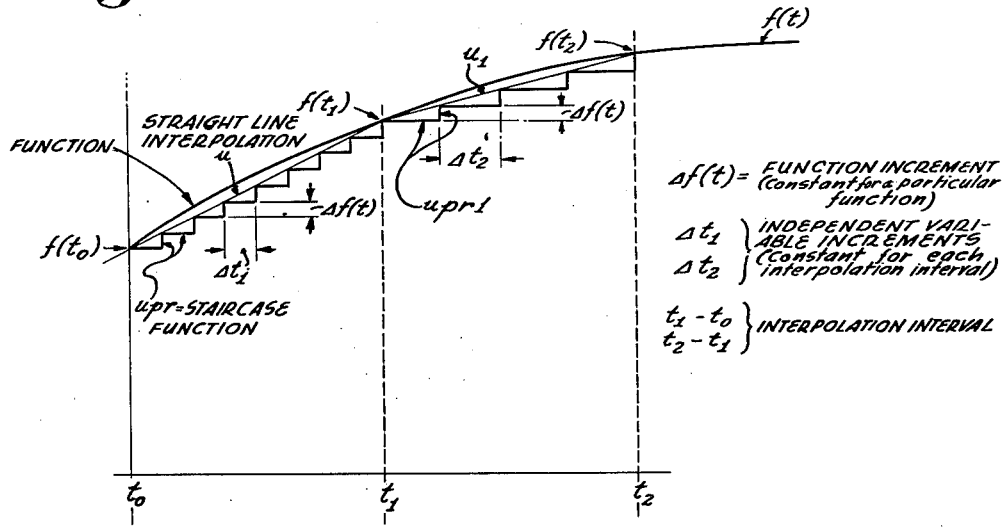
Figure 9:
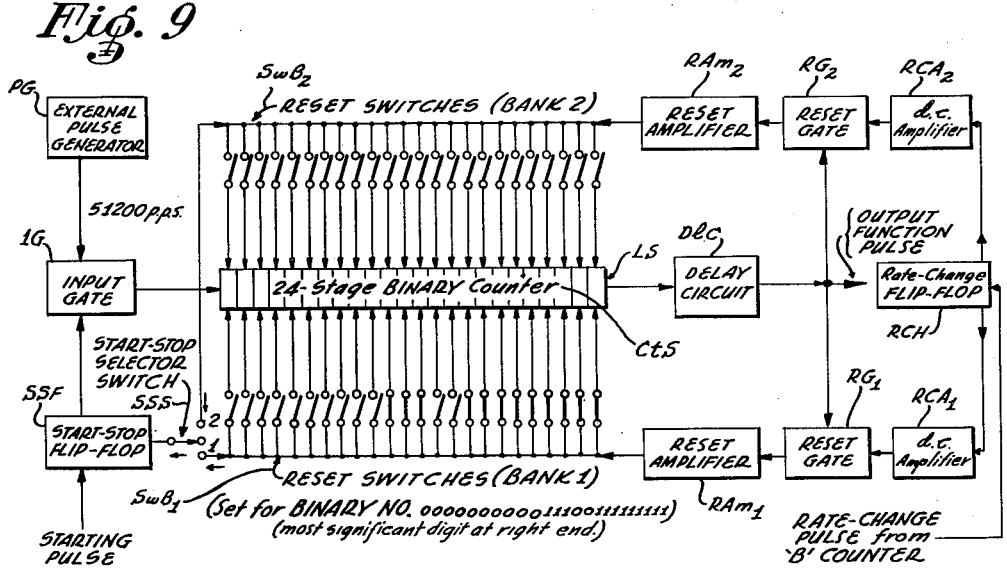
Figure 10:
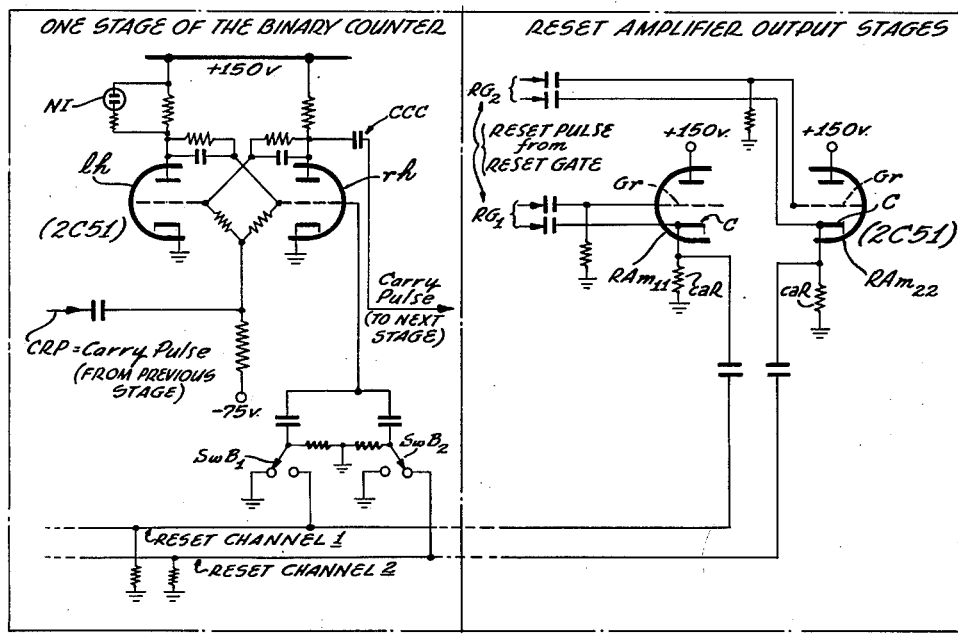
Figure 11:
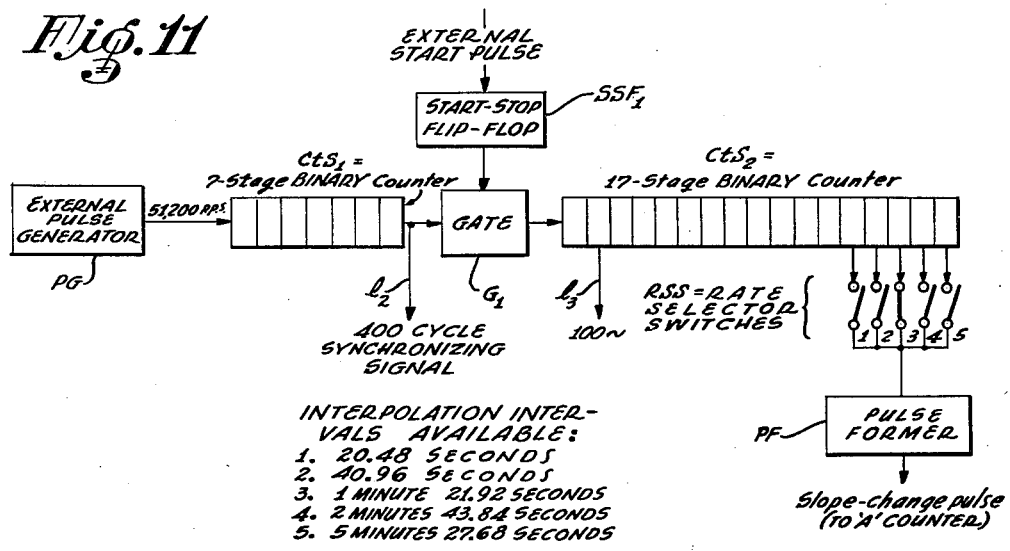

FIG. 8—Graph showing method of straight line interpolation and "staircase" approximations employed for expressing a star altitude angle curve in terms of varying pulse rates.
FIG. 9—Simplified schematic of pulse rate—or "A"-counter showing set-up of control units and switches which actuate this counter.
FIG. 10—Diagram showing details of one single binary stage of "A"-counter of FIG. 9 and of associated channels.
FIG. 11—Simplified block diagram of "B"-counter and associated control channels. (See also FIG. 50 in Division V, Section c.)

*Section (d)—Recording of Trajectory Data and Sequencing Schedule (Tape Recorder and Playback Unit)*

FIG. 12—Schematic oblique profile view of entire recording and playback unit assembly.

FIG. 13—Sectional diagram showing drive—and speed control motors—and associated gearshift mechanism.

FIG. 14—Sectional view in planes $H_1$—$H_1$ at right angles to the plane of FIG. 13 showing gearshift and sprocket drive mechanisms.

FIG. 15—Enlarged schematic showing details of preferred construction of a reel-lock.

FIG. 16—Cross-sectional view of clutch-drive assembly.

FIG. 17—Sectional view of sprocket wheel drive showing details of ratchet wheel and chain pulley assemblies.

FIG. 18—Details of foil channel head: schematic side view.

FIG. 19—Details of foil channel head: schematic front view.

FIG. 20—Phantom section view of recording head casing assembly showing reel path through assembly.

FIG. 21—Cross-sectional view of the three upper retainer units of FIG. 20 as seen in plane $A_1$—$A_1$ at right angles to the plane of FIG. 20.

FIG. 22—Sectional view of second upper retainer unit of FIG. 20 as seen against plane $B_1$—$B_1$ through longitudinal axis of this unit.

*Section (e)—System Synchronization Including Electronic Precision Clock*

FIG. 24—Functional block diagram of overall system of synchronization including essential details of electronic precision clock.

IN DIVISION V—DETAILED FUNCTIONAL DESCRIPTION OF NIGHTTIME AUTOMATIC SEXTANT

FIG. 24—Composite schematic drawing of entire automatic sextant assembly, portions of housing and other component units being broken away to reveal details of platform assembly, etc.

FIG. 25—Simplified "mock-up" of FIG. 24 showing major components of the automatic sextant and their functional relationship, portrayed in the same perspective as in FIG. 24.

*Section (a)—Altitude Angle Generator*

Figure 26:
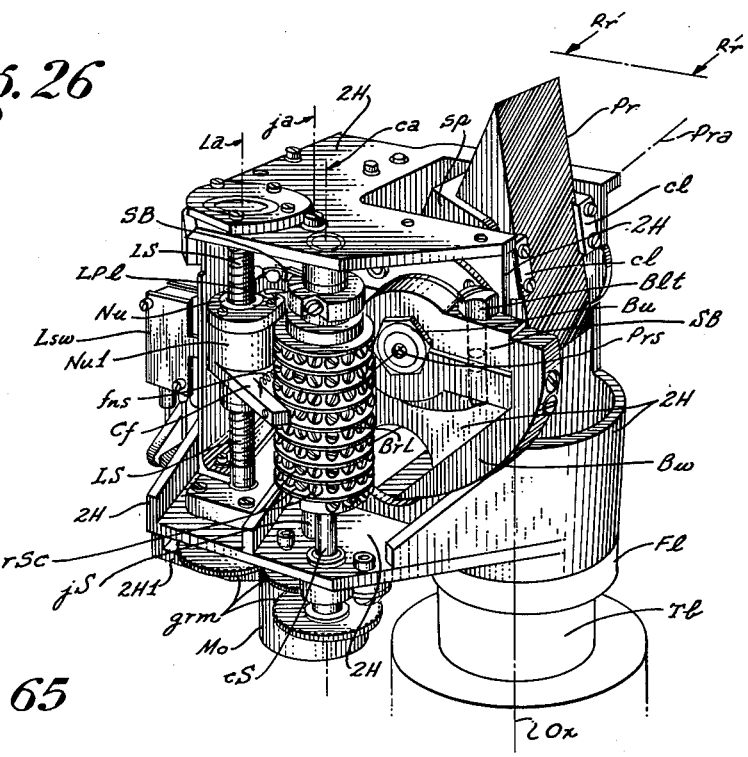

FIG. 26—Schematic perspective view of one altitude angle generator unit showing details of assembly.

FIG. 27—Simplified functional diagram illustrating operating principles of unit of FIG. 26.

FIG. 28—Enlarged schematic bottom view of escapement gear assembly.

FIG. 29—Schematic diagram showing details of sine bar.

FIG. 30—Schematic diagram showing relationship between rotary travel of altitude angle-drive gears and magnitude of elevation tilt of prism.

*Section (b)—Star Tracking System*

Figure 31:
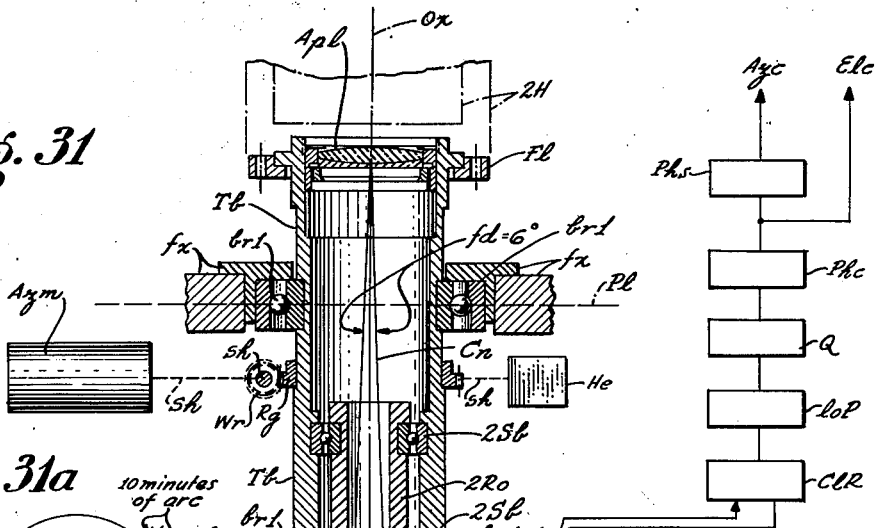

FIG. 31—Cross-sectional elevation view of one telescope unit (minus altitude angle generator of FIG. 26) and block-diagram of control units in signal channel of star tracking system associated with this telescope unit.

Figure 31A:
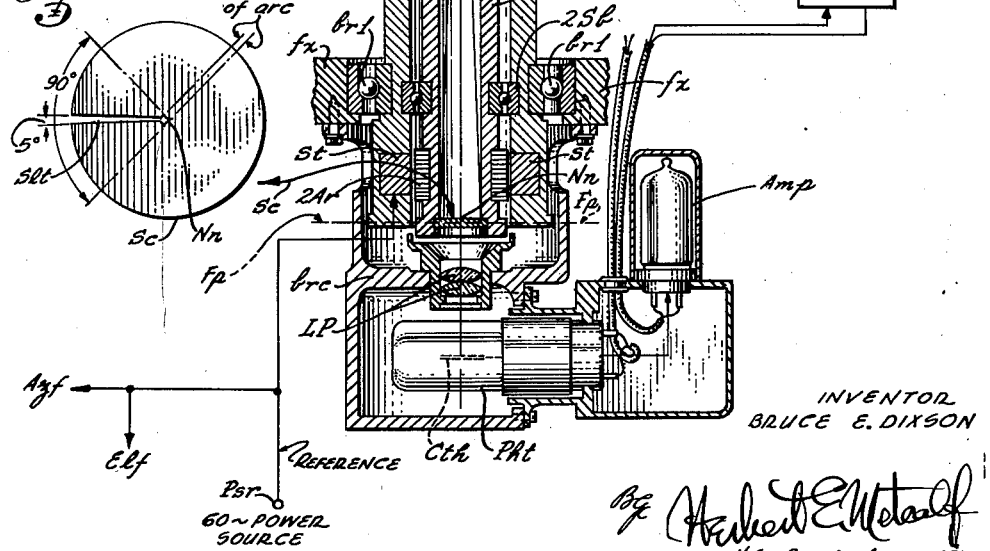

FIG. 31a—Enlarged plan view of scanner disc with preferred form of slot with flared portion at center of disc.

FIG. 32—Simplified sketch showing general operating principles of basic star tracking system.

FIG. 33—Schematic diagram showing adaptation of principles of basic system of FIG. 32 to four telescope structure of automatic sextant.

FIG. 34—Simplified diagram showing essential principles governing orientation of prism in an elevation plane normal to the platform of the automatic sextant.

FIG. 35—Same as FIG. 34, viewed in an elevation plane $El$—$El$ at right angles to that of FIG. 34.

FIG. 36—Simplified diagram showing essential principles governing orientation of prism in an azimuth plane parallel with the platform of the automatic sextant.

*Section (c)—Prism Resetting Counter*

FIG. 37—Enlarged schematic perspective view of one resetting counter assembly.

FIG. 38—Detailed cross-sectional view of the first counter unit and of the first of four planetary gear-counter units contained in the resetting counter of FIG. 37, the remaining three planetary gear counter units being shown in profile only.

FIG. 39—Detail profile sketch showing enlarged broken-away portion of first counter unit of FIG. 38.

FIG. 40—Plan view of a lock-washer used in the first counter unit of FIG. 38.

FIG. 41—Enlarged profile view of circular "undulated" spring employed in all counters of the assembly of FIG. 38.

FIG. 42—Plan view of spring of FIG. 41.

Figure 43:
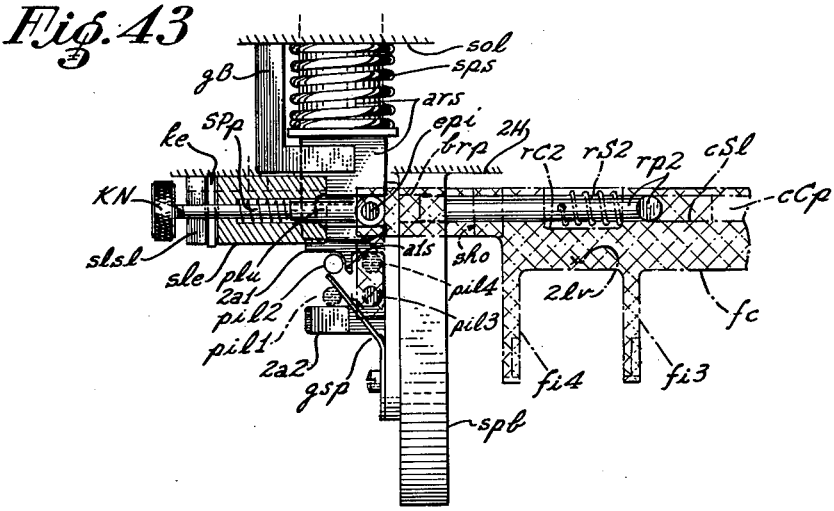

FIG. 43—Phantom section view of shifting guide and associated parts, taken in the general direction of arrow AA of FIG. 37 and showing location of these parts relative to each other and relative to the stop-assembly of FIGS. 37 and 45, only a broken-away portion of the latter being drawn into the present figure.

Figure 44:
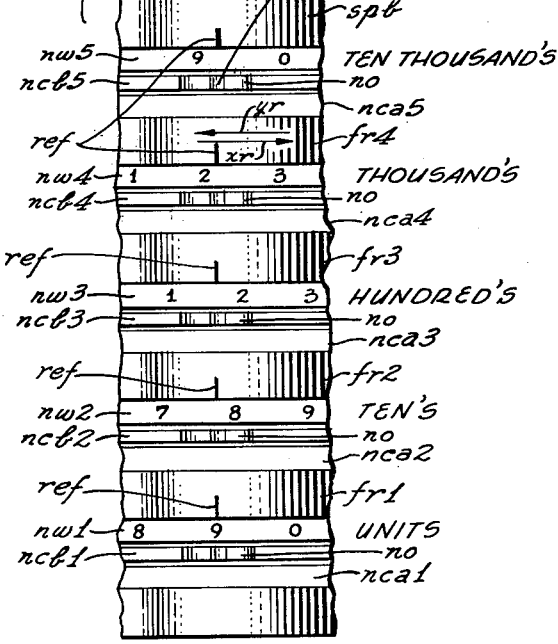

FIG. 44—Simplified close-up sketch of essential portions of counter unit-sequence showing procedure for presetting cams to desired numerals.

FIG. 45—Greatly enlarged perspective sketch of stop assembly, detached from resetting counter of FIG. 37 and turned "upside-down" in order to present details of stop-mount.

FIG. 46—Detail sketch showing broken-away portions (slotted retainer and end wedge) of stop mount of FIG. 45.

FIG. 47—Detail drawing of stop mount of FIG. 45, showing profile of detached semi-circular carriage with counter-stop and end wedges.

FIG. 48—Cross-section through the stop mount of FIG. 45 as seen in the general direction of arrows TT—TT of FIG. 45 against a plane in which the axis of the mounting pin for the counter stop is located.

FIG. 49—Detail drawing of stop wedge *ssm*.

Figure 50:
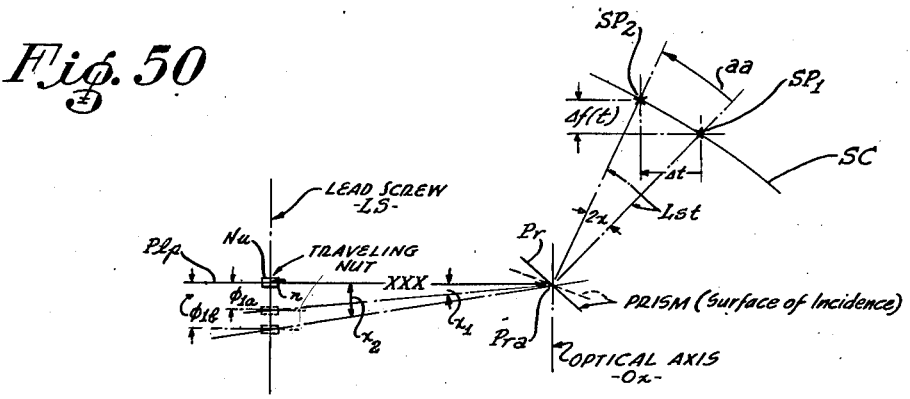

FIG. 50—Sketch illustrating example of "manual" selection of pulse-rate per interpolation interval (see Division IV, Section *c*) and determination of resetting counter reading per given number of function pulses (see present Division V, Section *c*).

*Section (d)—Observation Window*

FIG. 51—Diagram showing general case of geometry of positional relationship between observation window and specified (dynamic) horizontal plane of platform.

FIGS. 52 and 53—Diagrams showing geometry which establishes optimum position of certain limits of prism optics, including factors determining these limits.

*Section (e)—Bubble Turret Assembly*

FIG. 54—See Division V, Section *g*.

FIG. 55—Schematic diagram showing exploded view of bubble turret assembly.

FIG. 56—Simplified sectional view through pivotal axis of bubble turret proper.

FIG. 57—Schematic profile drawing of a single bubble unit and of portions of the supporting structure, parts of the bubble unit being broken away in order to reveal details of construction.

FIG. 58—Greatly enlarged profile sketch of one of the flat contact strips used for transfer of electrical energy from and to slip rings.

*Section (f)—Bubble Turret Azimuth Drive*

Figure 59:
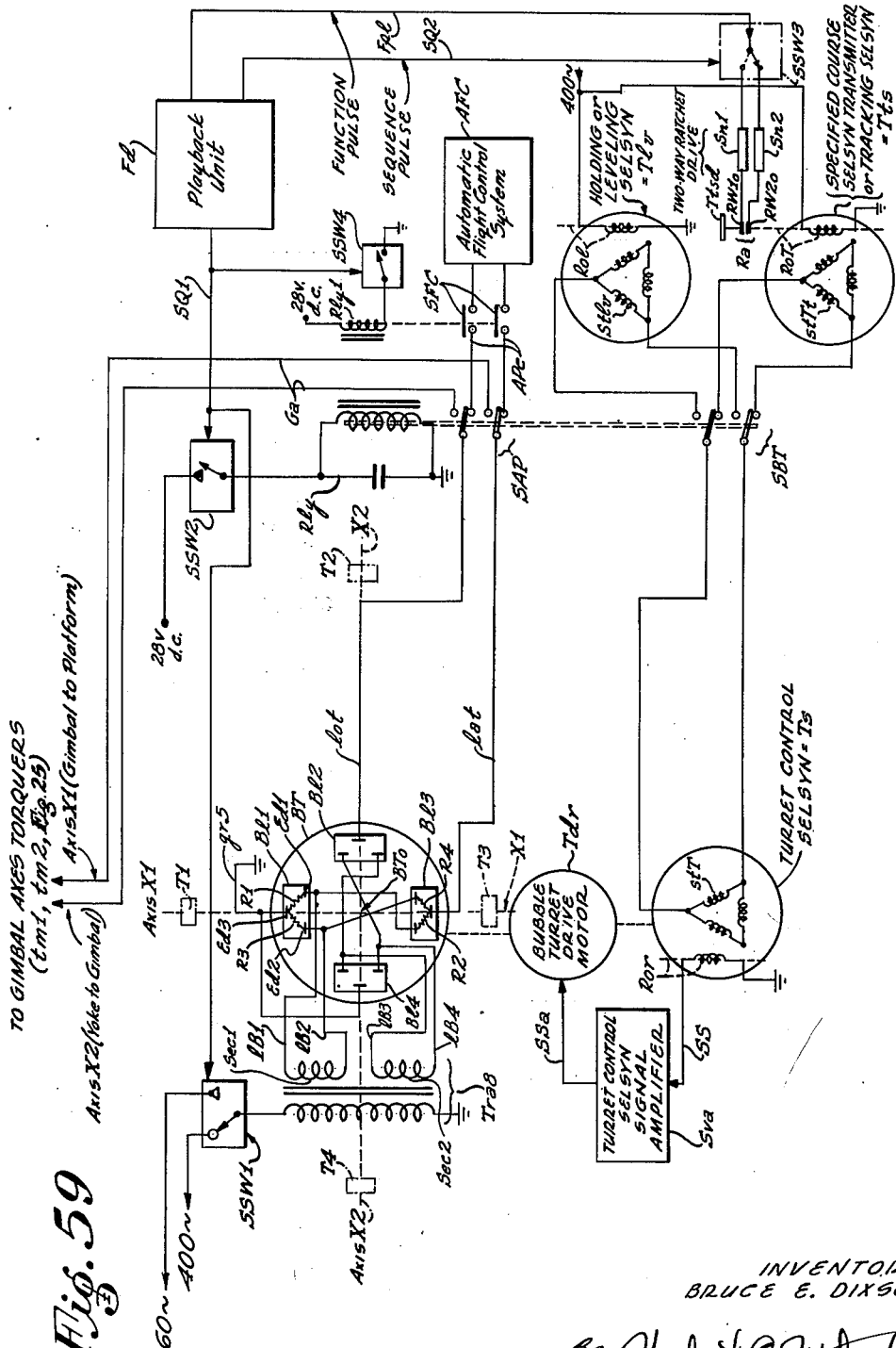

FIG. 59—Simplified wiring diagram showing layout of bubble turret azimuth drive servo system and associated control units.

FIG. 60—Enlarged and expanded view of a two-way ratchet drive assembly (such as that of FIG. 59).

FIG. 61—Detail sketch of ratchet drive of FIG. 60, pawl disengaged.

FIG. 62—Same as FIG. 61, pawl engaged and locked.

*Section (g)—Acceleration Error Detection by Bubble Units (See FIG. 59)*

FIG. 54—Sketch illustrating basic aspects of relationship between specified platform position and bubble acceleration errors.

*Section (h)—Azimuth Positioning of Platform and Bubble Turret (Including Pre-Celestial Orientation and General Principles)*

FIGS. 63 and 64—Schematic diagram illustrating principles which govern azimuth orientation of platform, telescopes and bubble turret in the course of a hypothetical flight.

*Section (i)—Sequence Control*

Figure 65:
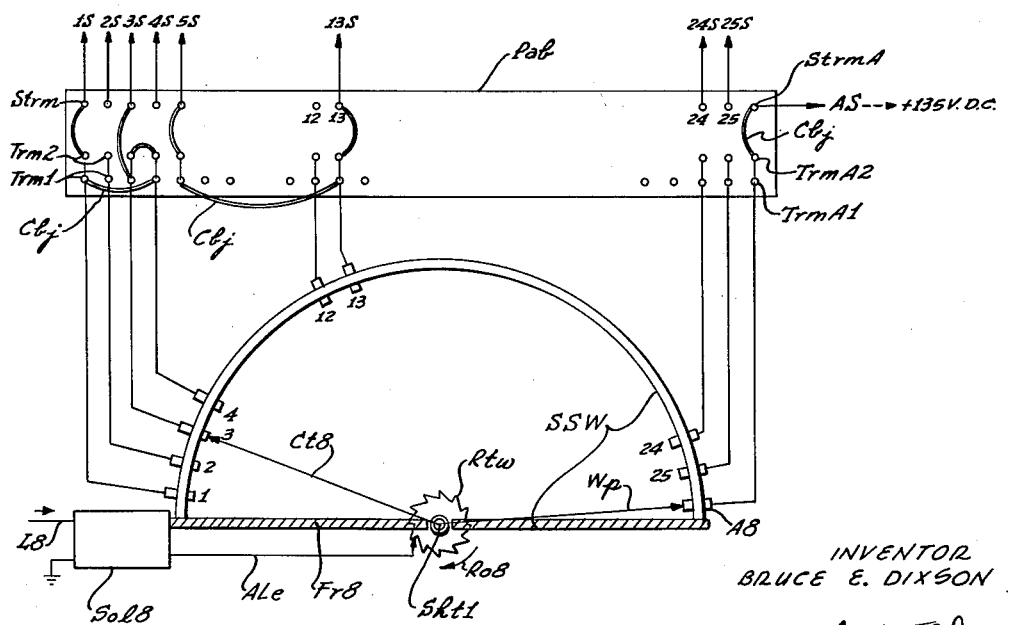

(1) MASTER CONTROLLER (A) Stepping Switches and Patchboard:

FIG. 65—Simplified schematic drawing of a single sequence switch-unit with portion of patchboard associated therewith.

Figure 66:
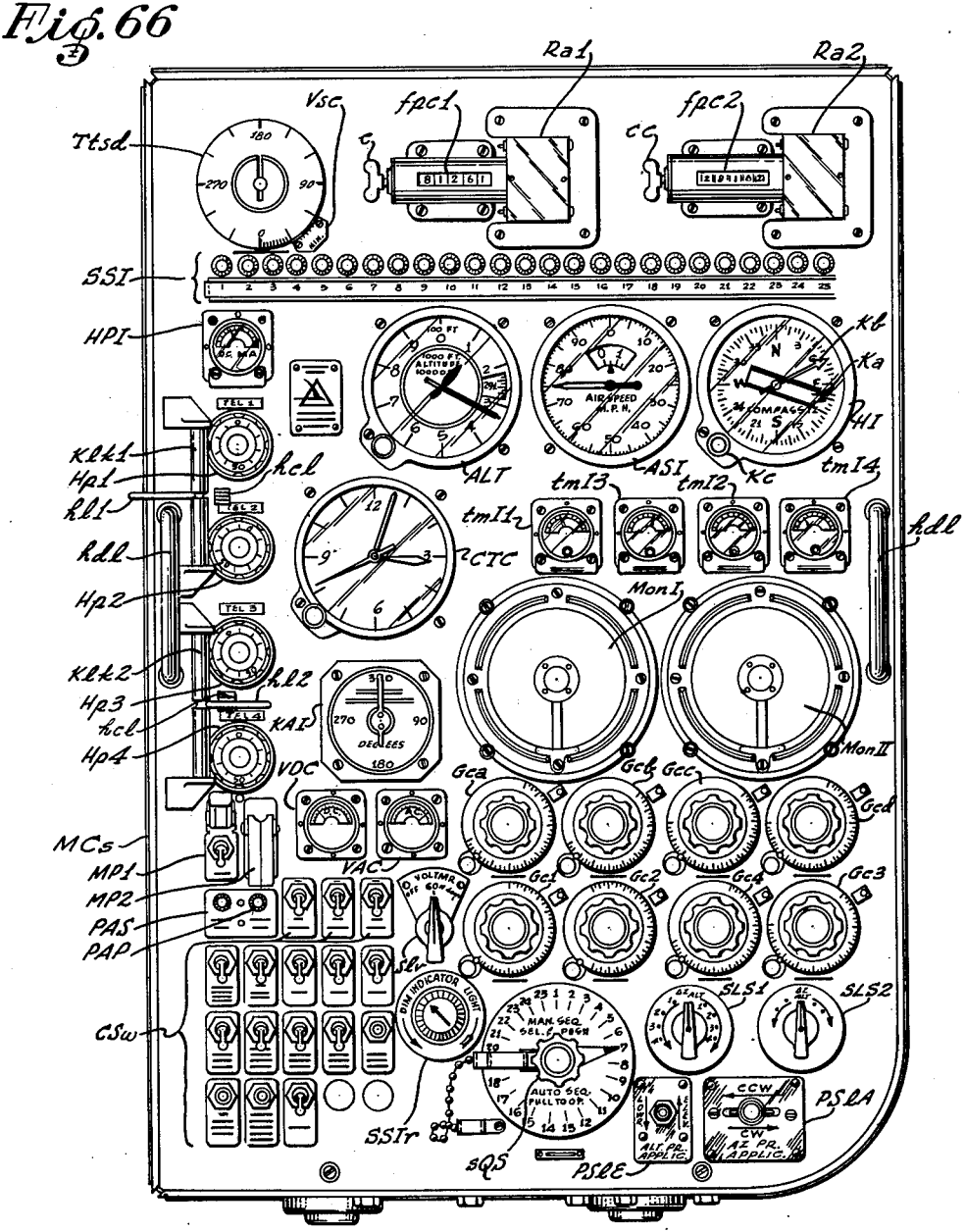

(B) Master Controller Panel:

FIG. 66—Diagrammatic front view of master controller switch board.

(2) ALTITUDE ANGLE GENERATOR CONTROL (PRISM SETTING SEQUENCE CONTROL CIRCUITRY)

Figure 67:
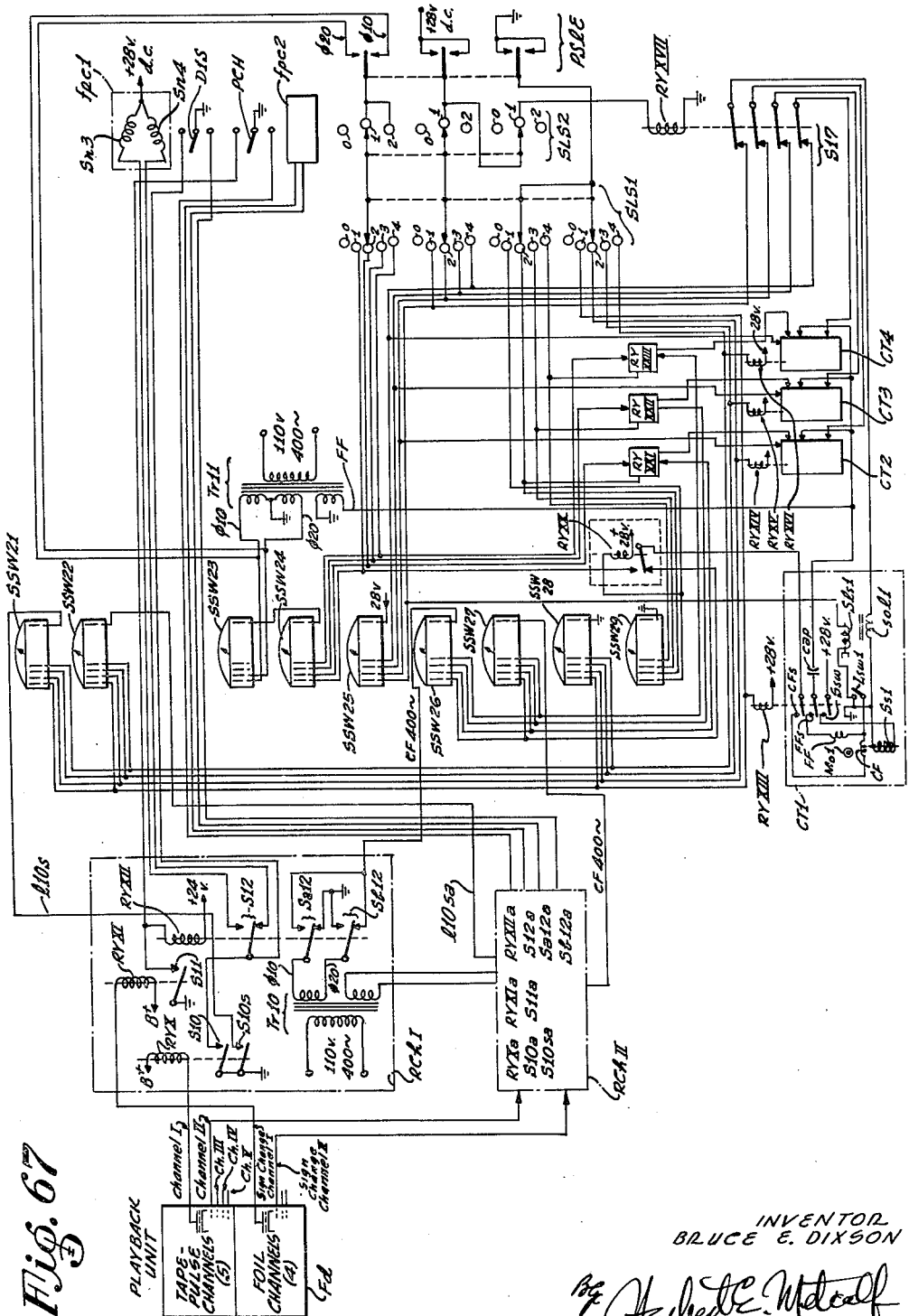

FIG. 67—Simplified wiring diagram of altitude angle generator sequence control circuitry.

(3) TELESCOPE AZIMUTH MOTOR CONTROL (MOTOR DRIVE SEQUENCE CONTROL CIRCUITRY)

FIG. 68—Sketch illustrating basic set-up of bridge-type helipot servo control of telescope azimuth drive motor.

Figure 69:
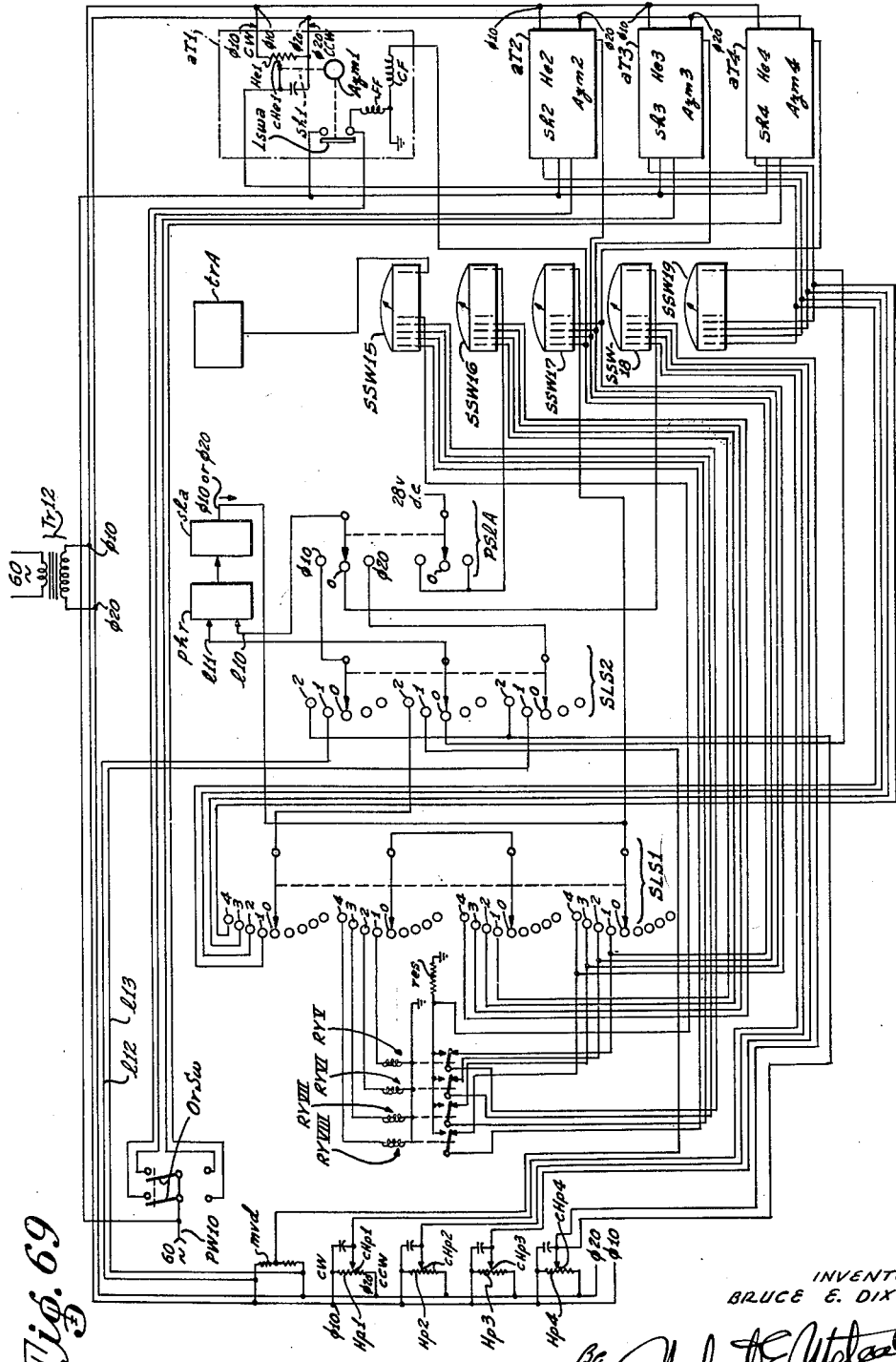

FIG. 69—Simplified wiring diagram of telescope azimuth drive sequence control circuitry.

IN DIVISION VI—SUPERVISED CELESTIAL NAVIGATION INCLUDING SUMMARY ON INITIAL GUIDANCE

FIG. 70—Flight plan profile sketch.

FIG. 71—Simplified graph showing programmed control points along preliminary flight path to departure point.

Figures 72, 73:
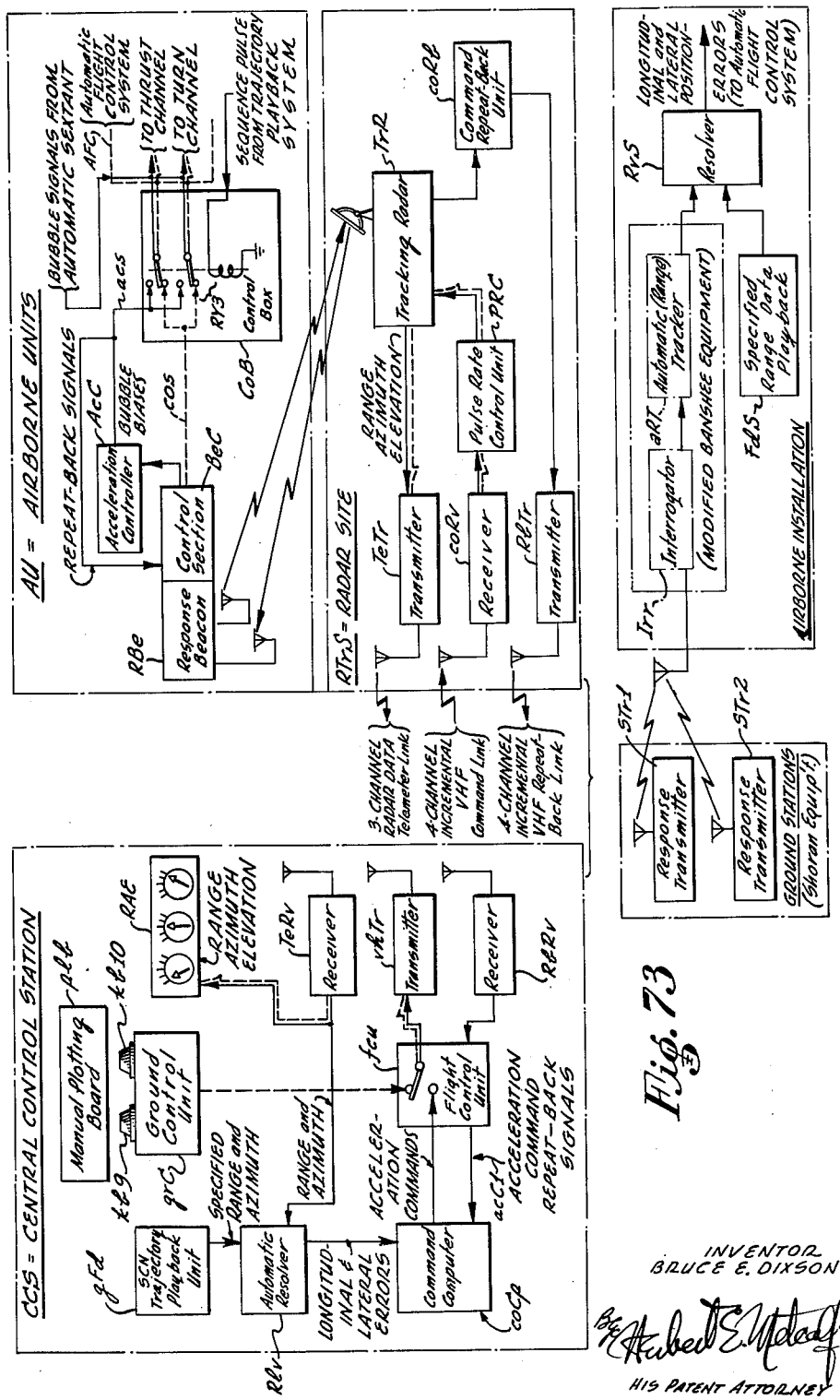

FIG. 72—Radar link initial guidance system.

FIG. 73—Shoran-type initial guidance system.

FIG. 74—Simplified graph showing effect of initial trajectory errors upon flight path and method of error correction through supervised celestial navigation control.

Figure 76:
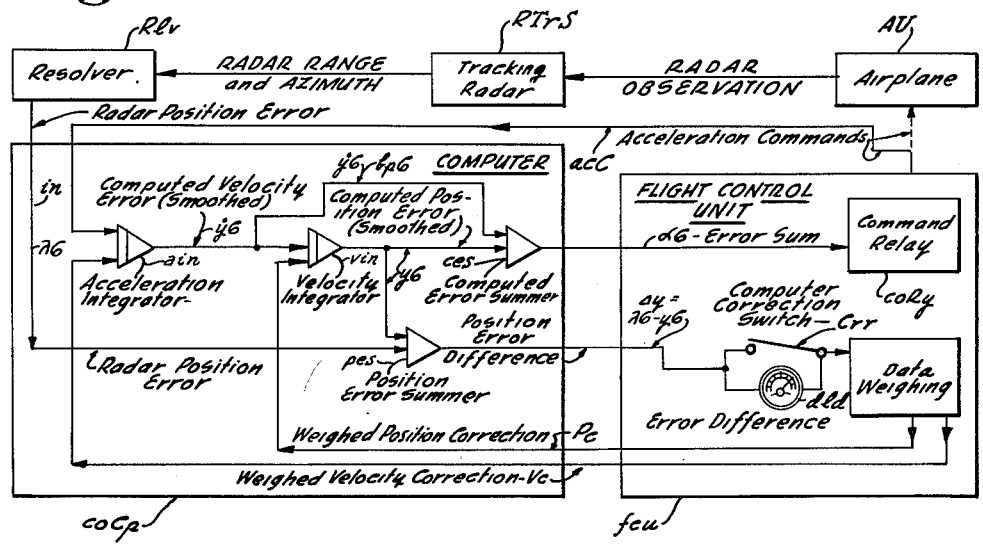

FIG. 75—Graphs illustrating principle of simulation underlying operation of command computer of FIG. 76.

FIG. 76—Simplified block diagram of computer- and flight control-units employed during ground controlled supervision of celestial navigation.

Figure 77:
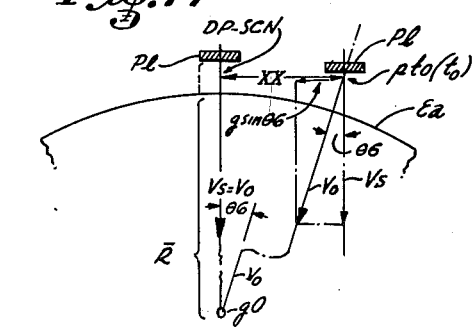

FIG. 77—Graph showing simplified method of deriving period of 84-minute oscillations.

Figure 78:
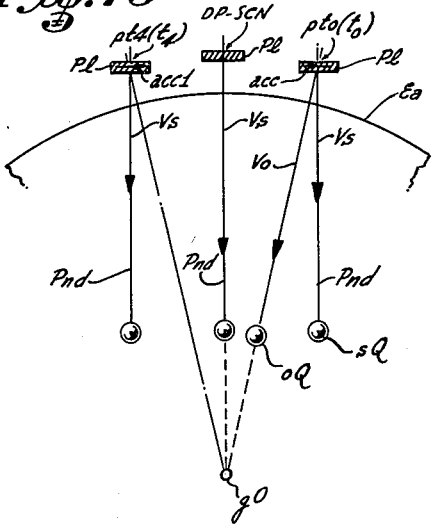

FIG. 78—Graph demonstrating condition of zero-acceleration error during 84-minute period of craft's oscillation about equilibrium position along trajectory.

IN DIVISION VII—AUTOMATIC FLGHT CONTROL SYSTEM

FIG. 79—Simplified flow diagram of automatic flight control system and sources of signal supply through ground-controlled initial guidance as well as from airborne automatic sextant and trajectory-playback.

Figure 80:
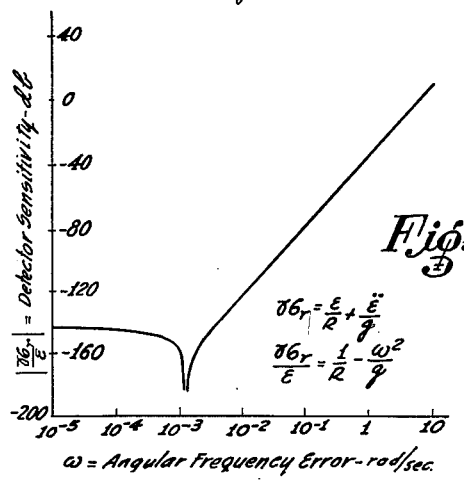

FIG. 80—Plot showing frequency characteristic of error detecting element.

FIG. 81—Flow diagram of automatic flight contol system showing left half of general block of FIG. 79 (computer unit, altitude and airspeed control unit) broken down into component units, including interconnections from and to adjoining units.

FIG. 82—Flow diagram of automatic flight control system, showing right half of general block of FIG. 79 (autopilot, longitudinal control unit, turboboost control unit) broken down into component units, including connections from adjoining units.

FIG. 83—Detailed block diagram of altitude and airspeed control units of FIG. 81.

Figure 84:
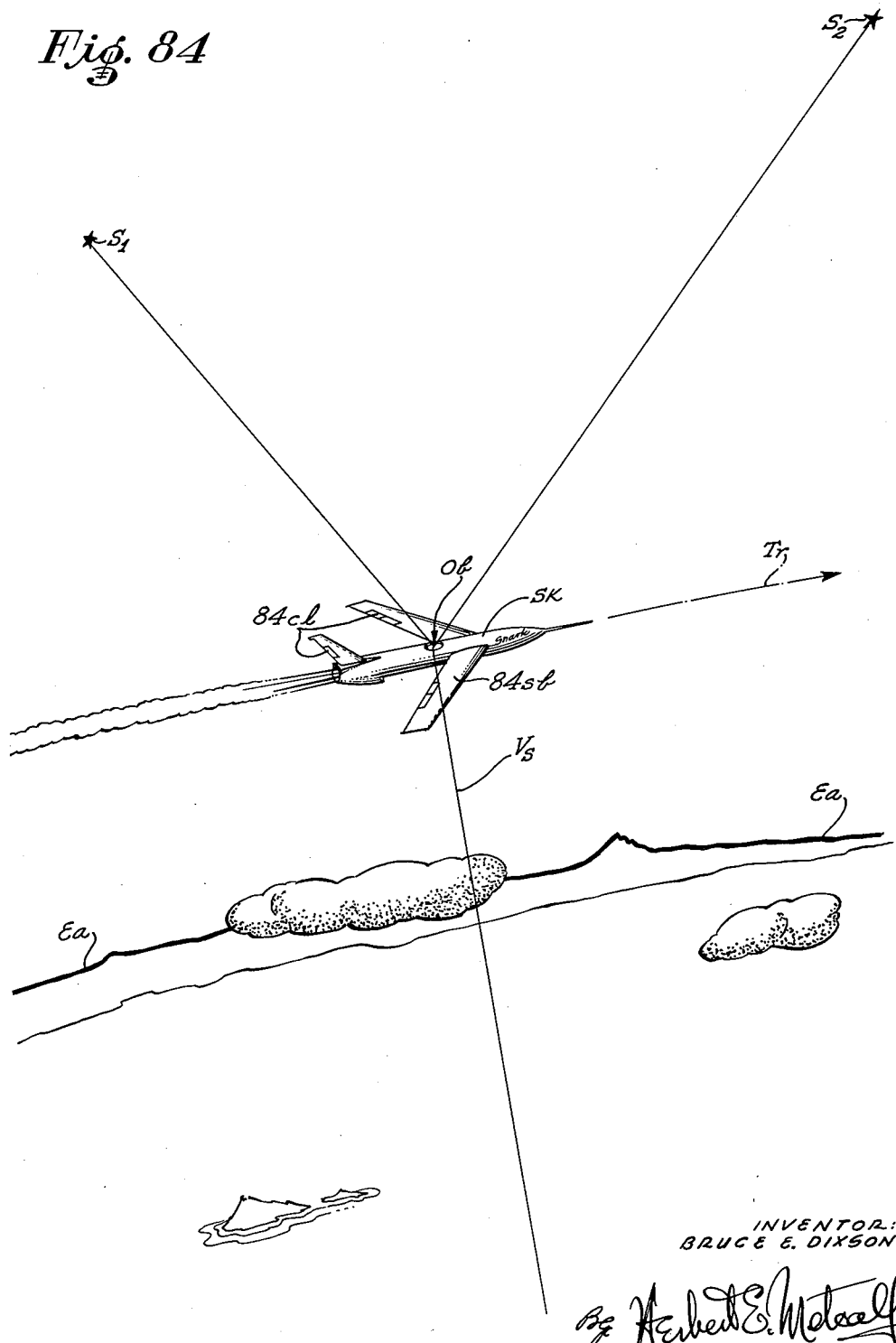

FIG. 84—Imaginary sketch showing a pilotless missile equipped with the automatic sextant of the present invention flying over the earth along a predetermined path under control of the present guidance system in which the altitudes of two celestial bodies tracked by the telescopes of the sextant serve to define the direction of instantaneous reference verticals aboard the missiles.

DIVISION III—GENERAL DESCRIPTION OF TRAJECTORY DATA SUPPLY SYSTEM AND NIGHT-TIME AUTOMATIC SEXTANT

In the preferred system herein described, the star altitude functions are pre-computed on the ground, recorded on magnetic tape and later played back during the planned flight. The computations are carried out partly manually and partly by IBM machines. (The abbreviation IBM will be used herein as meaning International Business Machines or equivalents). Intelligence of the time specified trajectory is completely contained by two curves, one for each star, giving specified apparent star altitudes as a function of time. These curves are derived by the solution of the equations of motion for the time specified trajectory (in terms of apparent star altitude and time) which take into account the particular data defining the time specified trajectory, such as declination, location of the trajectory with respect to the earth's coordinate system, motion of the craft with respect to a spacial or inertial coordinate system, maximum latitude, etc.

The calculated star altitude curves are converted into pulsed intelligence, suitable for recording and subsequent actuation of angle-reproducing devices. This transformation of the star altitude curves is carried out by a process of straight line slope approximation to the true instantaneous altitude values of the curves. The accuracy of these approximations is dependent upon the time length of linear slope and upon the rate of change of altitude in the actual calculated curve. Each successive straight-line slope is characterized by a constant rate of change of altitude for a definite period of time. This constant rate of each slope can be interpolated into a series of incremental altitude changes of fixed amplitude and of a fixed time-spacing or step rate per slope interval, the rate of these fixed altitude steps being determined by the "degree of steepness" of each slope. The incremental time spacing can be varied at the start of each new slope.

Such "staircase" approximation to a true curve can be conveniently simulated through pulse sequences of varying repetition rates. In the present adaptation, a pulse-rate generator, capable of converting the constant frequency of a crystal-controlled oscillator via 24-stage binary counters into a great variety of pulse frequencies, is automatically adjusted so as to yield the appropriate pulse rates which serve to closely approximate the calculated star altitude curves and which are, at the same time, also suited for recording purposes for actuation of specially designed airborne angle generating devices (after reconversion into pulse rates).

These trajectory pulse rates are recorded on a special 35 mm. magnetizable film, driven by sprockets. To obtain accurate speed control during recording, the sprockets are driven by a synchronous motor which is governed by the same frequency source used for the generation of the recorded pulse sequences. Speed control during airborne playback of this film record is governed by a frequency standard of superior accuracy.

Two star altitude functions may be recorded simultaneously on the same film. Additional film channels are provided for pulse sequences which control the so-called bubble turret trajectory angles, and for the master controller sequence pulses which govern the stepping switches that actuate the various airborne functions of the automatic sextant. In the present preferred system, the bubble turret trajectory angles are also pre-computed on the ground as will be explained later. The playback operation is started at the proper epoch so that the star altitudes are changed at the correct time. The airborne frequency standard and the playback unit may be thought of as a clock, accurate to approximately 1 part in ½ million, in which the various positions of the sequence pulses on the tape represent definite instants of time.

The overall accuracy of this system, including function computation, slope approximation, recording and playback errors, has been held within 6 seconds of arc.

The automatic sextant comprises a stabilized platform assembly mounted in a gimbal system with three degrees of freedom of motion with respect to the craft that carries the sextant. The pivotal support of the gimbal system about the azimuth axis is located near the center of rotation of the craft and near its center of gravity, the pivot constituting the fixed attachment of the system relative to the craft.

In order to facilitate a general introductory description of the automatic sextant, reference will here be made to FIGURE 24 of Division V which presents a simplified schematic perspective view of the entire sextant assembly in which portions of the housing of the sextant and various other parts are broken away in order to make visible the general lay-out of essential component units. (The relative size of some of these units is distorted in this drawing, or their outline is "stylized" freely for the purpose of stressing a simplified presentation of essential functions.)

The platform assembly of the sextant is suspended about a horizontal axis in an inner gimbal ring GR. (See gimbal axis X1 within ring GR whose front quadrant is broken away in the drawing.) The gimbal GR, in turn, is suspended about a horizontal axis X2 normal to that of the platform suspension axis X1 in a yoke or fork Y (outer "ring" of gimbal system) which is mounted upon an azimuth pivotal shaft P$s$, the latter rotatable in pivot-support Pv. The platform and gimbal systems are enclosed in a temperature controlled housing H which is rigidly attached to the structure of the craft (means of attachment not shown in drawing) and which also serves as the pivotal support Pv of the gimbal system. The housing is in the shape of an inverted bell, about 4 ft. in height and 3½ feet in maximum diameter. In the top of the housing is an optically flat glass window O$b$ (front portions of which are broken away in the drawing), 19 inches in diameter and 1½ inches thick. The refraction error and definition error of this window are negligible. The outer surface of the window is practically flush with the circular top plate of the housing. This top plate, whose circular rim is broken away in the drawing, in turn, is faired into the skin (not shown) of the supporting craft. Beneath this main window O$b$, and attached to the platform assembly immediately over the telescopes (see below), is a 13 inch diameter secondary window O$bs$ which serves partly to counterbalance the platform and partly to raise the telescope prisms optically toward the main window. (Window O$bs$ is supported on 4 arms B$r$ which extend from the platform. Only two arms are partly visible in the drawing, portions of the front arm B$r$ being broken away.) This arrangement enlarges the field of view of the telescopes or, if desired, permits a reduction in the diameter of the main window O$b$ while retaining the same field of view. The four telescopes (see below), "looking" through the two windows, are able to cover the sky throughout 360° in azimuth and between the altitudes of 20° and 80°. This coverage can be maintained for all altitudes of the aircraft for which pitch and/or roll do not exceed ±15°.

Four telescopes T1, T2, T3 and T4 and associated scanning systems are attached to the sides of the platform frame P$lf$, the telescopes being oriented at 90° to each other about the common center of rotation of the platform (two telescopes facing each other on each axis X1 and X2, respectively). The telescope optical axes (as for example O$x$4) are in a fixed position normal to the plane of the platform. The plane of the platform is physically represented by supporting plate P$l$ of the bubble turret assembly, the designation P$l$ of this plate being also used for the plane in which this plate is oriented. The telescopes themselves may be rotated in azimuth about their optical axes. The distance between opposite telescope centers is approximately 12 inches, and the length of each telescope assembly (including the angle setting devices) is approximately 18 inches. At the top of each telescope is the altitude angle setting or angle generating assembly which consists of a dove prism (see P$r$1, P$r$2, P$r$3 or P$r$4), rotatable in altitude about a horizontal axis, and a precision mechanical drive such as the one of prism P$r$1, roughly sketched at D$r$1, for setting the prism at the computed altitude angle.

The telescope optical and scanning system consists of a doublet objective of 1¼ inches clear aperture and 9 inch focal length (such as A$pl$4 of telescope T4), a focal plane scanner (such as S$c$4) and two paralleling lenses (such as LP4) which focus the star image upon a photo cell (such as P$ht$4). The scanning disc, which is 1 inch in diameter, is mounted in the hollow shaft of the rotor of a synchronous 60-cycle motor. The center of rotation of the scanner is aligned with the center of the optical field, and the disc itself is opaque except for a transparent narrow slot-like sector extending from its center to the outer edge. If the star image is at the exact center of the scanning field, no modulation of its light will result. When the image moves off-center, an essentially rectangular pulse signal of constant width and amplitude will appear at the photo-tube output. The phase of the pulse will depend on the polar angle of the image position; there is no variation of signal amplitude or phase with radial variation of position. Since the synchronous motor is polarized to lock in at a definite angular position of the scanner disc, the phase of the pulse signal may be compared with the phase of the motor driving voltage to determine the relative angular position of the star image.

To compare the phases between the signal voltage pulse from the star image and the sinusoidal motor voltage, it is necessary to transform the former to a sine wave. This is done with a 60-cycle ringing circuit which is "triggered" by the phototube signal impulses and thereby synchronized to the latter. The ringing circuit output is amplified, separated into elevation and azimuth error signals and applied to the control fields of 2-phase torquers on the gimbal axes and on the telescope azimuth drives or the pivot azimuth drive, respectively. The fixed fields of the torquers are energized by the fixed-phase power source which drives the synchronous scanner motors. Before the phototube signal is applied to the ringing circuit, it is passed through a clipper and low-pass filter which eliminates all spurious background signals including those from non-interesting lower-magnitude stars. During a scanning or "star-tracking" period, two adjacent telescopes operate simultaneously, the second pair of telescopes remaining inoperative.

If a star-changeover is contemplated for one of the tracking telescopes, the inoperative telescope on the same platform (gimbal) axis "takes over" at the instant of changeover, leaving the former telescope inactive during this second tracking period. Thus, two telescopes always remain as "spares," ready to continue the functions of the other pair of telescopes when called upon to do so.

The altitude angle setting units such as D$r$1 in FIGURE 24 operate on the sine bar principle: a bar attached to the prism altitude axis is driven up and down by a nut traveling on a leadscrew. Inaccuracies in the leadscrew are removed by a special adjustable compensating cam. The leadscrew is driven by a gear train which in turn is driven by a motor, controlled by a star-wheel escapement device. Each time a signal pulse is sent out by the star altitude scheduling device (=playback unit), the escapement permits the motor to drive the leadscrew $\frac{1}{360}$ of a revolution. This is equivalent, on the average, to a change in altitude of 5″ arc. This system is optically calibrated by adjusting the cam so that each angle set-off by the prism is within approximately 5″ of the ideal angle. Mechanical hysteresis has been held below 5″ arc.

Since the star altitude scheduling device sends out trains of single pulses, each equivalent to a certain change in altitude, a mechanism is required for setting-in the initial or base altitude of a certain star. The base altitudes of the first pair of stars for each pair of telescopes may be set-in on the ground, but those of the second pair of stars for either pair of telescopes must be set-in during flight. To do this, mechanical counter memories are geared to the lead-screw drives in such a manner that each position of the escapement, lead-screw and prism is equivalent to a unique 5-digit number. Two of these 5 digit-numbers, equivalent to two altitudes, may be pre-set into each counter. When star changeover takes place, a sequence signal from the star altitudes scheduling device (playback unit) disconnects the escapement and rotates the prism continuously until the preselected number appears on the counter, at which time the rotation is stopped at the desired base altitude.

The azimuth control of each telescope is accomplished by a continuous worm drive such as S$h$4 of FIGURE 24 which rotates the telescope about its optical axis, the latter remaining in a fixed position relative to the platform. Potentiometer memories are geared to the azimuth drives for setting-in the initial azimuth angle at a star changeover. When tracking, the azimuth drive of two of the four telescopes (T1 or T3) is controlled by the scanning (azimuth error) signals from the previously mentioned photocell output. As stated, these signals are separated into azimuth and elevation error signals, both of which cooperate in maintaining the star image in the center of the optical field of the particular telescope. The scanning error signals in elevation operate on the before mentioned gimbal axes torquers. Both tracking telescopes cooperate in maintaining platform P$l$ in the specified horizontal plane as will be further explained in Division V.

In order to establish a stellar pelorus line in the plane of the platform P$l$, one telescope of the operating pair remains "locked" in azimuth to the platform during tracking. Therefore, in order to follow the star in azimuth, the whole instrument, i.e., the gimbal system which supports the platform assembly must be rotated about the main pivot P$v$ in response to the scanning signals (azimuth error) from the locked telescope (T2 or T4).

The individual telescopes are capable of tracking stars of +4.4 photographic magnitude, although, in practice, they are stopped down so as to be insensitive to stars of less than +2.0 mag. brightness. This will restrict tracking operation to approximately 50 navigational stars. Such a restriction is necessary to prevent confusion in star acquisition since the total field of view of each tracker is approximately 6°.

About the center of gravity and the center of rotation of the platform box or frame P$lf$ are located the sensors which detect deviations of the observed vertical from the direction of the specified dynamic vertical established during tracking by the normal to the platform (i.e., established by the optical axes of the telescopes when two adjoining telescopes are tracking). These sensing elements are simple bubble accelerometers which respond to certain acceleration errors acting in the plane of the platform. They are provided with electronic pick-offs which operate through two resistance paths in the bubble liquid: the resistances are equal when the bubbles are centered, and unbalanced when the bubbles are displaced. These units are sensitive to an angular displacement (or equivalent horizontal acceleration) of about 3 seconds arc and give a linearly proportional signal over the whole range of 4000 seconds arc on each side of the null. The bubbles are critically damped and have a time constant of approximately 0.3 second.

Four of these units are arranged in orthogonal pairs (one of the units, designated with numeral B$l$1, being seen lengthwise in the drawing of FIGURE 24, and two other units, B$l$2 and B$l$4, partly visible, being seen edgewise) and mounted on a turret BT whose axis of rotation is aligned with the normal through the center of rotation of the platform. The two resistance paths in each bubble are connected in a bridge circuit to the two resistance paths of the opposite parallel bubble. The bridge is arranged so that opposite bubble deflection signals caused by turret rotational accelerations cancel out; deflection signals in the same direction caused by translational accelerations add together. The bubble turret is automatically oriented in azimuth during flight so that one pair of bubbles always serves to detect acceleration errors along the trajectory, while the other pair serves to detect the lateral error components. (See turret drive motor T$dr$ and turret signal selsyn T$s$ in FIGURE 24.) The longitudinal error component, after proper transformation, is used to correct the airplane's thrust; the lateral component exerts corrective action through the rudder.

A system of automatic flight control of a craft through these acceleration error signals is described in Division VII.

During the pre-celestial phase of flight from take-off point to departure-point, ground-operated radar tracking means are used to obtain information about the actual track made good by the craft. This "radar track" is compared with an ideal pre-computed track to the departure point, and corrective commands are sent by radar or radio directly to the craft's thrust and turn controls. During this phase, the automatic sextant is maintained in readiness for its initial functions at the departure point. "Supervised Celestial Navagation" takes place immediately before the onset of ACN-flight, as will be described in detail in Division VI in which a summary on the subject of "Initial Guidance" is also given. All airborne functions are "time-sequenced" by the previously cited master controller.

DIVISION IV—COMPUTATION AND RECORDING OF TRAJECTORY DATA

*Section (a)—Computation of Stellar Altitude Angles*

In an introductory statement, it has been pointed out that the intelligence of the time specified trajectory is completely contained by two curves, one for each star, giving specified apparent star altitudes as a function of time. These two curves are schematically represented in the general block diagram of FIGURE 1 as the computed outputs $h_1$ and $h_2$ from the IBM calculators of box B, plotted against time for star $S_1$ (primestar) and star $S_2$ (second star), respectively. Values of $h_1$ and $h_2$ are here chosen arbitrarily and represent actually point values (taken at constant intervals) of altitude angle differences as referred to the initial angular values at time $t_0$ (zero angle difference at origin), i.e., to the altitude angles of the stars at the departure point of ACN control. As will be shown in the brief outline of a computing procedure for deriving stellar altitude angles which follows, the input data furnished to the IBM calculators of box B are formulated as vector equations for two sets of vectors per star, oriented in an inertial coordinate system whose origin may be visualized as being located at the center of the earth. In the process of computation, the total resultant of one of these two sets of vectors moves about its origin and thereby successively defines the direction of the dynamic vertical for the craft in motion as it proceeds along the time-specified trajectory. This vector is designated as the dynamic vector. The total resultant of the second set of vectors, at the same time, identifies a specific star line which remains stationary in space and is designated as the star vector. If the origin of the inertial coordinate system (including both vectors) is shifted onto a given point of observation on the surface of the earth, the angle between the two resultant vectors, specified for that point and instant of observation, becomes the dynamic star altitude angle effective at that point. If this point is assumed to be the initial or departure point of the trajectory and, if for subsequent, equally spaced points along the trajectory, the departure point values of the dynamic vector components are corrected by a proportioned change of variables in the corresponding vector equation, the angle of the total resultant dynamic vector against the star line vector will vary from one observation point to the next since the star line vector remains fixed in space for all points. The original (departure point) angle between the two resultant vectors as well as the angle differences between two successive points of observation throughout the trajectory are computed by the IBM calculators which solve the equation $$\cos(90-h) = \frac{\bar{A}^* \cdot \bar{F}}{|A||F|}$$

where $h$=complement of the angle between the two resultant vectors and the normal to the dynamic vector (=angle between star line and specified horizontal plane, the latter being represented by platform $Pl$ of FIGURE 25 when the telescopes are tracking, as will be explained in Division V);

$\bar{A}^*$=Star vector (starline IR in FIGURE 34)
$\bar{F}$ =Dynamic vector (specified vertical $Vs$ in FIGURE 34)

If succesive values of star-altitude-angle differences are plotted against time, the previously mentioned star altitude curve results. The IBM calculators compute these values for two stars simultaneously as shown in FIGURE 1 where the curves for stars $S_1$ and $S_2$ must be visualized as resulting from successive point values of altitude angle differences $h_1$ and $h_2$, respectively, taken at constant intervals of time. In actual practice each value of $h_1$ or $h_2$ appears in the IBM output as a definite punch number difference (on a punched output card) per interval between observation points, the successive magnitudes of these differences identifying the difference of the sines of angles $h$ between two sequential measurements. A time interval of 81.92 seconds has been selected for the sequential measurements. Reasons for this particular selection are given in Division IV, Section $c$. The magnitude of these sine differences, furthermore, undergoes a correction before appearing as output $h_1$ or $h_2$ in as much as the successive values of the total angles $h$ for stars $S_1$ and $S_2$ are modified to read as folows:

(a) $$h_c = \frac{(h + K \cot h - 47.5°)}{2}$$

where $h_c$=modified value of $h$ ($h$=previously defined); $K \cot h$=formula for atmospheric refraction ($K$=a constant); 47.5°=midrange in elevation of the telescopes of the automatic sextant from which changes in the angle of prism tilt are measured. Tilt angles are half the actual angles due to double refraction in the prism. (See FIGURE 34, Division V, Section $b$.)

FIGURE 3 graphically interprets the vector setup for defining star altitude angles which has just been described. In the drawing, the rectangular coordinate system $\bar{i}_0, \bar{j}_0, \bar{k}_0$ is laid out in space as an inertial system whose $\bar{k}_0$ axis is oriented along the polar axis of the celestial sphere and whose $\bar{i}_0$ and $\bar{j}_0$ axes are contained in the plane of the celestial equator, axis $\bar{i}_0$ pointing at the vernal equinox ($=\gamma$; hereinafter designated as $\gamma$-axis) and axis $\bar{j}_0$ at an angle normal to both, $\bar{i}_0$ and $\bar{k}_0$. For practical purposes, the origin $O_1$ of this coordinate system, which theoretically is located at the center of the celestial sphere, may be shifted to any point in the earth's orbit without detracting from the quality of the system as an inertial spatial system since $\bar{i}_0$ and $\bar{k}_0$ are directed at fixed points at infinity. Therefore, origin $O_1$ may be placed at the center of the earth $Ea$ or at any point of observation on its surface, irrespective of the earth's orbital position at the instant of observation. In this coordinate system, hereinafter designated as the $\gamma$ system, resultant star vector $\bar{A}^*_\gamma$ remains in a stationary position relative to the coordinate axes since it is also directed at a fixed point at infinity. However, the resultant dynamic vector $\bar{F}_\gamma$ in the $\gamma$ system, representing the vertical in a moving craft, rotates about $O_1$, along the earth's rotation about axis $\bar{k}_0$, and simultaneously follows the direction of the trajectory $Tr$ of the moving craft. In addition, it is deflected in obedience to the sum total of all acceleration forces acting on the moving vertical. Hence, angle $\beta$, subtended at $O_1$ between vector $\bar{F}_\gamma$ and star vector $\bar{A}^*_\gamma$, constantly changes with time. For vector $\bar{F}_{\gamma 1}$, which has been computed for initial point $P_1$ of trajectory $Tr$ at time $t_1$, this angle has the arbitrarily chosen value of $\beta_1$ which equals the value of angle $(90-h_1)°$ subtended at point $P_1$ by the identical vectors $\bar{A}^*_\gamma$ and $(\bar{F}_{\gamma 1}=Vs_1=$dynamic vertical at $P_1$) if origin $O_1$ is transferred to $P_1$. Similarly, angle $\beta_T$, between $\bar{A}^*_\gamma$ and $\bar{F}_{\gamma T}$, computed in the IBM calculators for point $P_T$ at time $t_T$, equals angle $(90-h_T)°$ at point $P_T$ if $O_1$ is shifted to $P_T$. $\bar{F}_{\gamma T}=Vs_T$ =dynamic vertical at $P_T$. If points $P_1$ and $P_T$ were time-separated by 81.92 seconds, the difference between angle $\beta_1$ and $\beta_T$ would be expressed by the corresponding (corrected value of the computed output ($h_1$ or $h_2$) from the IBM calculators applicable to point $P_1$ at time $t_1$. This particular output value, as mentioned before, is identified by a characteristic setting of punched holes in the punched cards delivered from the IBM calculator, the setting of holes being indicative of a given difference number. These output cards are fed to the IBM card reader (such as "513-Summary Puncher") shown in box CR of FIGURE 1.

The IBM card reader CR contains a master file of punched cards especially prepared so that the punched holes in each card correspond to a unique switch setting in the "A" binary counter of the pulse rate generator PRG of FIGURE 1 to be described in Division IV, Section $c$. Each switch setting of this pulse rate generator, in turn, corresponds to a unique pulse rate per 81.92 seconds interpolation interval in the output of this unit PRG. The punched cards cover a range of these pulse rates from zero to 400 pulses per 81.92 seconds interval. For each output value $h_1$ or $h_2$ from the IBM calculator, registered on the punched card which the latter has delivered, there is a corresponding master file card which "matches" the same value in terms of a characteristic binary number represented by the sequence of punched holes it contains. In a so-called collator, the matching card is automatically separated from the master file of the card reader. All matching cards are lined up in their correct sequence for remote actuation of the corresponding switch-relays in the pulse rate generator. Ultimately, the pulse rates are reconverted into angular increments in the altitude angle generator of FIGURE 26 after being stored in a magnetic tape recorder (FIGURE 12) as will be explained in subsequent sections. These increments are identical with those represented by the successive values of $h_1$ or $h_2$ in the output of the IBM calculators.

A description of the operational setup of the various

IBM facilities lies beyond the scope of this specification, nor is it deemed essential to this disclosure to penetrate into the theories and mathematical developments which have led to the formulation of a number of simplified trajectory equations such as those employed in the process of deriving the dynamic vertical for points along a given trajectory. The validity of these equations and of a variety of formulae for the determination of trajectory parameters has amply been proven by practical experimentation. Therefore, in order to avoid undue complexity, details of all mathematical transactions, for which available IBM facilities are fully utilized, will be omitted from the ensuing brief summary of a computation process which is recommended for deriving the values of stellar altitude angles.

Referring to FIGURE 4, which offers a graphic display of essential trajectory parameters, this computation procedure (including all preliminaries) is summed up as follows: (Only a constant altitude path is herein considered. This must not be construed as a limitation of the present system since computations of varying altitude paths are potentially feasible.)

(1) Locate point of destination of ACN flight and select most suitable path (great circle, small circle or combination of both) and flight time. (Limitations affecting range of nighttime flight can be conveniently determined with the help of a global range computer especially designed for this purpose.) Velocity considerations, prognosis of meteorological trends and availability of navigational stars as per paragraph 2 (below) all are essential in this path selection.

(2) Select proper magnitude stars along entire path. At the present time, the choice of stars is limited to a predetermined list conforming to "color" and magnitude. Stars in, or close to, the "red" spectral class and with magnitudes of "3" or greater are usually satisfactory.

A further limitation is imposed due to the necessity of combining two stars for one and the same tracking period. The azimuth separation of these stars should be greater than 35 degrees and less than 145 degrees. It is possible, if absolutely necessary, to offset the prism (details in later sections) up to 55 degrees, but during the tracking of any two stars, the separation can never change more than 110 degrees.

(3) Obtain geodetic (map) latitudes and longitudes of key points along trajectory. Transform these geodetic coordinates to geocentric coordinates in order to determine exact location of these key points. (See key points for great circle trajectory in FIGURE 4: $P_1=$ initial point, $P_2=$ terminal point.) In the case of a great circle path (which is spheroidal), this involves mapping the constant altitude flight curve onto the surface of a sphere as a true great circle which simplifies determination of the directions of the normal along the spherical great circle.

Geocentric latitude $\phi_{gc}$ can be obtained as follows:

$$\tan \phi_{gc} = (er/pr)^2 \tan \phi_{gd}$$
$$\phi_{gc} = \tan^{-1}[(er/pr)^2 \tan \phi_{gd}]$$

where $\phi_{gd}=$ geodetic latitude
$er=$ equatorial radius of earth
$pr=$ polar radius of earth (4) Determine parameters of the trajectory. Only the example of a great circle (GC) path will be followed through. Formulae for deriving these parameters are omitted. Consult FIGURE 4 for graphic definition of parameters. Essentially this includes:

(a) Determination of $\Phi=$ co-latitude of pole $P_0$ which is also the angle subtended by the plane of the equator and the plane of the trajectory GC. ($P_0=$ point on surface of earth perpendicular above center of trajectory GC plane.)

(b) Determination of longitude of pole $P_0$ and determination of cone angle $\alpha_c$. The latter angle applies only to small circle trajectories. In the case of a GC flight path, the equivalent of this angle, subtended at the earth's center between the axis of pole $P_0$ and the plane of the trajectory GC, always equals 90 degrees. (In the drawing, a small circle trajectory between $P_{10}$ and $P_{20}$ is suggested whose pole $P_0$ coincides with that of the GC trajectory.)

(c) Finding the angular distance $\Delta\theta$ (in radians) of the trajectory between the points $P_1$ and $P_2$ specified in paragraph 3, above. (Measured at center of earth in plane of trajectory GC.)

(d) Finding angle $\theta_0$ between point of intersection of meridian M of pole $P_0$ with trajectory GC and point $P_1$ of trajectory. (Measured as in paragraph (c) above.)

(e) Determination of TGS (=true ground speed) in radians per slope or interpolation interval of 81.92 seconds under assumption of constant velocity (or variable velocity for a given acceleration). Since TGS is measured as in paragraph (c), above, the resulting velocity angle is designated as the $\theta$ angle in radians per slope (from which the angular acceleration $\ddot{\theta}$ is also determined).

TAS (True Air Speed) $\pm$ prevailing wind = TGS
TGS (in m.p.h.) = $60/88$ TGS (in f.p.s.)

Determine number of feet per degree of longitude for mean latitude of flight path (from available tables).

TGS ft./sec. (1° long./ft.) (rad./1°) = TGS (rad./sec.)
TGS (rad./sec.) (81.92 sec.) = TGS (radians/slope)

$\Delta\theta$ radians (angle measured according to paragraph (c), above) divided by TGS in radians per slope, will usually give a noninteger. Using the round-off convention to obtain the integer quotient, TGS is corrected to divide into $\Delta\theta$. A new TGS is thereby obtained which is the ultimate $\theta$-angle in radians per slope.

The above cited parameters $\Phi$, $\alpha_c$, $\theta_0$ and $\theta$ (the latter for constant velocity only) are constants for one particular trajectory. Several additional constants are included in the computations which have been omitted in order to simplify the presentation.

(5) Apply parameters of paragraph 4, above, to the given force vector equation in the Earth Coordinate System.

In the herein adopted earth coordinate system, axis $\overline{k}_1$ coincides with the earth's axis, and axis $\overline{i}_1$ with the line of intersection between the plane of the equator and the plane of meridian M through $P_0$, the origin $O_e$ of this system being located at the earth's center. Axis $\overline{j}_1$ lies in the equatorial plane and is normal to $\overline{i}_1$ as well as normal to $\overline{k}_1$. This coordinate system remains in a fixed position relative to the earth.

In this earth coordinate system, let $f_1$ be the force component in the $\overline{i}_1$ direction,
$f_2=$ force component in the $\overline{j}_1$ direction, and
$f_3=$ force component in the $\overline{k}_1$ direction.

Then, the total force vector $\overline{F}_1 = f_1\overline{i}_1 + f_2\overline{j}_1 + f_3\overline{k}_1$.

In order to find the true values of these vector components, applicable to the trajectory under consideration, the constants obtained under paragraph 4, above, must be incorporated in the general vector equations for $\overline{F}_1$. These values must be generated for every 81.92 second point along the trajectory as a function of angular distance $\theta$ traveled to each point, the angle $\theta$ being defined as follows:

$\theta = \theta_0 + \Delta_1\theta$. Time $t_0$ in the drawing defines the starting instant of the ACN flight along the trajectory, where $\theta = \theta_0$. $\Delta_1\theta$ represents the part of the total angular distance $\Delta\theta$ made good by the craft in flight up to the instant of observation. Since $\Delta_1\theta$ is computed for the total time value following time $t_0$, $\Delta_1\theta = \theta$ at the first 81.92 second-point (i.e., at the end of the first slope interval) and a multiple of $\theta$ at the end of each succeeding slope interval (constant velocity trajectory).

(6) Normalize vector components and transform the normalized force vector to the $\gamma$ system of FIGURE 3.

The vector components are "normalized" in order to express the total resultant force vector as a unit vector. This is necessary because, as can be shown, the total resultant star vector of paragraph 7, below, is a unit vector, and both resultant vectors must be expressed as unit vectors in order to express the correct value (cosine) of angle $\beta$ of FIGURE 3 subtended by these two resultant vectors. Components of the normalized force vector will be designated as $f'_1$, $f'_2$, $f'_3$. Thus, the normalized force vector $F'_1$ in the earth coordinate system is expressed as follows:

$$\bar{F}'_1 = \frac{\bar{F}_1}{|F_1|} = f'_1 \bar{i}_1 + f'_2 \bar{j}_1 + f'_3 \bar{k}_1$$

where $$|F_1| = \sqrt{f^2_1 + f^2_2 + f^2_3}$$

For transformation of this force vector $\bar{F}'_1$ from the earth coordinate system to the inertial coordinate system, defined with reference to FIGURE 3 and designated as the $\gamma$-system, make the following substitutions:

$\bar{i}_1 = \cos(\Omega_0 + \omega T)\bar{i}_0 + \sin(\Omega_0 + \omega T)\bar{j}_0$
$\bar{j}_1 = -\sin(\Omega_0 + \omega T)\bar{i}_0 + \cos(\Omega_0 + \omega T)\bar{j}_0$
$\bar{k}_1 = \bar{k}_0$ where $\Omega_0$=initial angle between the $\bar{i}_0$ vector and the $\bar{i}_1$ vector (the latter rotating with the earth). This is also the initial angle between the $\bar{j}_0$ and $\bar{j}_1$ vectors. $\omega T$=angular rotation of vector $\bar{i}_1$ from its original position at time $t_0$.

Therefore, if $\bar{F}_\gamma$ designates the total resultant force vector in the $\gamma$-system where the $\gamma$-axis represents the direction of $\bar{i}_0$:

$\bar{F}_\gamma = [f'_1 \cos(\Omega_0 + \omega T) - f'_2 \sin(\Omega_0 + \omega T)]\bar{i}_0$
$\quad + [f'_1 \sin(\Omega_0 + \omega T) + f'_2 \cos(\Omega_0 + \omega T)]\bar{j}_0$
$\quad + f'_3 \bar{k}_0$ (NOTE: The initial angle $\Omega_0$ is different for each particular starting time.)

(7) Compute resultant star vector $\bar{A}^*_\gamma$ in the $\gamma$-system:

$$\bar{A}^*_\gamma = a_1 \bar{i}_0 + a_2 \bar{j}_0 + a_3 \bar{k}_0$$

where $a_1 = \cos d \cos RA$
$a_2 = \cos d \sin RA$
$a_3 = \sin d$ $d$=declination (=angle measured at origin $O_1$ between starline $O_1 - S$ and plane of celestial equator).

$RA$=right ascension (=angle measured eastward at $O_1$ in plane of celestial equator between $\gamma$-axis and point of intersection between star's hour circle (celestial meridian) and celestial equator.

$a_1$, $a_2$ and $a_3$ are constants for each star throughout flight.

Two such star vectors $\bar{A}^*_\gamma$ must be computed for each particular tracking period.

(8) For greater convenience in the computation process, choose an inertial coordinate system such that $\bar{i}_0$, at flight time $t_0$, concides with axis $\bar{i}_1$ of the earth coordinate system. Then $\Omega_0 = 0$, and if $\bar{F}$ represents the total resultant force vector in this modified inertial coordinate system or modified $\gamma$-system:

$\bar{F} = (f'_1 \cos \omega T - f'_2 \sin \omega T)\bar{i}_0$
$\quad + (f'_1 \sin \omega T + f'_2 \cos \omega T)\bar{j}_0$
$\quad + f'_3 \bar{k}_0$ or $\bar{F} = f_{01} \bar{i}_{01} + f_{02} \bar{j}_{01} + f_{03} \bar{k}_{01}$ where $f_{01}$, $f_{02}$ and $f_{03}$ are the ultimate force components in the modified inertial coordinate system $\bar{i}_{01}$, $\bar{j}_{01}$, $\bar{k}_{01}$.

The displacement of the $\bar{i}_{01}$ vector from the $\gamma$-axis of the $\gamma$-system will be incorporated in the star vector components of each star by defining the angle $\}= RA - \Omega_0$ where the magnitude of $\Omega_0$ is determined by finding the local hours angle (LHA) of each star from the meridian M of pole $P_0$ of the trajectory GC. If the total resultant star vector in this modified $\gamma$-system is designated as $\bar{A}^*$:

$$\bar{A}^* = a_{01} \bar{i}_{01} + a_{02} \bar{j}_{01} + a_{03} k_{01}$$

where $a_{01} = \cos d \cos \}$
$a_{02} = \cos d \sin \}$ =constants throughout flight.
$a_{03} = \sin d$ (9) Compute angle subtended at origin $O_1$ of modified inertial coordinate system between star vector $\bar{A}^*$ and each of the successive total force vectors $\bar{F}$ for each 81.92 second interpolation point along trajectory. This computation must be carried out against two star vectors for the two stars to be tracked simultaneously.

The angle $\beta$ between the resultant vectors $\bar{A}^*$ and $\bar{F}$ (FIGURE 3) is the complement of angle $h$ subtended between the normal to the specified vertical $V_s$ (vector $\bar{F}$) and the star line (vector $\bar{A}^*$). $h$ is commonly referred to as the "dynamic" altitude angle of the star (measured against the specified artificial horizon), and angle $\beta$ is computed in terms of the sine of this angle $h$ as follows:

Since $\bar{A}^* \cdot \bar{F}$ (scalar product) $= |A^*||F| \cos \beta$:

$$\cos \beta = \cos(90 - h) = \sin h = \frac{\bar{A}^* \circ \bar{F}}{|A^*||F|}$$

From $\sin h$ (for each star), the desired quantity $$\phi = \sin h_c = \sin \frac{(h + K \cot h - 47.5°)}{2}$$

is determined, where $\phi$=distance of vertical travel (plus or minus from zero reference) of nut Nu in FIGURE 30. (Refer to Formula (a) at the beginning of this section.)

As can be seen by reviewing the text referring to FIGURE 1, output $h_1$ or $h_2$ of the IBM calculators expresses the quantities $\phi$ in terms of a specific punch number difference corresponding to the difference in values $\phi$ between two consecutive slope intervals. The angular difference between two consecutive dynamic altitude angles, expressed by two consecutive values of $h_1$ or $h_2$ is ultimately recreated in the prism elevation angle through corresponding pulse increments fed to the altitude angle generator of FIGURE 26.

*Section (b)—Computation of Bubble Turret Azimuth Angles*

The process of computing bubble turret azimuth angles (=BTA angles) and of converting successive BTA angle differences into pulse rates which are recorded on magnetized tape and ultimately reconverted into incremental or step-signals for the bubble turret azimuth drive (described in detail in Division V, Section $f$) follows through the same general stages as those presented in the preceding section for the derivation of stellar altitude angles. Instead of selecting for each slope interval of 81.92 seconds a pulse rate which covers in equal increments the angle difference between two successive 81.92 seconds points of angle measurement, the azimuth difference angles are computed only for each fourth interpolation interval or for points separated by $4 \times 81.92 = 327.68$ seconds or approximately 5½ minutes, and an appropriate pulse rate is selected for each of these extended time intervals to cover the measured angular difference in equal half degree steps.

The angle between the direction of the trajectory and the direction of the primestar azimuth line (=pelorus line) in the specified plane of the platform is designated as the angle Z in FIGURES 5 and 6 in which the dependence of the BTA angle on the platform azimuth position is demonstrated in a schematic plan view of the parts involved. The original departure point angle Z as well as the Z-angle-differences between each successive point of measurement throughout the planned ACN-flight are computed by IBM facilities from the already known direction of dynamic vector $\overline{F}$, star vector $\overline{A}^*$ and the angle $(90°-h)$ subtended between these vectors. The IBM solutions for successive Z-angle differences are carried forward from the basic equation:

$$\sin Z = \frac{\overline{A}^* \cdot \overline{k}_s}{\cos h}$$

where $\overline{k}_s$ represents a unit vector in the dynamic (specified) plane of the platform, normal to (and pointing to the left of) the direction of a second vector in that same plane which represents the direction of the specified trajectory. The derivation of this formula and of an expression for $\overline{k}_s$ in the previously defined modified inertial coordinate system (modified γ-system), suitable for IBM computations, will be briefly shown below with reference to FIGURE 7. This system of deriving incremental Z-angle values, as well as the overall method of "slaving" the bubble turret azimuth angle to the course of the trajector, constitute one preferred method of execution of this phase of data supply and of related operations of the automatic sextant, respectively.

The text below referring to FIGURES 5 and 6 will be better understood if reviewed after examination of Section h, Division V (referring to FIGURES 63 and 64). Reference to the relationship between BTA angles and platform position, at this point, is deemed necessary due to the dependence of BTA values upon the platform position, upon the position of the primestar telescope relative to the platform and upon values of angle Z and its increments or decrements whose computation is analyzed in the present section.

FIGURES 5 and 6 are replicas of the conditions described in Division V, Section $h$, in connection with FIGURE 64. In the present figures, the relationship between the bubble turret azimuth angle BTA and the angle Z, as well as the dependence of the BTA angle upon the azimuth setting of platform $Pl$ (i.e., its indirect dependence upon the angular setting of telescope T2 relative to platform $Pl$), are more clearly outlined. Parts shown bear the identical numerals as those of FIGURE 64. The angle Z between primestar line $Pel$ and trajectory $Tr$ has been marked out by shading the area between these two lines. It is seen that, in the example of both figures, this angle Z equals 20 degrees whereas the BTA angle, measured clockwise from the telescope T1 end of platform reference axis X1, in the case of FIGURE 5 equals 290 degrees and in the case of FIGURE 6 only 250 degrees. The discrepancy between these BTA angles is due to the 40° offset angle of telescope T2 on platform axis X2 in FIGURE 5. In the ultimate configuration of the bubble turret angles BTA from computed values of angle Z, due allowance must therefore be made for the particular setting of the telescope on platform axis X2 which tracks the primestar. During tracking functions, the telescope on axis X2 of platform $Pl$, either T2 or T4, remains in a fixed position relative to the platform. Furthermore, it can be visualized, as for example in FIGURE 6, that if the computed angle Z increases during one tracking period, the BTA angle decreases by the same amount since the platform is caused to rotate in the sense of the increasing angle Z which rotates the reference axis X1 in a sense so as to decrease the clockwise angle between axis X1 and trajectory $Tr$. The opposite occurs when the Z-angle decreases.

FIGURE 7 illustrates graphically the vector setup for defining angle Z. Point $O_s$ represents an arbitrary point along trajectory $Tr$ (great circle route) upon or above the surface of the globe $Ea$. For the computations which follow, this point $O_s$ serves as the origin for two rectangular coordinate systems $\bar{i}, \bar{j}, \bar{k}$ and $\bar{i}_s, \bar{j}_s, \bar{k}_s$, the former constituting the craft's moving coordinate system, the latter the craft's dynamic coordinate system. Vector $\bar{i}$ of the former system is the earth's radius vector through point $O_s$; vector $\bar{j}$ is tangent to point $O_s$ and perpendicular to $\bar{i}$ (for spherical earth), pointing in the direction of the trajectory $Tr$, and vector $\bar{k}$ is perpendicular to both vectors, $\bar{i}$ and $\bar{j}$, pointing to the left of $\bar{j}$ if the latter is viewed from origin $O_s$. In the dynamic system, vector $\bar{i}_s$ represents the dynamic vertical or force vector $\overline{F}$ computed for point $O_s$ in accordance with the procedure described in the preceding section, and vectors $\bar{j}_s$ and $\bar{k}_s$ are both perpendicular to $\bar{i}_s$ and perpendicular to each other, vector $\bar{j}_s$ again pointing in the direction of the trajectory and vector $\bar{k}_s$ pointing to the left of $\bar{j}_s$ if the latter is viewed from $O_s$. The plane of vectors $\bar{j}_s - \bar{k}_s$ (shaded area) constitutes the specified (dynamic) horizontal plane of platform $Pl$ of the automatic sextant, and vector $\overline{A}$ is the projection of star vector $\overline{A}^*$ onto this plane, the star vector remaining a constant throughout a particular tracking period. The force vector $\overline{F}$ and the star vector $\overline{A}^*$ as well as vectors $\bar{i}, \bar{j}, \bar{k}$ and $\bar{i}_s, \bar{j}_s$ and $\bar{k}_s$ are unit vectors. Vector $\overline{A}^*$, projected onto the craft's dynamic coordinates, can be expressed as follows:

$$\overline{A}^* = \sin h \bar{i}_s + \cos h \cos Z \bar{j}_s + \cos h \sin Z \bar{k}_s$$

($h$ = See definition given at the beginning of Division IV, Section $a$.)
Hence:

$$\overline{A}^* \cdot \bar{k}_s \text{ (scalar product)} = \sin h (\bar{i}_s \cdot \bar{k}_s) + \cos h \cos Z (\bar{j}_s \cdot \bar{k}_s)$$
$$+ \cos h \sin Z (\bar{k}_s \cdot \bar{k}_s)$$

$$\bar{i}_s \cdot \bar{k}_s = 0; \bar{j}_s \cdot \bar{k}_s = 0; \bar{k}_s \cdot \bar{k}_s = 1$$

$$\overline{A}^* \cdot \bar{k}_s = \cos h \sin Z \text{ or } \sin Z = \frac{\overline{A}^* \cdot \bar{k}_s}{\cos h}$$

which is the basic formula used for computing values of Z.

In order to write the above equation in the inertial system of reference, defined in connection with FIGURE 3, viz., in the modified version of this system, identified in Division IV, Section $a$, by the vector symbols $$\overline{F} = f_{01} \bar{i}_{01} + f_{02} \bar{j}_{01} + f_{03} \bar{k}_{01}$$

and $$\overline{A}^* = a_{01} \bar{i}_{01} + a_{02} \bar{j}_{01} + a_{03} \bar{k}_{01}$$

the following transformations must be carried out, wherein the derivations are limited to the case of a great circle route, analogous to the previously given example of star altitude computations:

First, define a unit vector in the dynamic plane $\bar{j}_s - \bar{k}_s$ which is representative of the direction of the trajectory.

$$\bar{j}_s = \frac{\bar{k} \times \bar{i}_s}{\sin \alpha} \text{ (cross product)}$$

(where $\alpha$ = angle subtended by vectors $\bar{i}_s$ and $\bar{k}$) defines such a vector, imposing the condition that $\bar{j}_s$ lie in the $\bar{i} - \bar{j}$ plane coincident with the dynamic plane. [This condition actually exists since the displacement of the $\bar{i}_s$ vector from the $\bar{i}$ vector in the example here given can be represented as being composed of a displacement along the $\bar{i} - \bar{j}$ plane (rotation of the craft's moving coordinate system about axis $\bar{k}$) and of a displacement along the $\bar{i} - \bar{k}$ plane (rotation of the same coordinate system about axis $\bar{j}$), shown respectively as displacement components $a$ and $b$ in the drawing, no rotation of the $\bar{i}_s$ vector about its own axis therefore being involved.]

Next, carry out computation of $\bar{k}_s$ (rather than of $\bar{j}_s$ because of greater simplicity) as follows:

Since $\bar{i}_s \times \bar{j}_s = \bar{k}_s$:

$$\bar{k}_s = \frac{\bar{i}_s \times \bar{k} \times \bar{i}_s}{\sin \alpha} \text{ or } \bar{k}_s = \frac{\bar{k} - \bar{i}_s(\bar{i}_s \cdot \bar{k})}{\sin \alpha}$$

[Triple cross—product $A \times B \times C = B(A \cdot C) - C(A \cdot B)$.]

$\sin \alpha = \sqrt{1 - \cos^2 \alpha}$ and $\cos \alpha = \bar{i}_s \cdot \bar{k}$ (unit vectors)

$$\bar{k}_s = \frac{\bar{k} - \bar{i}_s(\bar{i}_s \cdot \bar{k})}{\sqrt{1 - (\bar{i}_s \cdot \bar{k})^2}}$$

($\sin \alpha$ is always positive and near 1)

Next, transform components from the dynamic coordinate system to the modified inertial coordinate system (or modified $\gamma$-system), defined in Division IV, Section $a$, as follows:

$$\bar{i}_s = f_{01}\bar{i}_{01} + f_{02}\bar{j}_{01} + f_{03}\bar{k}_{01}$$

$$\bar{k} = \delta^3{}_1\bar{i}_{01} + \delta^3{}_2\bar{j}_{01} + \delta^3{}_3\bar{k}_{01}$$

where for great circle case:

$$\delta^3{}_1 = \cos \Phi \cos \omega t_1$$
$$\delta^3{}_2 = \cos \Phi \sin \omega t_1$$
$$\delta^3{}_3 = \sin \Phi$$

($\Phi$ and $\omega t$ having been defined in the preceding section). Also:

$$\bar{A}^* = \bar{a}_{01}\bar{i}_{01} + \bar{a}_{02}\bar{j}_{01} + \bar{a}_{03}\bar{k}_{01}$$

$$\sin h = \bar{i}_s \cdot \bar{A}^* = a_{01}f_{01} + a_{02}f_{02} + a_{03}f_{03} = \Sigma f_i a_i$$

$$\cos h = \sqrt{1 - (\Sigma f_i a_i)^2}$$

$$\cos \alpha = \bar{i}_s \cdot \bar{k} = \delta^3{}_1 f_{01} + \delta^3{}_2 f_{02} + \delta^3{}_3 f_{03} = \Sigma f_i \delta^3{}_i$$

$$\bar{k}_s = k_1 \bar{i}_{01} + k_2 \bar{j}_{01} + k_3 \bar{k}_{01}$$

where $$k_1 = \frac{\delta_1{}^3 - f_{01} \cos \alpha_i}{\sin \alpha_i}$$

$$k_2 = \frac{\delta_2{}^3 - f_{02} \cos \alpha_i}{\sin \alpha_i}$$

$$k_3 = \frac{\delta_3{}^3 - f_{03} \cos \alpha_i}{\sin \alpha_i}$$

Therefore:

$$\bar{k}_s = \frac{\delta_1{}^3 \bar{i}_{01} + \delta_2{}^3 \bar{j}_{01} + \delta_3{}^3 \bar{k}_{01} - (f_{01}\bar{i}_{01} + f_{02}\bar{j}_{01} + f_{03}\bar{k}_{01})\overbrace{(\Sigma f_i \delta_i{}^3)}^{=\cos \alpha}}{\sin \alpha = \sqrt{1 - (\Sigma f_i \delta_i{}^3)^2}}$$

$$= \frac{(\delta_1{}^3 - f_{01}\Sigma f_i \delta_i{}^3)\bar{i}_{01} + (\delta_2{}^3 - f_{02}\Sigma f_i \delta_i{}^3)\bar{j}_{01} + (\delta_3{}^3 - f_{03}\Sigma f_i \delta_i{}^3)\bar{k}_{01}}{\sqrt{1 - (\Sigma f_i \delta_i{}^3)^2}}$$

and $$k_1 = \frac{\delta_1{}^3 - f_{01}\Sigma f_i \delta_i{}^3}{\sqrt{1 - (\Sigma f_i \delta_i{}^3)^2}}; \quad k_2 = \frac{\delta_2{}^3 - f_{02}\Sigma f_i \delta_i{}^3}{\sqrt{1 - (\Sigma f_i \delta_i{}^3)^2}}$$

$$k_3 = \frac{\delta_3{}^3 - f_{03}\Sigma f_i \delta_i{}^3}{\sqrt{1 - (\Sigma f_i \delta_i{}^3)^2}}$$

Hence:

$$\sin Z = \frac{a_{01}k_1 + a_{02}k_2 + a_{03}k_3}{\cos h} = \frac{\Sigma a_i k_i}{\sqrt{1 - (\Sigma a_i f_i)^2}}$$

Section (c)—Generation of Pulse Rates (Digital Electronic Linear Interpolator)

A preferred method of generating a useful electronic signal output which will approximate a known mathematical function to any degree of accuracy will be shown with reference to FIGURES 9, 10 and 11 in which the essential components of a so-called digital electronic linear interpolator are presented in simplified diagrammatic form. This interpolator is a pulse rate generator which can be controlled so as to reproduce physically with great accuracy a series of linear interpolations between chosen points of a function. (See reference cited under No. 1 in the list of patent applications presented at the end of the introduction in Division I, wherein the present unit is discussed in detail under the name of "binary incremental slope computer.")

It is commonly known that any mathematical function can be approximated to as great an accuracy as desired by a series of straight lines connecting point solutions for certain values of the independent variable. (See $u$ and $u_1$ in graph of FIGURE 8 which shows a portion of one of the star altitude curves discussed in connection with FIGURE 1 and expressed as star altitude function $f(t)$, the independent variable being represented by $t$=time.) A "staircase" approximation to these straight lines may be made in the form of a number of equal, fixed increments $\Delta f(t)$ per straight line. (See $upr$ and $upr_1$ in FIGURE 8.) The rate of $\Delta t_1$ or $\Delta t_2$ increments per straight line section is proportional to the slope of the line. Each straight line may be approximated as closely as desired by decreasing the magnitude of the fixed $\Delta f$-increments and by a proportionate increase in the number of $\Delta t$ increments for each respective straight line interval. Likewise, the fitting of the straight lines to an actual curve may be made as close as desired by increasing the number of straight line or "interpolation" intervals per function.

Such interpolation intervals with a "staircase" approximation to a straight line can be simulated by a combination of two electronic counters, one operating as a pulse rate generator and the other as a timer, the latter being adapted to switch the former to a different pulse rate at the conclusion of a particular interval whenever such change in the rate of pulses is desired. In the combination of counters herein suggested, the function increment $\Delta f$ remains a constant of predetermined magnitude throughout all interpolation intervals (as intimated in FIGURE 8). The selection of any pulse rate (viz., of the number of $\Delta t$ increments per interpolation interval) in this case depends, therefore, not only on the function itself but also on the choice of the $\Delta f$ constant. This latter is determined in accordance with the specific task to be performed by the interpolator as will be explained further below.

In its adaptation to the specific operational demands herein specified, the interpolator of FIGURES 9, 10 and 11 is called upon to carry out the important ground station function of converting pre-computed flight intelligence (see preceding sections) into pulse rates suitable for "storage" on a magnetic tape and for ultimate reconversion into electro-mechanical control actions adapted to faithfully reproduce the pre-computed functions at specified instants of time. (Consult general block diagrams of FIGURES 1 and 2, specifically boxes CR, PRG and output from PRG via amplifier RA to film drive of recorder unit F$d$.)

The interpolator or pulse rate generator to be described below consists essentially of two binary counters, supplied from a common external pulse generator and known as the "A" and the "B" counters, with attendant selector circuits as sketched in FIGURES 9 and 11. Counter "A" (shown schematically in FIGURE 9 together with the essential control units which in this particular application serve to actuate the counter) is designed to generate the accurately spaced pulses which are to be recorded on the magnetic tape as the ACN intelligence of apparent star altitude angles (or bubble turret azimuth angles). The pulse rates are determined by two switch banks No. 1 and No. 2 (switches $SwB_1$ and $SwB_2$) which are alternately operative on counter "A" under control of counter "B" (FIGURE 11) so that one switch bank is always left open for re-setting to the next pulse-rate. Counter "B" determines the time length of slope approximation for which any one pulse rate is valid. At the end of each of these time intervals, it automatically switches counter "A" to the next pulse rate which is established through the setting of the alternate switch bank. The length of time interval can be determined by selector switches RSS of FIGURE 11 as will be explained further below.

Two of the counter units "A" and "B" of FIGURES 9 and 11, respectively, can be integrated into a single unit capable of delivering, simultaneously, two pulse rates for the convenience of recording (in one single operation) the two altitude function channels necessary for a single ACN flight. The azimuth functions for bubble turret control require only one channel.

The interpolator herein described operates as a pulse rate divider which can generate rates of 1/1, 1/2, 1/3, 1/4, 1/5 . . . 1/16777216 of the input rate supplied by the external pulse generator. Pulse rate division is obtained through two separate 24-stage binary counters constituting the previously mentioned "A" and "B" counters. The "A" counter, shown separately in the simplified drawing of FIGURE 9, emits a function pulse each time it fills up and clears. Variation in the rate of function-pulse emission is achieved by changing the "effective" capacity of the counter. The maximum capacity of the counter is, of course, a constant; its "effective" capacity is controlled by setting into it an initial base number to which the input pulses add until the counter fills to its maximum capacity. Upon clearing, the counter emits a function pulse and resets itself to the base number. Variation in the base number causes variation in the function pulse output rate.

The second 24-stage binary counter or "B" counter which is separately shown in the simplified drawing of FIGURE 11, operates from the identical external pulse generator as the "A" counter. As stated before, it serves as an interpolation interval timing device. When it has filled to the pre-set number, which indicates completion of the particular interpolation interval chosen for the function being generated, it switches the "A" counter to the alternate reset base number.

The actual placing of the base numbers into the "A" counter is accomplished through the two banks of toggle switches $SwB_1$ and $SwB_2$ of FIGURE 9. These rate selector switches may be set manually. However, for more effective operation, each switch has been provided with a holding relay to be actuated by remote control. As outlined in connection with FIGURE 1 in Division IV, Section $a$, the curves representing the altitude function output from the IBM calculator, constitute a succession of linear slopes per equal time intervals which are converted into the before-mentioned "staircase" approximations per slope by the automatic separation of punched cards from a prearranged master file of cards in the IBM card reader CR, each of these separated cards identifying a specific pulse rate per slope interval through a unique sequence of punched holes contained in the respective card. Each sequence of punched holes, in turn, constitutes a "key" in the form of a binary reset base number representative of the unique switch setting of one switch bank in counter "A" that acts to produce the desired "staircase" pulse rate approximating the corresponding function slope per duration of one slope interval. Through this keying action of the selected master file cards which is correctly sequenced by the progressive selection of the master file cards, one bank of holding relays of counter "A" is alternately set to the pulse rate which closely approximates the computed slope of the respective interval, while the counter operates on the other bank of switch settings similarly established through the preceding keying action of the IBM selected master file card.

The choice of the operational input pulse rate (frequency of external pulse generator PG of FIGURES 9 and 11) as well as determination of the length of the interpolation interval and of pulse rates per interval are all inherent in the specific application of the interpolator to the present ACN system. It has been found that by selecting an input rate of 51.200 p.p.s., the wide range of operational demands could best be satisfied. On one hand, a 400 cycle synchronization frequency for the recording unit Fd (FIGURE 1) and a 100 cycle frequency source for synchronization of the interval meter (electronic clock in FIGURE 23) during recording procedures can be derived by binary division of a controlling oscillator frequency of 51.2 kc. (The need for such synchronization is discussed in Division IV, Section $e$.) By further binary division of 400 c.p.s., interpolation intervals such as those listed in FIGURE 11, namely, of 20.48 sec., 40.96 sec., 1 min. 21.92 sec. (81.92 sec.), 2 min. 43.84 sec. and 5 min. 27.68 sec. are made available of which the 81.92 sec. interval is of special interest in this particular application to the ACN system. An anlysis of computed star-altitude curves for a variety of conceivable ACN trajectories has revealed that in the majority of practical cases, the approximation to the average degree of star path curvatures achieved by a fixed interpolation interval of 81.92 sec. throughout the trajectory is of sufficient accuracy to reduce to a tolerable minimum the total possible error which can result from the combination of this approximation by interpolation with the "staircase" approximation to a straight line attainable during each interpolation interval. In the case of this latter type of approximation, the pulse rates made available by binary division of the same master oscillator frequency of 51.2 kc. provide ample flexibility in the choice of the most suitable and most accurate pulse rate for each interpolation interval. From the input rate of 51.200 p.p.s., the "A" counter can emit function pulses separated by 1/51200 sec., 2/51200 sec., 3/51200 sec., 4/51200 sec., 5/51200 sec., . . . 16,777,216/51200 sec. (or 5 min. 27.68 sec.). The function pulse-separation time is the time necessary to fill and clear the 24-stage binary counter which can contain any pre-set or base-number from 0 to 16,777,216. The pulse separation time thus can be established at any value in steps of 1/51200 sec. from a minimum value of approximately 19.5 microseconds (=1/51200 sec.) to a maximum value of 5 min. 27.68 sec., these extreme values being obtained by presetting the counter "full" or "empty," respectively.

The theoretical limits in the degree of approximation to a straight line interpolation lie, on one hand, in the maximum pulse capacity of the interpolator (in the present adaptation approximately four million pulses per 81.92 sec. interpolation interval at the rate of 51.200 pulses per second) and, on the other hand, in the fixed quantity of the increment $\Delta f$ of FIGURE 8 which is determined by the mechanical design of the escapement gear Eg and additional components of the telescope altitude angle generator of FIGURE 27 to be described in Division V, Section $a$. For a fuller understanding of the relationship between pulse rates and altitude angle changes, the following details from Division V, Section $a$, are here briefly restated: Each (altitude) function pulse, in its ultimate application after release from storage on the magnetic tape, originates one unit-function step of the above cited escapement gear which results in one "unit step" of vertical motion of nut Nu of FIGURE 30, each "unit step" being representative of one fixed increment or decrement $\Delta f$ of FIGURE 8. This vertical motion of nut Nu per unit step, in turn, causes a minute rotational displacement of the associated telescope prism about its elevation axis, corresponding to an average altitude increment or decrement of approximately 5 seconds of arc. The ratio of the vertical displacement of nut Nu per function pulse to the fixed length of the prism's tilting arm (= distance "xxx" of sine bar SB of FIGURES 27 and 29) equals .0000125 and is expressed as the sine of the angle of tilt of bar SB per function pulse, or the sine of half the displacement angle of the prism's line of sight per function pulse. (For additional details consult Division V, Section $a$.) As outlined in Division IV, Section $a$, the IBM calculators compute the altitude angle difference per interpolation interval in terms of the difference of the sines of half of each of two consecutive altitude angles. Consequently, the number by which the quantity .0000125 must be multiplied in order to yield the computed sine difference value per interpolation interval, or the closest approximation thereto, equals the number of pulses per 81.92 sec. interval or the pulse rate which must be chosen for this interval in order to produce the desired angular tilt of the respective prism.

The altitude drive mechanism of each telescope operates reliably on a maximum of about 15 function pulses per second. In turn, the highest pulse rate to be encountered in the majority of flight applications is such that provisions for automatic pulse rate settings of the "A" counter via the IBM Card Reader CR of FIGURE 1 have been limited to a maximum of 400 pulses per 81.92 sec. interpolation interval, i.e., to a maximum pulse rate of 4½–5 pulses per second. It can be seen, therefore, that the limitations in the pulse capacity of the interpolator herein specified lie far beyond the practical accuracy requirements of the ACN system. To illuminate the scope of these requirements, an example of practical pulse rate selection will be given after completion of a more thorough description of the interpolator.

*Pulse Rate Generator or "A" Counter*

Operation of the function pulse rate generator, or "A" counter, illustrated in block form in FIGURE 9, may best be described in three parts: The rate setting procedure, the starting procedure and the function pulse rate generation proper. (The electronic circuits employed in each of the boxes shown in FIGURE 9 operate on well known principles and will therefore not be shown, except for the details given in FIGURE 10.)

*Rate setting procedure:*

The effective capacity of the "A" counter is defined as the number of pulses required to fill the counter from its reset state (base number). In order to clear and emit a function pulse, the "A" counter must receive one pulse more than its effective capacity. If N is the effective capacity of the counter, it will emit one function pulse for every $(N+1)$th pulse it receives. The following relationship then holds between the output rate $(r_o)$ and the input rate $(r_i)$ of the counter:

$$r_o = \frac{r_i}{N+1}$$

or $$N = \frac{r_i}{r_o} - 1$$

For example, if a function pulse output rate of 1.00000 p.p.s. (one pulse per sec.) is desired from an inpute rate of 51,200 p.p.s., the effective capacity to be established would be:

$$N = \frac{51,200}{1.00000} - 1 = 51,199$$

To obtain the proper capacity in the counter, the base number set-in with the switches must be the difference between the total capacity and the effective capacity. In the above example, the number N for 24 binary stages would be:

$$N = 000000001100011111111111$$

and the reset base number, $N_r$, would be the binary complement of N, or $$N_r = 111111110011100000000000$$

If the first (right-hand) digit of $N_r$ were changed from 0 to 1, the function pulse output rate would become 1.00002 p.p.s.

*Starting procedure:*

(1) The external pulse generator (PG) is put into operation.

(2) The start-stop flip-flop (SSF) is triggered externally into the condition in which it cuts off the input gate tube (IG) and thus prevents the input pulses from entering the counter.

(3) The rate-change flip-flop (RCH) is set into the position which turn on, say, the gate tube $(RG_1)$ for switch bank 1 (switches $SwB_1$).

(4) Bank 1 of reset switches ($=SwB_1$) is set to provide the desired reset base number in the counter for the first pulse rate to be generated. (Manually or through means previously described.)

(5) The start-stop selector switch (SSS) is moved from its neutral position to position 1. The start-stop flip-flop (SSF) then is triggered externally so as to turn on the input gate tube (IG).

(6) A random number will exist initially in the counter as the result of the initial application of voltage when the equipment is turned on. As the pulses enter the counter from the pulse generator, the counter fills up and finally carries clear to a zero condition.

(7) At the instant of clearing, a carry pulse is emitted from the last stage (LS) of the counter.

(8) This carry pulse is delayed about 5 micro-seconds in delay circuit D*l*C and then passes through whichever gate tube ($RG_1$ or $RG_2$) is kept "on" by the rate-change flip-flop RCH (in this case, the gate tube for switch bank 1). The delay is introduced to allow the carry-clear transients in the "A" counter "flip-flops" (see below) to die away.

(9) The delayed and amplified carry pulse (see reset amplifier $RAm_1$) is used to reset the "A" counter stages to the reset base number set in switch bank 1.

(10) This pulse also triggers the start-stop flip-flop (SSF) and cuts off the input gate tube (IG), thus leaving the specified reset number in the counter.

(11) The start-stop selector switch (SSS) is then moved to its neutral position so that circuit SSF will not be triggered by reset pulses during the ensuing function pulse rate generation for which the counter is now duly "readied."

*Function pulse rate generation:*

(1) Function pulse rate generation is initiated by triggering the start-stop flip-flop SSF from an external source so as to turn on the input gate tube IG. The start-stop flip-flop is not used during the subsequent operations.

(2) Pulses from the pulse generator PG add to the initial reset number in the 24-stage counter.

(3) When the counter has filled up, the next input pulse causes the counter to carry clear and to emit simultaneously an output pulse from the last stage (LS).

(4) The carry pulse is delayed about 5 microseconds in circuit D.C. to allow the carry-clear transients in the counter to die away. The delayed carry pulse is used as the output function pulse and as the reset pulse.

(5) The carry pulse passes through whichever reset gate tube ($RG_1$ or $RG_2$) is held "on" by the rate-change flip-flop (RCH), the latter being controlled by the "B" counter (see below) and its output pulse passing through a D.C. amplifier ($RCA_1$ or $RCA_2$) before reaching the respective reset gate. The amplified reset pulse (see amplifiers $RAm_1$ or $RAm_2$) resets the counter stages C*t*S through the correct bank of switches SwB before the next input pulse arrives at the counter.

(6) This operation is repeated in identical fashion throughout the interpolation interval. In the meantime, the second switch-bank $SwB_2$ is set up for the correct pulse rate-reset number to be used during the next interval. This is done either manually or by remote control.

(7) At the expiration of a particular interpolation interval, the rate-change flip-flop RCH is triggered by a pulse from the "B" counter. This cuts off the conducting reset gate tube RG and turns on the gate tube for the other channel so that reset pulses will now go through the other switch bank.

(8) The operation of the counter may be stopped at any time by triggering the start-stop flip-flop SSF so that the input gate IG is closed.

Most of the circuits utilized in the "A" counter are conventional. The binary counter stages $CtS$ are a series of 24 modified Eccles-Jordan flip-flops, for which 2C51 twin-triodes are preferably used, a neon tube serving in each stage as a visual indicator for the "state" of the respective flip-flop. A typical flip-flop stage (binary counter stage $CtS$) of FIGURE 9 is shown in the left portion of FIGURE 10. The "zero" or "0" state of each flip-flop is considered to be that in which the right side $rh$ of the tube shown in the drawing is conducting, so that the left side $lh$ is cut off and the neon indicator NI in the plate circuit is not illuminated. A negative carry pulse at CRP from the preceding stage, or a negative reset pulse through one of the reset switches $SwB_1$ or $SwB_2$ will reverse the condition of the tube and will initiate the "one" or "1" state. Changing from the "1" state to the "0" state will send a negative pulse through the carry coupling capacitor CCC to the next stage.

The reset amplifier output stages in the right half of FIGURE 10 (same as boxes $RAm_1$ and $RAm_2$ of FIGURE 9) consist of a cathode follower $RAm_{11}$ and $RAm_{22}$ for reset channel 1 and 2, respectively. Each cathode follower has two operating conditions:

(1) When the reset channel is not operative, the respective cathode follower is conducting. (Voltage on grid $Gr$ being high when reset gate RG of FIGURE 9 is "off.") In this condition, the low impedance looking into the cathode of this cathode follower attenuates unwanted pulses, thereby preventing any appreciable "cross-talk" build-up in the quiescent reset channel.

(2) When the reset channel is operative, grid $Gr$ is pulsed simultaneously with the cathode C by the negative reset pulse from $RG_1$ or $RG_2$, thereby driving tube $RAm_{11}$ or $RAm_{22}$ to cut-off. The shunt impedance of the cathode resistor $caR$ in this condition does not attenuate the reset pulse appreciably.

The remaining amplifier circuits in FIGURE 9 are conventional. For the gating circuits IG, $RG_1$ and $RG_2$ 6AS6 pentodes are preferably used, the gating signals for gates RG being applied to the suppressors and the pulses from the counter stages being applied to the control grids.

*Interval Timer or "B" Counter*

The interpolation interval timer, or "B" counter, is shown in block form in FIGURE 11. The 51,200 p.p.s. input from the external pulse generator PG is "divided down" in seven binary counter stages $CtS_1$ to a rate of 400 p.p.s., whence the pulses are tapped-off (line $l_2$) and transformed by a shaping circuit (not shown) into a 400-cycle sine wave, continuously available as a synchronizing signal for other equipment, such as for the film drive synchronous motor of the magnetic tape recorder. (See line F$s$ in FIGURE 1.)

The 400 cycle pulses from the last stage of counters $CtS_1$ are further "divided down" in the additional 17 binary counter stages $CtS_2$ after passing through gate $G_1$ (see text below). Gate $G_1$ is controlled by a start-stop flip-flop $SSF_1$, analogous to that of FIGURE 9. Before function pulse generation, the gate tube is "off"; at the beginning of the generation, the same externally supplied pulse which initiates the operation of the "A" counter also triggers the start-stop flip-flop $SSF_1$, turns on the gate tube $G_1$ and allows the 400 p.p.s. to reach the remaining counter stages $CtS_2$. These 17 stages are initially all in the "0" state, and begin now counting from zero up to their full capacity, after which they clear and begin counting again from zero. Rate change or slope change pulses for counter "A" can be obtained from any of the last five counter stages $CtS_2$ via rate-selector switches RRS and are passed through a pulse former PF before being delivered to counter "A." These five take-off points allow the selection of any of the five different interpolation intervals listed in FIGURE 11.

As in the case of the 400 p.p.s. "tap-off" at $l_2$, a 100 p.p.s. "tap-off" at $l_3$ may be used to derive a 100 cycle synchronizing signal for external equipment, such as for the electronic clock of FIGURE 23. In this case, gate tube $G_1$ must obviously remain "on" as long as the 100 cycle signal is needed.

*Pulse Rate Selection Per Interpolation Interval*

An example of "manual" or mental computation of pulse rates per interpolation interval is given with reference to FIGURE 50. As pointed out, such pulse rate selection is carried out automatically by IBM facilities. Nevertheless, it is useful, at this point, to follow through an example of "long-hand" pulse rate selection in order to correlate all essential factors which contribute automatically in bringing about the desired end effect and whose detailed discussion, by necessity, appears in widely separated sections of this specification. For the example of "manual" selection given below, a simplified condition will be assumed in which the computed star altitude increases at a virtually constant rate from 55° to 60° over an arbitrarily selected period of 10 interpolation intervals. In FIGURE 50, star altitude points $SP_1$ and $SP_2$ along the computed star altitude curve SC represent the initial and terminal points, respectively, of the selected period where $\Delta t = 819.2$ sec. and $\Delta f(t) = \sin 60° - \sin 55°$ (arrow $aa$ indicating direction of motion). The angular dimensions in the drawing do not correspond to the actual values given in this example. As stated in detail with reference to FIGURE 27 in Division V, Section $a$, straight line $xxx$ in FIGURE 50, representing sine bar SB which joins travel-nut N$u$ on lead screw LS with the rotational axis P$ra$ of prism P$r$ (surface of incidence of prism symbolizing the entire prism), is in a zero position P$lp$ normal to the axis of lead screw LS when the line of sight L$st$ of the prism is in its midrange or reference position of 47.5°. (This angle is measured against platform plane P$l$ (FIGURE 24) which is always normal to the axis of leadscrew LS or normal to optical axis O$x$ of the telescope. The latter axes portray the "dynamic" vertical specified for a given location only when two adjoining telescopes track their stars at the specified altitude angles and at the specified time.) Due to double refraction of incident rays in prism P$r$, the angle of displacement of line $xxx$ from the zero or neutral position equals half the angle of displacement of the prism's line of sight L$st$ from the midrange position of 47.5°. For any increase in star altitude (the latter represented by the line of sight of the prism) away from 47.5°, this displacement angle of line $xxx$, or motion of travel nut N$u$ on lead screw LS, is oriented downward from the neutral position, and for any decrease in line of sight angles away from 47.5°, it is oriented upward from the neutral position. In general, nut N$u$ will travel downward from any position for an ascending star altitude curve and upward for a descending curve. Thus, with $x_1$ and $x_2$ designating the displacement angles of line $xxx$ from zero for line-of-sight angles of 55° and 60°, respectively:

$$x_1 = \frac{55° - 47.5°}{2} = 3.75°$$

down from neutral when the telescope points at the 55° altitude angle of $SP_1$;

$$x_2 = \frac{60° - 47.5°}{2} = 6.25°$$

down from neutral when the telescope points at the 60° altitude angle of $SP_2$. Difference $x_2 - x_1 = 2.5°$.

$\phi_{1a}$ = distance of (downward) travel of nut N$u$ on lead screw LS from neutral position at $n$ for star altitude angle increase from 47.5° to 55° = sin 3.75°

(3° 45') = .06540

Each unit step of the escapement gear E$g$ of FIGURE 27 (equivalent of one function pulse from the "A" counter of FIGURE 9) produces a vertical displacement of nut N$u$ along screw LS so that the ratio:

$$\frac{\text{vertical displacement of nut}}{\text{length of sine bar}} = .0000125$$

Hence: .0000125 = sine of displacement angle × per function pulse and $$\phi_{1a} = \frac{.06540}{.0000125}$$

or $.06540 \times 8 \times 10^4 = 5232$ unit steps or function pulses.

$\phi_{1b}$ = nut travel from neutral $n$ for angle increase from 47.5° to 60° = sin 6.25°

$(6° \ 15') = .10887 = .10887 \times 8 \times 10^4 = 8709.6$ or 8710 function pulses.

Thus, $8710 - 5232 = 3478$ pulses are required to produce a change in the telescope-altitude angle from 55° to 60°. Since the star altitude is assumed to increase at a constant rate over the observed 13.65 minute-interval (=819.2 seconds), the 3478 pulses may be distributed evenly over 10 interpolation intervals, leaving 347.8 pulses per 81.92 sec. interval which is equal to a pulse rate of 4.25 pulses per second.

The effective capacity N of the "A" counter, according to the previously cited formula, equals $$\frac{51,200}{4.25} - 1 = 12046$$

The reset base number N$r$ or difference between the total and effective capacity of the "A" counter to which the switchbanks must be set for ten consecutive interpolation intervals equals $16777216 - 12046 = 16765170$. For 24 binary stages:

$$N = 000000000010111100001110$$

and $$N_r = 111111111101000011110001$$

The sequence of digits under N$_r$ specifies the "on" (=1) and "off" (=0) settings of the switch banks of FIGURE 9 for a pulse rate of 4.25 p.p.s.

*Section (d)—Recording of Trajectory Data and Sequencing Schedule (Tape Recorder and Playback Unit)*

In the tape recorder and playback unit, the electric pulse trains which are generated in the "A" counter of the linear interpolator described in the preceding section c, as well as the sequence pulses for the Master Controller (see Division V, Section i) are recorded on a 35 mm. sensitized cellulose tape by way of a sequence of recording heads which act to magnetize the coated or sensitized side of the tape along a corresponding number of pre-allocated parallel longitudinal tracks or channels on the tape. These same recording heads serve also as pick-off heads for reconversion of the recorded pulse intelligence into electric impulses during airborne playback of the tape. Since the magnetic record of the pulse trains from the above cited "A" counter, in the presently adopted procedure, carries information regarding only the magnitude of angular changes but not the sense or direction of these changes (increasing or decreasing altitude angles), separate recording channels (one for each pulse channel) have been provided on the uncoated side of of the tape whose function is to identify this directional sense. They are called "foil" channels (as against the "path" channels which contain the pulse information) because a strip of silver foil is placed on the "glossy" or coat-free side of the tape across one or the other of these "sign-change" channels wherever a change of slope, i.e., a reversal of direction of angular changes occurs in the corresponding path (pulse) channel. A separate foil channel head below the recording head casing carries a feeler switch for each foil channel which rides against the tape within the narrow, ribbon-like zone assigned to a single channel. The switch is closed (bridged) by the strip of foil when the latter passes with the tape through the foil channel head, thereby actuating a relay which reverses the phase of the amplified pulse signals on their way to the telescope elevation drive units.

One of the above mentioned foil channels is exclusively assigned to the function of starting and stopping the airborne playback operation.

During recording, the unit under discussion operates in synchronism with the above mentioned linear interpolator or pulse rate generator which is controlled by a 51.2 kc. master oscillator from which also the 400 cycle power supply for the tape recorder is derived. (See FIGURES 1 and 11.) As explained in greater detail in Division IV, Section e on "System Synchronization," a 100 cycle pulse supply from this same 51.2 kc. timing source (FIGURE 11) drives an electronic clock which is used in stop-watch fashion during the recording process in order to control the proper sequencing of the various time elements in each recording channel. During the playback function, this same tape recorder is driven in reverse from an airborne 400 cycle power supply under accurate frequency control from the secondary frequency standard referred to in the same Division IV, Section e, cited above. A preferred method of synchronous two-speed control for the tape reel drive will be explained in connection with FIGURE 12. The gear shift and sprocket drive mechanisms, the reel drive and take-up system, the recording head and foil channel head assembly as well as other pertinent features will be described in greater detail with reference to FIGURES 13 through 22 as well as with reference to the general diagram of FIGURE 12.

FIGURE 12 presents an oblique profile view of the entire recording and playback unit from the side upon which the tape reels are mounted. The reels proper have been removed from their shafts $s$A and $s$B in order to give a clear view of portions of the drive mechanism. Circular outlines RL1 and RL2 suggest the contours and relative positions of the tape reels when the latter are mounted.

The tape track is indicated by the parallel dotted lines T$p$, the arrows in the track marking the "forward" direction of tape travel which results from the "forward" rotation of upper and lower sprockets S$p$1 and S$p$2, designated by arrows $fwa$ on each sprocket. Sprockets S$p$1 and S$p$2 rotate in opposite direction and constitute the driving elements for endless chain C$h$ which in turn, rotates reel shafts $s$A and $s$B. The driving power for sprockets S$p$1 and S$p$2 is derived from motors $s$M and $d$M via a gear shift arrangement in transmission box B$x$ and via a conventional internal motion picture projector gear arrangement in casing $c$P$r$. Both these gear assemblies are obscured from view in the present drawing but are shown in the sectional drawings of FIGURES 13 and 14, in reference to which they will be briefly described further below. Chain C$h$ is always driven in a clockwise direction when viewed from the right in FIGURE 12 (see arrow C$ha$), irrespective of the sense of rotation of sprockets S$p$1 and S$p$2. When switch S$w$ (4 pole - 2 throw) is in "forward" position, motors $s$M and $d$M rotate the sprockets, and with them tape T$p$, in the forward direction indicated by the respective arrows $fwa$. This causes the tape to unwind from the top reel and to wind itself onto the bottom reel. With switch S$w$ in "backward" position, the top reel becomes the "take-up" reel and the bottom reel the "feeding" reel, sprocket wheels S$p$1 and S$p$2 rotating in a direction opposite to that of arrows $fwa$. Only one sprocket wheel at a time operates as the driving element. A ratchet wheel (not shown; see part $rwu$ in detail drawing of FIGURE 17) is firmly mounted on the rear face of each sprocket wheel, the ratchet teeth pointing clockwise on both ratchet wheels if viewed through the sprocket wheels from the front end of shafts S$p$1$c$ and S$p$2$c$. Pawls P$w$1, which are attached to the forward face of upper chain pulley Pu1 (only one of the two pawls visible; see detail diagram of FIGURE 17) are engaged by the teeth of the ratchet wheel on sprocket Sp1 when the latter rotates clockwise or forward in the direction of arrow *fwa*. The rotational torque of the sprocket wheel is thereby transferred onto chain pulley Pu1. When sprocket Sp1 is rotated counterclockwise ("backward"), pawls Pw1 slide idly over the ratchet teeth, and no torque is applied to pulley Pu1. In the case of the lower sprocket wheel Sp2, the conditions are reversed so that while this wheel is rotating "forward" (counterclockwise), no torque is applied to "bottom" chain pulley Pu2 (pawls Pw2 sliding idly over the ratchet wheel in back of sprocket Sp2), but if the lower sprocket wheel rotates "backward" (clockwise), the same torque transfer takes place as during clockwise rotation of the upper sprocket wheel Sp1. As a result of this arrangement, either pulley Pu1 or pulley Pu2 is rotated clockwise, depending on which of the sprocket wheels is driven in a clockwise direction. This has the effect of driving chain Ch clockwise, irrespective of the forward or backward position of switch Sw. In spite of this, tape Tp will travel in the indicated "forward" direction when switch Sw is in "forward" position, and it will travel in the opposite direction when the switch is in "reverse" or "backward" position (i.e., the tape is driven downward through the "recording" or "pick-off" head assembly RH and through the foil channel head FH when the unit is switched to "forward," and it is driven upward through these parts when the unit is switched to "reverse"). This is made possible through the adoption of slippage clutches which tend to hold the reels RL1 and RL2 on shaft sA and sB but permit rotation of the reels about these shafts against the friction of the clutches ("slippage"). The construction of these reel clutches as well as the method of mounting the reels on shafts sA and sB are shown in greater detail in FIGURE 16. In the present drawing, clutches Cl1 and Cl2 carrying felt discs Ft1 and Ft2, respectively, can be seen mounted on shafts sA and sB where they provide a grip on the reels in the manner explained with reference to FIGURE 16. The rate of rotation of clutch wheels Cl1 and Cl2 is slightly higher than that of the sprocket wheels Sp1 and Sp2. With switch Sw in "forward" position and tape-reels RL1 and RL2 mounted on shafts sA and sB, clutch Cl1 tends to rotate reel RL1 so as to pull the tape from sprocket wheel Sp1 towards the reel hub. The sprocket wheel, however, which has a firm grip on the tape (no slippage) and rotates clockwise, overpowers the clutch friction and causes the reel to rotate counterclockwise on shaft sA (large arrow *fwa*) while pulling the tape away from the reel. As the clutch continues to rotate clockwise at a higher speed than the "take-up" speed of sprocket wheel Sp1, it constantly operates to take up any possible slack in the tape between the feeding reel and the take-up sprocket. This tendency of the clutch to pull the tape away from the sprocket wheel obviously increases in proportion to the amount of tape carried by the reel. Consequently, the "slippage" is highest when the reel is filled with tape and decreases as the reel unwinds itself.

During this same "forward" motion, clutch Cl2 on the lower shaft sB, which always rotates clockwise like the clutch on shaft sA, tends to rotate reel RL2 clockwise and thereby to pull tape Tp away from sprocket wheel Sp2. The rate of pull is faster than the rate of tape delivery from the feeding sprocket Sp2 (the sprocket rotating counterclockwise). This causes "slippage" of reel RL2 against clutch Cl2 (clockwise rotation of reel RL2 at a slower rate than that of shaft sB), which increases as the "take-up" reel fills up with tape and always operates toward keeping the tape stretched tight between take-up reel and feeding sprocket. (Chain pulley Pu2, during this motion, is rotated by chain Ch in the opposite direction of sprocket wheel Sp2.)

If the drive direction is reversed, the same conditions described above for the "forward" drive of the upper sprocket and reel now become effective at the lower sprocket and reel. Similarly, the upper drive now operates in take-up fashion in the same manner as the lower drive during "forward" motion, the function of both reels being simply interchanged. A reversible feed and take-up system is thus provided which assures smooth, slack-less transfer of the film tape between reels and sprockets during both, "forward" and "backward" runs.

An additional tension device is provided for the section of tape between the two sprocket wheels Sp1 and Sp2. It consists of a frame Tf which carries two rollers Ro1 and Ro2, and is pivoted on pins *pv* between the two arms Fk (only one arm visible) of support Su, the latter being bolted to sideplate RHp of recording head casing RH. Tape Tp is guided over rollers Ro1 and Ro2 as indicated by the dashed lines before it enters (or after it leaves) the recording head assembly. A spring *rs* anchored between sideplate RHp and the cross member of frame Tf which is close to sprocket wheel Sp1, tends to pull down the near half of frame Tf and to pull up the far half of the frame which extends beyond pivot pins *pv*. This device fulfills the double purpose of holding the tape tight against the sprockets of wheel Sp1 via auxiliary roller Roa and of providing added tension for the section of tape which passes through the head assemblies RH and FH between rollers Ro2 and Rob. (See also drawing in FIGURE 20.) Bracket assembly Brk and turn buckles tb1, tb2 serve to hold chain Ch at the desired tension. The roller and pad combinations RPa and RPb at the upper and lower sprockets prevent the tape from "climbing up" on the sprockets. Roller Rob, the counter part to auxiliary roller Roa, holds the glossy side of tape Tp against the foil channel feeler switches of assembly FH to be described below in connection with FIGURE 18.

The recommended speed control system is designed for operation of the recorder at two different driving speeds. At low speed or normal operative speed, the tape travels 6 inches per second; at high speed, it travels eight times as fast. The low speed is employed during all playback functions as well as during all normal recording procedures when no special importance is placed on the time factor. The high speed is principally used for quick transfer of the tape from one reel to the other, for rewinding and similar operations. Since the angle computing devices (IBM facilities) and the pulse rate generator are capable of delivering the trajectory data at a considerably higher speed than that required for ultimate playback function, it is feasible to save valuable time during recording by using a multiple of the actually required pulse rates from the interpolator (such as eight times the desired playback rates) and by driving the recording tape at a correspondingly increased speed (such as eight times the speed actually required for playback). The pulse spacings on the tape remain the same as those of the normal recording speed which is also the playback speed.

In order to make certain that the tape is driven at the exact required speed during both, slow and high speed operation, the drive motor dM, a $\frac{1}{15}$ H.P. induction motor which carries the bulk of the load and whose power supply, during playback functions, is derived from the airborne craft's 400 cycle inverter, is connected to $\frac{1}{100}$ H.P. synchronous speed control motor sM which is driven from the 400 cycle power supply of the Secondary Frequency Standard Output Unit, referred to in Division IV, Section *e*. Pulley Py1 on the shaft of the induction motor dM and pulley Py2 on the shaft of synchronous motor sM are joined by what is known as a "44-O ring," designated by numeral Or. The ratio of diameter of the two pulleys is determined by the average power requirements of the complete drive system for both speeds of tape travel at the synchronous speed level of the speed control motor sM. This means that under both load conditions, the induction or drive motor dM must be caused to run at the same speed below that of the synchronous motor sM at which it delivers the required average power to the synchronous motor (or briefly synch motor-shaft), the difference in speeds being taken up by the proportionately larger diameter of the pulley on the drive motor shaft. The following considerations serve to make this point clear.

At normal or low speed tape drive, the total power requirements are low. The drive motor, under these light-load-conditions and with the selected pulley ratio, tends to "overdrive" the synch motor (viz. to "crowd" the latter into a higher speed since the former motor endeavors to run at nearly synchronous speed), but the synch motor's resistance to any such speed changes places an additional load onto the drive motor ("bucking" load) which reduces the latter's speed. The power delivered at that speed, which is the average power referred to above, minus the power consumed by the "bucking" load of the synch motor, brings the output power to the low level of the slow speed drive.

The total power requirements for the high-speed drive are high. Under these heavy load conditions and with the chosen pulley ratio, the drive motor tends to slow down the synch motor (the speed of revolution of an induction motor decreasing with increasing load), but the synch motor's resistance against any such changes, in this case, adds to ("boosts") the speed of the drive motor (viz. decreases its load) and therefore causes it again the run at the speed at which it delivers the above cited average power. The power added by the "boosting" action of the synch motor raises the output power to the higher level required for high speed operation of the recording unit.

Referring now principally to the simplified diagrams of the gearshift-and-sprocket drive mechanisms given in FIGURES 13 and 14 (FIGURE 13 presenting a profile view of motors $dM$ and $sM$ and a partial phantom view of box $Bx$ of FIGURE 12 in the general direction of arrow $Gg$ in FIGURE 12; FIGURE 14 showing the parts of FIGURE 13 in similar fashion against the approximate planes $H_1$—$H_1$ at right angles to the general plane of FIGURE 13), it is seen that a worm gear $wo$ (FIGURE 13) on drive shaft $dr5$ of speed control motor $sM$ (the principle torque on this shaft being supplied from induction motor $dM$ via the above described pulleys $Py1$, $Py2$ and O ring $Or$) conveys the rotary torque of shaft $dr5$ onto wheel $Wh$, shaft $sh5$ and transmission gears $Tr5$ and $Tr6$. (See FIGURE 14. Wheel $Wh$ and gears $Tr5$, $Tr6$ are firmly mounted on shaft $sh5$.) Gears $Tr5$ and $Tr6$ mesh with transmission gears $Tr5a$ and $Tr6a$, respectively, which are rotatably mounted on the output shaft $sh6$ of transmission box $Bx$. A cylindrical clutch $Cu$ is keyed onto the central portion of shaft $sh6$ at $Ky$ in such a way that the clutch can be shifted axially along shaft $sh6$ in both directions, but so that any torque applied about the longitudinal axis of the clutch is transferred onto the output shaft $sh6$. If clutch $Cu$ is shifted to the left in the drawing, it meshes with gear $Tr5a$, this latter gear thereupon applying high speed torque onto the clutch and onto output shaft $sh6$. If the clutch is shifted to the right in the drawing, it is engaged by gear $Tr6a$ which applies low speed torque onto clutch $Clu$ and output shaft $sh6$. The shifting mechanism consists essentially of two rods $Rd1$ and $Rd2$ which carry ring shaped bearing $rg$ on brackets $Bbr$ in which the extended end portion $Hu$ of clutch $Clu$ is rotatably mounted. To the left in the diagram, rods $Rd1$ and $Rd2$ are supported in the casing of box $Bx$ (see FIGURE 12), and their right ends fit over pins $op$ and $np$ which extend from the right side of the casing $Bx$. Springs $l6$ and $m6$ which shoulder these pins, hold rods $Rd1$ and $Rd2$ against eccentric hubs $hb1$ and $hb2$ on shaft $Sh7$ of gear shift knob $Kg$ (see also FIGURE 12). Shaft $Sh7$ is supported in bracket $bk$. Thus, when knob $Kg$ is rotated from the position shown in FIGURE 14 (turning the excentric portions of hubs $hb1$ and $hb2$ away from the rod ends), rods $Rd1$ and $Rd2$ and ring $rg$ are pushed to the left by action of springs $l6$ and $m6$, causing gear $Tr5a$ to engage clutch $Clu$ (high speed drive). If knob $Kg$ is turned into the position illustrated in FIGURE 14, excentric hubs $hb1$ and $hb2$ push rods $Rd1$ and $Rd2$ to the right against action of springs $l6$ and $m6$, causing gear $Tr6a$ to engage clutch $Clu$ (low speed drive). Stop $Stp$ (FIGURE 12) limits rotation of shaft $Sh7$ to the required amount.

Coupling $Cg$ ties output shaft $Sh6$ to worm gear shaft $wsh$ in the projector gear casing $cPr$ previously referred to in FIGURE 12. Only portions of the worm gear on this shaft are shown in FIGURE 14. The projector gear assembly in casing $cPr$ of FIGURE 12 consists principally of two drive shafts $wsh$ and $sht$ (FIGURE 14) which are supported in bearings $be1$, $be2$ and $be3$, $be4$, $be5$, $be6$, respectively. Shaft $sht$ is driven by worm gear shaft $wsh$ via worm $wm1$, the latter mounted near the lower end of shaft $sht$. Worm $wm2$ near the upper end of shaft $sht$, in turn, drives the upper sprocket wheel $Sp1$ via worm $wm3$, the latter mounted on sprocket shaft $Sp1c$ behind wheel $Sp1$. (See dashed circles.) Worm gear $wsh$ drives lower sprocket $Sp2$ via worm $wm4$ on sprocket shaft $Sp2c$. (Portion of wheel $Sp2$ broken away to expose worm $wm4$. See also sectional diagram of FIGURE 17.)

One of the preferred methods of mounting reel RL1 of FIGURE 12 on shaft $sA$ and a preferred type of construction of the clutch drive are shown in greater detail in FIGURES 15 and 16. In FIGURE 15, a recommended form of reel lock is sketched as viewed from an observation point on the extended axis of shaft $sA$ directly in front of the mounted reel in FIGURE 12. This reel lock is mounted in a recessed space on the front face of the reel core- or hub-assembly $Rhb$ underneath the side plate of the reel (the latter broken away in FIGURE 15) and consists of two parallel spring loaded locking blades $lBl1$ and $lBl2$ which are hinged on opposite ends at points $hn1$ and $hn2$, respectively. Torsional springs, not shown, are carried through the hinge axes at $hn1$ and $hn2$. The free ends of blades $lBl1$ and $lBl2$ carry pins $lp1$ and $lp2$, respectively, which extend through slots $slo1$ and $slo2$ in the sidewall of reel RL1. During mounting of the reel, pins $lp1$ and $lp2$ recede in slots $slo1$ and $slo2$ in the direction of arrows $ar1$ and $ar2$ through action of the conical end portion $co$ of shaft $sA$ (FIGURE 16), thereby clearing the way for cone $co$ to pass through the space between blades $lBl1$ and $lBl2$. This is done against tension of the above mentioned tortional retaining springs which normally hold blades $lBl1$ and $lBl2$ in the parallel alignment shown in the drawing of FIGURE 15. When the reel is pushed into place on shaft $sA$, blades $lBl1$ and $lBl2$, after being first separated by cone $co$, "snap" into this parallel "locking" position when they enter into the circular recess $rc$ provided on shaft $sA$ behind the conically shaped end-portion $co$ (FIGURE 16). This prevents the reel from being pushed outward on shaft $sA$ by action of springs $sg$ of clutch drive assembly $ClA$ (see below). When dismounting the reel, pins $lp1$ and $lp2$ are shifted manually in the direction of arrows $ar1$ and $ar2$, respectively. This clears the notched central portions $cno$ (FIGURE 15) of blades $lBl1$ and $lBl2$ from recess $rc$, permitting the reel hub to slide freely from shaft $sA$.

FIGURE 16 shows a simplified cross-sectional view of the clutch-drive assembly and of the mounted reel RL1 as seen in a horizontal plane through shaft $sA$ in FIGURE 12, part $sBo$ representing a portion of the supporting structure of shaft $sA$ in FIGURE 12 which holds this assembly onto body $Bo$ of the recorder (the shaft running on bearings $be7$ and $be8$ in sleeves $sv1$ and $sv2$, respectively). Driving disc $Clo$ is firmly mounted on shaft $sA$ and carries on its outer face a toothed wheel $tw1$ (portions of which are also visible in FIGURE 12) which is solidly attached to this disk C*lo*. Chain C*h* of FIGURE 12 engages this toothed wheel *tw*1. When rotated by one of the sprocket wheels S*p*1 or S*p*2 of FIGURE 12, the chain thus rotates shaft *s*A by applying torque on driving disc C*lo*. This torque is transferred onto clutch disc C*l*1 and felt-disc F*t*1 by way of four coil springs *sg* (only two visible) held in individual recesses which extend partly across driving disc C*lo* and partly across clutch disc C*l*1, the latter rotating freely on shaft *s*A. Springs *sg* constitute a form of elastic driving element for clutch disc C*l*1 which adds to the yielding qualities of the clutch, thus preventing any undue stress on the film tape. When reel RL1 is dismounted, springs *sg* push clutch disc C*l*1 with felt disc F*t*1 against retaining ring *rr* on shaft *s*A, leaving added space between discs C*lo* and C*l*1. This space is partly taken up when, during mounting of reel RL1 on shaft *s*A, the reel is pressed against the felt disc so as to allow locking blades *lB*/1 and *lB*/2 to enter circular recess *rc* and thereby to lock the reel securely into place. The identical features, explained above, apply also to the mounting of reel RL2 on shaft *s*B of FIGURE 12.

A ratchet wheel assembly which, as previously explained with reference to FIGURE 12, serves to convey the driving torque from sprocket wheel for S*p*1 or S*p*2 to chain pulley P*u*1 or P*u*2, is shown in greater detail in the schematic sectional view of FIGURE 17, taken against a horizontal plane through the axis of shaft S*p*2*c* in FIGURE 12, this shaft carrying lower sprocket wheel S*p*2 and lower chain pulley P*u*2. Both, the upper and the lower ratchet wheel assemblies, are identical in construction. Shaft S*p*2*c* is driven by worm gear shaft *wsh* of FIGURE 14 via worm *wm*4, the latter shown also in the present drawing. Gear *wm*4 is mounted on the rear portion of shaft S*p*2*c*, and the shaft proper is supported in the frame of casing *cPr* of FIGURE 12 within the body B*o* of the recording unit, broken-away parts of frame *cPr* being drawn into FIGURE 17.

Sprocket wheel S*p*2 which bears two rows of sprockets *spk* forming one single structural unit with the body of the sprocket-wheel, is locked onto shaft S*p*2*c* by screws *sc* and can be seen to carry ratchet wheel unit *rwu* which is securely attached to the rear surface of unit S*p*2 by locking pin *lp*3. Ratchet teeth *rth* extend from a ring-shaped shoulder of unit *rwu* as shown in the drawing. These ratchet teeth engage pawls P*w*2 of the chain pulley unit P*u*2 when shaft S*p*2*c* turns sprocket wheel S*p*2 counterclockwise (shaft axis viewed from bottom of drawing; see text to FIGURE 12, above). Unit P*u*2 is held by sleeve *sv*3 which rides freely on shaft S*p*2*c* between the shoulder of ratchet wheel unit *rwu* and shaft-support C*pr*. Toothed pulley wheel *cw* is clamped against the body of unit P*u*2 by disk *dk* which is firmly mounted onto the front end of sleeve *sv*3. Pawls P*w*2 are pivoted in disk *dk* as shown, the pivotal pins *ip* being fixed to the pawls and extending through bores in wheel *cw*. Each pin is engaged by a spring S*pr* which applies pressure and tortional stress onto the pawls, making certain that the active pawl faces "catch" securely in the ratchet teeth of wheel unit *rwu*. Springs S*pr* are carried through bores in the body of unit P*u*2 as shown in the drawing and are anchored at the rear openings of these bores. Numeral B*o* designates portions of the main frame of the recording unit of FIGURE 12.

The recording head assembly in its present preferred form consists of five recording head units *r*H*u*, supported in casing RH of FIGURE 12, one unit *r*H*u* for each of the five "path"- channels on the tape presently in use in the ACN-recording system, and of a foil channel head FH (FIGURE 12) with four individual "feeler" switches for the four foil channels on the tape which are in current use. The five recording head units *r*H*u* are lined up in one vertical row, individually supported in the common casing RH. Casing RH is attached to body B*o* of the tape recorder unit via plate PB, the latter being held onto body B*o* by bolt B*l*B. Foil channel head FH is supported at the lower portion of casing RH by bolts B*l*F in the manner shown in FIGURE 12. (As previously mentioned, casing RH also supports the tape tension device T*f*. Casing RH is composed of three plates, the two side plates RH*s* being bolted to transverse plate RH*p* by bolts B*l*H. The side of casing RH facing rearward to the right in FIGURE 12 is open (see detail drawing of FIGURE 22.) The recording head units *r*H*u* and the foil channel head FH will be described in greater detail with reference to FIGURES 20, 21, 22 and FIGURES 18, 19, respectively.

FIGURE 20 is a simplified diagrammatic phantom section view of casing RH as seen in a plane *ii—ii* through the casing in FIGURE 12 (see identification of planes *ii—ii*, *ll—ll* and *pp—pp* in sketch to the right of FIGURE 12). Numerals *r*H*u*1, *r*H*u*2, *r*H*u*3, *r*H*u*4 and *r*H*u*5 designate five cylindrical retainers (viewed "edgewise"), each of which carries its individual recording head. These retainers have been summarily designated as recording head units *r*H*u* in FIGURE 12. They can be individually removed from casing RH. All units *r*H*u* are essentially alike with the exception of structural variations in the cylindrical retainers proper which have been introduced in order to make possible the staggered mounting of the recording heads which is necessary to avoid superposition of the individual pulse-channels on the tape. (See FIGURE 21 and text below.) Six rollers R*oh* which are supported between opposite a pair of bearing pins (not shown) in the walls of casing RH, help to hold the tape against the recording heads. Rollers R*o*1, R*o*2, and R*ob*, previously mentioned in connection with FIGURE 12, are also shown in the present drawing, the path of the tape over these latter rollers and through the recording head assembly in casing RH being marked out by heavy line T*p* (solid arrow indicating "forward" travel and dashed arrow "reverse" travel of tape).

The circular "front" plates of the five retainers *r*H*u*1 through *r*H*u*5 in FIGURE 20 ("front" here referring to parts facing the observer in FIGURE 12) extend radially beyond the circular edges *ed* of the corresponding bore holes in the side plate RH*s* of the common casing RH through which the individual retainers are inserted into casing RH. A rim is thus provided on each retainer which permits fastening of the retainer to casing RH by means of bolt B*r* which enters through a slot in each rim, the bolthead and a washer clamping the rim against the "frontal" sideplate RH*s*. (See rim R*m* in unit *r*H*u*1, the inner circle *ed* representing not only the circular bore in side plate RH*s* but also an edgewise view of the outer cylinder surface of retainer *r*H*u*1). The circular frontplates open into the hollow interior of the retainers (see circular openings H*o*), whereas the circular backwalls of the retainers are closed entirely. When the retainers are mounted, these backwalls enter into the circular bore holes in the rear side-plate RH*s* and are "flush" with the latter's outer surface as shown in the sideview of FIGURE 21. The cylindrically shaped side wall of each retainer contains two rectangular openings opposite one another whose purpose is to make room for mounting the recording head inside the retainer as explained below. These openings are located in the top and bottom regions of each retainer as shown in the example of the axial view of retainer *r*H*u*1 in FIGURE 20 where the location of the openings is marked by numerals *tp* and *bo*, indicating empty areas along the periphery of the cylinder between parts *slb* and H*lb*. In each of the adjoining units *r*H*u*, these rectangular openings are successively displaced from each other in the direction of the longitudinal axis of the retainers, as seen more clearly in FIGURE 21. FIGURE 21 is a semi-phantom view of the top portion of FIGURE 20 as seen in a plane at right angles to that of FIGURE 20 (viewed in the general direction of arrows *pp—pp* of FIGURE 20 and 12) wherein the three top units *r*H*u* of FIGURE 20 are seen in cross-section against a vertical plane *ee—ee* through their longitudinal axes. In FIGURE 20, the remainder of the cylindrical segment not "occupied" by the window-like openings just referred to, is shown to be filled by portions H*lb* and S*lb* of the retainer cylinder. These bridging portions join the front sections with the back sections of the retainer cylinder and are of reduced thickness as compared with that of the remaining cylinder walls. The right bridging portion S*lb* which faces tape T*p* is crossed by a slot *sl*5 which runs parallel with the plane of the drawing in FIGURE 20. A "side" view of this slot *sl*5 (in the direction of arrow *pp*) can be seen in unit *r*H*u*1 of FIGURE 21 where portion S*lb* is marked out by dashed lines. Bridging portion H*lb* on the left side of unit *r*H*u*1 in FIGURE 20 contains a hole *ho*1 which lies in the same plane parallel with the drawing sheet as the slot in portion S*lb*. This is clearly shown in the sectional view of FIGURE 21 at right angles to this plane where slot *sl*5 and hole *ho*1 appear superposed. The purpose of these slots and holes will be explained below with reference to the detail-drawing of FIGURE 22.

Each retaining unit *r*H*u* is surrounded by a cylindrical shield *sd* which is loosely mounted between the sideplates RH*s* of casing RH and fits closely over the retainer (see shield *sd* in unit *r*H*u*1 of FIGURE 20). These shields *sd* contain a wide gap on the side which faces tape T*p* when shields and retainer are mounted in casing RH as illustrated in FIGURE 20. On the side of the shield opposite the gap, a narrow slot *sl*6 is provided (see unit *r*H*u*1 in FIGURE 20) which facilitates insertion and removal of the retainer unit *r*H*u* into and from casing RH. (i.e., the slot leaves room for passage of clamp screw K*l* of FIGURE 22 which protrudes beyond the outer cylinder surface of the retainer. As will be explained with reference to FIGURE 22, a corresponding notch is also provided in each of the large circular bores *ed* in the "frontal" sideplates RH*s* through which the retainers are inserted and removed.) The length of the slot *sl*6 in each shield *sd* is adapted to the "staggered" position of slot *sl*5 in the bridging portions S*lb* of each unit *r*H*u* as clearly shown in FIGURE 21. The protruding clamp screw K of FIGURE 22 prevents shield *sd* from rotating ("creeping") out of alignment during operation of the tape recorder.

Referring now to the schematic detail drawing of FIGURE 22 which is a sectional view of unit *r*H*u*2 of FIGURE 20 against a horizontal plane *ff—ff* through the longitudinal axis of the retainer as observed from the bottom of casing RH in the general direction of arrows *ll—ll* in FIGURE 12, all parts in the present drawing which have been already described in connection with FIGURES 12, 20 and 21, bear the same numerals assigned to them in the respective drawings. Numeral RH*d* designates the recording head proper which comprises essentially the ring shaped, flat-surfaced armature *r*Ar surrounded by coil R*c*, as well as the necessary wire connections which are omitted from the drawing for the sake of clarity of presentation. Armature ring *r*Ar which is here seen edgewise, contains a fine air gap in the portion G*w* of the ring which is held in slot *sl*5 of retainer *r*H*u*2 when recording head RH*d* is mounted in the cylindrical retainer. The flat outer face of ring armature *r*Ar, across which the just mentioned air gap runs, must be held flush with the cylindrical surface of retainer *r*H*u*2. A spacer *spc* is used between recording head RH*d* and clamp screw K*l*, the latter being inserted through the threaded hole *ho*1 in the retainer opposite slot *sl*5. Recording head RH*d* and spacer *spc* can be conveniently entered into the retainer through the openings in the retainer wall previously referred to. Clampscrew K*l* bears against spacer S*pc*, thus causing the spacer to clamp the recording head firmly against the bridging portion S*lb* and against the slot *sl*5 of the retainer. The dimensions of the coil support (not shown) and armature ring *r*Ar of recording head RH*d* are so proportioned that the air gap-surface of armature *r*Ar, under these conditions, lies within the cylindrical surface of the retainer, allowing tape T*p* to slide smoothly over the region of slot *sl*5.

Dotted line *nch* across the "front" sideplate RH*s* of housing RH indicates the location and approximate extent of a notch in the rim of the circular opening *ed* in plate RH*s* which provides clearance for clamp screw K*l* when retainer *r*H*u*2 is inserted or removed through this opening. Slot *sl*6 in shield *sd* is here shown to lie in the plane of the drawing, extending from plate RH*s* to the far side of clamping screw *kl*.

During operation of the recorder unit, the coated surface of tape T*p* (containing magnetizable material such as ferric oxide) passes over the air gap in armature ring *r*Ar. In bridging this gap, the film coating takes part in building an uninterrupted magnetic flux path through ring *r*Ar. If an electric impulse is sent through coil R*c* (such as during the recording of the path pulses from the linear interpolator referred to in the preceding section), the resulting magnetic flux circulating through ring *r*Ar passes through the minute portion of film coating which, at that instant, bridges the gap in ring *r*Ar. This places a magnetic "charge" onto that very portion of the coating, the charge remaining localized (viz. confined to and retained in the specific small area of coating) for an indefinite amount of time. During playback operation, the process is reversed, the "charge" in the film coating injecting a magnetic flux into ring *r*Ar at the instant of passage of the "sensitized" film portion across the air gap in ring *r*Ar. This momentary flux induces a current impulse in coil R*c* which, when amplified (see box *pla* in FIGURE 2) may be utilized as an actuating pulse for control devices. In the adaptation of the tape recorder and playback unit to the ACN-system herein specified, such pulses are used for airborn sequence control and for star altitude and bubble turret trajectory angle playback functions as will be explained in detail in subsequent sections.

Foil channel head FH of FIGURE 12 is shown in greater detail in the schematic front and side views of this unit of FIGURES 19 and 18, respectively. In FIGURE 19, the foil channel head is viewed in a plane parallel with that of FIGURE 21, such as it appears when mounted on the recording head casing RH and observed in the direction of arrows *pp—pp* of FIGURE 12. (See four bore holes B*lh* in FIGURE 19 for mounting bolts B*IF* of FIGURE 12, only two bolts being visible in the latter drawing. According to the definition previously given with reference to FIGURES 20 and 21, FIGURE 19 is actually a "side" view of unit FH.) The sideview of FIGURE 18 corresponds to an observation of the mounted unit FH against the plane of FIGURE 20 (which has been identified as a "front view" in the text referring to that figure), such as it appears when seen in the direction of arrows *ii—ii* of FIGURE 12.

Four oblong insulating blocks *ib* are adjustably held in frame H*f* by clamping screws K*s* which are threaded through the top and bottom portions of frame H*f*. Each insulating block *ib* serves as a support for one of the four feeler switches previously referred to. Two spring wires 5S*p* constitute a pair of "feelers" of one switch. (Only one pair shown in FIGURE 19.) The top end of each feeler wire 5S*p* is supported in a perforation *pf* in the corresponding insulation block *ib*. The pairs of perforations *pf* in each block are oriented as shown in the drawings. The feeler wire penetrates through the perforation. At the front end of each perforation (viz. the end facing the observer in FIGURE 19), a wire from connecting block *cbl* is soldered to the feeler wire. At the opposite end of the perforations (left side of insulation block *ib* in FIGURE 18), the feeler wires 5S*p* are bent downward, extending below roller R*ob* to points approximately level with the lower rim of a transverse groove $gr1$ cut across each of the two vertical bars of frame $Hf$. Near the horizontal level of the rotational axis of roller $Rob$ (FIGURE 18), feeler wire $5Sp$ is bent outward to the left against the roller surface. Below this level, the spring wire bends inward to a point above groove $gr1$ and thence, the end portion of the wire again points straight down. The side view of FIGURE 18 reveals that the left face of each insulation block $ib$ is partly carved out (see dotted line $ibc$), leaving a clearance space for wires $5Sp$ to enter beyond the straight-line surface level $lv$ of block $ib$. The angle of bent of each spring $5Sp$ near the perforation $pf$ in block $ib$ normally causes the spring to point obliquely downward (viz. outward to the left in FIGURE 18) so as to produce a certain amount of spring tension against roller $Rob$ when the assembly is mounted and wire $5Sp$ is pressed inward into its "operating" position shown in the drawing. Due to the broadside presentation of all parts in FIGURE 18, only one of the total of eight feeler wires $5Sp$ is visible. In FIGURE 19, the two feeler wires $5Sp$ of the first insulating block at the left side of the drawing are sketched into the drawing in order to show the orientation of these feelers in a plane normal to that of FIGURE 18. It is seen that wires $5Sp$ run parallel within the narrow oblong space defined by the width of one single block $ib$. If a short section of conductive material $Fo$ of a width less than that of insulating block $ib$, but wide enough to span the space between wires $5Sp$, is placed across the wires as shown in FIGURE 19, and if a circuit containing a power source is connected across posts $po1$ and $po2$, part $Fo$ closes or actuates this circuit, thus operating as a switch in conjunction with feeler wires $5Sp$ whenever it comes into contact with both wires $Sp$. The stipulation that the conducting part $Fo$ be not as wide as block $ib$ serves to assure that the feeler switch remains isolated from the adjoining switch on the neighboring block $ib$ so that it becomes possible, in the present example of execution of the assembly, to actuate four different circuits independently from each other. Conductive part $Fo$, in actuality, represents the narrow strip of silver foil which is placed on the glossy side $glo$ of film tape $Tp$ (FIGURE 18). In passing over roller $Rob$, this glossy side $glo$ contacts the feeler wires $Sp$. The coating of ferric oxide on the opposite side or face $coa$ of tape $Tp$ remains at all times isolated from any conductive contact with parts which may touch the glossy side of the tape, the material of the tape proper (cellulose acetate) serving as a perfect insulator. Thus, the foil channels on the glossy or uncoated side of tape $Tp$ may be caused to run directly opposite any one of the pulse (path) channels on the coated side of the tape without in the least affecting the latter channels. The narrow strips of silver foil are attached to the tape within the exact lateral confines of the particular foil channel to which they are assigned and at the exact longitudinal locations which specify the particular instants of time in which the foil strips are called upon the actuate the corresponding circuit, such as for example the circuit connected to binding posts $po1$ and $po2$ on block $cbl$. As can be easily seen, contact between the two feeler wires is made only during the brief moment in which foil $Fo$ moves with tape $Tp$ past feeler wires $5Sp$.

The feeler switches (or foil channels) can be made inoperative at will by breaking the contact between wires $5Sp$ and tape $Tp$ on roller $Rob$. This is done by manually shifting rod $rd$ from lower grooves $gr2$ in frame $Hf$, in which the rod is shown in both drawings, to the upper grooves $gr1$ previously mentioned. This rod $rd$ is built in the form of a roller and rests loosely in these supporting grooves. The center portion of the rod between the vertical arms of frame $Hf$ is somewhat larger in diameter than the end portions and fits into the free space carved out from insulating blocks $ib$. This center portion is covered with insulating material, and the ends of the rod extend a short distance beyond the outer fringes of the supporting grooves. Two flat springs $Sp5$ are attached to the bottom of frame $Hf$ by bolts $Blp$ and are bent upward along the grooved side of the vertical arms of frame $Hf$. These spring blades reach beyond the upper grooves $gr1$ (FIGURE 18) and bear against the supported ends of rod $rd$, thus retaining the rod either in the lower or in the upper open grooves. If the protruding ends of rod $rd$ are manually shifted outward and upward from lower grooves $gr2$ against the pressure of springs $Sp5$ and released as soon as they slide into the upper grooves $gr1$, pressure of the insulated center portion of rod $rd$ against the ends of feeler-wires $5Sp$ which reach to the bottom of grooves $gr1$ and stand in the way of the rod, will bend the curved section of wires $5Sp$ away from roller $Rob$, thus breaking the contact with tape $Tp$ normally sustained by these feeler wires. Hence, if rod $rd$ is left in the upper grooves, the feeler switches are inoperative irrespective of the presence of foil strips $Fo$ on tape $Tp$; if the rod is left in the lower grooves, the switches become "potentially" operative, i.e., they will actuate their respective circuits whenever a silver foil strip on tape $Tp$ momentarily bridges the contact faces of the feeler wires which bear against the tape on roller $Rob$.

In accordance with the present method of operation of the automatic sextant, the following channel distribution has been adopted for use of the tape recorder and playback unit in conjunction with the various pertinent component units of the automatic sextant:

PATH OR PULSE CHANNELS

Channel I: Altitude angle generator pulses, primestar
Channel II: Altitude angle generator pulses, second star
Channel III: Bubble turret trajectory pulses
Channel IV: Sequence switch pulses
Channel V: Spare channel

FOIL CHANNELS

Channel I: "Start" and "stop" function
Channel II: Sign change for pulse channel I
Channel III: Sign change for pulse channel II
Channel IV: Spare channel For pertinent details on recording procedures see the next following Section $e$.

*Section (e)—System Synchronization (Including Electronic Precision Clock)*

All airborne functions of the ACN system which will be described in detail in subsequent sections are time-controlled to within extremely close limits of accuracy by a crystal oscillator, here referred to as the secondary frequency standard. This oscillator maintains an average accuracy of one part in ten millions and is preferably housed together with the playback unit in a single temperature controlled housing. (See broken-line box SFF, enclosing boxes SFS and $Fd$ in FIGURE 2.) The crystal oscillator frequency of 102.4 kc. is divided by binary means and formed into suitable pulse circuits and power frequencies in an output unit (contained in box SFS of FIGURE 2) from which the playback unit and other airborne equipment are synchronously supplied. (For the sake of simplicity, the output unit is not shown as a separate unit in FIGURE 2. The crystal oscillator and the output unit do not require further description.)

Since the time-wise trajectory program which is stored on the magnetized tape must yield its successive control data at the exact specified moments of standard (or civil) time during which the various phases of the ACN flight are to take place, it is necessary to devise a method of accurately "locking" the starting instant of the playback period into synchronization with the specified starting instant of standard time and to maintain a playback speed which makes certain that the pre-calculated time table successively unfolds itself at the exact specified instants of standard time.

In order to accomplish satisfactory synchronization of the "absolute" playback-time (="time stored on the film") with official standard time during the programmed automatic flight, one of two procedures may advantageously be adopted. The more accurate method will be described in detail below. It calls for a playback-start prior to take-off, initiated by a Precision Electronic Clock which, in turn, has previously been started by the Primary Frequency Standard Station WWV, Bureau of Standards, Washington, D.C., via a radio link. This procedure will be explained in connection with FIGURE 23. In a second method of synchronization which is less accurate but has been found satisfactory in certain types of automatic flight of a vehicle manned by observers, a precision stop watch may be started in synchronization with a signal from Station WWV prior to take-off. At an appropriate instant during pre-celestial flight which has previously been selected, this stop watch is used to start the playback run. In this latter method, the length of tape used up idly during the initial playback period prior to the first control (sequence) signal can be shortened considerably.

At this point, it is important to recognize the necessity of proper coordination of synchronizing procedures during recording and playback functions. All recording functions are controlled by a 51.2 kc. "master" oscillator which serves as the timing source for the pulse sequences generated in the "Digital Electronic Linear Interpolator" of Division IV, Section c. Reference to this oscillator has already been made in FIGURES 9 and 11. The tape recorder which takes these pulse trains into storage, operates from a 400 cycle power supply which is derived from the same 51.2 kc. oscillator. (See line $Fs$ in FIGURE 1 and line $l_2$ in FIGURE 11.) A 100 cycle pulse supply from the identical frequency source (line $l_3$ in FIGURE 11) drives the electronic clock referred to above which, in turn, is used in stop-watch fashion to control the timing of the various sequence pulses which are to be recorded on the tape as the "go" signals for the scheduled function elements of each channel. In one preferred manual form, the sequence pulses are recorded on the tape with the help of a hand-pulser which is actuated whenever the indicating lights on the electronic clock-panel marks the specified time. (See text below; time-readings via indicator lights are accurate to within one tenth of a second.) The sequence pulses may also be recorded automatically with the help of IBM-facilities.

As stated at the beginning of the preceding section, the playback run is started by a strip of silver foil which is attached onto a foil channel (on the glossy side of the tape) especially assigned for this task. (Start-Stop Foil Channel I; for details on playback starting procedure see text below.) This same starting foil serves also to mark the initiation of the recording period on the tape and thereby fixes the point on the tape which identifies the "absolute" zero time for the playback schedule. After the recording period is started, the above cited stop-watch method of synchronization with the absolute time indicated by the electronic clock (hand-pulser-method) determines how many seconds, minutes and hours after "absolute" zero-time the sequence switch pulses, sign change pulses etc. are to appear on the recording tape. This sequence pulse recording is done in exact accordance with the pre-computed "absolute" time schedule. Obviously, the identity of this "absolute" time schedule, and with it the identity of the various pulse rates from the slope interpolator, is preserved only if the angular rate of tape travel to be employed during the recording process is exactly specified along with all the trajectory data since the physical spacing of the individual sequence pulses on the tape as well as the spacing between the individual recorded function pulses of a given pulse rate which are both intended to identify unique values of time, are dependent not only on the original time separation of the sequence pulses (i.e., on the absolute time values of the electric clock) or on the function pulse rate of the pulse rate-generator, respectively, but also on the rotary speed of the recording unit-drive motor. Strictly speaking, the identical 400 cycle power source which is used to drive the recording motor, should also be employed during playback operation, i.e., it should be derived from the same 51.2 kc. oscillator for playback synchronization. However, since airborne synchronization of the playback speed, in actuality, is carried out under control of the secondary frequency standard whose accuracy is superior to that of the ground borne 51.2 kc. master oscillator, it follows that the original time intelligence which remains "frozen" on the magnetic tape in the form of unique pulse spacings, is actually and necessarily improved in accuracy during the reproducing process provided, of course, that no significant errors are permitted to enter the system during the playback process. If the airborne synchronization control system can thus be relied upon to provide an extremely precise timing base for the playback functions, a valuable practical advantage is also gained in as much as the demands on the timing accuracy of the slope interpolator (see Division IV, Section c) do not have to be critical.

The high precision level of this airborne timing control is fully brought into play only if assurance can be given that the specified trajectory data are actually delivered at the pre-calculated time and that, last but not least, the craft is so steered during pre-celestial flight that it actually arrives at the departure point "on time." It can easily be seen that under adverse conditions, the effects of timing inaccuracies can be cumulative and thus contribute in greater measure to the total error which results from a combination of these timing errors with a number of possible errors from other sources. The present system is so designed as to eliminate or minimize all predictable errors.

In the following, the operating principles of an Electronic Intervalometer suitable for use as a precision clock in this type of timing control will first be briefly described. Reference will be made to FIGURE 23 in which essential portions of this electronic clock are shown in conjunction with a block diagram which illustrates the connections to be established between parts of the electronic clock and the secondary frequency standary, playback unit, station WWV etc. for the purpose of playback synchronization. Full details of the electronic clock or intervalometer are given in the reference cited under number 2 of the list of references submitted at the end of Division I. A step-by-step description of a preferred synchronization procedure will thereafter be presented with reference to the above-cited drawing of FIGURE 23 which applies to synchronization of the playback run with standard time. During recording, the electronic clock is used in an analogous manner, the 51.2 kc. "master" oscillator of the slope interpolator of FIGURES 9 and 11 being substituted for the secondary frequency standard and major emphasis being placed on synchronization of the starting instant of the recording run with the "absolute" zero-time of the flight schedule identified by the instant in which the electronic clock is caused to begin counting absolute time in seconds, minutes and hours. This starting instant of the clock-run is synchronized with the passage of the before mentioned starting foil on the recording tape across the feeler-switch in the foil channel head by causing the momentary closing of the feeler switch to trip the clock into operation. (For this starting procedure, the tape is so mounted that the previously applied starting foil reaches the foil channel head a short time after the recording unit is switched "on.")

Obviously, the recording on the tape of any sequence pulse which is intended to initiate or stop the delivery of function pulses to a given angle setting device during playback, must be synchronous with the recording on the tape of the corresponding function pulses. Since the delivery of function pulses from the slope interpolator or pulse rate generator is continuous once it is started, and since the electronic clock and the interpolator are synchronously controlled by the same master oscillator, all sequence pulses, when "matched" to the computed time schedule via the electronic clock by the previously mentioned hand-pulser method (or by automatic IBM facilities not to be described herein), must necessarily be coincident with the pertinent function pulses from the pulse rate generator.

In this recording synchronization system, it is also imperative that the IBM card reader CR of FIGURE 1 establish the settings of the alternate switch banks $SwB_1$ and $SwB_2$ of FIGURE 9 during the correct time intervals which precede the interpolation intervals for which the particular switch bank settings are scheduled. Assurance must be given that issuance of the function pulses from the pulse rate generator for the first slope interval be coincident with the scheduled initiation of the ACN-flight. In the synchronization procedures herein recommended, the pulse rate generator is "tripped" into operation simultaneously with the electronic clock by the starting foil referred to above, but only the "B" counter is caused to become operative. The two switch banks of the "A" counter are already pre-set to the pulse rate settings of the first two interpolation intervals, but the "A" counter proper does not start counting-out pulses until "tripped" at the instant specified for the start of ACN-flight. Thus, zero slope condition will prevail prior to this specified instant (zero pulse-output being equivalent to an infinite time increment per altitude increment). By switching means which will not be separately described, actuation of the "B" counter and of the alternate switch banks of the "A" counter is so controlled that immediately prior to the specified instant in which the "A" counter begins counting out its first pulse rate, the B counter "gates" the correct switch bank into the circuit so that the "A" counter is compelled to operate from the base-number setting which actually applies to the first slope interval. Automatic actuation of the switch bank settings through the IBM card reader is initiated at the instant of B counter switchover to the second switch bank (second interpolation interval). At this moment, the IBM card reader advances the third card from the correctly sequenced stack of punched cards (referred to in Division IV, Section c) for re-setting of the now inoperative first switch bank to the pulse rate which is to be applied for the third interpolation interval. Thereafter, the card reader is automatically switched to the next following punched card in virtual synchronism with the slope change pulses from the "B" counter.

The intervalometer shown schematically in FIGURE 23 within the space outlined by the broken line EC is essentially a combination of frequency dividing circuits which are capable of counting incoming pulses of a given frequency and of registering the total sum of the received pulses in terms of conventional time units. Specifically, if the clock is supplied with 100 pulses per second, it has a capacity of 24 hours and indicates by means of pilot lights its content of any fraction of this total amount in terms of hours, minutes, seconds, 10ths and 100ths of a second. An important feature of this clock is that it can be pre-set to any value of "absolute" time within its capacity and thereafter be caused to "run" for the duration of this preset value of time, or that it can be rapidly "filled" to a pre-set time-content and thence caused to "run" on absolute time. The clock also furnishes accurate measurement of time intervals between pulses of an unknown rate, or can be used for the transmission of a pulse at a previously determined time.

For illustrative purposes, each of the boxes Ba, Bb, Bc, Bd, Be, Bf, Bg and Bh in FIGURE 23 which represent individual counter units, is divided into three sections, section B10 containing the counting circuits, section B20 the indicating lamp matrix and wafer switch, and section B30 the mixing stage. (Box Ba differs from this arrangement, as will be explained below.) Within the enlarged dotted box Bh on the right side of the drawing, the structure of these sections is shown in somewhat greater detail. Each counter in section B10 contains a combination of so-called flip-flop stages which function either as radix-ten-counters, as in the case of boxes Bh, Bg, Bf and Bd, or as radix six counters as in the case of boxes Be and Bc, or as a radix twelve counter as in the case of box Bb. The counter B10 in box Ba is a single flip-flop stage which operates in ordinary binary fashion. (The method of combining flip-flop stages into counters of different radices as well as the operating principles involved are described in detail in reference number 3 listed at the end of Division I.) In the counter of section B10 of box Bh, a cascade arrangement is shown in which the connections between the flip-flop stages $5k$ and $5m$ identify a tertiary counting circuit, modified to the extent that the plate-output from the carry tube "y" of stage $5k$ is connected to the grid junction $5n$ of an intermediate flip-flop stage 5 whose plate output from carry tube "y" is fed to the grid of carry tube "y" of flip-flop stage $5m$. This combination of stages $5k$, $5l$ and $5m$ constitutes a radix five counter which is preceded by a binary stage $5i$ whereby an overall decade counting circuit is obtained. Therefore, after each 10ths input pulse from line $5d$ which carries the 100 cycle-pulse supply to the counter sequence, viz. after each 10th part of a second, one output pulse is carried over line $5c1$ to the following counter in section B10 of box Bg. This latter counter as well as the next following counter of box Bf are identical in structure with the one of box Bh just described. The carry pulse from box Bg to box Bf, hence, occurs once every second, and that from box Bf to box Be once every ten seconds. These first three radix-ten-counters are followed by a radix six counter in box Be which is composed of a tertiary stage (=two flip-flops combined to produce one output pulse for each third input pulse) preceded by a single binary flip-flop. From this counter, therefore, a carry pulse emanates once every minute. In similar fashion, the pulses are carried through the remaining counters, box Bd containing another radix-ten counter or-scaler which issues a pulse every 10 minutes; box Bd containing another radix-6 counter with an output pulse every hour, and box Bc containing a radix-twelve counter (i.e., a radix-six counter preceded by a single binary stage) from which a pulse emerges every 12 hours. An ordinary binary stage is added in section B10 of the last box Ba which is triggered from one state of equilibrium to the other by the 12 hour-pulse from the preceding counter. One of these two possible stable conditions can be identified to represent "a.m." and the other to represent "p.m.," thereby affording an extension of the clock's capacity over 24 hours.

Returning to further details drawn into box Bh of FIGURE 23, it will next be shown briefly how the exact instantaneous content of each counting stage is made known by means of indicating lamps, and how the clock can be set to fill to a predetermined amount of hours, minutes and seconds down to an accuracy of 1/100 second and to deliver a single output pulse at the end of this pre-set span of time.

Each counter shows a unique pattern of plate voltages for each number through which it counts in its cyclic operation. In the example of the radix ten counter of box Bh, all non-carry-tubes, marked "x," are non-conducting and all carry tubes, marked "y," are conducting when the counter is in "zero" condition. The plate voltage of each "x" tube, therefore, is high and that of each "y" tube is low. If from the matrix of wires shown in the upper part of section B20, the line marked "even" is singled out which emanates from the "y" tube plate of flip-flop $5i$ and connects to the "even" segments of portion $5v$ of the wafer-switch S5 shown schematically in the lower part of section B20, it can be seen that in the zero-condition of counter B$h$, all contacts made to this "even" line are at a low potential. At the other hand, all connections made to "matrix" line 0—1 which joins the "$x$" plate of flip-flop 5$k$ with segment 0—1 of the right portion 5$w$ of wafer switch S5, must be at a high potential under the same "zero" condition of counter B$h$. A neon light inserted across these two lines "even" and "0—1" (=neon light marked with numeral "0") will show a distinct discharge glow at the bottom electrode in the drawing if, and only if, the B$h$ counter is in zero condition. The additional neon lights, marked in the drawing with numerals 1 to 9 are similarly connected between the "even" or "odd" matrix line from flip-flop 5$i$ and one of the matrix lines designated with numerals 0—1, 2—3, 4—5, 6—7 and 8—9 emanating from the "$x$" and "$y$" plates of flip-flops 5$k$, 5$l$ and 5$m$. The corresponding electrodes of all these neon bulbs will all remain dark under "zero" condition. By mounting the neon lights in the front panel of the electronic clock in such a position that only those tube ends are visible which are connected to the "even" and "odd" lines from flip-flop 5$i$, a distinct discharge light will be observed only on one single bulb at the time.

As the counter begins to respond to incoming pulses, each successive pulse will change the pattern of plate voltages in a characteristic fashion and establish the condition of voltage differential at each successive neon tube which causes the particular tube to light-up at the front panel of the clock when the counter has reached the particular digit to which the illuminated bulb corresponds.

In an analogous manner, the wafer switch S5 establishes the characteristic condition of coincidence in the mixer stage of section B30 necessary for the generation of a negative output signal if, and only if, the counter has reached the digit to which wafer switch S5 has been set. Such a condition can be traced by selecting, for example, the previously cited zero status of the radix-ten counter of box B$h$ in which the "even" contact points of wafer 5$v$ are momentarily held at a low voltage level while the contacts 0—1 of wafer 5$w$ at the same instant remain at a high potential. If switch S5 is set to zero and the counter B$h$ cycles through its zero-content, the ganged switch arms SA1 and SA2 connect a low voltage to the control grid $cgc$ of cathode follower $cf$ and a high voltage to the control grid $cgo$ of output triode OT, respectively. The normally conducting cathode follower $cf$ will, therefore, be cut off and thus lower the cathode potential of triode OT, placing this latter tube (which is normally inoperative) near the conduction point. The coincident voltage surge at the control grid $cgo$ of triode OT drives this latter tube to sudden conduction, causing a negative output signal to be generated in its plate circuit. This output signal is fed into line 5$d$1.

The lay-out of sections B20 and B30 in boxes B$g$, B$f$, B$e$, B$d$, B$c$ and B$b$ varies only in details from that just described for sections B20 and B30 of box B$h$ when a radix-6 counter or a radix-12 counter is involved instead of a radix-10 counter. In principle, these successive portions of the electronic clock operate in the same manner as the combination of circuits of box B$h$. For the sake of simplicity, the indicator lamp matrix and wafer switch-components of these counters are represented in the form of switches whose number of contacts in each box indicate the number of neon bulbs apportioned to the respective counter and, at the same time, also the number of wafer switch contacts to which the respective counter can be pre-set. In the drawing, a switch-setting is suggested which corresponds to an absolute time value of 4 hours plus 40 minutes plus 9 minutes plus 20 seconds plus zero seconds plus $7/10$ seconds plus $3/100$ second= $4^h49^m20.73^s$. If the switch of box B$a$ were set to p.m., 12 hours would be added to this total amount. If the same switch setting of FIGURE 23 is assumed to designate the instantaneous illumination of the neon light banks, the momentary content of the clock can be visually identified as amounting to $4^h49^m20.7^s$, the "filling up" of the 21st second being predictable from the rapid progress of bulb illumination in the $1/10$ second counter of box B$g$.

For the purpose of better analysis, let the operation of the clock be observed in slow motion after it has counted from an over-all zero condition of all counters to the total pre-set value shown in FIGURE 23 down to the last $1/100$ second which the decade-counter of box B$h$ is about to "count out." It follows from the beforesaid that since all the higher counters are filled up to their settings, a negative square voltage—viz. a low voltage level—must be present in all output lines 5$d$2 through 5$d$7. In output line 5$d$1, this voltage is still high since the necessary coincidence condition for a negative output signal has not yet been established in the mixer stage B30 of box B$h$. In the case of the binary counter in box B$a$, the prerequisite for a low output voltage in line 5$d$8 is simply that a low voltage be present at the contact to which the two-position switch 5SW of section B20 is set. The voltages at the two contact points are derived directly from the "$x$" and "$y$" plates of the flip-flop which constitutes section B10. Section B20, therefore, merely consists of the two position switch 5SW and no mixer stage B30 is needed. If this binary flipflop is in the conventional zero-condition in which the "$y$" tube is conducting, the voltage at the "$y$" plate is low. As long as the flip-flop receives no trigger pulse from the preceding hour-counter B$b$ after the clock has been started from an overall zero condition, the voltage output in line 5$d$8 remains low if the switch is turned to the "$y$" contact. Since in the above cited example of clock-setting the hour counter B$b$ is set to 4 and far from being ready to deliver a carry pulse to box B$a$ (its total capacity being 12 hours) all output lines 5$d$1 through 5$d$8 will therefore carry a negative voltage as soon as the counter of box B$h$ has counted out its last $1/100$ second. The clock must count 12 hours before a carry pulse can appear in the output from the hour counter B$b$. Hence, switch 5SW of counter B$a$ can be conveniently set to contact "$x$" whenever more than 12 hours are to be counted by the clock. The voltage at the "$x$" contact is low during the second half of a 24 hour period. Therefore, if the clock is synchronized with standard time (see below), instead of counting "absolute" time, the "$y$" contact or the neon bulb associated with the "$y$" plate (see below) may be designated with "a.m." and the "$x$" contact with "p.m." Like all other counters, this binary flip-flop of box B$a$ is furnished with indicator lights which, in this case, merely show whether the flipflop is in "zero" condition or not. (An "$x$" bulb and a "$y$" bulb are connected across the respective "$x$" and "$y$" tube plate load resistors and properly disposed on the panel of the clock so that only the one electrode of each bulb is visible which flashes up when the corresponding tube conducts.)

For the present example or pre-setting below the 12 hours' capacity of counter B$b$, switch 5SW is set to the "$y$" contact as stated, thereby holding line 5$d$8 at a low voltage level so that a unique condition of simultaneous low voltages on all output lines 5$d$1 through 5$d$8 is created as soon as the radix ten counter of box B$h$ reaches the preset number "three." The master mixer $mm$ which is the common recipient of all output pulses from the preceding individual mixing stages, will emit an output pulse in line 5$op$ only if low signal voltages are present on all supply lines from the counters, these supply lines providing a coincident bias on the grids of eight triodes not shown in the drawing. If all tubes are cut off, a positive square voltage from the plate-end of a common plate load resistor provides an input signal to an inverter and cathode follower (not shown) contained in box IC from which the ultimate output pulse of the clock is secured, indicating that the time value of the clock's wafer-switch setting has been attained. As will be shown presently, this pulse can be utilized to stop the clock's operation at the instant the latter has reached its pre-set "absolute" time value.

The procedure of synchronization of the playback run with standard time through the intermediary of the electronic clock will now be briefly explained by further reference to FIGURE 23. Boxes *ig, gc* and *rm* inside the space enclosed by broken line EC represent an input gate, a gate control flip-flop and a re-set multivibrator, respectively, all three parts constituting auxiliary control units of the electronic clock. The gate control flip-flop *gc* operates as an "off" and "on" switch for input gate *ig*, the latter being provided with an indicator light (not shown in the drawing) which stays illuminated when the gate is "open" (viz. when gate-control *gc* is in "on" or "start" position). The control flip-flop *gc* can be switched "on" and "off" manually (switches not shown) or by external pulses as indicated in the drawing. (See "start" and "stop" lines STA and STO.) Start line STA contains a push button switch PPS which must be pressed down to connect the "start" line to the gate control *gc*. Input pulses from lines F*r*S and FM to gate *ig* are inoperative as long as gate control *gc* remains in "off" position (=input gate *ig* "closed"). Multivibrator *rm* serves for rapid re-setting of the clock. Its operating frequency is relatively high, such as 4.5 kc. The multivibrator can be set either to a "fast" position in which its output pulses are fed over line 5*f* directly into the third counter (="seconds"-counter B*f*), or to a "slow" position in which the pulses are channeled into line FM and follow the regular input path through gate *ig* to the 1/100 second"-counter B*h*. During all other clock operations, the multivibrator remains in "off" position.

Assume now that the playback unit of FIGURE 12 is scheduled to be started at $16^h12^m0^s$ PST (PST=Pacific Standard Time) and that at any convenient prior time, the electronic clock is to be started so that it can be synchronized with Station WWV from Washington, D.C., say at $16^h0^m0^s$ PST. As a first step, the clock must be "filled" to the desired time-content. To this end, all wafer switches and the a.m.-p.m. switch are first pre-set to read as follows:

/p.m./$4^h$/0×$10^m$/$0^m$/0×$10^s$/$0^s$/0×$0.1^s$/2×$0.01^s$ (The 2/100 seconds are added in the first counter B*h* to allow for an assumed radio-link-delay of 0.02 second.) For a quick resetting, the clock is first driven at the fast rate of multivibrator *rm* by putting switch MS into the "fast" position. At this rapid pulse rate, the clock fills up in a very short time (in a matter of seconds). Therefore, an external jumper (not shown) is previously inserted between output jack AJ and stop jack SJ, and as soon as the pilot lamps of the higher order counters indicate their approach to the content of the wafer switch setting, the multivibrator *rm* is switched to "slow," and the gate *ig* is opened by setting gate control *gc* manually to the "on" position. The multivibrator pulses now continue to fill the clock through the 1/100 second counter B*h*, and when the exact content of the wafer switch settings is reached, an output pulse appears at jack AJ which acts to stop the clock at the very instant of "fill up" due to the temporary jumper connection to stop jack SJ which causes the output pulse from the clock to trigger gate control *gc* into "off" position and thus to close gate *ig*. The clock is now ready for synchronization with official standard time. Obviously, the resetting procedure must be carried out sufficiently ahead of the actual instant of synchronization to allow for the final preparatory steps.

The 100 cycle pulse from the output unit *ou* of secondary frequency standard SFS is next connected to input jack JK of gate *ig*, and re-set switch MS is turned "off." The 100 cycle pulse does not start the clock until gate *ig* is re-opened. This latter function is carried out by a time-pulse from Station WWV. The WWV time pulses are emitted once every second except for the 59th second in each minute during while the pulse is suppressed. The time space occupied by the last second in each minute is therefore identified through an interval of silence. By listening to the voice announcement of the time from Station WWV, the minute immediately preceding the selected synchronization time, in the present case the 59th minute after $18^h$ (Eastern Standard Time or EST of Station WWV being 3 hours ahead of PST), is determined, and since the clock is to be started at exactly $16^h/0^m/0^s$/PST, push-button PPS is depressed at the instant of WWV-signal absence at $18^h59^m59^s$ EST which insures that the next following pulse at $19^h0^m0^s$ EST triggers gate control *gc* "on," thereby opening gate *ig*. (For this action, the WWV-time pulses which are made up to a train of five 1000 cycle sinewaves, are formed into five sharp pulses in a pulse shaping amplifier PSA annexed to the WWV signal receiver 5R*v* and fed via line STA to "start" jack STJ. The first 100 cycle pulse from line F*r*S which enters gate *ig* after it has been opened at $16^h0^m0^s$ PST, starts the clock, and thence, this very accurate 100 cycle supply from the secondary frequency standard SFS continues to drive the clock, causing it to add precise time units to its pre-set PST content and thereby to run in synchronism with official (Pacific) Standard Time.

For playback synchronization, reel RL1 of FIGURE 23 (compare with actual reel RL1 in FIGURE 12; forward rotation *fwa* is assumed for playback functions) is rotated into a position in which the starting foil F*os*, which marks the beginning of the specified playback time-schedule on tape T*p*, rests at a reference location whose distance "ahead" from the associated feeler switch in the foil channel head FH (see actual parts in FIGURES 18 and 19) is known in terms of seconds of tape travel. Assume 7 seconds are required for this travel period. Therefore, when the clock reaches $16^h11^m53^s$ (watching pilot lights), the play-back is started from this pre-adjusted reel-position. As soon as the starting foil reaches the feeler switch of foil head FH, a relay, represented in the drawing by battery B*y*, line *ly*, the feeler switch contacts in FH and line STO, acts to stop the clock (line STO being connected to stop jack SJ in lieu of the jumper previously used for stopping the clock). The pilot lamps of the electronic clock will show the exact time at which the playback has been started. Discrepancies between this indicated clock time (i.e., between the playback start initiated through the medium of the electronic clock) and the pre-specified starting time of the playback run can be corrected by rotating knob 5K*n* of rotary transformer RTR (both these parts here represented symbolically by a shaft handle and associated motor, respectively). This rotary transformer acts as a continuous phase shifter which permits addition or subtraction of single cycles per rotation to and from the 400 cycle supply from secondary frequency standard SFS to synchronous motor SM of the playback unit. This results in a change in travel speed of tape T*p* amounting to a 0.01 second advance or retardation of the travel time per four knob revolutions in the proper direction. Rotary transformer RTR is actually contained in one of the airborne playback amplifier racks not separately shown in this specification.

Numeral RH*d* in FIGURE 23 designates three of the five recording heads of recorder unit F*d* described in Division IV, Section *d*. These parts are here drawn in a form so as to symbolize their playback function as pick-off heads for transfer of function- and sequence-pulses from tape T*p* to the various control units of the automatic sextant.

DIVISION V—DETAILED FUNCTIONAL DESCRIPTION OF NIGHTTIME AUTOMATIC SEXTANT

In the ensuing detailed description of the essential component units of the nighttime automatic sextant, reference will be made to the composite drawings of FIGURES 24 and 25 whenever it is necessary either to determine the general location or function of a component unit or to verify the definition of certain operational axes of the sextant given in connection with these drawings. FIGURE 25 is a simplified schematic "mock-up" of FIGURE 24 in which major components of the sextant are portrayed in the same perspective as in FIGURE 24 but "idealized" to the extent of stressing their functional properties rather than their true physical appearance. Various accessory units have been added to this drawing whose overall operational purposes can be clearly recognized in this simplified presentation. These units and their functions will be described in due course by reference to the respective detailed drawings which follow in subsequent sections. All parts shown in FIGURE 24 which have already been described in the general introduction of Division III bear the same numerals in FIGURE 25. The various rotational axes of the gimbal system, telescopes etc. shown in FIGURE 25 will here be defined as follows:

Axis X1 is the rotational axis of the platform assembly within gimbal ring GR, also defined as the gimbal axis X1. (In FIGURE 25, platform Pl is represented as a square-shaped plate Pl carrying bubble turret BT, the latter also represented as a square plate, and telescopes T1, T2, T3 and T4. In actuality, platform Pl must be visualized as a plane near the level of the top surface of frame Plf of FIGURE 24 within which (level) the bubble units Bl are located. A plane parallel with this platform-plane Pl is physically represented by the supporting plate of the bubble turret assembly which is rigidly mounted inside frame Plf below the top-level of this frame. (The optical axes Ox of the telescopes are held in a fixed position normal to this supporting plate and therefore also normal to the platform plane Pl.) Telescopes T1 and T3 are mounted upon this axis X1.

Axis X2 is the rotational axis of gimbal ring GR within yoke Y, also defined as the yoke-axis X2. Telescopes T2 and T4 are mounted upon this axis.

Axis X3 is the rotational axis of yoke Y about its azimuth pivot Pv and therefore virtually also the azimuth rotation axis of platform Pl relative to the supporting craft and the azimuth rotation axis of bubble turret BT relative to the platform Pl. (This definition for axis X3 disregards the tilt produced in the platform and bubble turret rotational axes against the yoke-pivotal axis when the platform is rotated about yoke axis X2 or gimbal axis X1 away from its position of equilibrium. These deviation axes will nevertheless be classified as X3 axes.)

Axes X4 ($=X4_1$, $X4_2$, $X4_3$ and $X4_4$) are the azimuth rotation axes of the telescopes relative to platform Pl coincident with the optical axes Ox. Telescopes T2 and T4 have been arbitrarily determined to remain in fixed azimuth relationship to platform Pl during star tracking operations, whereas telescopes T1 and T3 are rotated about their azimuth axes X4 relative to the platform during these same tracking operations.

The horizontal axis of rotation Pra of each prism Pr is the elevation or altitude axis of the prism. Any prism elevation-or altitude angle resulting from rotation of the prism about this axis is measured against the plane of platform Pl. If such a prism elevation angle is to represent a given elevation or altitude angle of a star, the plane or platform Pl must coincide with the same special plane against which the star altitude angle is measured (i.e., it must coincide with the specified dynamic horizontal plane according to the definition given in Division I). The actual prism elevation angle relative to a star (i.e., the spacial elevation angle of the prism's or telescope's "line of sight") therefore depends on both, the position of platform Pl relative to space and the elevation angle-setting of prism Pr relative to platform Pl.

Before proceeding to the detailed analysis of the nighttime automatic sextant, the following features shown in the composite drawing of FIGURE 24 to which no reference has been made in the previous general description of the sextant (see Division III) and to which essentially no further reference will be made in the subsequent sections, will here be briefly described:

*Platform assembly.*—The quadrangular frame Plf carries on each of its four sidewalls a bracket Brt in which the respective telescope assembly is supported. Trunnions (not visible) projecting from the two opposite brackets Brt of telescopes T1 and T3 support the entire platform assembly in gimbal ring GR. Counterbalance cB is suspended from frame Plf on three bars bc (only two visible). If desired, the platform assembly may be "caged" to yoke Y by caging pin Cp which is mounted on the side of balance weight cB, the latter extending downward to the proximity of the upper horizontal surface of the yoke-base. From each corner of frame Plf (lower portion) extends (horizontally) a junction plate jp to which various electrical connections are made. (Only one plate jp is visible in the drawing. Wire connections are omitted.) The four brackets Br extending upward from frame Plf and carrying secondary observation window Obs at their upper extreme ends, support a partly perforated plate fp (portions of which are broken away in the drawing), mounted underneath window Obs. This plate serves essentially for balancing purposes. Torque motors tml between gimbal ring GR and brackets Brt of telescopes T1 and T3 serve to rotate the platform assembly about axis X1. In turn, gimbal ring GR, and with it the platform assembly, are rotated about axis X2 by torque motors tm2.

*Pivot.*—A circular plate cpL whose center portion extends downward into a sleeve sl which surrounds pivotal shafts Ps and carries slipring assembly SR on its outer surface, is rigidly attached to yoke Y as shown. Ring gear Ri, mounted on the lower rim of circular plate cpL, is engaged by gear dg (actually by a pinion), driven from yoke azimuth drive motor Ym which is supported in the structure of pivotal support Pv (=part of housing H). Pivot shaft Ps with sleeve sl and assembly SR rotate in bearings bP about this pivotal support Pv. Power transfer to the rotating sliprings is carried out by a set of two very thin strips of flat sheet-stock per slipring. These strips (not shown) are preferably made of beryllium copper, each strip carrying a contact pin of platinum-iridium. (See FIGURE 58.) The sliprings preferably consist of rhodium-plated brass. The contact strips are mounted on both sides of transfer plates Pw (only two plates shown) which enter into the free space between the slipring mounts and are supported in the pivotal structure Pv. The stator Smst of selsyn motor Sm of FIGURE 25 whose function will be described in Division V, Section h, can be seen to be attached to a fixture of the pivotal support Pv (below the lower extreme end of sleeve sl), whereas the rotor Smr of this same selsyn Sm is attached to pivotal shaft Ps of yoke Y. Gear mg, attached to shaft Ps near its lower end, engages a gear mounted on the rotor shaft of selsyn monitor mS, described in Division V, Section i, 1B.

The manner in which wire connections are carried from yoke Y to gimbal ring GR (and vice versa) as well as from gimbal ring GR to the platform assembly (and vice versa) is described in detail in reference No. 4 listed at the end of Division I. (See flexible "pigtail" connections, portions of which are shown at Pg1 and Pg2 in FIGURE 24.) All power supply and signal currents enter or leave the automatic sextant through the bottom of the pivotal support. The entire wiring as well as the temperature control system are omitted from the drawing.

Section (a)—Altitude Angle Generator

One of the four precision altitude angle generator assemblies of the automatic sextant referred to in the introductory text of Division III (see parts Pr1 and Dr1 in FIGURE 24 on top of telescope T1) is shown schematically in FIGURE 26 in a preferred form of execution. The principles underlying the operation of this angle setting device are essentially as described in the reference listed under No. 5 at the end of Division I of this specification. In addition to the description of component parts accompanying FIGURE 26, a brief summary of the functional properties of this apparatus will be given with reference to FIGURES 27, 28, 29 and 30.

FIGURE 26 is a schematic perspective side view of one of the altitude angle generators as it appears on top of each of the four telescopes T1 to T4 shown in FIGURE 24 or 25. Housing or bracket 2H which is mounted on top of telescope barrel T$b$ by flange F$l$ (see FIGURE 31 of one single telescope assembly minus the altitude angle generator of FIGURE 26), essentially supports the following units of the angle generator:

(a) A drive motor M$o$ with the associated gear assembly g$rm$ which rotates lead screw LS, jack screw $j$S and cam screw $c$S about their respective axes L$a$, $ja$ and $ca$, the screw shafts being journalled in the left forward portion of bracket 2H as shown in the drawing;

(b) A prism shaft Pr$s$ (axis Pr$a$) which carries dove prism Pr in support $sp$ in which the prism is held firmly by clamps $cl$.

(c) A split eccentric bushing B$u$ over the forward end of shaft Pr$s$ which carries sine bar SB whose hub fits like a vise over bushing B$u$. Both these latter parts (viz. hub and bushing) are held on shaft Pr$s$ by bolt B$lt$.

The portion of sine bar SB which extends to the left of the diagram (only partly visible in FIGURE 26) carries a steel ball in its extreme left end (numeral $sb$ in FIGURE 29) which rests on plate LP$l$, the latter attached to mount N$u$1 of travel nut N$u$. Travel nut N$u$ is provided with an internal thread which fits over the external thread on lead screw LS. Mount N$u$1 is firmly attached to nut N$u$. Upon rotation of lead screw LS, nut N$u$ and plate LP$l$ are caused to ascend or descend along the lead screw (depending on the sense of rotation of the latter), and in so doing, tilt sine bar SB whereby shaft Pr$s$ and prism Pr are rotated about axis Pr$a$. This decreases or increases the altitude angle of the "line of sight" of the associated telescope. (For details, refer to FIGURE 34.) Jack screw $j$S which rotates in a sense opposite to that of lead screw LS, also carries an external thread on which rides a follower nut (not visible in FIGURE 26, see part $fn$ in FIGURE 27). The threads of screws LS and $j$S have the same pitch. Nut mount N$u$1 and follower nut $fn$ are joined together by spring $fns$ which helps to prevent nut N$u$ as well as follower nut $fn$ from rotating along with lead screw LS or jack screw $j$S, respectively. Arm C$f$, firmly attached to nut mount N$u$1, constitutes a cam follower and as such operates like a lever on nut N$u$ by which the nut can be rotated about lead screw LS in discreet quantities. It can easily be seen that any such rotation adds to or deducts from the amount by which plate LP$l$ is raised or lowered through rotation of lead screw LS alone. Spring $fns$ holds cam follower C$f$ against barrel B$r$L of cam screw $c$S. The outer surface of barrel B$r$L is provided with a helical channel along which cam follower C$f$ travels as screws LS, $j$S and $c$S are rotated, the rate of ascent or descent of the helix being adapted to the vertical rate of travel of nuts N$u$ and $fn$. The depth of the helical channel is adjustable along its entire path by radial screws $r$S$c$ so that cam follower C$f$, in sliding over the screw heads, adds to or deducts from the normal vertical rate of travel of nut N$u$ along rotating lead screw LS, depending on how far the head surface on each radial screw $r$S$c$ is raised or lowered from a given midrange of radial adjustment. Thus, if anywhere within the range of the angle generator lead screw LS rotates through a small angle and thereby lifts or lowers plate LP$l$ by a corresponding amount, this quantity of plate displacement, viz. this change in the angle of prism tilt, can be increased or decreased by a minute portion through appropriate adjustment of the respective radial screw or screws $r$S$c$ under cam follower C$f$. Means are thereby provided to compensate for minute errors which may originate in the angle setting mechanism or through flaws in the optics of the prism. By calibrating the assembly in small increments of rotation of the cam shaft, an accuracy of the order of one second of arc can be achieved.

Prism shaft Pr$s$ is spring loaded axially (spring load applied counter-clockwise in the drawing), the spring being mounted on the far end of prism shaft Pr$s$ (not visible in the present diagram). This causes the left end of sine bar SB with ball $sb$ to exert pressure against plate LP$l$ at all times. Part B$w$ constitutes a balancing weight, and two-way limit switch L$sw$ prevents excursions of travel nut N$u$ beyond a safe range.

In FIGURE 27, the essential components of the angle generator of FIGURE 26, including portions not shown in FIGURE 26, are sketched in a simplified functional diagram which serves to facilitate a summary explanation of the operation of this device. (Relative size of parts not drawn to scale.)

Altitude drive motor M$o$ rotates drive pinion $dp$ through an escapement gear assembly E$g$ which is essentially composed of star wheel pinion $wp$, internal star wheel $iw$ and pawl $pw$, these parts and associated solenoids (see below) being located in, or attached to, housing 2H1 of FIGURE 26 (mounted below bracket 2H) but not visible in that figure. Portions of the remaining gear assembly g$rm$ (to be described further below) can be seen in the lower part of FIGURE 26. The escapement gear and related units permit automatic changeover between two modes of operation of the angle generator, one mode admitting incremental changes of the prism altitude angle in obedience to function pulses from the playback unit of Division IV, Section $d$, which are fed to motor M$o$, and the second mode securing continuous actuation of the angle generator for "slewing" the prism into a given altitude angle during pre-setting or re-setting (star-changeover) procedures. (See details in wiring diagram of FIGURE 67.) In the first mentioned mode of operation, internal star wheel $iw$ and star wheel pinion $wp$ of the escapement gear are oriented in one single plane. These two gear units always rotate together when motor M$o$ drives shaft 2$sh$. However, internal star wheel $iw$, while keyed to shaft 2$sh$ and therefore compelled to follow the shaft's rotation, is slidable axially along the shaft so that the two gear units $wp$ and $iw$ can be separated in a vertical direction, as shown in the diagram. (Separation exaggerated in drawing.) Slewing solenoid S$ls$ serves the purpose of separating these gears whenever no stepping action of the escapement gear is desired as will be explained presently. The spring loaded armature $ar$ of stepping solenoid S$s$ (also called escapement solenoid) holds pawl $pw$ meshed with the teeth of starwheel pinion $wp$ as long as solenoid S$s$ and drive motor M$o$ remain inactive. This "off" condition is sketched in FIGURE 28 in which pawl $pw$, internal star wheel $iw$ and pinion $wp$ are represented as occupying the single plane of the drawing sheet. (The shaft of armature $ar$ passes underneath the internal starwheel tooth, FIGURE 28 being viewed in the direction of arrow $vw$ of FIGURE 27.) It can be recognized that due to the "solenoid off" orientation of the toothfaces of internal starwheel $iw$ and pinion $wp$, pawl $pw$, upon actuation of solenoid S$s$, must engage a tooth face of the internal star wheel $iw$ as the pawl is retracted (radically outward). At the same time, the pawl is disengaged from the teeth of pinion $wp$. Whenever solenoid S$s$ is energized, motor M$o$ is also actuated, and therefore, depending on the sense of rotation of motor M$o$ and shaft 2sh, pawl pw slides along one or the other face of the internal starwheel tooth which lies in its radial path at the instant of motor-and-solenoid actuation. Gear units iw and wp are now free to rotate through a small angle which is determined by the peripheral separation of the internal starwheel teeth. Pawl pw is never pulled beyond the working depth of the internal starwheel, and as soon as it bears against the next following internal tooth, cam action of the obstructing tooth face tends to force the pawl back toward pinion wp, causing the pawl to engage the succeeding tooth-face of th pinion. At some instant during this process, motor Mo and solenoid Ss are de-energized (end of incremental signal from playback). Spring pressure on solenoid armature ar and cam action between pawl pw and pinion wp rotate the gears until the pawl locks against two adjacent teeth of pinion wp. One fixed incremental step is thereby concluded, and the gears remain locked in their "off" position as shown in the drawing until the succeeding altitude function signal causes a repetition of the process just described.

During star changeover, the telescope which ceases its star-tracking function, through a sequence signal from the playback unit previously referred to, receives "slewing" power to drive its prism to a new altitude angle to be used after a subsequent star-changeover in which the same telescope returns to active tracking duty. The sequence signal connects drive motor Mo of FIGURE 27 to an A.C. power source which rotates the motor "forward" or "backward" according to the sense of direction of current flow selected by a separate signal from one of the sign-change channels of the playback tape described in Division IV, Section d. (Details of circuitry shown in wiring diagram of FIGURE 67.) Simultaneously, a D.C. power source is connected to stepping solenoid Ss and to slewing solenoid Sls of FIGURE 27. The latter solenoid, when actuated, lifts internal starwheel iw of the escapement gear from the plane of starwheel pinion wp (by way of a yoke not shown in the diagram). Pawl pw in turn, is cleared from pinion wp through action of solenoid Ss and hence, both gear units iw and wp are free to rotate without interference from the pawl until motor Mo and solenoids Sls and Ss are stopped by a second sequence pulse which disconnects the power from these parts. The method of timing this second sequence pulse, and details of the mechanism which controls the duration of the slewing action are described in Division V, Section c, which covers the detailed features of the prism resetting counter. This counter is also shown in the present diagram (FIGURE 27), bearing designation RC. Drive pinion dpl which is mounted on the main drive shaft of counter RC, is rotated by drive motor Mo through pinion dp and counter idler idl. (The resetting counter is mounted on the rear plate of bracket 2H of FIGURE 26 and therefore not visible in that drawing.)

Prism idler id2 and adjustable idler id3 connect drive pinion dp with the remaining portions of the angle generator drive mechanism whose essential functions have already been described with reference to FIGURE 26. (Numerals used in FIGURE 27 for parts already described correspond to those of FIGURE 26.) The sequence of drive gears for these portions of the angle generator drive proper is outlined in FIGURE 27, viz. adjustment gear id3 drives the lead screw shaft (represented by axis La), the jack screw shaft (axis ja) and the cam shaft (axis ca) via lead screw gear dp2, jack screw gear dp3 and cam shaft gear dp4, respectively.

The relationship between rotary travel of the altitude angle drive-gears and the magnitude of angular tilt of the prism is outlined in FIGURE 30 in which parts Mo, dp, id2, id3, dp2, La, LS, Nu, SB, Pra and Pr of FIGURE 27 are redrawn in a schematic profile view. Gear configurations for the angle setting drive which determine the extent of angular travel of sine bar SB and prism Pr are so designed that for each incremental signal from the playback unit of FIGURE 12 and for each corresponding step of escapement gear Eg of FIGURE 27, pinion dp rotates through an angle of 45° in either direction. This amount of rotation, in turn, results in $\frac{1}{960}$ of a revolution of leadscrew LS (rotational ratio between pinion dp and gear $dp2=120:1$) and raises or lowers plate LPl (or travel nut Nu) by one "unit step" whose magnitude is expressed by the ratio of this vertical displacement per unit step to the fixed length of the sine bar distance XXX. This ratio per unit step equals .0000125 and represents the sine of the corresponding angular displacement $x$ of sine bar SB around axis Pra. Expressed more precisely, this means that for each unit—or altitude function-step, the quantity .0000125 is added to or subtracted from the sine of the total prior angle of displacement of sine bar SB from an established reference position (see below) in which the angle $x$ and its sine are zero. The corresponding displacement of the line of sight LSt of prism Pr equals twice the displacement angle $x$. (See details with reference to FIGURE 34.) Prism Pr is mounted at an angle such that with sine bar axis XXX (see details of sine bar in FIGURE 29) in a horizontal plane parallel with that of platform Pl of FIGURE 25 and therefore normal to the axis of lead screw LS, the line of sight Lst of the prism forms an angle of plus 47½° with platform Pl. This constitutes the midrange of the telescope and the reference position of sine bar SB (or of nut Nu) cited above. See horizontal line Plp through Pra and Nu which symbolizes the sine bar reference position in a plane parallel with the plane of platform Pl. In this midrange position, reflecting surface Rs of prism Pr is inclined 21¼° against leadscrew axis La or optical axis Ox.

$$21\frac{1}{4}° = \frac{90° - 47.5°}{2}$$

(See text referring to FIGURE 34.) The distance XXX of axis Pra of shaft Prs from axis La of leadscrew LS can be adjusted by rotating eccentric bushing Bu, shown schematically as a shaded portion in the sketch of sine bar SP of FIGURE 29. (Dimensions of eccentric exaggerated.) The contact point of ball sb on plate LPl is thereby shifted laterally in the direction of line XXX of FIGURE 27 (for calibration purposes). This ball point contact also admits the necessary amount of lateral play upon plate LPl for bar SB during raising and lowering of nut Nu.

Section (b)—Star Tracking System

One of the four telescope units summarily designated with numerals T1, T2, T3 and T4 in FIGURES 24 and 25 is shown in greater detail in the cross-sectional elevation view of FIGURE 31. The altitude angle generator described in the preceding section (including the dove prism) which forms part of each telescope unit and of the over-all star tracking system associated with each telescope unit, is not shown in this drawing. However, a portion of the supporting bracket 2H of the altitude angle generator of FIGURE 26 which is marked in FIGURE 31 by broken-off dash-dot lines 2H, as well as flange Fl illustrate how the generator is mounted on top of telescope barrel Tb, lines Ox in both drawings indicating the orientation of the optical axis of the telescope. Each of the four telescope units is identical in construction.

The basic star tracking system of the automatic sextant, such as it applies to a single telescope unit, is described in detail in reference No. 6 listed at the end of Division I of this specification. Essentials of operation of this system will first be described below, whereupon particular attention will be directed towards the incorporation of this system in the four-telescope structure of the automatic sextant.

In FIGURE 31, cylindrical telescope barrel Tb is shown to be supported on bearings br1 which hold the barrel in such a position that the optical axis Ox of the telescope which coincides with the longitudinal axis of barrel T*b*, remains at all times normal to plane P*l*, the latter being representative of the plane of platform P*l* of FIGURE 25. Fixtures *fx* which contain bearings *br*1, simulate portions of the supporting bracket B*rt* of the telescope shown in FIGURE 24 which is attached to the platform frame P*lf*, the relationship between platform P*l* and frame P*lf* having been explained in the initial reference to FIGURE 25 at the beginning of Division V. Aplanatic objective lens A*pl* receives light from an interesting star and its surrounding field via the reflecting dove prism P*r* of FIGURE 26 (the reflected starlight passing through the hollow cylinder portion of bracket 2H shown at the right corner of FIGURE 26) and focuses this light on focal plane F*p* within the optical field of the telescope. The conditions under which light from the point source of a star strikes the null point N*n* in the optical field of focal plane F*p* (N*n*=point of incidence of axis O*x* on plane F*p*) will be explained separately by reference to FIGURES 34, 35 and 36.

A scanner motor is mounted inside the lower portion of barrel T*b*, the axis of rotation of its armature coinciding with the barrel axis or optical axis O*x*. The scanner motor consists of stator S*t* which is fixed to the inner wall of barrel T*b*, and a hollow-shaft cylindrical rotor 2R*o* with armature 2A*r*, the rotor being held in scanner bearings 2S*b* in the inside wall of barrel T*b*. The hollow shaft of rotor 2R*o* permits passage of light from the stars and at the same time helps shield the focal plane from random light, acting as an effective baffle. The diameter of the hollow portion of rotor 2R*o* determines the diameter of the circular optical field in focal plane F*p* which, in turn, determines also the extent of the telescope's field of view in the sky. (The "field angle" of the telescope equals 6 degrees and can be expressed as the angle *fd* subtended at the center of lens A*p* by the surface of cone C*n* whose base constitutes the circle of intersection of the interior surface of hollow rotor 2R*o* with focal plane F*p*.) Attached to the lower end of rotor 2R*o* and rotating therewith in the focal plane F*p* is a scanner disk S*c* whose surface is opaque except for a slot S*lt* (see separate sketch of disk S*c* in FIGURE 31*a* and text below), the apex of the slot being located at the center of rotation of the disk which in turn coincides with the null position N*n* in the optical field. Rigidly secured to the supporting fixture *fx* is a cylindrical bracket *brc* which holds a set of achromatic collimating (paralleling) lenses L*P* below and concentric with barrel T*b*. (See detailed description of paralleling lens system in reference No. 8 listed at the end of Division I.) The light falling upon the optical field in focal plane F*p* passes through lenses L*P* as a modulated light source whose frequency of modulation equals the rotational speed of the scanner motor, stator S*t* being preferably supplied from a 60 cycle power source P*sr*. The phase of this 60 cycle power source serves as a reference phase for the null seeking star tracker servo system. The modulated light from lenses L*P* is directed onto cathode C*th* of photocell P*ht* (mounted on bracket *brc* below lenses L*P*) which converts the incident light into essentially square-pulsed electrical energy, to be preamplified in amplifier A*mp*.

This modulation system employing a rotating slotted shutter between focal plane F*p* and photocell P*ht* permits the scanning of adjacent finite sections of a given field of view. In accordance with the techniques expounded in this specification for pointing the telescope at precomputed star elevation and azimuth angles, this field of view, at the onset of a given pre-calculated tracking period and under the required conditions of flight, is expected to contain a distinguishable star whose light predominates over that from undesirable sources, such as non-interesting stars, uniform or non-uniform background-light etc. Each finite section of the field of view generates a photocell signal output characteristic of the light content in that section. A complete scanning sequence from a known starting position of disk S*c* through succeeding adjacent sections around the field back to the starting position causes one cycle of signal output of the photocell which is qualitatively characteristic of the particular field scanned. This cyclic photocell-signal thus becomes a function of disk or shutter position. By identifying the disk position with a synchronous reference potential of a frequency equal to the rate of disk rotation and by utilizing means for comparing the phase of this reference voltage with the phase of a filtered photocell signal component of the same frequency (see below) which is representative of the position of the interesting star image within the scanned optical field, any azimuth and elevation deviations of the star image from the null-position of the field can be automatically derived as error signals and corrected by means of the star tracking servo system to be described more fully in connection with FIGURES 32 and 33.

In order to secure useful error-correcting signals from the photocell currents, the output from pre-amplifier A*mp* (cathode follower) in FIGURE 31 is first passed through a clipper and low pass filter, represented by boxes C*IR* and *lo*P, respectively, which eliminate all spurious background signals including the lower magnitude signals of non-interesting stars. In all cases in which the interesting star image is not located at the center of the optical field, this star image generates a pulse which may be considered a complex wave of a series of higher frequency harmonics occurring with a repetition rate of 60 cycles per second. The width of the essentially square shaped 60 cycle signal pulse from low pass filter *lo*P is determined by the shape of slot S*lt*, by the rotational speed of disk S*c* and by the degree of proximity of the interesting star image to the null-point N*n*. FIGURE 31*a* shows an enlarged plan view of disk S*c*, illustrating a preferred type of slot S*lt* which is slightly wedge-shaped and approximately 5 degrees wide near the periphery of the disk. This slot opens into a flared area near its apex, the flared area covering 10 minutes of arc of the six-degree angle *fd* illustrated in FIGURE 31 and 90 degrees in width at its open end, diminishing in width towards center N*n* at the rate of 9 degrees per minute of arc of angle *fd*. (Disk S*c* containing this precisely shaped slot or notch S*lt* is preferably made of glass, the area outside the notch being made opaque photographically.) Since the scanner disk rotates at a constant velocity, the length of time during which a star image is permitted to pass through the disk when the star image lies within the flared area of the notch, is therefore proportional to the distance of the image (within the 10 minute area) from the center N*n* of the optical field. Hence, the output pulse from low pass filter *lo*P in FIGURE 31 will be of maximum width if the tracking error is of a magnitude of 10 minutes of arc and will diminish in width in proportion to the further decrease of the tracking error. For any larger tracking error, the pulse width remains practically unchanged. (For discussion of a scanner disk with a somewhat differently contoured slot refer to No. 9 of the references listed at the end of Division I of this specification.) In the band pass and 60 cycle low "Q" resonant filter following the low pass filter *lo*P (designated by box Q), the isolated star pulse of 60 cycle repetition rate is converted into a 60 cycle sinusoidal signal whose amplitude is proportional to the width of the signal pulse, a wider pulse being equivalent to a stronger pulse, capable of ringing a "louder" resonance. The phase of this 60 cycle resonant frequency is in step with the signal pulse which "rings" the resonator Q. The amount of electrical degrees by which the signal pulse, and with it the 60 cycle resonant frequency, is phase-displaced from the reference frequency of the scanner (discounting additional phase shifts introduced in the signal channel) is determined by the position of the desired star image in the optical field of the scanner relative to a reference axis in this field. This can be clearly seen in the simplified sketch of FIGURE 32 which serves to illustrate the general operating principles of the basic star-tracking system under observation. In this diagram, two mutually perpendicular axes Ax1 and Ax2 are laid out in the plane of scanner disk Sc of FIGURE 31, their point of intersection Nn coinciding with the center of rotation of disk Sc. These axes must be visualized as remaining in a fixed position relative to stator St in the telescope barrel Tb of FIGURE 31 while disk Sc is rotating. Such a condition is suggested in FIGURE 32 by showing a broken away portion of the stator "lined up" tangent to axis Ax1. Let the one arm of axis Ax1 which is marked "0 degrees" and which cuts through stator St at a predetermined location, be selected to represent the zero reference axis in the optical field. A simple, wedge-shaped slot Slt in disk Sc is shown in alignment with this reference axis. This is the zero position of the slot (or disk) through which the latter rotates each time the reference field voltage of the scanner drive motor (from source Psr in FIGURE 31) goes through its zero phase. Three interesting star images S3, S4, and S5 have been inserted in the optical field at different locations away from null point Nn, thus representing a variety of tracking errors of the telescope. If the disk rotates in the direction of arrow Arr, the reference phase will have progressed 60 electrical degrees from zero when the star image S3 appears through the rotating slot Slt. The 60 cycle voltage, generated in the resonant filter "Q" of FIGURE 31 by the isolated star signal pulse from photocell Pht, under these conditions (and disregarding other factors), will therefore lag 60 degrees behind the reference voltage. If this 60 cycle signal from the resonant filter Q is used in a servo system so as to rotate stator St, and with it the reference axis "0° Ax1" and the associated prism, clockwise through 60 degrees in azimuth, the 60 degree phase lag of star image S3 will be reduced to zero. Obviously, this signal acts to correct an azimuth error only. However, if a second correction signal is derived from this azimuth error signal by, say, a 90 degree phase advance of the latter, this second signal voltage first shows a 30 degree phase advance over the reference voltage and can be used in a servo system which acts to tilt disk Sc about axis Ax2 in a sense so as to move image S1 towards that axis. This latter correction signal would thus act as an elevation or altitude control voltage. Since both control voltages act simultaneously, the phase of the altitude error voltage will be affected by the action of the azimuth servo system as long as the azimuth error is not reduced to zero. If in the present example the 60 degrees phase lag of the azimuth error signal is reduced to zero and an altitude error still exists, this altitude error signal will lead the reference voltage by 90 degrees. Axis Ax2 about which the elevation correction torque is being applied, has rotated clockwise through 60 degrees, along with reference axis Ax1, so that the prevailing elevation torque moves the star image straight towards Nn.

Returning to FIGURE 31, it is seen that the identical 60 cycle power source Psr which drives the scanner motor, is also used to feed the reference (or fixed) field coils of the azimuth and elevation servo motors (as indicated by the feed lines Azf and Elf, respectively) which act in conjunction with the amplified correction voltages from the photocell output (to be further discussed below, these voltages being fed to the respective control field coils of these servo motors) to reduce the tracking error of the telescope to zero. For these servo motors, the general principle applies that if the control field and the reference field in any one motor are in phase or 180° out of phase, zero torque is produced in that motor; if control and reference fields are 90° or 270° out of phase, maximum torque is generated. For all intermediate phase differences, the torque assumes a proportionate intermediate value, the sense of torque depending on whether the phase of the control field leads or lags that of the reference field. In addition to this, the effective torque depends also on the amplitude of the torque signals in the control field. Thus, in the example of star-image S3 of FIGURE 32, the initial 60 degree phase delay in the azimuth error control signal which feeds into the control field coils of the azimuth servo motor, as well as the initial 30 degree phase advance of the elevation error control signal in the control field coils of the elevation servo motor, will both cause torque in the respective servo motors. In the case of star image S4 of FIGURE 32, the initial 180° phase difference between the azimuth servo-reference field and azimuth servo-control field will produce zero torque in the azimuth servo motor. If star image S4, besides being located on the 180 degree arm of axis Ax1, were also located upon axis Ax2, viz. at the center Nn of the optical field, portions of the interesting star image would constantly sensitize the photocell-cathode during the entire 360 degrees of each disk rotation. This would practically eliminate the 60 cycle pulse from the input to resonant filter Q of FIGURE 31, reducing the servo correction voltages to zero in both, the azimuth and elevation servo motors. Since the star image S4 is displaced from the tilt axis Ax2 and necessarily also from null point Nn, the 60 cycle output from resonant filter Q will persist, but due to its 180 degree phase displacement from the reference field, it will not cause any servo-action in the azimuth motor. The elevation error control signal, in this case, will produce maximum torque in the elevation servo motor due to its 180+90=270 degree phase difference from the reference field. Both, the azimuth and elevation control signals, will disappear when the servo mechanism has caused the star image S4 to shift onto null point Nn.

The advantage of using the flared slot of FIGURE 31a instead of the straight slot depicted in FIGURE 32 lies in the fact that an increased impetus is given to the servo system to drive the star image to the null point when the tracking error is slight (image entering the 10-minutes-of-arc area) and that this impetus is damped as the null point is approached.

In the example of star image S5 of FIGURE 32, it is seen that the azimuth error signal lags the reference by 270° (or leads it by 90°), causing maximum azimuth torque. The elevation signal initially lags (or leads) the reference by 180°, resulting in zero elevation torque. However, as the azimuth servo system acts to reduce the azimuth error to zero, it also acts to build up an elevation correction torque which will be maximum, if an elevation error persists after the azimuth error is reduced to zero.

The adaptation of the above described basic star tracking system to the 4 telescope structure of the automatic sextant will now be described with reference to the schematic diagram in FIGURE 33. (The system of platform control herein advocated is a preferred system of control.) In this drawing, the two platform axes X1 and X2 of FIGURE 25 are shown in an imaginary plan view of platform Pl in two positions of the platform, designated as "Pos. A" and "Pos. B," the orientation of yoke Y of FIGURE 25 being simulated by dashed line Y for position "Pos. A" of the platform. The intersection of these two platform axes coincides with axis X3 about which the platform virtually rotates whenever yoke Y is rotated in azimuth. In position "Pos. A" of the platform axes (axes drawn in full lines), telescopes T1 and T4, represented summarily by the contour of the respective prisms Pr1 and Pr4 projected onto the plane of the platform (width of prisms relative to their "depth" is exaggerated), are arbitrarily assumed to be oriented in their zero azimuth position relative to platform Pl, in which they are so aligned that the azimuth "lines of sight" of prism Pr1 and Pr4 point "inboard" in the direction of the respective platform axes as shown, for example, by line Lst upon axis X2 for telescope T4. (See definition of "line of sight" of prism given with reference to FIGURE 34.)

In the plan view of FIGURE 33, the vertical plane in which the "line of sight" of the prism moves as the prism is rotated about its elevation axis P$ra$, remains always normal to axis P$ra$ of the prism whose surfaces I$s$ (surface of incidence) and R$s$ (reflecting surface) are here shown projected onto the azimuth plane of the platform, as indicated, for example, in "Pos. A" of prism P$r$1.

It is further assumed that telescopes T1 and T4 have been selected to track stars S$x$1 and S$x$2, respectively, and that at the onset of an imaginary tracking period, the instantaneous orientation of these telescopes relative to the selected stars is represented by the platform in position "Pos. A" of its axes X1 and X2. In this position, let the images of the interesting stars register at S$i$1 and S$i$4 in the respective optical fields of telescopes T1 and T4, these fields being represented by a plan view of disks S$c$1 and S$c$4. (The positional errors of the prisms relative to the stars have been exaggerated in the drawing for the convenience of demonstration; only the azimuth errors being readily displayable in this plan view, and the prisms must be visualized as being superimposed upon their scanning disks and optical fields as shown in position "Pos. B" of telescope T1.) Disks S$c$1 and S$c$4 are shown in their correct zero reference positions, i.e., if prisms P$r$1 and P$r$4 are in their respective zero azimuth positions relative to the platform axes as shown in the present drawing, the associated stators are held in positions such that the zero reference axes "0° A$x$1" (identified in FIGURE 32) for disks S$c$1 and S$c$4 point "inboard" along the respective platform axes in the same direction as the "lines of sight" of the prisms (stators and prisms rotate in azimuth as if they were one single unit), slots S$lt$ crossing these axes when the 60 cycle reference voltage in the stator coils goes through zero phase.

Before the phase-conditions and ensuing tracking servo actions of the hypothetical case of FIGURE 33 can be correctly evaluated, the following features of FIGURES 31 and 25, not referred to thus far, must be fully understood:

In a preferred execution of circuit design for the signal channel from photocell P$ht$ in FIGURE 31, resonator Q is followed by a phase corrector P$hc$ which is so adjusted that its output voltage remains in phase quadrature with the reference phase when its input voltage from resonator Q originates from a star image which appears superimposed on the reference axis "0° A$x$1." The output voltage from phase corrector P$hc$ goes to the control fields of the elevation torquers via line E$lc$ (and via a torque amplifier not shown in the drawing) and thus serves as the altitude or elevation error correction voltage of the servo system. The same signal from P$hc$, in a second channel, is further subjected to a 90 degree phase shift (see box P$hs$; phase shift assumed to be a 90 degree phase advance in the ensuing discussions) and thence fed to the control fields of the azimuth torquers via line A$zc$ (and via a torque amplifier not shown in the present drawing; see unit S$vy$ in FIGURE 25 and unit $tr$A in FIGURE 69), thus serving as the azimuth correction voltage of the servo system. In practice, the tracking system of each telescope is phase-adjusted by first aiming each pair of telescopes of the same platform axis, such as T1 and T3 or T2 and T4, at a starlight source (which may be artificial) so that the star image appears at the respective null points N$n$ of the optical fields. For this type of adjustment, the telescopes must be set to their zero-azimuth positions relative to the platform. The platform is then tilted about the corresponding elevation correction axis (i.e., about axis X2 in case of T1 and T3, and about axis X1 in case of T2 and T4, as explained further below) in a direction which causes the star images to be displaced along the respective reference axes "0° A$x$1," which is to the right in the drawing for T2 and T4, and downward for T1 and T3, these reference axes pointing "outboard" for T2 and T3 as shown in the drawing. (See outlines of disks S$c$2 and S$c$3 of telescopes T2 and T3, respectively, drawn onto axes X2 and X1 in "Pos. A" of the platform; see also text below.) In each case, the output voltage from phase corrector P$hc$ is thereupon adjusted to lead (or lag) the reference voltage by 90 degrees. This automatically eliminates the effects of unwanted phase shifts, the latter being permanently and unavoidably present in the individual photocell output channels.

An essential requirement for the successful functioning of the selected phasing system is the correct relative orientation of the reference axes "0° A$x$1" and the correct relative sense of rotation of scanner disks S$c$. The reference axes "0° A$x$1" of telescopes T1 and T3 upon platform axis X1, as well as those of telescopes T2 and T4 upon platform axis X2 must point in the same direction, respectively, but each scanner disk of the corresponding pairs of scanner disks S$c$1, S$c$3 or S$c$2, S$c$4 must rotate in an opposite sense relative to the other disk of one pair, indicated by the arrows in FIGURE 33. Careful analysis of the optical conditions under which this tracking system must operate, reveals the reasons for these requirements. Since the two opposite telescopes (i.e., the prisms) on one and the same platform axis "face" each other, a tilt about their common platform-elevation axis decreases the elevation angle of one telescope if it increases the same angle on the opposite telescope, and vice versa. Consequently, if, for instance, a star image of telescope T4 is displaced along axis A$x$1 (or axis X2) to the right of point N$n$ in FIGURE 33 by a tilt of platform about axis X1 which lowers T4 into the plane of the drawing, the same tilt would displace the same star image also to the right of N$n$ in telescope T2. (Consult also FIGURE 34.) With both reference axes "0° A$x$1" pointing likewise in the same direction, the corrective torques resulting from these errors operate in the same sense of direction, a condition necessary to reduce the tilt error to zero in both cases. At the other hand, rotation of platform about axis X3 (azimuth) results in star image displacements in the opposite directions in each pair of opposite telescopes. Corrective azimuth torques about axis X3 must therefore also operate in opposite directions. Hence, opposing scanner disks are connected to rotate in opposite directions. The example of tracking errors given in FIGURE 33 will further bear this out. (Consult also FIGURES 34, 35 and 36.) This applies also to the case in which the telescopes are torqued about their own axes X4.

Proceeding now to the torquers proper, it has been previously stated that telescopes T2 and T4, during tracking operations, remain fixed in azimuth relative to axis X2 of platform P$l$, and any azimuth error signals issuing from the tracking channels of these two telescopes are corrected by applying a corresponding torque about axis X3 onto pivotal shaft P$s$. (See lines A$zc$ in FIGURE 25 from photocells P$ht$ of telescopes T2 and T4 to servo amplifier S$vy$, and line $ay$ from S$vy$ to yoke azimuth drive motor Y$m$, this latter line carrying the amplified azimuth tracking error control signals when switch $sY$ is in tracking position $tk$. Parts C$lR$, $loP$, Q, P$hc$ and P$hs$ of FIGURE 31 are omitted in FIGURE 25.) Azimuth error-signals from the tracking channels of telescopes T1 and T3, however, act to rotate these latter telescopes about their own axes X4$_1$ and X4$_3$, respectively. (See lines A$zc$ in FIGURE 25 from photocells P$ht$ of telescopes T1 and T3 to azimuth drive motors A$zm$ of these telescopes.) Parts listed above which are shown in FIGURE 31 are also omitted in FIGURE 25. The azimuth drive motor A$zm$ which performs these functions and which is actually provided on all four telescopes (see FIGURES 24 and 25), is shown schematically in FIGURE 31 where box A$zm$ represents the azimuth motor and dashed line S$h$ the extension of the motor shaft, illustrating one preferred form of execution. Box H$e$ contains one of the heliopots H$e$ descibed in Division V, Section $i$, 3 in connection with FIGURE 69, the heliopot arm $c$H$e$ of FIGURE 69 being linked to shaft S$h$. Shaft S$h$ carries an anti-backlash split worm drive, shown at W$r$ in cross-section in order to illustrate the manner in which this worm gear drives ring gear R$g$ and thereby rotates barrel T$b$, ring gear R$g$ being rigidly mounted on the outer surface of barrel T$b$. Tracking error signals in elevation from telescopes T2 and T4 are applied as corrective torque voltages onto gimbal axis X1. (See lines E$lc$ from photocells P$ht$ of telescopes T2 and T4 in FIGURE 25, connected to torquer $tm$1; only one torque motor shown, a second identical torque motor being provided at the opposite end of the gimbal axis.) Elevation error signals from telescopes T1 and T3 are corrected by torquing the yoke axis X2. (See lines E$lc$ from photocells P$ht$ of telescopes T1 and T3 in FIGURE 25, connected to torquer $tm$2; only one torque motor shown.) Reasons for this particular distribution of tracking control functions are, in part, arbitrary. The system here submitted constitutes one preferred form of execution which has been found convenient in practice. It can be recognized, for instance, that by fixing one pair of telescopes (of the same platform axis) to the platform, i.e., by leaving the azimuth torque motors of these two telescopes inoperative during tracking, and by rotating the platform in response to azimuth tracking error signals from these telescopes, azimuth index lines can be provided for both pairs of telescopes and also for the bubble turret. Practical advantages of this arrangement will become more evident after examination of Division V, Section $h$. Regarding the tracking control in elevation, it is remembered that the prism elevation angles relative to the platform are under control of the function pulses from the playback unit (see feedlines from playback unit F$d$ via sequence switches SSW to prism elevation axes P$ra$ in FIGURE 25). The tracking control in elevation does not affect the prism-elevation angles relative to the platform. However, by tilting the entire telescope, i.e., the entire platform, at right angles to the platform axis upon which the tracking telescope is located, the elevation angle of the prism relative to space, viz. relative to the interesting star, can be altered independently from the prism setting control. It will be also remembered that the true purpose of correcting tracking errors in elevation on two telescopes (placed at an optimum angle of 90 degrees against each other) by applying corrective tilts onto the platform, is to maintain the platform in a plane normal to the specified dynamic vertical. (See text below referring to FIGURES 34, 35 and 36.)

Returning now to the setting of telescope T4 in platform position "Pos. A" of FIGURE 33, the displacement of star image S$i$4 from the null point N$n$ in the optical field, according to the analysis given above, will cause rotation of platform P$l$ about axis X3 in a sense and at a rate corresponding to a phase lead of 45°+180° =225° in the resulting azimuth error control signal (assuming 90° phase advance in both, part P$hc$ and part P$hs$ of FIGURE 31). Hence, if in the example of FIGURE 33 any phase lead of more than 180° and less than 360° in the azimuth control signal results in clockwise rotation of the platform, stator S$t$ and prism P$r$4 of telescope T4, while remaining in the same position relative to axis X2 of the platform, will be rotated clockwise about axis X3 through 45° together with the platform, such that star image S$i$4 eventually appears in slot S$lt$ at the same instant in which the slot rotates through its zero-reference position. This is indicated by the sketch of telescope T4 in position "Pos. B" of the platform. It can be recognized that the zero azimuth reference axis "0° A$x$1" has actually been rotated towards the star S$x$2 whereby the star image, here designated with S$i$4$a$ has been moved towards the reference axis until it appeared in alignment with this axis, thus reducing the phase discrepancy, viz. the torque about axis X3 to zero. The optics involved in this azimuth rotation of the prism can be studied with the help of the sketches in FIGURES 34 and 35. Correction of the elevation error takes place simultaneously. However, in the drawing, an elevational error is shown persisting in position "Pos. B" of axis X2 (as suggested by the position of star image S$i$4$a$) for the purpose of demonstrating that if the azimuth error is reduced to zero before the elevation error has disappeared, a phase divergence of 90 degrees remains between the elevation error control signal and the reference voltage. Since the resulting elevation torque is applied about axis X1 (now in position "Pos. B") which is parallel with elevation axis P$ra$ of the prism, the prism is virtually tilted in elevation until the star image has moved to the null point N$n$. The optics involved in this tilting motion are briefly outlined in FIGURE 34.

For telescope T1, the tracking functions are carried out analogously. Rotation of the platform in response to the azimuth error signal from telescope T4 will modify the original azimuth error signal from telescope T1, registered as star image S$i$1 for "Pos. A" of axis X1. Thus, if position "Pos. B" of the platform were to be reached before the tracking servo mechanism of telescope T1 became operative, prism P$r$1 and the stator S$t$ associated with T1 would be rotated into a new azimuth position relative to star S$x$1 by the tracking action of telescope T4 alone, as shown by dotted prism P$r1x$ and stator S$tx$ in "Pos. B" of axis X1. An azimuth tracking error signal from telescope T1 leading the reference voltage by approximately 20 degrees, thereupon, would rotate stator S$t$ and prism P$r$1 clockwise into positions S$ty$ and P$r1y$, respectively, whereby the azimuth error signal of star image S$i$1$a$ would be reduced to zero. This action is similar to that explained with reference to telescope T4 except that, in this case, rotation of the azimuth zero-reference axis "0° A$x$1" is carried out by the rotating telescope barrel rather than by the rotating platform. If an elevation error signal remains after elimination of the azimuth error, as suggested by the position of star image S$i$1$a$, tilting of the platform about axis X2 continues since a 90 degree phase lead of the altitude error signal over the reference voltage is present. In spite of the fact that the axis of tilt of the platform, in this case, is not parallel with the elevation axis P$ra$ of prism P$r1y$, the tilting of the platform will move the star image to the null point N$n$ since the light path from star S$x$1 through the prism P$r1y$ remains in a vertical plane perpendicular to the rotation axis P$ra$ of prism P$r1y$. (See arrow $arl$.) A certain amount of cross-coupling between azimuth and elevation control signals develops if platform tilt is coupled with an off-set position of the prism relative to its zero azimuth position on the platform. This does not affect the successful operation of the tracking system so long as the prism-offset angle is held within permissible limits, a condition which can be fulfilled by careful programming of the tracking schedule.

FIGURE 34 shows in a simplified diagram the essential principles governing the orientation of prism P$r$ in an elevation plane normal to one of the platform axes X1 or X2 which bisects the prism into two equal halves if the prism rests in its zero azimuth position relative to the platform. The prism surface I$s$ which faces the incident light from star S1$a$ after the light has penetrated through the observation window O$b$ (secondary window O$bs$ omitted for convenience; see also FIGURE 24) will be designated as sighting surface or surface of incidence, the mirrored surface R$s$ as reflecting surface and the surface I$m$ (directed towards the telescope barrel) from which the mirrored star image emerges, as the image surface. Surface I$s$ and I$m$ each form an angle of 35° with surface R$s$. (Selection of the 35° angles establishes an optimum condition for reflecting light rays from stars within permissible altitude limits downward into the telescope barrel.) For this type of reflecting dove prism, it can be generally stated that light rays impinging upon surface I$s$ in a direction parallel with the reflecting surface R$s$ will be cast in the same direction parallel with R$s$ as they leave the prism via surface I$m$. Consequently, if a star were located at zenith Z$s$, and if prism P$r$ were oriented with its reflecting surface R$s$ vertical, the light of the star image would be cast vertically downward from surface I$m$. For any other orientation of surface R$s$ away from the vertical, there is a unique direction for light rays incident on surface I$s$ which causes the reflected light rays emanating from surface I$m$ to be also cast vertically downward. This unique direction for incident rays will be designated as the "line of sight" L$st$ of the prism. In FIGURE 34, the line of sight of the prism is viewed in a "broadside" elevation plane perpendicular to axis P$ra$ of the prism. If the same prism is viewed in a "frontal" elevation plane (arrows E1—E1) at 90 degrees to the plane of the drawing of FIGURE 34 as shown in FIGURE 35, the line of sight L$st$ can be seen to be at all times parallel with the vertical bisecting plane or parallel with the broadside surfaces B$s$ of the prism, these latter surfaces being here oriented normal to the surface of the drawing sheet. In the plan view of the prism of FIGURE 36 which corresponds to the presentation of prism P$r$1 or P$r$4 in its projection onto an azimuth plane parallel with that of the platform which was given in FIGURE 33 (arbitrary elevation angle; axis P$ra$ parallel with plane of drawing), the line of sight is always perpendicular to the rotation axis P$ra$ of the prism (or parallel with surfaces B$s$). In both cases (FIGURE 35 and FIGURE 36), light rays RL$s$ leaving surface I$m$ of the prism after (double) refraction and reflection in the prism will follow a path parallel with surfaces B$s$ or perpendicular to platform plane P$l$, if, as incident rays IR upon surface I$s$, they are directed parallel with the line of sight L$st$ of the prism. (In the azimuth view of FIGURE 36, the reflected ray RL$s$ must be visualized as being directed vertically downward into the plane of the drawing, surface I$m$ here being superposed by surfaces I$s$ and R$s$.) For brevity, the line of sight as viewed in the elevation plane of FIGURE 34 will be called the "elevation line of sight," and the line of sight aspects of FIGURES 35 and 36 will be designated as "azimuth line of sight."

In the elevation plane of FIGURE 34, prism P$r$ has been drawn at two different angles of inclination or tilt, the difference in orientation of the prism resulting from a tilt of the platform or platform axis upon which the telescope is mounted and not from rotation of the prism about elevation or altitude axis P$ra$. Owing to the fixed positional relationship between prism P$r$, aplantic objective lens A$pl$ and focal plane F$p$ (the distances between these parts and their proportional size are not drawn to scale in FIGURE 34), the objective lens A$pl$ and focal plane F$p$ are shown tilted through the same angle as prism P$r$. For one of the two angles of tilt shown, solid lines have been used in the drawing. Solid line P$ls$ through the objective lens in position A$pls$, for the sake of discussion, will be assumed to represent the plane of platform P$l$ in its specified "dynamic" or specified apparent horizontal position and line V$ss$ the perpendicular to this plane (vis. the specified dynamic vertical V$s$), against which reflecting surface R$s$ of prism P$r$ (solid lines) is inclined 20 degrees. (The question as to whether or not vertical V$ss$ can, under a given set of conditions, be considered the actual specified vertical V$s$, will be taken up further below. The fact that V$ss$ and V$s$ are here drawn parallel does not mean that these verticals are identically located in space. (See remarks which follow further ahead.) Due to double refraction of the light passing through the reflecting prism, the "line of sight" of the prism is always inclined against vertical V$ss$ by an angle twice the inclination angle of reflecting surface R$s$ against this vertical. This is readily shown by the example of an incident ray IR which, in the drawing, forms an angle of 40° against vertical V$ss$ and, according to the beforesaid, must be shown to be parallel with the line of sight of the prism. Ray IR forms an angle of incidence I of 35° against the surface I$s$ of the prism drawn in solid lines. The angle of refraction I$_1$ can be found by solving the equation $$\sin I_1 = \frac{\sin I}{N_1} \text{ for } I_1$$

($N_1$=refractive index.) For crown glass BSC–2, which is preferably used for this type of prism, $N_1$=1.517; hence $I_1$=22.3 degrees. From surface R$s$, the light ray is reflected at the same angle at which it strikes the mirrored surface. Therefore, the angle of the reflected ray against the normal to surface I$m$ equals angle I$_1$. Due to a second refraction at surface I$m$, which is the reverse process of the first refraction at surface I$s$ (sin $I$=sin $I_1 N_1$), the angle between the outgoing ray RL$s$ and the vertical upon surface I$m$ results in the same 35 degree angle as the angle of incidence I. Since angle $\delta s$ of surface I$m$ against vertical V$ss$ and the angle $\delta r$ of outgoing ray RL$s$ against the same surface I$m$ both measure 55°, light ray RL$s$ must be parallel with vertical V$ss$ or perpendicular to platform surface P$ls$. Hence, ray IR is also parallel with the line of sight of the prism. Any light ray striking the curvature of objective lens A$pls$ in a direction parallel with ray RL$s$ is substantially focused at N$s$ upon the focal plane F$ps$, N$s$ here being intended to represent an axis seen edgewise upon which null point N$n$ is located, such as axis A$x$2 of telescope T4 at the lower left side of FIGURE 33. The star image will fall upon the null point N$n$ on axis N$s$ only if the conditions of FIGURE 35 are met simultaneously (where outgoing light rays RL$s$ must likewise be perpendicular to platform surface P$l$ in order to be focused at N$s$1 which in that diagram is the edgewise projection onto line F$p$, of an axis perpendicular to axis N$s$ of FIGURE 34 upon which null point N$n$ is likewise located, such as axis A$x$1 of the same telescope T4 in FIGURE 33).

From the beforesaid, it can be concluded that the image of a star S1$a$ whose computed altitude angle against the true specified dynamic vertical V$s$ is 40 degrees at a given time and location (the altitude angle remaining unchanged after the starlight has passed through observation window O$b$), will fall upon null point N$n$ in the focal plane of the telescope if at that same time and location the angle of inclination of the reflecting surface R$s$ of the prism, measured against the same specified dynamic vertical V$s$, is 20 degrees, and if the prism is simultaneously so directed in azimuth that the light from the star impinges upon the sighting surface I$s$ of the prism in a direction parallel with the azimuth line of sight of the prism. Conversely, it would seem logical to conclude that if under the same assumed conditions, reflecting surface R$s$ were set at an angle of 20 degrees against the physically established vertical upon platform P$l$ (such as against optical axis O$x$ or leadscrew LS of FIGURE 30, which are both in a fixed position normal to platform P$l$), and if the platform and the telescope were so oriented that at the specified time and location the star image would fall upon null point N$n$, this vertical upon the platform would represent the true specified dynamic vertical V$s$. This conclusion is fallacious as far as a single telescope is concerned. It will be briefly shown below why a minimum of two tracking telescopes is needed in order to establish dynamic vertical V$s$ aboard the craft. Such a vertical V$s$ must be made physically available at every instant of flight in order to make it possible to physically sustain the plateform in the specified horizontal plane. The sole purpose of the two telescope-star tracking system and of the prism angle setting procedure through data supply from the magnetic playback is to establish and maintain this specified horizontal plane in the sextant aboard the craft since it is the ultimate aim to derive useful acceleration correction signals for flight control from an acceleration sensitive device which is mounted in this specified plane, or upon platform P$l$ oriented in this plane, as will be explained in greater detail in Division V, Section $g$. The computed star altitude angles from the magnetized tape which are physically laid-off from the platform-vertical during flight, serve as a valid medium to achieve the above cited task of establishing the specified horizontal plane aboard the craft only as long as they are made simultaneously effective on a minimum of two tracking telescopes, and as long as these telescopes are actually centered upon their guiding stars, the azimuth lines of sight of the respective prisms intersecting each other at an angle larger than 45 degrees or smaller than 135 degrees. (Optimum azimuth separation 90 degrees). Only under these conditions does the vertical which is physically established aboard the craft by virtue of the rigid mechanical relationship between either one of the telescopes and the platform, actually coincide with the specified dynamic vertical V$s$.

If only one telescope were to be used during tracking such as telescope T4 of FIGURE 33 (which may be placed at the center of platform P$l$), this telescope could be preset to its correct precomputed altitude and azimuth angles, and the craft could fly in the specified manner, permitting the telescope to "pick up" and "track" the interesting star as scheduled, creating the conditions of zero error identified in FIGURES 34, 35 and 36, in spite of an incorrect orientation of the platform or of vertical V$ss$ relative to the true specified vertical V$s$. Apart from the obvious reason that, once the interesting star image appears in the optical field of the telescope, the tracking system will cause it to be shifted to the null point N$n$, it can be readily shown that the star image may conceivably appear in the optical field in spite of the faulty orientation of the platform plane due to a tilt of both platform axes away from their specified orientation in combination with a proportionate platform azimuth rotation, all of which does not necessarily affect the setting of the prism relative to the interesting star. This is a case analogous to the situation arising from consideration of the dynamic vector in its relation to but a single star vector. (See for example FIGURE 3 in Division IV, Section $a$). The dynamic vertical or force vector associated with a single star vector can be rotated about this single star vector, (i.e., it can be rotated away from the unique position relative to the star which it is expected to occupy) without affecting the relative angle of inclination of these two vectors (viz. the dynamic vector may be rotated within the surface of a right circular cone whose principal axis is the associated star vector, the origin of both vectors being located at the apex of the cone). The platform of the automatic sextant, rigidly fixed at right angles to the optical axis of the single tracking telescope T4 or to the platform-vertical which is expected to be representative of this force vector, consequently may be rotated simultaneously about axes X3, X2 and X1 away from its uniquely specified position in analogous fashion, without disturbing the position of the prism relative to the tracked star. Hence, vertical V$ss$ of FIGURE 34, and with it the entire system represented in the elevation plane of FIGURE 34, could be rotated about the star vector or about ray IR in a similar manner without deflecting the star image from null point N$n$.

The true or uniquely specified dynamic vertical is established by one of the two lines of intersection between two simultaneous cone surfaces of the type just described. The second cone is formed by rotation of a second system about a second star vector, the apices of both cones virtually coinciding and the second optical system being mounted upon the same platform P$l$ at an optimum azimuth angle of 90 degrees rotated against the angle of the system of FIGURE 34 and adjusted in an analogous manner so that the image of the second star is also centered at null point N$n$, simultaneously with that of the first telescope. (Ambiguity between the two lines of intersection of cone surfaces is eliminated by the precomputed azimuth setting of the two cooperating telescopes. Without the latter, a third starline and intersecting cone is required to identify the correct line of intersection of the three cones. The case of two cones in tangency is excluded because it would, for instance, imply parallel oriented lines of sight of the two tracking telescopes and consequently result in interference between the two elevation tracking controls.)

Returning again to FIGURES 33, 34, 35 and 36, let it be assumed that at a given instant, one of the two required tracking telescopes, such as T4 in position "Pos. B" of FIGURE 33, has established the desired centering of the star image, but that the vertical, physically established therewith, does not actually coincide with the dynamic vertical V$s$ specified for that instant (the second telescope T1 in position "Pos. B" of FIGURE 33, correctly preset to its specified altitude and azimuth angles, having remained inoperative so far). According to the analysis just presented, an altitude and azimuth angle discrepancy must exist at the second telescope T1 if it is put into operation at that same instant since its physically established vertical, which rests in identical orientation relative to platform P$l$ and relative to space as that of telescope T4, falls inside or outside the above mentioned cone-surface associated with the second star vector. (The magnitude of error in the platform position, of course, must be taken to be small enough to allow the image of the second interesting star still to remain within the optical field of the second telescope.)

Let the above stated case of elevation error of the second telescope (which is, of course, applicable to both tracking telescopes) be represented by the broken-line portion of the drawing in FIGURE 34 for which the same computed star altitude angle of 40° against vertical V$s$ is assumed to apply at the above stated instant of observation, the system and point of observation of FIGURE 34 having been actually rotated 90 degrees against that which applied to the first telescope. (In order to simplify matters, the azimuth position of the prism relative to platform P$l$, is taken to represent that of prism P$r$1$x$ rather than that of prism P$r$1$y$ of FIGURE 33 or any other actually possible azimuth position.) The reflecting surface R$s$ of the broken line prism shows a preset 20° inclination angle against the pseudo-vertical V$o$, physically established by the incorrect orientation of the platform, which deviates from vertical V$ss$ by an arbitrary angle of 5°, vertical V$ss$ in the present example again being first taken to represent the correct specified vertical V$s$. As a consequence, objective lens A$pl$ and focal plane F$p$ with null point axis N$s$ and optical axis O$x$ likewise deviate from their specified solid-line positions, as indicated by their respective broken-line positions A$plo$, F$po$, N$o$ and O$xo$. (Line V$o$ against which the 20 degree inclination angle of the prism has been set, is normal to the platform in position P$lo$.) The entire telescope structure, thus, appears rotated in elevation through 5 degrees against the incident ray IR which maintains a 40 degree angle against the true dynamic vertical V$s$. Hence, in the broken-line example of prism setting, the angle of incidence I of the light from star S1$a$ increases to 40 degrees (against the 35 degrees of the solid line prism), but the elevation line of sight of the prism is directed at an angle of 20+20+5=45 degrees against vertical V$ss$ as marked by line L$sto$ above window O$b$. The resulting light path through the broken-line prism and aplantic objective lens A$plo$ (outgoing rays marked RL$o$) casts the star image away from null point axis N$o$ to a point N$o$1 (refraction and reflection angles not drawn to scale), causing a proportionate elevation error signal as explained with reference to FIGURE 33. This elevation correction signal tends to rotate the entire telescope structure into its solid line position (rotation of platform about axis X2 of FIGURE 33), and thereby to eliminate the deviation of vertical V*o* from vertical V*ss*.

It is quite evident at this point, that any such corrective action in elevation of the second telescope which involves rotation of platform P*l* about axis X2, will introduce elevation and azimuth errors in the first telescope, and that it is therefore impossible, in practice, to consider the isolated action of one tracking telescope without due regard to the action of the other. This is equally true for the isolated observation of corrective actions in azimuth or elevation of one single telescope. The analysis of isolated action given above has been chosen in an attempt to simplify a step-by-step presentation of the problems involved. In the case here illustrated and, generally speaking, in all cases which fall within the operational range of the optical system, interaction between both telescopes operates in the sense of cooperation in the common task of bringing the physically established vertical V*ss* into coincidence with the specified dynamic vertical V*s*. This statement bears further substantiation which can be taken up after a brief analysis of the optics of azimuth errors illustrated in FIGURES 35 and 36.

It is convenient to classify azimuth errors into two types, one type of azimuth error originating either from rotation of the platform about axis X3 away from its correct position (in which the conditions stipulated in FIGURES 35 and 36 for the line of sight L*st* and for incident rays IR are fulfilled), or from rotation of the telescope relative to the platform, i.e., about axis X4 away from its correct position. The other type of azimuth error originates from a sideways tilt of the prism away from its correct position, caused by rotation of the platform about the tilt axis (X1 or X2) upon which the tracking telescope under observation is located. The orientation of prism P*r* relative to the slant ray IR2 in FIGURE 35 can be visualized as representing both these deviations of the prism from its correct position relative to an interesting star: in the first case of error, the entire telescope structure including the prism has been rotated about axis X3 or about axis X4 (viz. about the optical axis O*x*) against rays IR in a sense so as to move the left side of the prism below the plane of the drawing sheet and the right side above this plane. If the prism is again viewed from the front as in FIGURE 35, rays IR which have remained virtually in a fixed position relative to the sextant, assume now the slant angle of rays IR2 relative to the prism surface I*s*. In the second case of error, the entire telescope structure has been tilted to the left against rays IR, the tilt axis here being assumed to be observed edgewise and located somewhere along optical axis O*x* between lens A*pl* and focal plane F*p*. It is seen that in both cases, skew rays IR2 suffer a parallel shift in the prism as if passing through a parallel-surfaced piece of glass of a thickness equal to the vertical distance in the prism between the point of incidence and the point of exit of ray IR2. Outgoing ray RL*o*1 shows a slant angle against plane P*l* through lens A*pl* which results in a deflection of the star image to the left of the null point axis N*s*1 onto some point N*o*2 here shown projected onto focal plane line F*p* but not necessarily located on null point axis N*s* of FIGURE 34. Since, in actuality, the above cited displacements of the prism from its correct azimuth position relative to the interesting star involve also changes in the elevation angle of the incident rays (i.e., result in displacements of the prism from its correct elevation position in which the star image is cast onto the elevation zero axis in the optical field, represented by N*s* in FIGURE 34), the point of incidence of slant ray RL*o*1 of FIGURE 35 upon plane F*p* will be located somewhere between the null point axes N*s* and N*s*1 (or between axes A*x*1 and A*x*2 of FIGURE 33), the azimuth error deflection following a curved path in all these cases. (Only if the elevation angle remains unchanged, does the azimuth error deflection follow a straight line.) In FIGURE 36, ray IR2 represents the first mentioned case of azimuth error (prism rotation about axis X3 and X4, outgoing ray RL*o*1 being actually directed downward to the left into the plane of the drawing sheet. In the second case of error (tilt of platform), the incident rays show the same direction as ray IR of FIGURE 36 but are similarly deflected due to the slant position of the prism relative to the ray.

From the standpoint of the isolated tracking action of a single telescope, it is important to recognize that both type of the above cited azimuth errors of prism position are corrected in the same manner by the resulting azimuth error signal, viz. through rotation of the platform about axis X3 or through rotation of the telescope (relative to the platform) about its optical axis. This is simply due to the reason that the tracking system of the single telescope does not recognize the difference between azimuth deviations caused by tilt or deviations caused by azimuth rotation of the prism. Any such azimuth correction does not affect the prevailing status of tilt of the platform about the axis upon which this single telescope is mounted, the other platform tilt axis being arbitrarily controlled by the elevation error signals of this same single telescope. It is quite evident therefore that since the single telescope is incapable of controlling the tilt of the platform about the very axis upon which it is mounted and since, at the other hand, this single telescope nevertheless can track its interesting star, no assurance whatsoever is given that the platform is oriented correctly even if the single telescope holds the interesting star image at the null point N*n*. (The same conclusions apply also to a single telescope mounted in the center of the platform, only one platform tilt axis, i.e., the elevation error correction axis of this telescope, being controllable.) In fact, if the platform orientation is not accidentally correct, both platform axes, X1 and X2, must be oriented wrongly when the single telescope is tracking, a condition which has been already stated previously and which can be readily verified by examining the earlier reference to the rotating dynamic vertical (rotation of dynamic vector about the star vector within the surface of a right circular cone). An attempt to demonstrate this case is given in FIGURE 35 where the star vector may be visualized as being represented by, say, the central incident ray IR, and where the entire telescope structure can be visualized as having been rotated and tilted from a zero tracking error alignment establishing vertical V*s* (here shown as a slant line whose upper end must be imagined to rise above the plane of the drawing sheet) into the zero tracking error alignment actually shown in the drawing which establishes vertical V*ss* within the elevation plane of the drawing. If the zero alignment which establishes vertical V*s* is the correct one, motion of the vertical V*s* into position V*ss* has followed a curved path (elevation angle of incident ray IR having remained unchanged), and the physically established vertical V*ss* has therefore been tilted away from vertical V*s* about two axes (= platform axes), one oriented parallel with, and the other oriented normal to the plane of the drawing sheet.

Thus, FIGURE 35 not only demonstrates the case of zero tracking error in azimuth despite the incorrect orientation of the platform axis in the plane of that drawing, but it also shows in conjunction with the elevation case of FIGURE 34 that whenever the physically established vertical V*ss* deviates from the orientation of the specified vertical V*s*, the platform must be incorrectly oriented about both its axes, X1 and X2.

Returning now once more to the previous illustrative example of prism setting in a condition of tracking in which the single telescope T4 of FIGURE 33 is assumed to be holding it's star-image at the nullpoint N*n* (telescope T1 inoperative) in spite of the incorrect orientation of the platform plane, it is clear, from the standpoint of the prism view of FIGURE 35 along, that this single telescope cannot recognize the positional error of the platform since the prism has been rotated and tilted into a position which causes the azimuth line of sight of the prism to be directed parallel with rays IR (zero tracking error). However, as soon as the second telescope T1 enters into play, correction of the positional error of the platform can be demonstrated to occur in the following manner (realizing all the while that in practice, the presence of a simultaneously operative second telescope does not permit this assumed condition ever to develop and that this type of hypothetical error has been merely selected because it offers a convenient means for tangible proof of the cooperative manner in which the two tracking telescopes correct errors in the position of the platform): Let the prism of FIGURE 35 represent telescope T4 on axis X2 of the platform (this axis being seen edgewise) and let the upper end of the specified vertical V$s$ point in a direction above the plane of the drawing sheet as previously assumed. Let vertical V$ss$ which has been physically established by the incorrect orientation of the tracking telescope T4, lie within the plane of the drawing sheet, let line P$l$ through aplanatic lens A$pl$ represent platform axis X1 and finally, let telescope T1 be mounted on the right sight of this axis, facing its star toward the left. (Compare with edgewise view of axis X2 in "pos. B" from direction of star S$x$2). The elevation error appearing in telescope T1 (already previously referred to) will tend to tilt axis X1 (line P$l$ in FIGURE 35) in a manner so as to tilt vertical V$ss$ towards alignment with vertical V$s$. The same tilting motion introduces an azimouth error in telescope T4 which produces platform rotation in a sense so as to rotate the prism of FIGURE 35 to the right above the plane of the drawing sheet, aiding the motion of vertical V$ss$ towards vertical V$s$. The tilting motion initiated by telescope T1 also affects the altitude setting of telescope T4, tending to increase the elevation setting and thus causing a platform tilt about axis X1 which raises the top portion of vertical V$ss$ above the plane of the drawnig sheet, again aiding the motion of this vertical towards vertical V$s$. Any azimuth errors injected into telescope T1 by this tilt about axis X1 as well as by rotation of the platform is independently corrected by rotation of telescope T1 about it's own optical axis, i.e., without any return "interference" upon the platform position or upon telescope T4. It can be seen that any incorrect elevation orientation of one platform axis is sensed and reacted upon by the telescope which is mounted on the other axis. One telescope therefore cannot "lock" on it's star unless the other telescope ceases to react upon it by reaction upon its own image signals. This can only occur when both telescopes are centered upon their stars, i.e., when the platform is oriented as specified by the elevation settings of the prisms. Hence, if in the above example, axis X1 has been tilted far enough to produce zero elevation error in telescope T1 and if the platform has been rotated far enough to reduce any further azimuth error of telescope T4 to zero; if the axis X2 has been tilted to take up the injected elevation errors of telescope T4 and if azimuth errors in telescope T1 are likewise eliminated, the physically established vertical V$ss$ will coincide with V$s$ and the platform will be oriented according to specifications.

The principles above expounded apply also to all cases wherein both prisms are rotated into an offset angle relative to their azimuth zero position upon platform P$l$, such as the orientation of prism P$rly$ in "Pos. B" of axis X1 in FIGURE 33. Such offset position does not alter the mounting of axis P$ra$ parallel with the platform plane. Tilting about the corresponding platform elevation axis, under these conditions, results in a parallel shift of the incident rays relative to the prism which introduce an insignificant azimuth rotation and does not cause any interference as long as the offset angles are kept within permissible limits.

Action of the above described tracking system is virtually instantaneous so that all angular changes in the elevation settings of both tracking telescopes, introduced by function signals from the playback unit, are compensated for at the moment they are carried out by the telescope altitude angle setting devices. The platform therefore remains constantly oriented in the plane specified through these function signals in accordance with a precomputed flight program, and the acceleration sensitive devices which are mounted in the specified plane of the platform, are able to constantly detect unwanted deviations in the orientation of the actually existing dynamic horizontal plane such as it is determined by the actual flight performance of the guided craft.

Concerning observation window O$b$ in FIGURE 34, it is shown in this drawing that this window merely causes a downward parallel shift of the light rays incident upon its outer surface (compare straight path of dotted ray IR4 with ray IR). This shift does not affect the altitude angle as exemplified by incident ray IR1 which strikes surface I$s$ of the solid-line prism in a direction parallel with, but at a location above that of ray IR and, nevertheless, is focused at N$s$ because it also forms a 40 degree angle against vertical V$ss$ and therefore follows a path parallel with that of the elevation line of sight of the solid-line prism. (See details concerning construction of observation window in Division V, Section $d$.)

The secondary window O$bs$ (FIGURE 1) which is omitted from the drawing of FIGURE 34, simply duplicates the optical effect of window O$b$, i.e., it produces a further parallel downward shift of incident rays upon surface I$s$, or, in other words, it raises the prism optically towards observation window O$b$. A detailed discussion of the secondary window can be found in reference No. 7 listed at the end of Division I. (See also end of Division V, Section $d$.)

As previously stated, the second tracking telescope is mounted on a platform azimuth axis normal to that of the first telescope (see FIG. 25), but its tracking orientation is not necessarily limited to a central elevation plane at right angles to that of the first telescope. Azimuth lines of sight of two cooperating telescopes are limited to certain maximum and minimum angles of intersection by mechanical stops provided in each telescope which confine the azimuth excursions of each telescope to a maximum angle of 60 degrees in both directions away from its zero azimuth position upon the respective platform axis. The presence of the observation window and other limiting factors bound the elevation line of sight of each telescope to an angular range of 55 degrees between a maximum altitude of 5 degrees and a minimum altitude of 60 degrees, measured against the normal to the observation window O$b$.

Section ($c$)—Prism Resetting Counter

Each of the four telescopes of the automatic sextant is provided with a resetting device which permits automatic reorientation of the prism altitude angle (i.e., of the elevation angle of the prism as referred to the plane of the supporting platform between two subsequent tracking periods and which can also be conveniently used prior to the flight for setting the prism to the initial altitude angle of its first tracking period.

As stated on prior occasions, the two cooperating telescopes which are selected for the initial tracking period (i.e., one telescope of each platform axis of FIGURE 25) must be correctly oriented in azimuth and elevation (altitude) so that they point at their respective stars when the craft reaches the departure point for the ACN flight. This means, first of all, that the platform upon which the telescopes are mounted, must be sustained as closely as possible within the horizontal plane specified for the departure point and that it must also be properly oriented in azimuth so that the individual angular azimuth and elevation settings of the telescopes relative to the platform which have been precomputed for the departure point and adjusted prior to the flight, become valid at the departure point. Only if these conditions are fulfilled, and if the craft which carries the automatic sextant is "on schedule," can the images of the programmed stars be expected to appear within the optical fields of the telescopes and thus permit the star tracking servo systems to begin functioning properly.

It will be remembered also that the altitude function pulses from the magnetic tape playback unit are calculated to change the initial altitude settings of the prisms in precisely proportioned steps, and it is obvious therefore that all prism altitude settings which follow the original setting of a prism during one and the same tracking period, depend for their accuracy on the correct initial setting of the prism. While such an initial altitude setting can be physically established prior to the take-off for the first tracking period of the telescope, it is not possible manually to pre-set the same prism for additional initial settings to become effective at the onset of a second or third tracking period. These changes in the altitude angle of the prism must be correctly carried out during the intervening time between two consecutive tracking periods in which the particular telescope is inoperative, and they must be initiated and executed automatically. Any mechanism, therefore, which is to perform changes in the setting of the prism altitude angle by automatic remote control, must have the properties of a counter, capable of memorizing the algebraic sum of all angular changes in addition to or subtraction from an initial value of the prism altitude angle, and it must perform these changes in the proper sense of direction and in the proper resetting sequence.

A mechanical prism altitude angle resetting counter which provides these facilities under control of an overall sequencing program will be described presently. It is understood that any prism altitude angle resetting function must, in general, be accompanied by a corresponding prism azimuth resetting function. This latter function is carried out simultaneouly by separate electrical means which will be shown in detail in FIGURE 69 of Division V, Section i, 3. The platform does not require any resetting procedure after a star changeover since it remains constantly under control of two tracking telescopes, its orientation in the specified plane as well as in azimuth at the conclusion of any particular tracking period being virtually coincident with the one specified for the immediately following period. This will be more fully understood after examination of the text accompanying FIGURE 63 in Division V, Section h. (Star changeovers normally become effective for one telescope at a time. It is feasible, however, to execute star changeovers on two telescopes simultaneously and to reest the elevation angles on two prisms at the same time, as explained in Division V, Section i, 2 with reference to FIGURE 67.)

A preferred form of mechanical prism resetting counter will now be described in detail with reference to FIGURES 37 through 49. In the first drawing (FIGURE 37), the entire resetting counter assembly is shown schematically in an enlarged perspective view taken in the general direction of arrows R$r$—R$r$ against the far side of housing 2H of the altitude angle generator of FIGURE 26 upon which this assembly is mounted, the drive axis $rca$ of FIGURE 37 being oriented parallel with lead screw axis L$a$ of FIGURE 26. Broken-away portions of the angle generator housing 2H are shown in the present drawing where numeral 2H$a$ represents the bottom plate and numeral 2H$b$ the top plate of that housing. A portion of the circular frame $lsh$ for the prism-and sine bar-loading spring assembly mentioned in Division V, Section a, is visible at the upper left of the drawing. The resetting counter consists essentially of a set of five counter units, mounted in cascade and supported between endplates $spa$ and $spb$ and on four individual circular frames $fr1$, $fr2$, $fr3$ and $fr4$, the frames being attached to baseplate B$p$ which is firmly bolted between endplates $spa$ and $spb$ (two bolts $bs$ on each endplate, only one on plate $spb$ visible). The entire supporting structure of these counter units is bolted to bottom plate 2H$a$ of housing 2H (two bolts, part of one being visible at $bH$). Each of the five counter units contains a drive pinion or shaft (not visible in the present figure), a numbered wheel $nw$ (i.e., $nw1$, $nw2$, $nw3$, $nw4$ and $nw5$, respectively) and two notched cams $nca$ and $ncb$ (i.e., $nca1$, $ncb1$, $nca2$ $ncb2$, $nca3$, $ncb3$, $nca4$, $ncb4$ and $nca5$, $ncb5$, respectively). The first of these five units (at the bottom of the set in FIGURE 37) is driven directly by the input drive shaft (for details refer to FIGURE 38), whereas the remaining four units are driven via planetary gear systems of a 10 to 1 ratio. The first counter unit and the first of the four planetary gear counter units will first be described in greater detail with reference to the drawing in FIGURE 38 which shows these two units on an enlarged scale in a cross sectional plane perpendicular to base plate B$p$, this sectional plane containing drive-axis $rca$ of FIGURE 37. All parts shown in FIGURE 38 which correspond to parts already shown in FIGURE 37, bear the identical designations as in FIGURE 37, bottom end plate $spa$ appearing to the right in FIGURE 38 with axis $rca$ oriented horizontally.

The three last planetary gear counter units to the left in FIGURE 38 are shown in profile view only and are summarily designated with numerals $pu2$, $pu3$ and $pu4$. They are essentially identical with the first planetary gear counter unit which has been summarily designated with numeral $pu1$. The first counter unit $du$ to the right of unit $pu1$ is carried by shaft $dr$ which operates as a drive pinion for the next following counter unit. The driving power is derived from the altitude angle drive motor M$o$ of FIGURE 27 via pinion $dp$, idler $id1$ and drive pinion $dp1$ as previously stated in Division V, Section a, the latter two of these gears being barely visible at the bottom of FIGURE 37. Drive pinion $dp1$ is mounted on the main drive shaft $dr$ as sketched in the present figure.

Drive shaft $dr$ rotates on front bearings $br$ ("front"= right side of FIGURE 38) in end-plate $spa$ and carries a sleeve bearing $slb$ which is firmly anchored on shaft $dr$ by pin $bp$. A floating bearing $brf1$, referred to further below, serves as the rear support for parts $slb$ and $dr$. Numbered wheel $nw1$ whose central portion extends into a cylindrical shoulder $r1$, is mounted on an outside thread of sleeve bearing $slb$, pins or reams $re$ locking the numbered wheel securely onto part $slb$. Two circular cams $nca1$ and $ncb1$ whose diameter equals that of numbered wheel $nw1$, ride on shoulder $r1$. Cams $nca1$ and $ncb1$ normally are firmly clamped together between spring $2sp$ and nut $nu$, the spring shouldering against numbered wheel $nw1$, and locknut $nu$ riding on the outside thread of the larger-diameter portion of sleeve bearing $slb$. A lock-washer $lw$ is fitted between the adjoining surfaces of cam wheels $nca1$ and $ncb1$. The manner in which the two cam wheels can be rotated relative to numbered wheel $nw1$ and thereafter locked securely into place so as to prevent slippage on shoulder $r1$ will be explained with reference to the detail drawings in FIGURES 39, 40, 41 and 42. FIGURE 40 shows a plan view of lock-washer $lw$. Key $ky$ on the inner rim of the washer serves to lock the washer onto the supporting shoulder $r1$ of FIGURE 38 so that the washer cannot slip sideways nor rotate relative to the shoulder. The two lock ears $le$ on the outer rim of the washer enter into two diametrically opposite cavities $2ca$ which are formed by a face-to-face position of two grooves, each groove belonging to a set of grooves on one of the two adjoining cam wheels $nca1$ and $ncb1$. This can be seen clearly in the sketch of FIGURE 39 which shows broken-away portions of the assembled parts $nw1$, $2sp$, $ncb1$, $lw$, $nca1$, $nu$, $slb$ and $spa$ of FIGURE 38 in an enlarged schematic profile view. The adjoining surfaces of the two cams $nca1$ and $ncb1$ are shaped in the form of circular rims from each of which are cut ten equally spaced grooves which combine to form ten oval openings around the perimeter of these rims when the grooves of both cam wheels are lined up opposite each other. Lockwasher $lw$ which fits into the circular space inside the two adjoining rims, is mounted on shoulder $r1$ of FIGURE 38 in a position which places ears $le$ into alignment with any two chosen diametrically opposite numbers on wheel $nw1$. (Numerals reading from zero to 9). In the example of FIGURE 39, ear $le$ is lined up with numeral 3, the opposite ear $le$ (not visible) being consequently lined up with numeral 8. Lockwasher $lw$ may also be mounted so as to place ears $le$ opposite some intermediate point between two consecutive numerals of numbered wheel $nw1$. (See text below.) The diameter of washer $lw$ is smaller than that of the above mentioned circular rims; however, ears $le$ extend outward to the periphery of these rims. If the cams are aligned so that the grooves rest face-to-face over ears $le$, the remaining eight grooves on each cam, likewise, are aligned face-to-face with each other, and as in the present case, each cavity is further aligned with one of the ten numbers on wheel $nw1$.

The sketch in FIGURE 42 shows a plan view of circular spring $2sp$ of FIGURE 38, revealing two keys $ky1$ on the inner rim of the spring by which the latter is locked onto shoulder $r1$ of FIGURE 38. The enlarged profile view of this same spring $2sp$ in FIGURE 41 shows the undulations of the spring which cause pressure in the direction of arrow $2ar$ (i.e., to the right in FIGURE 38) when the spring is shouldered against wheel $nw1$, and thereby tend to push cam wheels $nca1$ and $ncb1$ away from numbered wheel $nw1$ in opposition to the pressure from locking nut $nu$. If nut $nu$ is firmly tightened against the spring pressure, spring $2sp$ flattens out as sketched in FIGURES 38 and 39, and cams $nca1$ and $ncb1$, in addition to being clamped fast between wheel $nw1$ and nut $nu$, are also securely locked on shoulder $r1$ via lock ears $le$. The purpose of locking the cams onto shoulder $r1$ will be explained further below. Loosening nut $nu$ provides a small amount of sideplay for the cam wheels which is in part taken up by counter-pressure from spring $2sp$ against the restraining hold of lock ears $le$. Reduced friction permits manual rotation (relative to wheel $nw1$) of one or the other cam with the help of an appropriate spanner which can be applied on holes $hl$ (FIGURE 39). If either one of the cams is rotated from the position shown in FIGURE 39, ears $le$ will be wedged against the grooves of the non-rotating cam. (This assumes that contact between nut $nu$ and cam $nca1$ is always maintained.) If cam $ncb1$ is rotated, ears $le$ will force this cam back against spring $2sp$ (not flattened) until the next pair of grooves allow the cam to slide again forward into full contact with the rim of cam $nca1$. If cam $nca1$ is rotated, cam $ncb1$ also will be forced back against spring $2sp$ as long as there is no clearance between cam $nca1$ and nut $nu$. In this case, cam $ncb1$ recedes under pressure from ears $le$ which are pushed sideways by the rotating cam until the next pair of grooves allow cam $ncb1$ to return to its previous position. Thus, each cam can be conveniently rotated in equal steps like a dial wheel which "snaps" into a recess each time the reference mark on the wheel reaches one of the equally spaced numbers on the dial. In the present case, each step represents an angular cam rotation against numbered wheel $nw1$, covering the distance or arc between two consecutive numbers on wheel $nw1$. Whatever the number and direction of rotational steps of either cam, the grooves will always be oriented face-to-face and re-combine to form cavities $2ca$ after each rotational step.

In the drawing of FIGURE 39, notch $no$ on cam $ncb1$ whose purpose will be explained below (see same notch $no$ in FIGURE 37) is shown aligned with numeral "4" on wheel $nw1$. It can be seen that since one of the grooves on the rim or shoulder of cam $ncb1$ is located opposite the central portion of this notch $no$, and since all the numbers on wheel $nw1$ and all the grooves are spaced by the same rotational angle, the center of notch $no$ must rest aligned with one of the numbers on wheel $nw1$ whenever the rotating cam wheel reaches one of the semi-locked positions previously described (see alignment line $lno$). This assumes alignment of ears $le$ of FIGURE 40 opposite two chosen numbers on wheel $nw1$ as in FIGURE 39. Should it become necessary to align notch $no$ with a pre-specified point between two consecutive numbers on wheel $nw1$, lockwasher $lw$ would have to be mounted on shoulder $r1$ with ears $le$ correspondingly displaced. (Such necessity may arise for reasons to be explained below.)

Returning to FIGURE 38, each of the three planetary counter units $pu1$, $pu2$ and $pu3$ following unit $du$, carries an individual short drive pinion $drp$ which constitutes the so-called sun pinion of the associated planetary gear system which forms part of the next following counter unit. Drive shaft $dr$ of the first counter unit $du$ forms the sun pinion of the first planetary gear system of unit $pu1$, thus acting directly as the input shaft for the second counter unit. (See rear portion $drs$ of shaft $dr$.) Sun pinion $drp$ at the output side of the second counter unit drives the planetary gear system of the third counter unit $pu2$, etc. "Output" shaft $odr$ of the last or fifth counter unit $pu4$ merely acts as a supporting shaft which revolves in bore $bo$ of endplate $spb$. The ensuing detailed description of the second counter unit $pu1$ essentially applies also to the remaining three units $pu2$, $pu3$ and $pu4$. The planetary gear system of each of these four counter units comprises, in addition to the sun pinion at its center, two planetary pinions $ppo$ and an outer ring gear $2ig$, also called internal gear. Ring $ir$ which carries internal gear $2ig$ on a ridge on its inside surface, fits into circular supporting frame $fr1$ to which it is firmly clamped by three bolts $bts$ (only one bolt seen in cross sectional view). In FIGURE 37 as well as the left portion of FIGURE 38, slot-shaped openings $btss$ in these supporting frames can be clearly seen. Bolts $bts$ are inserted through these slots $btss$ and fastened in threaded bores on ring $ir$, the slots admitting a limited amount of angular play for positional adjustments during mounting of the counter units. Frame $fr1$ serves to hold the entire counter unit $pu1$ in alignment along the drive shaft axis $rca$.

Each planetary pinion $ppo$ is composed of two concentric gear wheels $ppa$ and $ppb$ of different diameters which are combined to form a single unit, the larger diameter wheel being located in front of the smaller diameter wheel. These planetary pinions are rotatably mounted on shaft pins or reams $re1$ which not only support the pinions but also serve to lock numbered counter wheel $nw2$ onto sleeve bearing $slb1$, wheel $nw2$ being mounted onto the outside thread of bearing $slb1$. (See similar purpose of reams $re$ of the first counter unit $du$.) As will be shown presently, reams $re1$ also serve to transfer torque onto drive pinion $drp$. Sleeve bearing $slb1$ is keyed onto sun pinion $drp$ by pin $bp1$. Numbered wheel $nw2$ is essentially shaped like the previously described wheel $nw1$ of the first counter unit $du$. It carries two rotatable cam wheels $nca2$ and $ncb2$ on a shoulder $r2$. In the present case, the method of holding the cam wheels on shoulder $r2$ differs from that employed in the first counter unit. The cams are held in a semifixed position on shoulder $r2$ by being clamped between numbered wheel $nw2$ and shim $shi$, the latter shouldering against the disk-like forward portion of sleeve bearing $slb1$. The pressure on cams $nca2$ and $ncb2$ is determined by the rotational position of wheel $nw2$ on threaded sleeve $slb1$. This pressure is properly adjusted during mounting, such that the undulated spring $2sp1$ (same as spring $2sp$ of unit $du$) which is here between cams $nca2$ and $ncb2$, is flattened out, but allowing for a marginal pressure which permits either one of the cams to be rotated against numbered wheel *nw*2 if sufficient force is applied with a spanner. (See narrow notches *no*1 in FIGURE 37 which are used as leverage points for the spanner.) Reasons for this type of mounting will be given further below. The cams can be conveniently aligned with any one of the numbers on wheel *nw*2. The method of alignment is similar to that explained with reference to cams *nca*1 and *ncb*1 of FIGURE 39. However, rotation of the cams does not operate on the equal-step-system of the first counter unit. The wide notches *no* on the peripheral surface of each cam wheel (FIGURE 37) are therefore provided with a small central notch or mark *noc* (except those of unit *du*) which facilitates alignment with the wheel numbers. This central mark *noc* is not necessary in the case of unit *du* since the cams of the first counter unit *du* "snap" into their correct central positions. The purpose of providing wide notches *no* will be described presently.

A floating ring bearing *brf*1 fits into the circular forward opening of internal gear ring *ir*. It serves to support the rear portion of sleeve bearing *slb* of the first unit *du* and thus holds the load on shaft *dr* properly distributed. While the forward portion of sleeve bearing *slb* is directly carried by drive shaft *dr*, the same forward portion of sleeve bearing *slb*1 is supported within the back section of ring *ir*, and the partly visible floating ring bearing *brf*2 which rides in the forward section of the next following internal ring *ir* (not shown) serves as the back support for this bearing *slb*1.

Shaft *dr* (sun pinion of first planetary gear system) engages the larger diameter gearwheels *ppa* of planetary pinions *ppo*, and the smaller diameter gearwheels *ppb*, in turn, engage the teeth of internal ring 2*ig*. Thus, upon rotation of shaft *dr*, planetary pinions *ppo* are forced to travel along internal gear 2*ig*, and in doing this, revolve the entire assembly which is mounted on sleeve bearing *slb*1, including numbered wheel *nw*2, cams *nca*2, *ncb*2 and sun pinion *drp*. Pins *re*1, thus, also serve to transfer torque from shaft *dr* onto drive pinion *drp*. The rotational ratio between shaft *dr* and sun pinion *drp* is 10 to 1, viz. for ten rotations of the input shaft *dr* to planetary gear unit *pu*1, output pinion *drp* of this latter unit rotates once. Pinion *drp*, in turn, must rotate ten times in order to cause one full rotation of the sun pinion of counter unit *pu*2 etc. Since numbered wheel *nw*1 of the first counter unit *du* rotates at the rate of the main drive shaft *dr*, and since each numbered wheel *nw* bears numerals 0 to 9 (ten divisions) on its peripheral surface, the first counter unit is conveniently called the unit gear, and the next higher gears, successively identified by supporting frames *fr*1, *fr*2, *fr*3 and *fr*4, are designated as the ten's, the hundred's, thousand's and ten-thousand's gears, respectively. For a full rotation of the last numbered wheel *nw*5 (or the shaft *odr*), the input shaft *dr* of the unit gear must therefore rotate ten thousand times. Starting from a zero position in which numeral zero on each counterwheel *nw*1 to *nw*5 rests opposite a reference mark *ref* (FIGURE 37) on frames *fr*1 to *fr*4 and on endplate *spb*, respectively (mark on plate *spb* not visible in FIGURE 37), the maximum number which can be read against these reference marks amounts to 99999 which represent 9999.9 rotations of shaft *dr*.

Referring again to the general drawing of the resetting counter of FIGURE 37, a stop assembly illustrated separately on a greatly enlarged scale in the schematic drawing of FIGURE 45 and consisting essentially of fingered carriage *fc*, stop mount S*m* and lever 2*lv* (to be more fully described below) is detachably mounted on endplates *spa* and *spb* by two spring loaded retractable pins *rp*1 and *rp*2 which fit into corresponding bores *brp* in the end plates (only one visible). The pins are carried by the stop assembly in a manner shown more clearly in FIGURE 45 and are bent at right angles at their free inner ends so that they can be used as handles. By pressing these pin handles together against the tension of their loading springs, the pins are retracted from their bores and allow removal of the entire stop assembly. When mounted, the stop assembly can be shifted over a limited distance in both directions along its axis of support. (See free space between shoulder *sho* of portion 2*lv* of carriage *fc* and endplate *spb*.) A spring loaded plunger *plu*, held in sleeve *sle* which is attached to housing 2H of the altitude angle generator, bears against lever 2*lv*, tending to shift the entire stop assembly towards endplate *spa*, thereby affecting the position of portions of the stop assembly relative to components of the previously described counter units. The amount by which plunger *plu* is permitted to displace the stop assembly in this manner is controlled by shifting guide S*hg* and pin *pil*. Shifting guide S*hg* consists of a two-armed bracket (arms 2*a*1 and 2*a*2, the former being provided with a step *als* as shown) and guide spring *gsp*. As will be shown later, this spring *gsp* counteracts the pressure of plunger *plu* when the resetting counter rests in an initial position of readiness before the first step of actuation. The shifting guide assembly S*hg* is bolted onto endplate *spb* as indicated in the drawing. Pin *pil* is mounted on lever 2*lv* at an angle such that any vertical or "transverse" motion imparted on the stop assembly in a direction parallel with drive axis *rca* causes pin *pil* to move in the same direction within the space confined by bracket arms 2*a*1 and 2*a*2. Shifting guide S*hg* restricts this vertical motion of pin *pil* in a definite manner as will be described presently. A second pin *epi*, extending from the same lever 2*lv*, is engaged by spring loaded armature *ars* of counter solenoid *sol*. (Solenoid *sol* obscured from view in the present figure.) The location of these components relative to each other is illustrated in the partly broken-away phantom view of FIGURE 43, taken from the general direction of arrow ArA of FIGURE 37. All parts in the drawing of FIGURE 43 bear the same numerals as the corresponding parts in FIGURE 37. As long as solenoid *sol* remains inactive, spring *sps* holds armature *ars* in its extended or "off" position wherein pin *pil*, through the translatory action of pin *epi*, stays tilted against arm 2*a*2 of shifting guide *shg* as shown in the example of pin position given in FIGURE 37. In this "off" position of armature *ars*, the leverage applied on the entire stop assembly, lifts fingers *fi* (i.e., figners *fi*1, *fi*2, *fi*3 and *fi*4) of carriage *fc* and spring mounted stop *ssm* of stop mount *sm* clear from contact with any portion of the counter gear units.

Upon actuation of solenoid *sol*, the resulting angular displacement imparted on pin *epi* and on the stop assembly about the rotational axis of supporting pins *rp*1 and *rp*2 operates in the fashion of a hand brake which tends to lower fingers *fi* and stop *ssm* against the gear sequence of the counter and to pull these parts of the stop assembly into firm contact with the counter units. Each of the fingers *fi* is designed to act upon one or the other of cam wheels *nca* and *ncb* of one planet gear counter unit, finger *fi*1 acting on the ten's gear, finger *fi*2 on the hundreds gear, finger *fi*3 on the thousand's gear and finger *fi*4 on the ten thousand's gear. Spring mounted stop *ssm* acts on either one of the two cam wheels of the unit gear. Constructional details of stop mount *sm* which carries stop *ssm*, are shown in the previously cited enlarged drawing of the stop assembly in FIGURE 45 and will next be described in greater detail.

FIGURE 45 presents a preferred form of the stop assembly, detached from the resetting counter of FIGURE 37 and turned upside down so as to make visible portions of the assembly which are obscured from view in the general drawing of FIGURE 37. Parts previously mentioned bear the same numerals as in FIGURE 37. Stop mount *sm* carries a cover plate *csm* which is fitted onto the bottom side of the mount as shown in FIGURE 37. This plate *csm* is broken away in FIGURE 45 so that the construction of the spring mounted stop

*ssm* can be clearly seen. Mount *sm* is provided with a semi-circular slot *sci* which serves as a guide for spring *msp* whose ends are attached to pins which project from retainers *ret*, the retainers being properly curved so that they can be shouldered against the rounded ends of slot *sci* as shown in the drawing. The top wall of this guiding slot *sci* which faces the observer is composed of a flat semi-circular carriage *2cr* and of a narrow slide *sld*. Slide *sld* forms part of mount *sm* (see also FIGURE 37) whereas carriage *2cr* constitutes a separate part on whose re-enforced central section the previously mentioned stop or stop wedge *ssm* is mounted. Stop *ssm* is a crescent shaped steel disk with re-enforced points *es* as shown in the profile sketch of FIGURE 49. This stop wedge fits into slot *ot* of carriage *2cr* (FIGURE 45) and is held onto the carriage by pin *pn* which enters through hole *oh* of the stop wedge (FIGURE 49). Pin *pn* is shown in the profile view of carriage *2cr* sketched in FIGURE 47, as well as in the cross sectional view through stop mount *sm* of FIGURE 48 taken in a plane through the axis of pin *pn* as observed from the approximate direction of arrows TT—TT of FIGURE 45. Stop *ssm* fits loosely over this pin *pn*, but the pin is firmly held in carriage *2cr*. Thus, stop wedge *ssm* can be rotated against carriage *2cr* through a small angle, limited by edges *es* which are wider than slot *ot*. The sectional sketch of FIGURE 48 shows the manner in which carriage *2cr* is slidably held between cover plate *csm* and slide *sld* of mount *sm*. A slide shoe *crs*, forming an integral part of carriage *2cr*, fits over the face of slide *sld* as shown, entering the narrow slot between part *sm* and part *sld*. (See also FIGURE 37.) The contact surface of the slide shoe is adapted to the curvature of slide *sld*, and spring *msp* tends to press shoe *crs* into the narrow slot between slide *sld* and mount *sm* when cover plate *csm* is mounted on part *sm*. Both ends of the curved carriage *2cr* are provided with a wedge W*g* as illustrated in the profile sketch of FIGURE 47. One of these end wedges is also shown in the enlarged drawing of a broken away end portion of carriage *2cr* in FIGURE 46. When carriage *2cr* is fitted onto mount *sm*, these end wedges W*g* slide through openings *2op* in mount *sm* (FIGURE 45) into slots *2s* in the curved face of retainers *ret* as sketched in FIGURE 46. When pressure is applied against stop wedge *ssm* (FIGURE 45) in the direction of arrow *xp*, for example, the end wedge on the side of the applied pressure pushes retainer *ret* along guide-slot *sci*, compressing spring *msp* against the opposite retainer which is blocked against the rounded end of slot *sci*. End wedge W*g* on this compressed end of spring *msp* slides from the slot *2s* in the retainer and through opening *2op* in mount *sm*, receding by the same amount by which the end wedge at the pressure side advances into slot *sci*. The opposite occurs when pressure is applied against stop *ssm* in the direction of arrow *yp*. If mount *sm* is firmly supported (which is the case when the stop assembly of FIGURE 45 is mounted on the resetting counter and in operation, as will be shown below), carriage *2cr* with stop *ssm* is permitted to recede under pressure from either directions *xp* or *yp* and slide along rail or slide *sld*, coverplate *csm* preventing the rail shoe *crs* from slipping off its rail. Increased pressure will result in increased counter pressure from spring *msp*, the spring acting as an efficient two-way buffer for stop *ssm*.

The remainder of FIGURE 45 illustrates the detailed outline of fingered carriage section *fc* and lever section *2lv* of the stop assembly with appended parts *fi1*, *fi2*, *fi3*, *fi4*, *pil*, *epi*, *rp1* and *rp2* which have been already mentioned previously. Lever *2lv* does not riquire further comment. It is shaped to bridge end plate *spb* (FIGURES 37 and 43) and to hold pins *pil* and *epi* in the correct positions relative to shifting guide S*hg* (FIGURE 37) and solenoid armature *ars*, respectively. The contact faces of fingers *fi* can be seen to be slightly curved inward in adaptation to the outward curvature of the cam wheels *nca* and *ncb* of FIGURE 37 which they are to contact.

The body of fingered carriage *fc* contains a central longitudinal slot *cSl* and two recesses *rC1* and *rC2* and is provided with the necessary bores for insertion of pins *rp1* and *rp2*. The inward portions of these pins are bent at right angles, the bent pin ends extending from central slot *cSl* and constituting the handles previously mentioned with reference to FIGURE 37 by which the pins can be retracted against the tension of springs *rS1* and *rS2*. These springs occupy the respective recesses *rC1* and *rC2* and are slipped over the pins when the latter are inserted into their bores. The outward end of each spring is attached onto the pin whereas its inward end shoulders against the wall of the recess as demonstrated more clearly in the sketch of FIGURE 43. Spring pressure acts against the pin at the attached outer end of the spring, thus tending to push the pin outward against the retaining force of the pin handle which is stopped against the outer end of central slot *cSl*. The middle section of slot *cSl* is filled with plate *cCp* (visible in FIGURES 37 and 43 only) which limits the extent of pin retraction during removal of the stop assembly from the resetting counter.

In the drawing of the resetting counter of FIGURE 37, as well as in the phantom view of FIGURE 43, solenoid *sol* is disengaged, showing armature *ars* in an extended position in which fingers *fi* and stop *ssm* are lifted from any contact with the respective counter units. (In FIGURE 43, pin *pil* is assumed to occupy position *pil3*. Part *gB* on solenoid *sol* is a guiding brace for armature *ars*. Armature *ars* consists of the cylindrically shaped magnet proper which, in FIGURE 43, is seen held partly outside the solenoid housing by spring *sps*, and of a U-shaped extension which engages pin *epi* in the manner best shown in FIGURE 37). The stop assembly, while in this "off" position of FIGURES 37 and 43, is also shown to be shifted "downward" parallel to axis *rca* as far as it can go. This "downward" shift (or "transverse" shift with respect to the cams of the counter units) is produced by the stop assembly's own weight, aided by pressure of spring SP*p* (FIGURE 43) against plunger *plu*, the latter bearing against lever *2lv* as stated above. Spring SP*p* is anchored at the bottom (i.e., left side in FIGURE 43) of a bore in sleeve *sle* and rides on the extension shaft of plunger *plu*, pushing against the head of the plunger. Key *ke* is pressed through the shaft of plunger *plu* and slides into slot *slsl* in sleeve *sle* (FIGURE 37) when knob KN (staked onto the shaft) is properly rotated so as to align the key with the slot. Plunger *plu* can be held in a retracted position by first pulling knob KN until key *ke* is cleared from slot *slsl* and by then rotating the knob so that key *ke* shoulders against sleeve *sle*.

The range of downward shift of the stop assembly is limited to the extreme position shown in FIGURES 37 and 43 in which pin *pil* shoulders against the base of shifting guide S*hg*. This position is reached before key *ke* is stopped against the bottom of slot *slsl* and before the clearance between stop mount *sm* and the bottom end plate *spa* is taken up entirely. The extreme downward shift defines the exact position of the stop assembly along axis *rca* in which, upon actuation of solenoid *sol*, the second row of notched cams *nc* (counting downward in FIGURE 37) i.e., cams *nca1*, *nca2*, *nca3*, *nca4* and *nca5* are to be engaged by stop *ssm* of mount *sm* and by fingers *fi1* to *fi4* of carriage *fc*, respectively. Whenever solenoid *sol* is activated, pin *pil* moves towards arm *2a1* of shifting guide S*hg*. In the present case, the combination of pressure from spring SP*p* (FIGURE 43) and pull from armature *ars* compells pin *pil* to slide along the base of guide S*hg* from position *pil3* to position *pil4* where the pin is stopped by the action of top wedge *ssm* (see below) shortly before it reaches arm 2*ai*, the arm preventing excessive tilt.

An analogous alignment of stop *ssm* and fingers *fi* with the first (top) row of notched cams, i.e., with cams *ncb* of FIGURE 37 is attained through the stoppage of downward shift of the stop assembly by pin *pil* when the latter is wedged against step *als* of the shifting guide S*hg*. (See position *pil*2 of the pin in FIGURE 43).

Before the stop assembly can be made to occupy, in proper succession, the two above cited positions of alignment with the notched cams of the counter units, it is necessary to establish an initial or starting position, into which the assembly must be placed manually. In such an initial setting, with solenoid *sol* inoperative, pin *pil* is wedged against the outside surface of guide spring *gsp* and against arm 2*a*2 of shifting guide S*hg*. (See position *pil*1 of the pin in FIGURE 43). From the beforesaid, it becomes evident that as soon as solenoid *sol* is actuated for the first time, pin *pil*, due to the constantly prevailing pressure of spring SP*p* against plunger *plu* and due to the simultaneous pull from armature *ars*, will be forced along the outside surface of guide spring *gsp* and then slide over the free end of the spring onto step *als*. Since the pressure of spring SP*p* combined with the armature pull overrides the tension of spring *gsp*, the latter spring will be bent inward during this process, but due to the outward slant of this spring, pin *pil* is held back in position *pil*1 until solenoid *sol* is actuated for the first time. While pin *pil* is held in position *pil*1, fingers *fi* and stop wedge *ssm* of the stop assembly rest in alignment over the first row of notched cams next to the numbered wheels *nw* (i.e., over cams *ncb*). When pin *pil* is shifted from position *pil*1 to position *pil*2, the angular or rotational pull from armature *ars* successively brings fingers *fi* and stop *ssm* to bear against this first row of cams as will be shown more in detail below. This occurs before pin *pil* can be stopped by arm 2*a*1 of the shifting guide. It will be seen presently in which manner this latter phase of operation serves to bring about the desired first resetting of the counter. As soon as solenoid *sol* is released, pin *pil* slides from step *als* into position *pil*3 (spring *gsp* having resumed its normal slant position), this time being "pushed" by both, armature *ars* and plunger *plu*. Renewed actuation of solenoid *sol* merely "pulls" pin *pil* towards position *pil*4 in the recess behind step *als* as previously stated, the base of shifting guide S*hg* permitting no further downward shift of the stop assembly.

A further important feature to be considered before proceeding to the illustration of an entire operating cycle of the resetting counter is the "staggering" of the contact surfaces of fingers *fi*. When the stop assembly is mounted on the resetting counter as in FIGURE 37, fingers *fi* and stop wedge *ssm* rest in a centered position over an imaginary straight line through the reference marks *ref* on frames *fr*1 to *fr*4. (In the construction of the stop mount assembly illustrated in FIGURE 45, the position of stop *ssm* actually deviates somewhat from this straight line, as will be explained below.) In the direction of this straight line through reference marks *ref*, the contact faces of fingers *fi* do not occupy the same level above the counter units but are "staggered down" toward the high end of the resetting counter. In other words, if solenoid *sol* is actuated, the contact face of finger *fi*4 will bear against the peripheral surface of one of the cams *ncb*5 or *nca*5 while finger *fi*3 does not quite touch the surface of the corresponding cam *ncb*4 or *nca*4, and fingers *fi*2 and *fi*1 are proportionately further removed from their cams, stop wedge *ssm* maintaining the largest distance of clearance from its cams. Assuming now that the drive motor starts to rotate the gears of the resetting counter, it will become evident that as soon as the slowly rotating ten thousand's gear moves notch *no* (of the cam which is aligned with finger *fi*4 in the same horizontal plane) into a position opposite reference mark *ref* and underneath finger *fi*4, this finger will slide into the notch. However, the depth to which the finger can advance, is limited by finger *fi*3 of the thousand's gear which now rides against the perimeter of cam *ncb*4 or *nca*4 and bears the pressure, imparted on the stop assembly by the pull of armature *ars*, thereby holding the remaining fingers *fi* and stop *ssm* clear from contact with their cams. When one of the notches *no* of the thousand's gear moves similarly underneath finger *fi*3 and opposite reference mark *ref*, finger *fi*3 slides into this notch, permitting finger *fi*2 of the 100's gear to ride on its cam, provided finger *fi*4 has already entered its corresponding notch. The same occurs with the remaining ten's and unit's gears. The unit counter has the highest rotational speed. When stop *ssm* slides into one of the notches *no*, after all fingers *fi* have entered their respective notches, it is wedged into the notch to its full depth since this stop wedge *ssm* constitutes the last member of the staggered sequence, destined to bring the entire gear train to a quick stop. Buffer spring *msp* (FIGURE 45) damps the impact on the stop wedge, permitting a certain amount of end play which is aided by the fact that notch *no* is only partly filled by the stop wedge. Obviously, all counter units must be left free to rotate until the unit counter reaches the final digit. For this reason, all notches *no* are made considerable wider along the perimeter of the cams as the arc section occupied by the contact surface of each finger *fi*. The example of FIGURE 44 will further clarify this point.

FIGURE 44 is a simplified close up sketch of essential portions of the counter unit sequence located directly underneath the contact faces of the stop assembly of FIGURE 45. On the basis of this sketch, the best method of pre-setting the cams to the desired numerals can readily be evolved. In the example of this drawing, the first row of cams adjacent to numbered wheels *nw*, viz, cams *ncb*1, *ncb*2, *ncb*3, *ncb*4 and *ncb*5, have been used for setting the counter automatically to numeral 92179. (The second row of cams is not shown but can be used in identical fashion.) If the counter is assumed to operate from the null position in which all zeros of the respective counter wheels *nw* are lined up opposite the corresponding reference marks *ref*, it may be rotated counterclockwise (direction of arrow *yr*) or clockwise (direction of arrow *xr*) as viewed from drive pinion *dp*1 in FIGURE 37. In the first case, it counts "up," in the latter case, it counts "down" from zero. It can be anticipated from what has been said in the preceding paragraph that in either case, all notches *no* must be pre-set with the thought in mind that when the total pre-set number is reached by the counter and the gears come to a stop, they must all be centered opposite the reference marks *ref* as shown in the drawing. In the case of numeral 92179, digit 9 of the "unit" wheel *nw*1 will "lock" substantially in direct line opposite its reference mark *ref* on frame *fr*1 and, therefore, the notch of cam wheel *ncb*1 must be pre-set exactly opposite numeral 9 of wheel *nw*1. (See remarks regarding exception to this rule which follow below.) However, digits 7, 1, 2, 9 of the 10's, 100's, 1000's and 10000's units, respectively, do not assume such positions of alignment opposite their reference marks when the counter has "filled" to the desired number. These digits appear shifted away from their reference marks in the direction of arrow *yr* irrespective of the sense of rotation of the counter. What ever the desired number, and whether this number has been reached counting "up" from zero or counting "down" from zero, the degree of deviation from the reference mark obviously is always in proportion to the decimal relationship between two consecutive gear units as shown clearly in the example of numeral 92179 in the present figure. Consequently, in pre-setting the row of cams to a desired number, only the cam of the "unit" counter (i.e. the notch of this cam) can be set directly opposite the selected "unit" digit on numbered wheel *nw*1. All notches of the cams above the unit counter must be set at the correct distance to the right of the respective number on wheel *nw*. In the present adaptation of the resetting counter to the operational set-up of the automatic sextant, this can be accomplished simply by first "slewing" the counter to approximately the correct number (resetting mechanism disconnected, slewing clockwise or counterclockwise from zero; see wiring diagram of FIGURE 67), whereupon the drive motor is stopped and drive pinion *dp*1 manually rotated "down" or "up" until the exact number "unit" digit opposite reference mark *ref*) is reached. Hereafter, all cams *ncb* are lined up with their notches opposite reference marks *ref* which places the notches of the ten's, hundred's, thousand's and ten thousand's cams automatically at the correct lateral distance to the right of the respective digits on numbered wheels *nw*. Since this setting of the cams remains unaffected by subsequent operation of the resetting counter, the second row of cams *nca*1, *nca*2, *nca*3, *nca*4 and *nca*5 can now be pre-set in the same manner by first slewing the counter approximately to the correct second pre-set number, by then rotating the counter manually to the exact number and by finally aligning the notches of all cams *nca* with their reference marks *ref*. After this, it remains to slew the counter to a third number and to adjust this number manually to the exact desired amount. This last pre-set number constitutes the setting in which the counter proper remains until the initial operational phase of the altitude angle generator becomes effective as will be shown below.

Returning briefly to the drawing of FIGURE 45, it is seen that an imaginary straight line (IL) through the contact faces of fingers *fi*, when extended through the assembly of stop mount *sm*, does not cut through stop wedge *ssm* as would have to be expected if the procedure just outlined for the presetting of cams *nca*1 and *ncb*1 of the "unit" counter were to be followed. The design of stop mount *sm* shown in FIGURE 45 does not permit stop wedge *ssm* to be mounted in line with contact fingers *fi*. This does not alter the principles followed for presetting cams *nca*1 and *ncb*1. As stated in the analysis of the drawing of FIGURE 39, lockwasher *lw* may be mounted on shoulder *r*1 (FIGURE 38) with ears *le* displaced from a digit on wheel *nw*1 by an appropriate rotational angle. This displacement must correspond to the angular displacement of stop *ssm* away from line IL of FIGURE 45 and will also prevail as a displacement angle for notches *no* when cams *nca*1 and *ncb*1 are preset. Rotation of the cams to the correct position ahead of the desired numeral on wheel *nw*1 is aided by the fact that the cams "snap" into place when the right location is reached. When the counter is in operation, cams *nca*1 and *ncb*1, in this case will be stopped shortly before or after notches *no* occupy a position directly opposite reference mark *ref*, depending on whether the counter counts "up or "down" from zero. The digit on wheel *nw*1, in both cases, will nevertheless be stopped directly opposite the reference mark.

The resetting counter of FIGURE 37 is driven simultaneously with the prism altitude angle drive gears of the associated telescope as shown in FIGURE 27. Its zero position corresponds to the zero position of the prism and, therefore, represents the midrange of the line of sight of the prism, which is an angle of 47.5 degrees measured against the plane of the supporting platform (see line P*lp* in FIGURE 30). For any increase of the prism angle from 47.5°, the resetting counter "counts down" to that, after counting two units, it reads 99998; for any decrease from this midrange, it counts "up" so that after counting two units, it reads 00002. These deviation angles result either from "step" actions of the escapement gear (E*g*, FIGURE 27) during the tracking period of the associated telescope, or from "slewing" action during the resetting period. The resetting period falls into the time interval between two tracking periods in which the associated telescope is inoperative. The "step" action issues under control of the altitude function pulses from the playback tape. The "unit" function step defined in connection with FIGURE 30 does *not* correspond to a "unit" step of the counter; however, there is a definite relationship between the two. The resetting counter moves 5/4 units per function pulse, not counting the 8:5 reduction between gears *dp* and *dp*1 (FIGURE 27). The actual ratio of function pulse unit versus resetting counter unit therefore equals $$5/5 \times 5/4 = 25:32$$

In the example of a 60 degree altitude angle given at the end of Division IV, Section *c*, with reference to FIGURE 50, the resetting counter reads the 8710 function pulses "down" from zero, viz. $8710 \times 25/32 = 6804.68$ units from 00000 or 93195 (.32).

For any flight schedule in which two star change overs are contemplated for the particular telescope under observation, three initial settings of the associated resetting counter must be properly computed, each initial setting applying to the starting instant of one of the three tracking periods to which the telescope will be subjected. (Three tracking periods per telescope represents the maximum for which the resetting counter herein described is designed.) When the craft is ready for take-off, the resetting counter must be in a position which holds the prism at the initial elevation angle of the first tracking period. Therefore, in pre-setting the counter, the two rows of cams must first be adjusted to the readings which apply to the second and third tracking periods. This permits the previously explained procedure to be followed in which the counter is "slewed" to the respective readings and the cams are lined up with the reference marks. Hence, due to the established operational sequence of the stop assembly, described in detail above, the first row of cams adjacent to the numbered counter wheels must be used for the second tracking period, and the second row of cams must be used for the third tracking period. The counter pre-setting for the first tracking period comes last and thus can be left untouched until the craft arrives at the departure point. For all three initial settings, the circuits are manually switched to "slewing" (see text in Division V, Section *i*, 2 referring to the wiring diagram of FIGURE 67) so that the drive motor can run freely (i.e., without interference from the escapement gears) until the counter reaches the desired number.

After the counter has thus been set to the proper readings, the last preparatory step in this pre-setting procedure is to shift the stop assembly to its initial position *pil*1 of FIGURE 43 and to check all sequencing details in order to secure correct automatic operation of the counter. The related circuitry is described in connection with the wiring diagram of FIGURE 67 and will not be mentioned here. When the craft arrives at the departure point, a sequence signal from pulse channel IV (see Division IV, Section *d*) establishes the correct initial connections for operation of the telescope and resetting counter. During the initial phase of ACN-flight, the resetting counter merely records the changes in the prism elevation angle resulting from actions of the escapement gear under control of the altitude function signals. At the termination of the first tracking period for the telescope under observation, counter solenoid *sol* (FIGURE 43), "slewing" solenoid S*ls* and "stepping" solenoid S*s* (FIGURE 27) of this telescope will all be actuated simultaneously with drive motor M*o* so that the latter is free to "slew" the resetting counter into its new position, the stop assembly being pulled into its correct position *pil*2 against the first row of notched cams *ncb*. The "slewing" time during which drive motor M*o* remains actuated, is always calculated to outlast the time necessary for the stop assembly to lock the "unit's" cam and thus to stop the counter. The short period during which the motor remains under power after the resetting operation has been completed, has no appreciable heating effect on the stalled motor. Calculation of the approximate period of time needed for slewing the resetting counter (i.e., the prism) to a new setting involves also determination of the correct sense of rotation of the counter. Since the resetting to a new prism altitude angle takes place immediately after conclusion of the first tracking period of the telescope in question, and since the terminal angle of the prism at the moment of "abandonment" of the telescope is known beforehand, it can be ascertained at a glance whether the new initial altitude angle which is scheduled for the second tracking phase of the telescope, is larger or smaller than the previous terminal angle and how large the difference between the two angles is. Once this difference angle is computed, it merely remains to express it in terms of the equivalent numerical change required in the setting of the counter. The same applies to the angle change for the third tracking period.

At the moment of stoppage of motor M$o$ by a second sequence pulse at the end of the first slewing period, counter solenoid $sol$ also becomes inactive, permitting the stop assembly to shift into alignment with the second row of notched cams as previously explained. After this resetting action, the prism remains in a "latent" position of readiness for the next tracking period of the telescope which is followed by the same resetting sequence outlined above, the second row of notched cams $nca$ being now actuated upon by the stop assembly.

Section (d)—Observation Window

One feature of predominant importance in the design of the automatic sextant is the fact that it favors the use of the smallest allowable observation window which can be used in any currently known system of automatic celestial navigation. The importance of designing around the smallest possible window size lies in the realization that any system is limited in accuracy by the inherent errors in the observation window through which all stellar intelligence is received. The inherent optical error of the window is made manifest in two ways, both of which are a function of its size. Any refractive glass will be manufactured with a certain lack of homogeneity causing random variations in the index of refraction. A glass becomes less homogeneous as its diameter and thickness are increased, and observations made through it at low angles (where a large area of the glass is utilized) can easily result in errors too large for reasonably precise navigation. Errors due to temperature differentials on the two sides, curvature of the surfaces from sag due to dead weight or pressure differentials and other aerodynamic disturbances also increase with an increase in glass diameter. Problems of supersonic flight further complicate the ability to retain accuracy with large windows. Correcting the window optically becomes harder as the size increases; flattening and polishing becomes less exact per period of time. Manufacturing limitations and service conditions produce observation errors increasing with an increase in window size. Giving equal consideration to all these factors, a stellar navigator using the smallest glass such as the automatic sextant herein specified will be inherently more accurate.

The general case of making navigational observations through an observation window is illustrated in the drawing of FIGURE 51 in which the geometry of positional relationship between the specified apparent horizontal plane of platform P$l$ and the circular observation window O$b$ (the latter rigidly attached to the navigated craft) is represented as viewed in a vertical plane through the center of the window and through the center of rotation O$o$ of platform P$l$, the window in position O$_{w1}$ being assumed to occupy a plane parallel with that of platform P$l$ in its specified horizontal position, and positions O$_{w2}$ and O$_{w3}$ illustrating angles of window displacement relative to the indicated platform-plane resulting from extreme maneuvers of the craft. The following definitions apply to the various detailed features shown in this diagram:

O$o$ = Center of rotation of platform
B5 = Lowest apparent star altitude to be tracked by optical means
C5 = Angular apparent star altitude range
A5 = Angular limit due to maneuver of craft with respect to specified dynamic vertical. A5 may or may not equal A6.
$a$5 = Required aperture of optics
R$w$ = Required radius of window
$I_1$ = Angle of refraction
$a$P1, $a$P2, P$a$1, P$a$2 = Intersection of limiting rays incident on planes normal to line of sight which intersect surface of optics at $a$P2 or P$a$2, respectively.
D5 = Height of observation window above O$o$.
E5 = Highest apparent star altitude to be tracked by optical means.
$a$R$c$ = Clearance radius required = D5
$\theta$5 = Minimum star altitude with respect to observation window.
$\phi$5 = Maximum star altitude with respect to observation window.
$t$5 = Thickness of observation window.
R$p$1 R$p$2, R$pa$1, R$pa$2 = Radii of $a$P1, $a$P2, P$a$1 and P$a$2 in moving about center of rotation of the platform.
C$ro$ = Optic center of rotation for various apparent star altitudes A study of the geometry of FIGURE 51 reveals that two principal factors determine the size of the observation window. One factor is the navigational criteria upon which the design is based and includes the following elements: The lowest star altitude to be observed = B5; the angular range of observations = C5 required to include sufficient interesting stars to permit navigation at any geographic location at any time; the highest star altitude to be observed = E5; the angular range of observation = A5 and A6 beyod the limiting altitudes B5 and E5 required to permit steady and continuous tracking as the craft maneuvers about the reference platform fixed in inertial space; the minimum and maximum angle of observation through the window = $\theta$5 and $\phi$5 due to an extreme maneuver at an extreme altitude setting; and the aperture = $a$5 of the optical means required to gather light from a sufficient amount of interesting stars within the range C5 for the star tracking servo system. The other factor controlling window size is the design arrangement as it determines the elements of clearance radius $a$R$c$ and consesequently, height D5 of the observation window above the center of rotation O$o$ of the platform; refraction angle of the glass I$_1$; the glass thickness $t$5; the location of the optics that determines $a$P1, $a$P2, R$p$1 and R$p$2; and the location of the center C$ro$ about which the optics rotate to track through range C5 that determines P$a$1, P$a$2, R$pa$1 and R$pa$2.

For any given values of A5, A6, B5, E5 and $a$5 which establish the navigational criteria, the minimum window size will be determined either by window radius R$w$ required to permit observation at the low angle $\theta$5, or by window radius R$w$1 required to permit observation at the high angle $\phi$5. In the general case, it can be seen that R$w$ is likely to be the critical dimension because it is a function of $\theta$5. $\theta$5 = B5 − A6, and since any navigational criteria would tend to specify smallest practical values for B5 to obtain largest observational range and largest values of A6 for maximum freedom on maneuver, the angle $\theta$5 will be small. But if $\theta$5 = 0, R$w$ = ∞. Therefore $\theta$5 must be significant and A6 < B5. The very fact that R$w$ increases so rapidly with small decreases in $\theta$5 at low angles indicates that R$w$ will control the selection of $\theta$5 and consequently affect the selection of A6 and B5. Also, for any established value of $\theta$5, there will be one position for $aP1$ where $Rw$ will be smaller than for any other position for $aP1$. $Rw1$ will not be the critical dimension unless either $\phi 5$ becomes a small acute angle or $Rpa2$ becomes too large, or some undesirable conditions of the two in combination exist. $\phi 5$ cannot be a small angle unless excessively large limits for maneuver are specified. $\phi 5$ is restricted to large angles (independent of maneuver considerations) by the fact that there is a limit to how closely the apparent zenith can be approached. (It is obvious that no azimuth information could be made available if at the beginning of any given tracking period a navigation star were to be located at the apparent zenith.)

Where
$$\phi 5 = 180° - (E5 + A5)$$
$$E5 = B5 + C5 < 90°$$
$$\phi 5 = 180° - (A5 + B5 + C5)$$

Adequate celestial navigation under satisfactory conditions of maneuver can be performed at any position on or over the surface of the earth and at any time where $$A5 + B5 + C5 < 90°$$

Therefore $Rw1$ will not be critical due to $\phi 5$. It will be shown that $Rpa2$ can be controlled in the design. Thus, $Rw$ will determine minimum window size. For a condition of minimum $Rw$ it is apparent that the design arrangement for given navigational criteria must be such as to provide an optical means for the platform which will provide optimum locations for points $aP1$ and $Pa2$.

The geometry establishing the optimum position of $aP1$ and $Pa2$ is shown in FIGURES 52 and 53 in which the same numerals and essentially the same methods of representation are employed as in FIGURE 51. It can be seen from FIGURE 52 that $Rw$ will vary with the location of $aP1$ with respect to the center of rotation of the platform $Oo$ at a radius $Rp1$. For any given distance $D5$, $$Rw - r5 = \frac{D5 - b5}{\tan \theta 5}$$

Since $D5$, $\theta 5$ and $r5$ are fixed values, $Rw$ will have a minimum value where the dimension $b5$ has a maximum value. From this the following proposition may be stated:

(a) The design must be so arranged that the axis of the glass normal to its surface and passing through the center of rotation of the platform will lie between $aP1$ and the intersection of the ray through $aP1$ with the lower surface of the window.

$$\frac{b5}{\sin \beta 5} = \frac{Rp1}{\sin (90 - \theta 5)}$$

Since $Rp1$ and $\sin (90 - \theta 5)$ are constant, $b5$ will be maximum where $\sin \beta 5$ is maximum. Maximum $\sin \beta 5 = 1$ and $\beta 5 = 90°$.

But if
$$\beta 5 = 90°, \beta 5 + \alpha 5 = 90°$$
$$\gamma 5 + \alpha 5 = 90°$$
$$\theta 5 = \gamma 5$$

From this the following proposition may be stated:

(b) The design must be so arranged that $aP1$ will be located such that the ray through $aP1$ will be tangent to the circle of revolution of $aP1$ about the center of rotation of the platform $Oo$.

A further consideration of $Rw$ can be seen from the following relationship:

$$Rw \doteq 0 \text{ as } Rp1 \doteq D5$$

$Rp1$ is a function of design compactness around the smallest clearance sphere for the internal mechanism comprising the navigation instrument, and $D5$ can be made to approach the minimum attainable value of $Rp1$ as determined by the required aperture $a5$. See FIGURE 53.

$$Rp1 = \frac{D5}{\cos \theta 5} - a5$$
$$D5 = (Rp1 + a5) \cos \theta 5$$

From this condition the following proposition may be stated:

(c) The design must be so arranged as to provide the smallest permissible clearance sphere, and the optics so located that the upper limiting ray of the aperture (incident on the surface of the optics at P2) will be tangent at the circle of revolution of point $aP2$ about $Oo$ and just barely clearing the lower surface of the observation window when the optics are sighted at their lower angle $\theta 5$.

These three conditions $a$, $b$ and $c$ specify the design arrangement required to obtain the minimum-sized observation window (diameter $Rw$), as determined by the lowest angle of view with respect to the window (angle $\theta 5$).

Having established the optimum value for $Rw$ at a given value of $\theta 5$, the full amount of maneuver allowed, $A5 + A6$, or the limiting angle $\phi 5$, can be laid out to determine the allowable value for $Rpa2$ by using the established value for $Rw$. It can be seen by studying FIGURE 53 that for any given range of specified apparent star altitudes $C5$, the value for $A5 + A6$ will be maximum when the optic center $Cro$ is at $aP2$. In other words, the total sum of allowable maneuver rates and range for specified apparent star altitudes will be greatest when the pivot point for the optical means in setting off elevation angles is at or near the point of incidence of the upper limiting ray with the optics. If $Cro$ is located at or near $aP2$, the optical means must be some form of periscope in order to remain within the clearance sphere. Thus, a fourth proposition may be stated:

(d) The design of the optical means must be some form of periscope with the center of rotation for elevation settings at or near the point of tangency of the upper limiting ray (of lowest angle of view) at the circle of revolution of point $aP2$ about $Oo$.

The design of the automatic sextant is basically arranged so that it can comply with the above four propositions defining the requirements necessary to provide for the smallest size observation window and the smallest permissible clearance sphere within the navigation criteria established for the design.

*Secondary Observation Window*

The secondary window which is discussed in greater detail in reference No. 7 cited at the end of Division I, helps to compensate for the fact that the optic center or "entrance pupil" ($Cro$ in FIGURE 53) for certain design arrangements, cannot be placed at its optimum location near or at the surface of the clearance sphere and therefore requires a larger size observation window $Ob$ than the minimum size otherwise permissible. With the secondary window, this minimum permissible size of the main observation window can, in these cases, be maintained since the secondary window raises the prism, i.e., the "entrance pupil," optically towards the main observation window as previously stated. (See end of Division V, Section b.) The secondary window is also useful as a (transparent) counterweight for balancing the gimballed platform assembly, i.e., for maintaining the center of gravity of the platform at the center of rotation $Oo$ of FIGURE 51.

*Section (e)—Bubble Turret Assembly*

In the general simplified schematic of FIGURE 25, the bubble turret has been represented as a plate $BT$ which carries bubble units $Bl$ and is pivoted upon the center of platform $Pl$ in a plane parallel with the latter. In a preferred form of actual execution, the entire bubble turret assembly, including turret azimuth drive motor T*dr* (FIGURE 25), turret selsyn T*s* and the gears associated therewith as well as a small transformer (not shown), is mounted on a baseplate which, in turn, rests firmly on a supporting plate P*l*, the latter being attached onto frame P*lf* of the platform assembly as shown in FIGURE 24. As briefly stated in Division III, this supporting plate can be conveniently selected to physically represent platform P*l* because it lies in a plane normal to the optical axes of the telescopes and parallel with a plane containing the acceleration-sensitive devices to be discussed further below, besides being oriented nearly in the same plane which contains also the two gimbal axes X1 and X2.

FIGURE 55 shows an exploded view of the entire bubble turret assembly from which supporting plate P*l*, the transformer referred to above (see numeral T*ra*8 in FIGURE 59), all wire connections and other details have been omitted in order to simplify the presentation. Bar BT*b* is firmly bolted to baseplate BT*p* via posts BT*po* (designation BT*po* includes nuts, washers, etc., which do not require description) in a diagonal position across the central portion of the baseplate. The actual bubble turret is pivoted in the space between bar BT*b* and baseplate BT*p*. A separate simplified cross-sectional sketch of the bubble turret proper given in FIGURE 56 shows bearings *b*BT in bar BT*b* and baseplate BT*p* between which the bubble turret proper is pivoted. Essentially, the bubble turret proper can be said to consist of pivoted gear G5 and of a cylindrical support *cy*S mounted thereon, which bears a pivoted top-plate or endplate *e*P solidly united therewith, the endplate carrying four bubble units B*l* (only two shown) in a manner described below in greater detail with reference to FIGURE 57. This bubble turret is so oriented as to be effectively rotatable about axis X3 of the sextant or of paltform P*l*, the axis through the pivots of parts G5 and *e*P being held normal to the plane of the supporting plate P*l*. The automatic sextant is mounted with axis X3 passing preferably through the vicinity of the center of gravity of the craft to be navigated, and the bubble units B*l* proper occupy a common horizontal plane parallel with the plane of supporting plate *pl*, at a vertical level effectively coincident with the plane of axes X1 and X2. This arrangement assures a symmetrical orientation of the bubble unit pairs about the point of intersection of axes X1, X2 and X3 irrespective of platform positions relative to the craft.

Returning to FIGURE 55, gear G5 is driven by turret drive motor T*dr* through pinion *dp*5 and a number of intermediary gears G4. Parts of motor T*dr* and its mounting assembly, shown in the drawing under the common numeral T*dr*, are self-explanatory and will not be described. The same applies to turret selsyn T*s*, whose associated output gears G3 are also connected to the turret gear G5. The functional purpose of the drive motor T*dr* and selsyn T*s* and the circuit lay-outs for these parts will be explained with reference to FIGURES 25 and 59. (See next following Section *f*).

Each bubble unit B*l* is attached to a separate oblong mounting plate M*p* which is shaped like a flat sugar loaf and mounted lengthwise along (and below) one of the outer partly receeding edges of plate *e*P as shown in the assembly view of FIGURE 55. The base end of each mounting plate M*p* is bolted to endplate *e*P by two bolts *bt*5 whereas each of the opposite ends of these mounting plates M*p* is suspended on a leveling screw *lSc* which penetrates through both, plate *e*P and plate M*p*. The sectional sketch in FIGURE 57 through a single bubble unit mount and bubble unit proper shows that the spacing between mounting plate M*p* and endplate *e*P, maintained at bolts *bt*5 by washers W*s*5 at the left side of the sketch (viz. at the base end of mounting plate M*p*), can be taken up in discreet portions at the opposite (i.e., right) end of plate M*p* by adjustment of leveling screw *lSc*. Bubble unit B1 can thereby be leveled relative to endplate *e*P or plate P*l* during calibrating procedures.

The bubble units B*l* proper may be of varied construction, as outlined in detail in references No. 10 and 11 listed at the end of Division I. In the execution presented in the sectional sketch of FIGURE 57, the bubble unit is essentially composed of two sealed textelite blocks T*x*1 and T*x*2, held together between clamping plates CP by means of two rows of screws not shown in the drawing. (Front halves of textelite blocks T*x* partly broken away.) The lower textelite block, designated as case assembly T*x*2, contains bubble chamber *bch*, partly filled with a magnesium nitrate solution which can be inserted into the chamber through a duct sealed by filler plug *fP*. The space inside the chamber not filled with this solution constitutes bubble *b*B. A single terminal *tr*3 protrudes from the bottom of case T*x*2 which is internally connected to lower electrode E*d*3, the latter extending over the entire bottom surface of bubble chamber *bch*. The upper textelite block, designated as cap assembly T*x*1, carries two terminals T*r*1 and T*r*2, fastened to mounting plate M*p*, which are internally connected to two upper electrodes E*d*1 and E*d*2, respectively. These latter electrodes are embedded in textelite which also fills the space between the electrodes; the lower surfaces of the electrodes are the only portions thereof exposed to contact with the liquid in chamber *bch*. Electrodes E*d*1 and E*d*2 and their textelite embedding protrude from the lower surface of cap assembly T*x*1 and fit into the slot-shaped top portion of bubble chamber *bch* of the lower case T*x*2. A rubber ring "O"*r* around the upper electrodes serves as a seal. The contact faces of electrodes E*d*1 and E*d*2 as well as the textelite surface between the electrodes are concave in a direction normal to the plane of the drawing. A groove is thereby provided along which bubble *b*B travels if displaced from its central position shown in the sketch, chamber *bch* being only as wide as the bubble.

A circular plate *cp*5 (FIGURE 55) is fastened to the top of endplate *e*P, carrying flat contact strips *br*5 in a special friction-reducing arrangement. One of these strips is shown in FIGURE 58 in a greatly enlarged cross-sectional elevation view through the center of circular plate *cp*5 (parts of this plate broken away). Contact button *cbr*5, preferably made of platinum iridium, rests against its corresponding slip ring (not shown) in the face of a similar circular plate *cp*6 (FIGURE 55) which is attached to the central lower surface of bar BT*b*, the slip rings facing downward in FIGURE 55. Electrical connections (not shown) to and from the four bubble units are carried over this slip ring- and contact strip-arrangement. Seven of the eight contact strips *br*5 shown correspond to lines *l*B1, *l*B2, *l*B3, *l*B4, *lat*, *lot* and *gr*5 in the wiring diagram of FIGURE 59.

A mirror M*i*, supported on bar BT*b* in a position centered on axis X3 of the sextant and facing windows O*bs* and O*b* of FIGURE 24, serves as a vertical reference for an observer looking through the windows when the automatic sextant is fully assembled and mounted.

Section (*f*)—Bubble Turret Azimuth Drive

Rotation of the bubble turret BT of FIGURES 55 and 56 about axis X3 of the automatic sextant (designation BT applying to the entire bubble turret assembly as well as to the bubble turret proper) is independently controlled by the servo system sketched in simplified form in FIGURES 25 and 59. This turret-drive control system can be briefly explained by first establishing a reference position for all parts involved. Let the bubble-turret, represented as circle BT in FIGURE 59, be rotated into the position suggested in the drawing in which axis X1 of platform P*l* (FIGURE 25) passes centrally through the bubble unit pair B*l*1 and B*l*3 which is wired to deliver lateral acceleration error signals into line *lat*, and in which axis X2 of the platform passes correspondingly through the centers of bubble units B$l$2 and B$l$4 wired to provide longitudinal acceleration error signals in line 1*ot*. (In order to avoid 180 degree-ambiguity, let it be further specified that bubble unit B$l$1 with the grounded electrode E$d$3 be turned towards the same end of axis X1 upon which telescope T1 is mounted.) This is the zero reference position of the bubble turret relative to the platform established for the turret control system, the "arm" of axis X1 which carries telescope T1 constituting the zero-reference axis upon the platform.

Turret control selsyn T$s$ of FIGURES 59 and 25 constitutes the receiving portion of a simple self-synchronous remote-control system whose transmitter or selsyn generator T$ts$ (designated as "Tracking Selsyn" or "Specified Course Selsyn Transmitter") is located in the master controller switchboard unit MC$s$ of FIGURE 66. (See part T$tsd$.) In the present system, a second selsyn generator T$lv$, designated as "Leveling Selsyn" or "Holding Selsyn" and located in the same unit MC$s$ of FIGURE 66 (but not visible in that figure), is employed exclusively during portions of the pre-celestial phase of flight as explained in greater detail in Division V, Section $h$. The rotor shaft R$or$ of turret control selsyn (receiver) T$s$ (FIGURES 59 and 55), through action of the associated servo system, will always tend to align itself in a position relative to selsyn stator $st$T which corresponds to the position of rotor shaft R$o$T or rotor shaft R$ol$ relative to the selsyn generator stators $st$T$t$ or $st$l$v$ of units T$ts$ and T$lv$, respectively. As shown in FIGURE 55, the turret drive gear G5 is connected to the output gears G4 of drive-motor T$dr$ as well as to selsyn rotor gears G3. For the bubble turret reference position above specified, there is a corresponding reference position for rotor shaft R$o$T of selsyn generator T$ts$ relative to its fixed stator $st$T$t$ which constitutes the zero position of the selsyn system. The gear dimensions are so designed, and all operational parts are so aligned that for a given angular rotation of shaft R$o$T away from its zero position, bubble turret BT will be turned from its reference position by the same angular amount. As is commonly known, any asymmetry between the rotor positions in selsyn generator T$ts$ and control transformer T$s$ will produce an error signal in line SS which feeds from the windings of rotor R$or$ to servo amplifier S$va$ where the error signal causes an amplified control voltage to appear in line SS$a$ which connects to turret drive motor T$dr$ (FIGURES 59 and 25). The sense of this control voltage is such as to drive the motor in a direction opposite to the sense of direction of discrepancy between the rotor positions, and its magnitude is proportional to the amount of positional difference between the rotors. Turret drive motor T$dr$ being geared to both, bubble turret BT and control selsyn T$s$, will thus rotate turret BT and rotor shaft R$or$ until the error signal in line SS is reduced to zero at which time rotors R$or$ and R$o$T rest again in alignment and turret BT remains in its new position, remotely determined by the setting of rotor shaft R$o$T relative to its zero reference positions. The same applies to settings of rotor shaft R$ol$ if selsyn generator T$lv$ is switched into the servo system.

Rotor R$ol$ of selsyn generator T$lv$ is locked permanently in its zero-reference position which acts to hold bubble turret BT in its reference position of alignment with platform axes X1 and X2 when switch SBT connects the holding or leveling selsyn T$lv$ into the servo system. (For details, see Division V, Section $h$.) This takes place during the so called "command guidance" phase of the pre-celestial flight which will be discussed in Division VI.

At the onset of the so-called "star acquisition" phase (end portion of the command guidance phase; see Division VI), remote control over the bubble turret azimuth position is switched from selsyn generator T$lv$ to selsyn generator T$ts$ by action of sequence switch SSW2 (over two-position relay R$ly$ and switch SBT) through a sequence pulse in line SQ1 from playback unit F$d$. As shown in the present drawing (FIGURE 59), the same sequence pulse also actuates switch SAP which connects the bubble error signals from lines 1$at$ and 1$ot$ either to lines G$a$ or to lines APc, in the present case to lines APc (via a pre-amplifier not shown in the drawing). During the pre-celestial flight prior to this star-acquisition period, when switch SAP connects to lines G$a$, these latter lines feed the bubble "leveling" signals to gimbal axes torquers $tm$1 and T$m$2 of FIGURE 25. (Ssee Division V, Section $h$.) After switch-over to lines APc at the onset of the star acquisition phase, the bubble accelerations error signals are ready to be supplied to the automatic flight control system AFC of the craft but remain disconnected from the latter for the duration of this star acquisition period. At the onset of the "Supervised Celestial Navigation" phose (SCN-phase) which follows the star acquisition phase and precedes the ACN or midcourse-phase of flight, the same sequence pulse from playback F$d$ which initiates the SCN-phase, advances sequence switch SSW4 to a new "patch" which grounds a 28 V.D.C. source through relay R$ly$1 thereby closing switch SFC. This switch stays closed for the remainder of the automatic flight. The bubble acceleration error signals, therefore, are connected to the craft's automatic flight control system from the beginning of the SCN-phase of flight. The sequence pulse which turns switch SAP from lines G$a$ to lines APc also changes the bubble turret power supply from a 60 cycle source (for gimbal axes torque control) to a 400 cycle source (for automatic flight control) via line SQ1 and sequence switch SSW1. During these same periods, i.e., throughout the star acquisition, SCN- and ACN-phase of flight, the bubble turret azimuth remains under control of selsyn generator T$ts$. The azimuth position impose on the bubble turret at the instant of switch-over to selsyn generator T$ts$ (i.e., rotation of the turret into alignment with the trajectory; see Division V, Section $h$) is maintained virtually unchanged during the star acquisition—and SCN-phases. When the ACN-flight begins, the two-way ratchet drive R$a$ of FIGURE 59 (to be described below) which is geared to rotor R$o$T of selsyn generator T$ts$, begins to enter into play. This ratchet drive is actuated by function pulses from playback unit F$d$ (lines F$pl$) which are switched either to solenoid S$n$l or to solenoid S$n$2 by sequence switch SSW3, the latter being controlled through sequence pulses from the same playback unit F$d$ (line SQ2.) Lines SQ1 and SQ2 of FIGURE 59 are actually a single output line from the sequence pulse channel of unit F$d$ to the patchboard unit of master controller MC, as suggested by line SQ in FIGURE 25.) In the simplified schematic of FIGURE 59, dial T$tsd$ of the master panel MC$s$ of FIGURE 66 is shown mounted on the same shaft extension of rotor R$o$T as ratchet wheels RW10 and RW20. In FIGURE 25, the same ratchet drive R$a$ with associated units S$n$1, S$n$2, RW10, RW20 is illustratively represented as a single drive unit R$a$. Parts S$n$1, S$n$2, RW10 and RW20 in FIGURE 59 correspond to parts S$n$8$a$, S$n$8$b$, RW1 and RW2, respectively, of FIGURE 60, described below.

It is evident that since the bubble turret is mounted upon platform P$l$ which, in turn, rotates with yoke Y about axis X3 in pivotal support P$v$ (FIGURE 25), the actual azimuth position of bubble turret BT is the combined result of both, platform and bubble turret-rotation about axis X3. For any configuration of azimuth angles in the setting of bubble turret BT relative to the supporting platform P$l$, this dependence of turret-azimuth on the platform azimuth position must therefore be duly recognzied as explained in the text accompanying FIGURE 63 (Division V, Section $h$) which is devoted to azimuth presetting procedures for platform P$l$ and bubble turret BT. The text in the next following Section $g$ refers to additional details in FIGURE 59.

The above mentioned ratchet drive R$a$ of FIGURE 59 (the same type of drive being also employed to actuate function pulse counters *fpc*1 and *fpc*2 of master controller panel MC*s* of FIGURE 66), will now be briefly described with reference to FIGURES 60, 61 and 62. In FIGURE 60, shaft S*h*8 represents the shaft extension of rotor R*o*T of FIGURE 59 (or the input shaft to one of the counters *fpc*1 or *fpc*2 of FIGURE 66, or any other shaft to be driven by this ratchet system). Shaft *sh*8 can be seen to carry two ratchet wheels RW1 and RW2, two brackets B*r*8*a* and B*r*8*b* and a star wheel S*t*8. Wheels RW1, RW2 and S*t*8 are firmly mounted on the shaft, whereas brackets B*r*8*a* and B*r*8*b* are freely rotatable about the shaft. In the diagram, the length of shaft *sh*8 is greatly exaggerated, and the wheels and brackets mounted on it are shown in an expanded position along the shaft in order to present a clearer view of all essential operational parts. Thus, for example, ratchet wheel RW1, in actuality, is closely adjoining bracket B*r*8*a*, and ratchet wheel RW2 is close to bracket B*r*8*b* and the latter also close to bracket B*r*8*a*. About the mid-portion of bracket B*r*8*a*, link LK8*a* is attached which joins the bracket with plunger P*l*8*a* of solenoid S*n*8*a*, helical spring HS1 holding plunger P*l*8*a* in its protruded position shown in the diagram when solenoid S*n*8*a* is not energized. (The solenoid is here actuated by electrical pulses.) The free end of bracket B*r*8*a* carries pawl P*w*8*a*, rotatable on the bracket and located in the same vertical area which is occupied by ratchet wheel RW1 and by a pin p*n*8*a*, the latter extending from mount M*t*8*a* which is fixed to a supporting structure (not shown) which also supports shaft *sh*8. The vertical portion of mount M*t*8*a* lies also in the same vertical area as wheel RW1. Shaft *pi*8*a*, in actuality, is but a short pin upon which pawl P*w*8*a* is mounted, the pawl and all parts which lie in the same vertical plane therewith being mounted close to bracket B*r*8*a*, as mentioned before. A spring load on pawl P*w*8*a* (spring not shown) tilts the pawl against pin p*n*8*a*, and the edge of the pawl facing the pin acts as a cam which controls the rotary motion of the pawl when solenoid S*n*8*a* is energized. During the initial portion of retraction of plunger P*l*8*a* into solenoid S*n*8*a*, pawl P*w*8*a* is pulled from pin p*n*8*a* and simultaneously rotated into contact with ratchet wheel RW1. Further retraction of plunger P*l*8*a* causes the pawl to engage a tooth of ratchet wheel RW1 and to rotate the wheel until the pawl locks against the stop-surface (vertical portion) of support M*t*8*a*. This is shown more clearly in the sketches of FIGURES 61 and 62 in which the identical part numbers are used as in FIGURE 60, FIGURE 61 illustrating the pawl-position before actuation of the solenoid and FIGURE 62 presenting the pawl in its wedged position during actuation of the solenoid, both drawings showing the assembly associated with solenoid S*n*8*a* of FIGURE 60 in the approximate direction of arrow *ar*8. Stoppage of pawl P*w*8*a* against the vertical portion of mount M*t*8*a* and de-energizing of solenoid S*n*8*a* after passage of the solenoid-actuating pulse are essentially coincident. The pawl returns to its original position as plunger P*l*8*a* is released (viz. pulled from solenoid S*n*8*a* by pressure from spring HS1) and remains in readiness for the next solenoid action. The amount of incremental rotation of shaft *sh*8 resulting from this pulsed solenoid action and the dimensions of the teeth of star wheel S*t*8 are such that after each pulse, detent *dt*8 which is held against star wheel S*t*8 by tension from spring HS3 (bracket B*r*8*c* supported by same means which support shaft *sh*8 and mounts M*t*8*a*, M*t*8*b*) will slide into the next recess between two adjacent teeth of the wheel, thus preventing the shaft from "creeping" during the de-energized periods of the solenoid when the pawl does not engage the ratchet wheel.

The action of solenoid S*n*8*b* and ratchet wheel RW2 with associated parts P*l*8*b*, HS2, LK8*b* B*r*8*b*, *pi*8*b*, P*w*8*b*, *pn*8*b* and M*t*8*b* is identical with that just described for solenoid S*n*8*a*, wheel RW1 and associated parts, except that it causes rotation of shaft *sh*8 in the opposite direction. The combined action of stop mount M*t*8*a* (or M*t*8*b*) and star wheel S*t*8 serves to hold shaft *sh*8 in proper rotary alignment so that, for example, in the case of the ratchet drives of counters *fpc*1 and *fpc*2 of FIGURE 66, exactly one unit is added to or subtracted from the number indicated in the counter whenever a pulse has been fed to solenoid S*n*8*a* or solenoid S*n*8*b*.

In the case of the application of this ratchet drive system to the bubble turret azimuth drive, each actuation of solenoid S*n*8*a* or S*n*8*b* is designed to cause a measured rotation of rotor R*o*T of FIGURE 59 (clockwise or counterclockwise) which is translated into an incremental azimuth rotation of the bubble turret of one half degree through the servo system described in this section. (See also Division V, Section *h*.)

*Section (g)—Acceleration Error Detection by Bubble Units*

The bubble units whose physical appearance and location has been described with reference to FIGURES 55, 56 and 57 operate as accelerometers which detect deviations of the horizontal plane observed aboard the navigated craft from the specified horizontal plane established aboard the craft by the orientation of platform P*l* of FIGURE 25 as summarily outlined in the introductory section of this specification. A more detailed analysis of the conditions under which such deviations are sensed by the bubble units will now be given in connection with FIGURE 59 after a brief explanation of the circuitry constituting the acceleration error signal pick-off system shown in the same figure.

Each pair of opposite bubble units B*l*1, B*l*3 and B*l*2, B*l*4, on turret BT is connected as a bridge circuit which provides zero current flow in lines *lat* or *lot* when the corresponding bridge is balanced, i.e., when each of the two resistance paths of the respective parallel bridge arms represented by the liquids on both sides of the bubbles in two opposite bubble units (such as R1, R3 and R2, R4 for units B*l*1 and B*l*3, respectively) is equal. Such a balanced condition exists in one bridge when bubble *b*B of FIGURE 57 is centered between the three electrodes E*d*1, E*d*2 and E*d*3 in two opposite units B*l*. (Electrodes E*d*1, E*d*2 and E*d*3 are identified in FIGURE 59 for one single unit B*l* only. Portions of the liquid which partly fills bubble chamber *bch* of FIGURE 57 between one of the upper electrodes and the bottom electrode on each side of bubble *b*B are represented in FIGURE 57 by resistances R1, R3 and R2, R4 for units B*l*1 and B*l*2, respectively.) Thus, if a 400 cycle power source from each of the secondaries *sec*1 and *sec*2 of transformer T*ra* 8 is connected in parallel across the terminal posts T*r*1 and T*r*2 (FIGURE 57) of each pair of bubble units, respectively (such as *sec*1 across R1, R3 and R2, R4 of bubble units B*l*1 and B*l*3, parts T*r*1 connecting to electrodes E*d*1, and parts T*r*2 to electrodes E*d*2 in each unit), and if bubbles *b*B are centered between the electrodes as in FIGURE 57, no output signal will appear in lines *lat* or *lot*. An unbalance of this bridge system is caused either by tilting the supporting platform P*l* (FIGURE 25) from its horizontal position of equilibrium within the stationary gimbal system, or by holding the platform virtually fixed in this horizontal position of equilibrium while subjecting the supporting gimbal system to acceleration forces which act unidirectionally on two opposite bubble units or by a combination of said platform tilt and translational platform-acceleration via acceleration of the supporting gimbal system in which the resulting bubble deflections do not cancel each other. Such an unbalance will produce a 400 cycle output signal in line *lat* and/or line *lot*, each line being connected across one bridge combination. Sense and magnitude of this output signal becomes a function of the direction and magnitude of tilt or resultant accelerating force which causes the unbalance. Under the condition of level flight at constant altitude stipulated for the system of automatic celestial navigation herein specified, the sum total of only those accelerating forces need be considered which act in the horizontal plane of the bubble units. According to the reasoning submitted in Division V, Section *e*, this plane is represented by platform P*l* of FIGURE 25 which carries the four telescopes. In this plane, the resultant vector of acceleration forces can be divided into components acting parallel with and components acting normal to the direction of motion of the craft in flight. Thus, if axis X1 through bubble turret BT in FIGURE 59 were to represent the direction of motion of the guided craft (i.e., if turret BT were lined up in its zero reference position relative to platform P*l*, and if the arm of platform axis X1 upon which telescope T1 is mounted were to point in the direction of motion of the craft), a longitudinal error signal would be originated in line *lot* from bubble units B*l*2 and B*l*4 whenever acceleration forces acted in a direction parallel with axis X1 so as to "unbalance" the bubbles of these units from their central positions of equilibrium. Correspondingly, acceleration forces normal to axis X1 would produce lateral error signals in line *lat* from bubble units B*l*2 and B*l*4 if they acted in a manner such as to unbalance the bubbles in these units. Any rotational acceleration forces, however, which act around axis X3 of the platform (FIGURE 25) which is also the rotational axis BT*o* of bubble turret BT in FIGURE 59, and upon which the center of gravity of the craft is located, will not produce output signals in lines *lat* or *lot* since the bubbles in two opposite bubble units, under these conditions, are deflected by equal and opposite amounts so that the resulting unbalance signals are concelled out. (It can be seen in the drawing that the bubble units are so interconnected that unbalance-signals from two opposite units add together if both bubbles are deflected in the same direction, and cancel out if the bubbles are deflected in opposite directions.)

Assume now that a craft carrying the automatic sextant is grounded at a location U and that platform P*l* and bubble turret BT are duly leveled so that under the prevailing local acceleration forces (gravity, coriolis, etc., which permanently affect the local vertical), the bubbles are "balanced" in their central positions and the error output in lines *lat* and *lot* is zero.

Assume, next, that the same craft flies over location U at constant altitude and speed, passing through this location at a specified time and velocity and in a specified direction. Let bubble turret BT be correctly aligned in azimuth so that the axis through bubble units B*l*1 and B*l*3 is parallel with, and the axis through bubble units B*l*2 and B*l*4 orthogonal to the trajector. (For information on the azimuth orientation of the bubble turret relative to platform P*l* see text in the next following section.) By hypothetical manual leveling means, the platform with the bubble turret, during this passage, is further assumed to be "titled" or inclined against the now prevailing acceleration (coriolis) forces in such a fashion that the bubbles return to their central positions and the error signals in lines *lat* and *lot* are reduced to zero. The normal to the platform in this "balanced" position uniquely identifies the dynamic vertical for this instant of passage of the craft over location U under the specified conditions of flight.

Ostensibly, if the dynamic vertical can be computed beforehand for this specific instant and condition of flight, and if platform P*l* can be held fixed in a plane normal to this dynamic vertical at the same instant, any deviations from the prescribed flight conditions must become manifest in a deflection of the bubbles from their balanced central positions since the unique status of acceleration which identifies this dynamic vertical, no longer prevails. This is illustrated in the sketch of FIGURE 54 where position P*sp* of platform P*l* is determined by the specified dynamic vertical V*s*, normal to the plane of platform P*l* in position P*sp*. The specified dynamic vertical is here represented as a "caged" plumb bob V*s* which must be visualized as a rigid structure holding the platform in this prescribed position. In actuality, this specified vertical is established by the two optical axes of the two adjacent telescopes, mounted on the platform, which track their selected stars at the given instant, as explained in detail with reference to FIGURES 34, 35 and 36. The platform rests in the computed horizontal position P*sp* only:

(1) If both telescopes are tracking (centered on) their respective stars, (2) If at the specified instant, the computed star altitude angles, viz. the elevation angles of the lines of sight of the prisms, are correctly laid-off against the platform and, (3) If the azimuth separation of the lines of sight of the prisms amounts to at least 45 degrees (possibly 90 degrees). One unit of each bubble unit pair of FIGURE 59 is drawn in FIGURE 54 as a simple level B*l*3 and B*l*4 resting against platform P*l* which is held in the specified plane P*sp*, the platform as well as the bubble turret occupying the same assumed azimuth position relative to each other and relative to the trajectory T*r* (see arrow T*r* in FIGURE 54) as in FIGURE 59. Bubbles *b*B3 and *b*B4 can be seen in deflected positions which indicates that the craft, at the instant of observation, does not perform in the prescribed manner. The actual acceleration forces acting on the craft are such that if platform P*l* were held in position P*so*, bubbles *b*B3 and *b*B4 would remain balanced centrally. In other words: A plumb bob V*o* suspended in the craft above the platform would be directed orthogonal to plane P*so* while the star tracking telescopes hold the computed plumb bob direction V*s* perpendicular to plane P*sp*. The difference between the specified plumb bob direction V*s* and the actually observed direction V*o* can be resolved into two horizontal components of deflection, shown as vectors $\overline{V}la$ and $\overline{V}lo$, the latter component being oriented parallel with the direction of motion of the craft, and the former component oriented parallel with line *n*T*r* normal to the trajectory or direction of motion. The bubble deflections appearing in the plane P*sp* resolve the total plumb bob error V*t* in this very manner, i.e., they physically express the acceleration error components (=the difference between specified and observed accelerations) along axes T*r* and *n*T*r* which become effective in the plane P*sp* of platform P*l* at the given instant of observation. For illustrative purposes, these deflections are exaggerated in the present drawing. The equivalent of components $\overline{V}lo$ and $\overline{V}la$ constitute the error pick-off signals which appear in lines *lot* and *lat* of FIGURE 59 whenever the craft deviates from its scheduled behavior during the ACN flight. These signals are converted into appropriate thrust and rudder acceleration commands which act to reduce the acceleration errors to zero and thus to bring the position of plumb bob V*o* of FIGURE 54 into coincidence with vertical V*s*. Note that only the differences of acceleration forces enter into play as propulsion and steering control means. The conversion of these bubble error signals into useful acceleration control signals and a recommended overall automatic flight control system will be briefly explained in Division VII.

*Section (h)—Azimuth Positioning of Platform and Bubble Turret (Including Pre-Celestial Orientation and General Principles)*

At the moment of the craft's arrival at the departure point, the platform and telescopes of the automatic sextant must be so oriented that the images of the chosen stars appear within the optical fields of the two particular telescopes which have been selected for the respective initial star tracking periods. The same applies to subsequent star change-over points where the telescope which is scheduled to pick up a new star must be properly aimed at this new star at the instant of star change-over. The presence of a prominent star image in the optical field of each telescope generates useful control voltages in the respective star tracking servo systems which operate to level out the platform assembly (platform attitude control) and to rotate this assembly as well as one of the tracking telescopes into their correct azimuth positions such that the star image in each telescope moves onto the null point of its optical field. (Consult Division V, Section *b*.) It is to be noted that these tracking operations do not have any effect whatsoever on the elevation setting of the prisms relative to the platform. This applies also to the azimuth setting of the "locked" telescope (i.e., to the azimuth setting of telescope T2 or T4 relative to platform P*l*). When both telescopes are centered on their stars, the optical axes of these telescopes represent the specified dynamic vertical whose physical orientation is determined by the instantaneous angles between the lines of sight of the tracking telescopes and the optical axes of these telescopes, the lines of sight of the prisms, when extended into space, establishing the desired "coincidence" with the starlines when the prisms are in their zero-error tracking positions. For each tracking period, the initial values of these star elevation angles are set into the pre- and re-setting mechanisms of the telescopes prior to the scheduled flight. Subsequent values of these angles are constantly readjusted during each tracking period by the altitude function pulses from the playback unit. (Azimuth setting and control discussed further below.)

Aside from the necessity to maneuver the craft into its correct initial position and motion at the specified arrival time of the departure point, assurance must be given that all above stated conditions are established at the correct specified time and location. The initial settings for the departure point require special attention in that they must not be allowed to be rendered useless by maneuvers during the pre-celestial phase of flight. More specifically, this means that since no starline is available during this non-tracking period, control over the platform position must be exerted by other than celestial guidance methods. Once the telescopes are tracking their stars, i.e., are holding the star images in the null points of the optical fields, the extension of the line of sight of each prism virtually becomes the star vector $\bar{A}^*$ of FIGURE 7, its orientation fixed in space for the duration of the tracking period, against which the total force vector $\bar{F}$ of FIGURE 7, represented by the optical axis of each telescope, forms an angle of varying magnitude. As stated before, the computed initial value of this angle which is pre-set into the prism-altitude drive prior to the flight, is corrected during the tracking period by the incremental altitude function pulses from the playback unit, and the position of the platform is thereby constantly adjusted to its specified horizontal level. The projection of the star vector or starline onto the plane of the platform successively marks the direction of the azimuth or bearing line of the tracked star upon the platform. The initial azimuth angle of this starline projection, referred to the prime-star and measured against the meridian through the magnetic poles, is also pre-set into the system by appropriate azimuth orientation of the platform and telescope relative to the trajectory (to be discussed below). In the present system, this azimuth angle is constantly corrected by the tracking action of the telescopes during a particular tracking period.

A close approximation to the specified platform orientation is achieved during the preliminary, non-celestial flight-period by the platform leveling system described below. (See also Division VI on "Initial Guidance.") During this pre-celestial phase of flight, the conditions are such that the leveled platform, i.e., the normal thereto, serves as an index which "validates" the pre-set altitude angles of the first two tracking telescopes by holding their lines of sight at the approximately correct spacial elevation angle of the corresponding starlines. At the same time, the leveled platform is "slaved" into the correct initial azimuth position by a flux-valve (see below). This preliminary method of platform positioning assures that the star images fall within the optical fields of the telescopes as the craft approaches the departure point. (See "star acquisition" period in Division VI.)

Platform-leveling control during pre-celestial flight (i.e., during the major portion of the "command guidance" period; see Division VI) is exercised by the bubble unbalance signals in line *lat* and *lot* of FIGURE 59 which are switched (switch SAP) to the torquing motors of gimbal axes X1 X2, respectively, while bubble turret BT is held in the fixed alignment with platform axes X1 and X2 shown in that same figure (through action of the "holding" selsyn transmitter T*lv*). (See also FIGURE 25 and Division V, Section *f*.)

Azimuth control of the platform during pre-celestial flight, i.e., during the first portion of the "command guidance" period exclusive of the "star acquisition" period, is maintained by the following preferred method: Platform axis X2 (=gimbal or yoke axis X2) is "slaved" into alignment with the pelorus- or azimuth-line of the prime-star (or with an azimuth line which forms a predetermined angle with the latter) through flux-valve F*v* and the associated differential selsyn system illustrated schematically in the lower right hand portion of FIGURE 25. Flux valve F*v*, differential selsyn generator D*sg* and the servo system composed of selsyn control transformer S*m*, servo signal amplifier S*vy* and yoke azimuth drive motor Y*m* constitute a well known self-synchronous remote control system through which the azimuth position of yoke Y in pivot unit P*v* (=rotation of the entire platform assembly about axis X3) is regulated when switch *s*Y is turned to position *prc* in the drawing. Stator S*gst* of flux valve F*v* and stator S*mst* of selsyn control transformer S*m* are mounted on the craft in identical (fixed) alignment relative to the craft's centerline. Flux valve F*v* acts as a selsyn transmitter or generator whose rotor is represented by the horizontal components of the earth's magnetic field cutting through the stator windings. (Coil E*x* is supplied by an exciting current, such as 400 cycles A.C.) This imaginary rotor, i.e., its field axis, thus, constantly assumes the direction of flow of the earth's magnetic field, virtually indicating the direction of the magnetic North pole in the northern hemisphere. Rotor S*mr* of selsyn control transformer S*m* as well as drive motor Y*m*, for illustrative purposes, are both shown geared to the axis X3-shaft P*s* of yoke Y. In actuality, only drive motor Y*m* is geared to shaft P*s*, gear *cp*L being fixed to shaft P*s* and gear *dg* fixed to the armature shaft of the drive motor, as illustrated in FIGURE 24. The rotor windings S*mr* of selsyn transformer S*m* are directly mounted alongside shaft P*s*, stator S*mst* being fixed to the pivotal support P*v* which surrounds shaft P*s*. (See FIGURE 24.) The latter thus constitutes the rotor of selsyn S*m*, and the azimuth position of gimbal axis X2 of yoke Y, and with it that of axis X2 of platform P*l*, can therefore be taken to represent the rotor field axis of selsyn S*m*. According to a basic selsyn transformer principle which applies to this type of control systems, no voltage appears in rotor windings S*mr* if the axes of the stator and rotor fields of selsyn S*m* rest in alignment with each other. An error voltage will be induced in the rotor windings S*mr* if these fields are misaligned, magnitude and sense of this voltage depending on the magnitude and sense of discrepancy in the orientation of these fields. The field position in stator S*mst* depends on the relative position of rotors and stators in flux valve F*v* and differential selsyn generator D*sg*. If the craft is heading North (magnetic) and yoke Y is aligned with the centerline of the craft, with differential selsyn D*sg* likewise in zero alignment, no error voltage appears in rotor S*mr* because the resultant field in stator S*mst* is also aligned parallel with the centerline of the craft. Whenever the craft deviates from its northerly heading, the field in stator S*mst* deviates accordingly, inducing an error voltage into rotor S*mr*. This error voltage is fed to the signal amplifier S*vy* which causes motor Y*m* to rotate shaft P*s* until platform axis X2 resumes the position of alignment with the imaginary rotor of flux valve F*v*. Thus, axis X2 of platform P*l* is "slaved" into constant agreement with the direction of the magnetic meridian, provided rotor D*rt* of the differential selsyn generator D*sg* remains in zero alignment relative to stator D*st*. However, if through rotation of knob K*c* (see knob K*c* and index K*a* in FIGURE 66 of the master controller panel) rotor D*rt* is angularly displaced from this position of alignment, an equal and opposite displacement angle will be introduced in the azimuth position of platform axis X2 relative to its north-south direction. Thus, if knob K*c* turns rotor D*rt* counter-clockwise through an angle of, say, 90° against stator D*st*, platform axis X2 rotates 90° clockwise into an east-westerly direction, irrespective of the heading of the craft. If telescope T2, for example, is fixed in its zero azimuth position relative to axis X2 and has previously "faced" the magnetic North, it will now point East and will be held in this position by action of the flux valve without regard to pre-celestial maneuvering of the craft. (Index K*a* of heading indicator HI in FIGURE 26 shows the actual yoke position on the dial. If index K*a* is rotated by knob K*c* so as to point North on the dial, rotor D*rt* of differential selsyn D*sg* rests in zero alignment with stator D*st* and yoke Y is oriented in a north-southerly direction with telescope T2 facing North. Clockwise rotation of index K*a* actually rotates rotor D*rt* counterclockwise against stator D*st* and therefore also rotates the yoke clockwise.) If the magnetic bearing of the primestar is 90° at the departure point, and if telescope T2 is selected to track this star from the beginning of the ACN flight, a 90° counterclockwise setting of rotor D*rt* from zero therefore will assure that flux valve F*v* holds the platform in the correct azimuth position for "acquisition" of the primestar during the craft's approach to the departure point.

The azimuth position of axis X2 of the platform during the craft's approach to the departure point also determines the position of platform axis X1. Since the second telescope, selected for tracking in conjunction with the axis X2 telescope, is located on platform axis X1, the angle through which this telescope must be rotated about its own axis in order to bring it into alignment with the bearing of the second star, must be calculated on the basis of the axis X2 azimuth position at the departure point. Details of these azimuth settings will be more thoroughly understood after following through the example of presetting procedures given further below with reference to FIGURES 63 and 64.

Concurrently with the azimuth pre-orientation of platform and telescopes, the star-altitude angles must be set into the respective drive mechanism of the telescopes. This is separately explained in Division V, Sections *a* and *c*.

Flux valve control over the azimuth position of the platform is abandoned and the platform azimuth control transferred to the tracking telescope (primestar tracker) at the onset of the "star acquisition" phase when switch *sY* of FIGURE 25 is turned to contact *tk* by a sequence pulse from the playback F*d*, thereby connecting the azimuth tracking error signals from the axis X2 telescope to the yoke azimuth servo amplifier S*vy*.

The bubble turret of FIGURE 55 which is rotatably mounted on platform P*l* has its separate azimuth drive which permits rotation of the turret into alignment with the trajectory irrespective of the platform azimuth position. The mechanism of this remotely controlled turret drive has been briefly explained in Division V, Section *f* (FIGURE 59). It is evident that since the bubble signal acceleration control is to become effective along the craft's longitudinal axis (thrust control) and about the craft's yaw axis (directional or rudder control), bubble units B*l*2 and B*l*4 of FIGURE 59 which are wired for longitudinal acceleration error pick-off signals, must be aligned parallel with the longitudinal motion of the craft (which is the longitudinal axis of the craft when course and heading of the craft are the same) and bubble units B*l*1 and B*l*3, wired for lateral pick-off signals, must correspondingly be aligned in a lateral direction normal to this longitudinal motion. The longitudinal and lateral acceleration errors signal channels qualify as such only if the turret axis which in its reference position in FIGURE 59 is shown in alignment with platform axis X1, points in the direction of the trajectory during the ACN flight. This turret axis upon which the lateral bubble units are centrally mounted, will be called the longitudinal turret axis. It can be seen that the orientation of axis X1 of platform P*l* at the departure point thus provides an index line against which the azimuth angle of the longitudinal turret axis relative to the platform can be laid off. As shown in the example given below with reference to FIGURES 63 and 64 and in accordance with the preferred present-day practice, the angle formed between platform axis X1 and the trajectory at the departure point, which is known beforehand (measured clockwise from the telescope T1-end of axis X1), is set into rotor R*oT* of selsyn generator T*ts* (FIGURE 59) as a displacement angle relative to stator *st*T*t*. This is done prior to the flight, and the selsyn generator T*ts* thereupon, is disconnected, rotor R*oT* remaining its pre-set position. Selsyn generator T*ts* is called the "Tracking" or "Specified Course" selsyn transmitter due to its function of holding the bubble turret in constant alignment with the specified trajectory ("tracking" the trajectory) during the ACN flight, as will be explained below.

In Division V, Section *f*, it has already been summarily stated that during the command guidance phase of the pre-celestial flight exclusive of the star acquisition phase (see Division VI), the bubble turret remains locked to its reference position of alignment with the platform axes shown in FIGURE 59. This "locking" is done by connecting selsyn generator T*lv*, called the "Holding" or "Leveling" selsyn, into the turret drive circuitry. Rotor R*ol* of selsyn generator T*lv* is permanently locked to its zero position as previously explained with reference to FIGURE 59. The reason for locking the bubble turret into alignment with the platform axes at this initial stage of the flight becomes evident if it is recalled that, for the duration of this initial "command guidance" phase, bubble signal lines *lat* and *lot* are connected to gimbal axes torquers *tml* (located at junction of gimbal ring GR and platform P*l*, supplying torque about axis X1) and *tm2* (located at junction of yoke Y and gimbal ring GR, supplying torque about axis X2), respectively, as illustrated in FIGURES 59 and 25. (Connections from turret to torquers omitted in FIGURE 25.) As previously stated, and as indicated by the name of selsyn generator T*lv*, this selsyn serves to hold the turret in the proper position relative to platform P*l* so that the bubble signals can be used for platform leveling purposes during this pre-celestial period. Under this set-up, bubble displacement signals in lines *lat* and *lot* can be counteracted only by torque about gimbal axes X1 and X2, respectively. In order to avoid distortions, the resultant acceleration forces produced by the correcting torques, must be in direct opposition to the resultant lateral and/or longitudinal acceleration forces which produce the corresponding bubble error signals when the supporting platform is displaced from its level or horizontal plane. In other words: if, for instance, the bubbles in units B*l*1 and B*l*3 are deflected from their central positions, the resulting corrective torque must be applied about an axis parallel with the longitudinal turret axis and not about an axis angularly displaced from it, which is possible only if gimbal axis X1 (or platform axis X1) and the longitudinal turret axis remain in fixed parallel alignment with each other.

From the above-said it can be ascertained that during the approach to the departure point, and specifically at the beginning of the star acquisition phase, a discrepancy must exist between the pre-celestial bubble turret orientation and the turret's orientation of alignment with the trajectory required for the departure point, unless the course to be followed happens to coincide with the scheduled orientation of platform axis X1. Any such discrepancy, however, is corrected at the onset of the star acquisition phase when control of the bubble turret azimuth drive is switched from the holding selsyn T$lv$ to the specified course selsyn T$ts$ by a sequence signal from the playback unit. This switchover causes the longitudinal bubble turret axis to swing rapidly into alignment with the specified direction of the trajectory due to the beforementioned presetting of rotor R$o$T which has been calculated so as to take into account the azimuth position of platform axis X1 prevailing at that instant (see below).

At the initiation of the star acquisition period, the telescopes begin to track their stars in azimuth and elevation, i.e., platform azimuth control is switched from the flux valve servo signals to the azimuth tracking error servo signals, and platform attitude control (platform tilt about axes X1 and X2) passes from the bubble-unbalance servo signals to the elevation tracking error servo signals. The platform as well as the bubble turret, therefore, are compelled to "level out" in the prescribed horizontal plane of the departure point. The bubbles, supported in this specified plane, henceforth align themselves in response to the acceleration forces acting within this plane in a direction parallel with and normal to the line of motion of the craft against the acceleration forces imposed onto the same bubbles by the pre-computed "dynamic" orientation of the supporting platform. Depending on the amount of unbalance or error existing between these actually prevailing acceleration forces and those "reproduced" for the departure point by the pre-computed departure point orientation of the platform, the bubble channels will yield deviation signals of varying magnitude. These error signals truthfully reflect the total acceleration errors, i.e., the amount of acceleration unbalance or the difference between specified and observed accelerations being effective in the above stated directions within the specified plane of the platform. The bubble signal channels are not connected to the craft's flight control system until the starting instant, scheduled for the immediately following supervised celestial navigation (SCN) phase, has arrived. Thus, during the star acquisition phase, time is permitted for all undesirable transients in the bubble signal channels to die away. A method of counteracting acceleration errors by ground computed corrective acceleration impulses during the SCN-phase of flight will be described in Division VI. These acceleration command impulses are fed into the bubble channels in the manner shown in FIGURES 79 and 81 and serve to minimize initial acceleration errors immediately prior to the arrival of the craft at the departure point and thereby to reduce ensuing 84-minute oscillations about the trajectory.

After complete transfer to ACN-flight at the departure point, precomputed incremental signals from function pulse channel II of the playback unit (see Division IV, Section $d$) control the turret azimuth position through the two-way ratchet drive R$a$ of FIGURE 59 which actuates rotor R$o$T of the specified course selsyn transmitter T$ts$ in the manner outlined in Division V, Section $f$. (Throughout the preceding star acquisition-and SCN-phases, rotor R$o$T stays in the position into which it has been rotated at the onset of the star acquisition phase. Since the craft proceeds along a straight line course during this relatively short period, the lineup of the longitudinal bubble turret axis parallel with the trajectory remains practically unaltered, the platform-azimuth, controlled from the axis X2 tracking telescope remaining likewise virtually unchanged throughout this period.

The turret azimuth correction angles are delivered in ½ degree increments in synchronism with the corresponding prime-star altitude angle changes with which they are intimately associated. The method of computing the bubble turret azimuth angles from the prime-star altitude angles has been outlined in Division IV, Section $b$. These computations provide solutions for the angle Z between the primestar-or leadstar-pelorus line (=projection of primestar azimuth upon the plane of platform P$l$) and the trajectory-azimuth (shown in FIGURE 7) for each fourth slope interval, i.e., for each time interval of 4×81.92 sec.=approximately 5 minutes throughout the ACN flight. (See definition of slope-or interpolation-interval given in Division IV, Section $c$.) The angular increments, delivered from the magnetized tape playback in the form of function pulses, represent the difference angles between successive values of the total angle Z which show the gradual change of the primestar azimuth orientation relative to the trajectory, starting with a zero-difference angle at the onset of ACN navigation, when the longitudinal turret axis forms the initial azimuth angle Z against the trajectory which has been computed for the departure point.

When setting this pre-computed bubble turret azimuth angle into rotor R$o$T (FIGURE 59), any off-set angle of telescopes T2 or T4 relative to platform axis X2 must be duly taken into account. If these telescopes are tracking in a centered or "zeroed" position on platform axis X2, the projection of the primestar line onto the platform coincides with the direction of platform axis X2 (=gimbal-or yoke-axis X2).

The considerations governing the pre-setting of initial azimuth angles into the platform and bubble turret azimuth drives must logically also be adhered to in the pre- and resetting of azimuth angles for subsequent star changeover points if such changeovers are scheduled for the same automatic flight. The same applies also to the corresponding elevation or altitude settings of the telescopes which have been described in Division V, Section $c$, and which must become effective in synchronism with the azimuth settings. For a better understanding of the azimuth positioning procedure to be followed as an important part of the preferred overall platform control system herein described, a simplified example of an assumed case of ACN-flight is submitted in FIGURE 63 in which the scheduled trajectory T$r$ follows a great circle route in a north-easterly direction, the course being drawn as a single straight line and the same magnetic bearing of 45° being assumed throughout the section of flight shown. The initial or departure point-azimuth of the primestar (platform axis X2) is taken to be 90° and that of the second star 350°. (Platform P$l$ and bubble turret BT are here represented as square planes as in FIGURE 25, seen in their projection onto the horizontal plane of the drawing sheet. The telescopes, viz. the respective prisms, are seen projected onto the platform plane as in FIGURE 33.)

FIGURE 63$a$ (bottom) shows the platform orientation at the departure point. Telescope T2 on axis X2 and telescope T1 on axis X1 are selected for the initial star pick-ups. Hence, axis X2, in order to cause "fixed" telescope T2 (here centered in zero position on axis X2) to point at 90°, must point 45° clockwise (=cl.) from trajectory T$r$ and 90° cl. from North. (N=magnetic north.) Due to the fixed orientation of flux valve stator S$gst$ relative to the craft's center line, and due to the 45° counterclockwise (=ccl.) displacement of the direction of the earth's magnetic flux from the zero direction along the craft's center line (zero "crab" angle being here assumed), yoke Y, and with it axis X2 of the platform, will be deflected 45° ccl. from the trajectory, i.e., telescope T2 will "point" towards N if rotor D$rt$ of differential selsyn generator D*sg* (FIGURE 25) is left in zero position. Consequently, this rotor D*rt* must be set ccl. 45+45=90° from zero (rotated ccl. against stator D*st*) in order to slave axis X2 to the specified azimuth of 90°.

With platform axis X2 at 90° (azimuth angle measured clockwise from N, the platform axis being faced always from the viewpoint of telescope T2 in its zero or center position relative to axis X2), telescope T1 when centered in zero position on axis X1, points at zero azimuth (=N). In order to point at 350°, telescope T1 therefore, must be rotated 10° ccl. relative to the platform (i.e., about the telescope's own axis).

The end of platform axis X1 which carries telescope T1 representing the zero reference axis for rotations of the bubble turret BT relative to the platform P*l*, rotor R*oT* of specified course selsyn transmitter T*ts* (FIGURE 59) must be pre-set at a cl. angle of 180+45=225° from zero in order to secure proper rotation of the turret into alignment with the trajectory. (Bubble turret reference axis on platform P*l* turned south or 180° at the departure point.) As previously stated, the bubble turret remains locked to its zero position during precelestial flight. At the moment of arrival of the craft at the departure point (in actuality at the beginning of the "Supervised Celestial Navigation" phase of flight), the turret consequently is "slewed" through a cl. angle of 225° into its specified position.

Referring now to FIGURE 63*b* which shows the platform orientation at the first star-changeover point, it is assumed that during the initial tracking period between FIGURES 63*a* and 63*b*, axis X2 with telescope T2 has rotated 20° cl. to follow the primestar, and that telescope T1 on axis X1 has rotated a total ccl. angle of 35° which includes a 20° ccl. rotation to "take up" the 20° platform rotation plus an additional hypothetical 15° ccl. rotation due to tracking of the second star during this initial period. It is further assumed that with this orientation of platform and telescopes at the instant of the first star changeover, the tracking function is transferred from telescope T1 to telescope T3 on the same axis X1, and that telescope T2 continues tracking its first star. The location of the new star to be tracked by telescope T3 has been computed to reach an azimuth angle of 190° at the instant of the first star changeover. With axis X1, at this instant, oriented along a line from 20° to 200° azimuth, telescope T3, in its zero position on axis X1, points at 200°. Hence, a 10° ccl. rotation of this telescope from zero about its own axis correctly pre-sets telescope T3 for its first tracking operation.

As outlined in Division V, Section *c*, each of the four telescopes, when "abandoned" after a star-changeover, immediately is reset to the pre-computed position of its next tracking period. This resetting operation is initiated automatically at the moment of a star changeover (when the telescope whose tracking period is terminated, becomes inoperative) and covers both, altitude as well as azimuth angles, the resetting circuitry being explained in detail in connection with FIGURES 67 and 69 in Division V, Section *i*, par. 2 and 3. After completion of the resetting operation, the re-positioned telescope remains in readiness for its next tracking duty.

Returning to telescope T1 in FIGURE 63*b* which is now ready for resetting to its next initial tracking angle, the net value of the reset angle must be correctly ascertained from the terminal position of telescope T1 at the conclusion of its first tracking period, from rotations of the platform during the next intervening tracking periods during which telescope T1 remains inoperative, and, finally, from the pre-computed azimuth angle of the second star which telescope T1 is scheduled to "take over" at the specified instant of changeover to this star. FIGURE 63*b* shows the terminal position of this telescope, viz. the total angle of 10+20+15=45° through which it has been rotated ccl. from zero up to the instant of changeover. During this first tracking period, telescope T1 has tracked its star to a final azimuth angle of 350−15=335°. No actual value will be computed for the next initial tracking angle of telescope T1 since the remaining example of FIGURE 63*c* sufficiently clarifies the necessary considerations which must be followed in the determination of this reset angle.

Referring now to FIGURE 63*c*, it is assumed that after an additional tracking period between FIGURES 63*b* and 63*c*, telescope X2 has rotated into a new azimuth position 30° cl. from the position shown in FIGURE 63*b*, and that at this instant, the second star changeover takes place in which telescope T2 discontinues its tracking functions in favor of telescope T4, the latter scheduled to track its first star at an initial azimuth angle of 5°. It is important to recall that, according to FIGURE 25, the telescopes T2 and T4 have their own azimuth drives (motors A*zm*) like telescopes T1 and T3, so that presetting or resetting of these telescopes in azimuth is made possible without affecting the position of platform P*l*. (Each of the four telescopes remains "locked" to the platform by the gears of its own azimuth drive whenever the latter is inoperative. Thus, telescopes T2 and T4 are "locked" to the platform during their tracking functions because the azimuth drives of these telescopes do not operate, the tracking errors in azimuth, instead, actuating the axis X3 torque motor Y*m*.) Telescope T4, therefore, can be pre-set simply by rotating it from its centered poistion on axis X2, analogously to the presetting of the telescopes on axis X1. In the present case, axis X2 being oriented in a direction from 140 to 320 degrees, telescope T4 is correctly pre-set by rotating it from its centered position on axis X2 (in which it points at 320° azimuth) through a cl. angle of 45°. During the now initiated tracking period, telescope T4 remains at this angle of 45° relative to axis X2, and the platform rotates in azimuth in obedience to azimuth tracking error signals from this telescope.

Telescope T2 having been left in its centered position pointing at 90+20+30=140 degrees, is ready for resetting at the instant of changeover portrayed in FIGURE 63*c*, provided a second tracking period is specified for this telescope. A description of the resetting procedure for this telescope is not deemed necessary as it follows the previously outlined principles. Obviously, telescope T2 must be reset by rotating it about its own axis since the platform, at this period of telescope resetting, is under control of the azimuth tracking signals from telescope T4. Again, the platform rotation during the tracking period of telescope T4 must be taken into account in the determination of the reset angle for telescope T2, similarly to the case of telescope T1 mentioned in connection with FIGURE 63*b*. It can be seen that in the example of resetting of telescope T1 for a second tracking period, two intervening tracking periods would actually have to be observed: The first period from the instant of changeover of telescope T1 to telescope T3 to the instant of changeover from telescope T2 to telescope T4 (i.e., the period between FIGURE 63*b* and FIGURE 63*c*) and the second tracking period from this latter changeover of FIGURE 63*c* to say, the next changeover from telescope T3 to telescope T1 (not shown).

For the sake of clarity, the telescopes which have not been under direct discussion in the description of successive platform positions in FIGURE 63, have been omitted from the drawings, with the exception of telescopes T3 and T4 in FIGURE 63*a*. These telescopes are shown in their "anticipated" positions in which they appear at the beginning of the ACN-flight but which do not become effective until the first and second changeover points of FIGURE 63*b* and 63*c*, respectively, have been reached.

In the preferred form of operation herein recommended, bubble turret BT remains "slaved" to the trajectory for the entire duration of ACN flight. As stated before, this is done through the intermediary of specified course selsyn transmitter T*ts* (FIGURE 59) whose rotor, after conclusion of the pre-celestial phase of flight, is driven by one half degree incremental function signals from the playback unit F*d* via two-way ratchet drive R*a*. The pre-computed angular increments must be referred to the initial azimuth setting of the bubble turret which is effective at the beginning of the ACN-flight. (FIGURE 63*a*.) Since this initial azimuth setting, in turn, is referred to axis X1 of the platform which varies its azimuth position under control of the tracking error signals from telescopes T2 or T4, the turret azimuth control from the magnetized tape must constantly operate to correct these platform azimuth variations in order to keep the turret slaved to the prescribed magnetic course.

The example of platform and bubble turret orientations of FIGURE 63 shows the dependence of all pre- and reset-angles on the initial setting of the telescope on axis X2 which is scheduled for the first tracking operation, in this case telescope T2. It is feasible to use the zero setting of differential selsyn rotor D*rt* (FIGURE 25) and to cause axis X2 to follow the north-south direction of the magnetic field during the "command guidance" phase of flight, as suggested in the diagram of FIGURE 64. In this diagram, the departure point-orientation of parts involved is shown for the purpose of illustrating a case in which a 20 degree course is selected for the initial trajectory and where the star to be tracked by telescope T2 is scheduled to appear at an initial azimuth angle of 40 degrees. (Same method of presentation used as in FIGURE 63.) Here, telescope T2 is simply rotated cl. from its centered position on platform axis X2 to the scheduled 40 degree azimuth of the prime star. Platform axis X1 being now oriented east-west (with bubble turret zero reference at 90), rotor R*o*T of specified course selsyn transmitter T*ts* is pre-set at a cl. angle of 180+90+20=290 degrees in order to slew the turret to the 20° course of the trajectory scheduled for the departure point.

*Section (i)—Sequence Control*

(1) MASTER CONTROLLER (A) Sequence switches and patchboard:

The master controller is an airborne sequencing unit which automatically regulates all functions of the automatic sextant during flight. It is energized by time-controlled sequence pulses from the magnetized tape of the playback unit. As explained in Division IV, Section *d*, these sequence pulses are recorded on a separate tape channel alongside the star altitude function pulses and the bubble turret trajectory pulses. Their timing is programmed in accordance with the pre-computed function schedule for a particular ACN-flight and properly synchronized with the various function pulse sequences during recording so that during airborne playback of these same pulse sequences, the automatic sextant actually performs the corresponding functions at the exact scheduled time of flight and in the proper sequence. Such a function and sequence control not only calls for a bank of multiple-position selector switches which must be "stepped forward" in unison whenever a sequence pulse is delivered from the playback unit, and which must permit as many "switch-overs" as there are sequence pulses on the tape, but this type of control must also provide facilities for a flexible wiring system that admits ready changes in wire connections for every different trajectory to be flown. A stepping-switch and patchboard arrangement has been selected for this function sequencing control of the automatic sextant which utilizes conventional features of a telephone switchboard. A single "unit" of such a selector switch-patchboard combination is illustrated in the schematic drawing of FIGURE 65. It can be seen that each contact blade 1 to 25 of the 25 position selector or sequence switch SSW is permanently connected to two socket terminals T*rm*1 and T*rm*2 on patchboard P*ab* and that jumper cables C*bj* may be inserted across any different pair of these terminals T*rm*1 and T*rm*2 or/and between one of these terminals (T*rm*1 or T*rm*2) and one terminal S*trm* of an additional row of 25 socket terminals to which 25 service circuits 1S, 2S, 3S etc. are permanently connected. Switch SSW is supported on frame F*r*8 which carries shaft S*ht*1 in bearings (not shown), ratchet wheel R*tw* and contact arm C*t*8 being firmly attached to this shaft. A wiper W*p* permanently connects arm C*t*8 with contact A8 on switch SSW which is also permanently wired to a pair of terminals T*rm*A1 and T*rm*A2 on patchboard P*ab*. These latter terminals, in turn, are "bridged" by jumper cable C*bj* to an additional socket terminal S*trm*A which is permanently connected to a service circuit AS. A solenoid S*ol*8 which is attached to frame F*r*8 and whose armature lever AL*e* engages ratchet wheel R*tw*, receives the amplified sequence pulses from the playback unit (not shown) via line L8. Each time the solenoid is actuated by a sequence pulse, lever AL*e* rotates ratchet wheel R*tw* one measured step in the direction of arrow R*o*8 thereby causing contact arm C*t*8 to advance from the contact blade heretofore occupied to the next following blade.

In the present application of this patchboard sequence control system, several banks or stacks of sequence switches SSW are mounted in a row on a common frame F*r*8, using one single shaft S*ht*1 to which all the contact arms C*t*8 of the switch banks are attached. A single solenoid engages a ratchet wheel R*tw* on the common shaft S*ht*1 via lever AL*e*, thus advancing all contact arms in unison to the same next following step-number of the switches whenever the solenoid is actuated by a sequence pulse. In a preferred execution, for instance, five stacks of these switches, each stack composed of 6 sequence switches, are mounted on a common frame and actuated by a single solenoid utilizing a single shaft which is supported in the frame on four bearings and which carries one correctly aligned contact arm for each switch, a wiper W*p* furthermore connecting each arm C*t*8 with an additional contact blade A8, in the same manner as indicated in FIGURE 65. The 25 stepping contacts and the A8-contact of each switch are permanently linked with their twin-row of 25 double terminals T*rm*1 and T*rm*2 and with terminals T*rm*A (T*rm*A1 and T*rm*A2), respectively, all of which are combined on a common patchboard that also carries the terminals S*trm* and S*trm*A for the service circuits (one single row of terminals S*trm* and a terminal S*trm*A for each switch).

For an illustration of the versatility of this sequence-switch-patchboard combination, let it be assumed that several jumper cables C*bj* are inserted in patchboard P*ab* of FIGURE 65 as shown in the drawing in order to distribute a power source of plus 135 v. D.C. to various service circuits whose selection changes in accordance with an imaginary timing program to be sequenced through solenoid S*ol*8 and selector switch SSW. With switch SSW in position 1, the 135 v. power source will be available in service circuits 1S and 3S. After actuation through a first sequence pulse, relay S*ol*8 advances contact arm C*t*8 to position 2, disconnecting the 135 volts from circuits 1S and 3S and leaving all terminal connections open. During this sequence period, however, any one of the "ganged" sequence switches mentioned above may connect a different power source or signal current to service circuits 1S and 3S or to any other service circuit. The second sequence pulse shifts arm C*t*8 into position 3, again supplying service circuits 1S and 3S with 135 volts D.C. The same "linkage" to circuits 1S and 3S is maintained by the next following sequence pulse which advances the switch to contact 4. In position 5, the switch connects the 135 v. source to service circuits 5S and 13S. A more practical example of actual sequence switch connections, such as they are used for various simultaneous functions of the automatic sextant, will be encountered in the wiring diagrams of FIGURES 67 and 69. The patchboard and all the sequence switches are combined in a compact unit designated as the sequencing unit or sequence controller which forms one portion of the master controller unit (the latter collectively identified with numeral MC in all drawings), the other portion being constituted by the master panel or master controller switchboard MC*s*, diagrammatically illustrated in FIGURE 66.

B. Master Panel:

The master controller switchboard or master panel shown in the schematic profile drawing of FIGURE 66 serves to facilitate manual and visual control over all functions of the automatic sextant and associated equipment from a centralized, readily accessible station. In one preferred execution, the master panel contains a bank of power- and selector switches, a civil time clock, an altimeter, a heading indicator, star signal monitoring oscilloscopes, sequence indicator lights, pulse counters, gain controls etc. and a number of regulating devices for rotating the telescopes as well as the platform and the bubble turret to their various pre-set tangles. All pre-flight power- and gain-adjustments, pre-settings of platform, prisms, resetting counters, bubble turret azimuth etc. and all ground-checks on the ACN-equipment prior to and after the ACN-flight are carried out from this central station of the master controller. In case the automatically guided craft is manned by observers, this panel serves to yield readily all essential information about the performance of the automatic sextant and about the scheduled progress of the craft along its trajectory. The purposes of the various switches, knobs and dials shown in FIGURE 66 will be briefly enumerated below, reference being made to the numerals contained in this drawing and to the corresponding sections in this specification where the functions of pertinent components are described in greater detail:

T*tsd*=Bubble turret trajectory indicator

This dial indicates the bubble turret azimuth angle as measured clockwise against its zero-degree reference axis on the platform (telescope T1-arm of axis X2, this reference being represented by the zero mark on vernier scale V*sc* which permits dial readings to an accuracy of a fraction of a degree. Dial T*tsd* is mounted on the extended shaft (rotor) of a selsyn transmitter. The stator of this selsyn connects to the stator of the bubble turret selsyn receiver whose rotor, in turn, is geared to the turret driving gear. Prior to an ACN-flight, this dial T*tsd* is pre-set to the equivalent of the initial (departure point) deviation angle of the trajectory from the prime star pelorus line. For actual values of angle settings see reference cited below. From the onset of the ACN-flight, the selsyn transmitter shaft, and with it dial T*tsd*, are automatically rotated from this initial position (in clockwise or counterclockwise increments) via two ratchet gear devices mounted on the same shafts and actuated by two solenoids under control of function pulses from the playback units. The selsyn transmitter, solenoids, and ratchet drives are mounted underneath the panel housing (not visible in the present drawing). See text in division V, Section *f* and associated parts in FIGURES 25 and 59. For ratchet-drive details, consult FIGURES 60, 61 and 62, described in the same division V, Section *f*. Selsyn transmitter T*lv* of FIGURE 25 for precelestial bubble turret control whose rotor is permanently locked in a position to hold the turret in alignment with gimbal axes X1 and X2, is mounted in the rear portion of the master switchboard housing. A pointer on the extended shaft of this selsyn rotor reads against a dial contained in an auxiliary control panel in the rear portion of the top surface of the master switchboard housing (not visible in FIGURE 66). This dial unit is provided with a shaft lock.

$\left.\begin{array}{l}fpc1\\fpc2\end{array}\right\} =$ Path Pulse Counters for Path- or Function Pulse-Channels I and II, Respectively These counters indicate the algebraic sums of all altitude angle function pulses from the magnetized tape of the playback unit which have actually been received by the respective angle generators of the automatic sextant in the course of a projected flight. The total reading of either counter at the conclusion of an ACN-flight, when compared with a pre-computed reading, serves to indicate whether the associated angle generators have received all their function pulses as scheduled. (One counter successively registers the function pulses for telescopes T1 and T3; the other counter registers those for telescopes T2 and T4). The indicated sum of pulses can also be checked against a plot of pulses which shows the exact number of pulses the counters should read at pre-computed instants of star-change-over, sign change or the like, in case an observer aboard the craft surveys the counter readings. The counters are driven by ratchet-drives similar to the ones used for the bubble turret selsyn transmitter mentioned under numeral T*tsd*, above. Boxes R*a*1 and R*a*2 contain the ratchet drive gear, and the solenoids are mounted underneath the panel housing (not visible in FIGURE 66). Winged knobs *c* and *cc* permit manual operation of the counters. (See path pulse counters in wiring diagram 67 of division V, Section *i*, 2.)

SSI=Sequence Switch Indicator Lights

These indicator lights show the progressive positions of the sequence switches during ACN-flight or during ground checking procedures. (See FIGURE 65 and part 1 of the present division V, Section *i*.)

HPI=Helipot Position Indicator (Telescope "Helipot Slaving" Indicator)

To be described in connection with switches SLS1 and SLS2, below.

$\left.\begin{array}{l}Hp1\\Hp2\\Hp3\\Hp4\end{array}\right\} =$ Helipots for Pre-Setting Reset Azimuth Angles of Telescopes T1, T2, T3 and T4, Respectively (Including Knob Locks K*lk*1 and K*lk*2)

These helipot knobs may be rotated over a range of 50 degrees clockwise and counterclockwise from the reference zero as indicated by the auxiliary dial scale on the front faces of each knob. (Main scales on circumferential surface of knobs and zero-position-marks not visible in drawing). Rubber covered clamping shafts K*lk*1 and K*lk*2, rotatable eccentrically about a vertical axis, serve to hold these knobs firmly in place after completion of the pre-setting procedure. (See handles *hl*1 and *hl*2 for rotating the respective shafts, the upper handle and shaft being shown in unlocked position and the lower shaft in locked position, with handle *hl*2 securely held in place by clamp *hcl*.) For helipot presetting procedure refer to switches SLS1 and SLS2, below.

*hdl*=Handles for Carrying Master Panel Unit
ALT=Altimeter
ASI=Airspeed Indicator
HI=Heading Indicator with Yoke-Angle Index This indicator is a self-synchronous gyro stabilized compass (or repeater), commercially known as a Gyrosyn compass, whose course-setting knob K*c* and double pointer index K*a* here serve the purpose of setting and indicating the yoke-angle relative to magnetic North, the magnetic heading of the craft being indicated by pointer K*b*. The index setting is used during pre-celestial control only. Index K*a* is actually mounted on or geared to a differential selsyn generator rotor shaft, rotatable through knob K*c*. When index K*a* is aligned with North (zero degrees) on the fixed dial, rotor and stator of the differential selsyn are likewise in zero alignment, and yoke Y (=axis X2 of platform Pl) is oriented north-south, telescope T2 facing north. See parts D*rt*, D*st* and K*c* in FIGURE 25. For details on purpose of yoke-index and recommended setting procedure, see Division V, Section *h*.

$\left.\begin{array}{l}tm\text{I}1\\ tm\text{I}2\\ tm\text{I}3\\ tm\text{I}4\end{array}\right\}$ = Torque Motor Drive Indicators These dials indicate the "attitude" of the torque motors of axes X1, X2 (=gimbal axes), X3 (=pivot axis of yoke) and X4 (=azimuth rotation axes of telescope which tracks the second star, i.e., which rotates in azimuth relative to platform), dial *tm*I1 pertaining to axis X1, dial *tm*I2 to axis X2 (second dial from right), dial *tm*I3 to axis X3 (second dial from left) and dial *tm*I4 to axis X4. "Attitude" is here defined as rate and direction of torque, referred to zero torque indicated by the central position of the left-right dial pointers.

$\left.\begin{array}{l}\text{M}on\text{ I}\\ \text{M}on\text{ II}\end{array}\right\}$ = Star Signal Monitor Oscilloscopes for Channel I (Prime Star) and Channel II (Second Star), Respectively The screens of these oscilloscopes are provided with circular sweep-patterns resulting from two equal 60 cycle sinusoidal voltages in phase quadrature, one of which (vertical deflection voltage) is synchronous with the 60-cycle reference voltage of the scanner motors of the (two tracking) telescopes. Any star image error signals, taken preferably from the phase corrector P*hc* in the photocell-output of the corresponding telescopes (see elevation error line E*lc* in FIGURE 31) and fed to the cathode of the oscilloscope, appear as "pips" or instantaneous localized intensifications of a short section of the normally invisible circular sweep pattern on the oscilloscope screen. The screen signal thus created is located at a polar angle from the center of the screen which is indicative of the momentaneous tracking error in azimuth and/or elevation of the respective telescope. If the image of the tracked star is located at the center of the optical field, a blurred trace of the entire circular sweep (or no trace at all) appears on the screen. This screen presentation offers excellent monitoring means on the behavior of the tracking system.

CTC = Precision Civil Time-Clock
KAI = Platform-Keel-Angle Indicator

This indicator shows the clockwise angle of deviation of the platform axis X2 (=gimbal axis or yoke axis X2) from the keel-line or centerline of the craft. The dial pointer is mounted on the rotor shaft of a selsyn receiver (contained in panel housing) whose associated selsyn transmitter is located in the pivot assembly of the automatic sextant. (See selsyn transmitter *m*S in FIGURE 24 whose rotor *m*S*r* is geared to pivot shaft P*s* of yoke Y via ring gear *mg*, the latter mounted on shaft P*s*.)

$\left.\begin{array}{l}\text{MP}1\\ \text{MP}2\end{array}\right\}$ = Master Power Switches $\left.\begin{array}{l}\text{VDC}\\ \text{VAC}\end{array}\right\}$ = D.C. and A.C. Voltmeters S*lv* = Selector switch for Voltmeters $\left.\begin{array}{l}\text{G}ca\\ \text{G}cb\\ \text{G}cc\\ \text{G}cd\end{array}\right\}$ = Axis X1, X3, X2 and X4 Torque Motor Gain Controls, Respectively (For Pre-Flight Adjustments of Power Amplifier Gain)

$\left.\begin{array}{l}\text{G}c1\\ \text{G}c2\\ \text{G}c3\\ \text{G}c4\end{array}\right\}$ = Signal Amplifier Gain Controls for Channels I and II and Monitors MonI and MonII, Respectively (For Pre-Flight Adjustments)

$\left.\begin{array}{l}\text{PAS}\\ \text{PAP}\end{array}\right\}$ = Power Switches for Auto Sextant and Auto-pilot.

CS*w* = Individual Control Switches for Time-Clock, Torque Motors (Fixed Field Power), Scanner Motors, Amplifiers, Phototubes, Playback Drive, etc.

SSI*r* = Dial for Regulating Intensity of Sequence Switch Indicator Lights SSI

*s*QS = Sequence Control Selector Switch

When the knob on this dial is pushed-in after switching the pointer to any one of the 25 positions on the dial, the sequence switches will automatically move to the selected position to which the pointer has been manually set. When the knob is pulled out, the sequence switches are returned to automatic control through the sequence pulses.

In cases in which an ACN-guided craft is manned by observers, this switch may be used for certain types of emergency operation during flight. For instance, during temporary obliteration of star images through a cloud, switch *s*QS can be turned back to the sequence number which establishes the connections of pre-celestial platform control which serve to hold the platform in a level position. After the disturbance has passed, the sequence switch is returned to the current ACN-sequence-number and the dial knob pulled out.

$\left.\begin{array}{l}\text{SLS}1\\ \text{SLS}2\end{array}\right\}$ = Slewing Selector Switches and $\left.\begin{array}{l}\text{PS}l\text{A}\\ \text{PS}l\text{E}\end{array}\right\}$ = Manual Power Control for Slewing Telescopes Switch SLS1 is the telescope selector switch for slewing. From its central "off"-position shown in the drawing, the switch handle can be turned to the left for slewing the telescopes in azimuth, and to the right for slewing the telescopes (viz. the prisms) in altitude, the four positions on each side of the "off" position selecting telescopes T1, T2, T3 or T4 for the respective slewing action.

Switch SLS2 is the slewing mode selector switch which operates in the same manner as switch SLS1, except that it has only two positions on each side of the central "off" position: The first position to the left next to the "off" position is for "manual" slewing in azimuth and the second position for "helipot slewing" in azimuth; the first position to the right is for "manual slewing" in elevation (altitude) and the second position for "manual pulsing" or "pulsed slewing" in altitude. Switch SLS1 of the present drawing corresponds to the top half of ganged switch SLS1 in FIGURE 69 as far as its operation on the four left positions is concerned. The right half of switch SLS1 of the present figure corresponds to switch SLS1 of FIGURE 67 (bottom half of switch SLS1 shown in FIGURE 69). The left half of switch SLS2 in the present figure corresponds to the top half of ganged switch SLS2 in FIGURE 69, and the right half of switch SLS2 in the present figure to switch SLS2 in FIGURE 67 (bottom half of switch SLS2 shown in FIGURE 69). The "zero" or "track"-positions of these switches in both FIGURES 67 and 69, and their central "off" position in the present FIGURE 66 are identical. These positions are held by the switches when the telescopes are tracking.

The manual-slewing power-control-switches PS*l*A and PS*l*E correspond to switches PS*l*A and PS*l*E in FIGURES 69 and 67, respectively. Actuation of these switches supplies power to the respective angle setting drives. During "manual slewing" operation, the handles of these switches are pushed up or down (altitude) or to the left or right (azimuth) for arbitrary increase or decrease of the prism altitude angles or for arbitrary clockwise (CW) or counterclockwise (CCW) rotation of the telescope azimuth drive motors, respectively. During "pulsed slewing" in elevation, power switch PS*l*E is operated in the same manner but only for brief moments at a time. For "helipot slewing" in azimuth, power switch PS*l*A may be pushed either way in order to apply power, the sense of telescope rotation here being determined solely by the respective helipot setting.

Circuit details for these selector and power switches are given in sub-sections *i*, 2 (altitude control) and *i*, 3 (azimuth control) which follow below.

Pre-setting of prism altitude angles (including reset angles) via the slewing and resetting-counter mechanisms is described in detail in Division V, Section c. Circuit details are given in the above cited sub-section i, 2. For pre-setting the telescopes in azimuth (including adjustment of helipot-reset angles), the following procedure is here recommended: (The related circuitry is described in detail in sub-section i, 3, cited above.)

(1) Turn switch SLS2 to second position left (helipot slewing) for the purpose of first pre-setting all four telescopes successively to their initial (departure point) azimuth angles. (See Division V, Section h, concerning determination of initial azimuth angles.)

(2) Turn switch SLS1 to first position left (selecting first telescope T1 for "helipot slewing" in azimuth.)

(3) Rotate helipot knob H$p$4 (helipot H$p$4 at left bottom of FIGURE 69) to the desired initial azimuth angle for telescope T1.

(4) Push power switch PS$I$A either to the right or to the left and watch movement of index finger of helipot position indicator HPI. The index needle will point somewhere to the left or right from its mid-position on the scale, depending on the magnitude and sense of discrepancy between the actual telescope azimuth position and the azimuth angle setting on helipot H$p$4. Actuation of switch PS$I$A causes the needle to move towards it central zero position. When telescope T1 has reached the desired azimuth angle, the index needle rests in its central position, and rotary motion of the azimuth drive motor stops.

(5) Repeat above procedure after turning switch SLS1 successively to the second, third and fourth position left (selecting telescopes T2, T3 and T4 for pre-setting). Use same helipot knob H$p$4 for pre-setting each of the initial azimuth angles of these telescopes.

(6) Return switches SLS1 and SLS2 to neutral (=central positions in which the switches remain when the telescopes are tracking) and turn each helipot knob H$p$1, H$p$2, H$p$3 and H$p$4 (helipots in FIGURE 69 bearing same numerals) to the respective reset azimuth angles which the corresponding four telescopes T1 to T4 are scheduled to occupy at the onset of their individual second tracking periods.

Each telescope can be "manually" slewed in azimuth without the use of the helipot assigned to it after turning switch SLS2 to the first position left (manual) and by putting the selector switch SLS1 to the telescope to be slewed "manually."

The same applies to "manual slewing" of the telescope prism in elevation after setting switch SLS2 to its first position to the right from neutral.

Only one helipot per telescope is provided on the master panel shown in the present figure. It is feasible, however, to add as many helipots as needed for repeated star changeovers and to provide means for switching these helipots to their respective telescopes.

(2) ALTITUDE ANGLE GENERATOR CONTROL (PRISM SETTING SEQUENCE CONTROL CIRCUITRY)

A preferred sequence control system for the time-wise actuation of the telescope altitude angle generators (whose mechanisms and functional duties have been described in detail in Division V, Section a) is illustrated in the simplified wiring diagram of FIGURE 67. This control system is made up of a layout of sequence switches and relays which serve to initiate the various functions of the angle setting and resetting mechanisms. Operation of this altitude drive sequence control is best described by tracing the circuits in FIGURE 67 for a series of assumed conditions under which the altitude angle generators are called upon to function during a hypothetical flight:

Let telescopes T1 and T2 be in the state of tracking their first stars during the initial period of ACN-flight, and let telescopes T3 and T4 be readied for their respective first tracking operations, i.e., pre-set to the altitude angles which are assumed to become effective at the second and first star-changeovers respectively, these star-changeovers being scheduled to take place at some later pre-determined time. First star-changover: switchover from T2 to T4; second star-changeover: switchover from T1 to T3.) Under these conditions, pulse relays RYX and RYX$a$ are pulsating at the rates of the altitude function pulses supplied from pulse channels I and II, respectively, of the playback unit F$d$. (The altitude function pulse channels are simply designated as "Channel I" and "Channel II." Playback amplifier $pla$ of FIGURE 2 is omitted from the present drawing. Channel I is here assumed to carry function pulses for telescopes T1 and T3 and channel II is assumed to carry function pulses for telescopes T2 and T4. Parts shown within the dotted box RC$h$I are duplicated in box RC$h$II except for the 400 cycle power supply and transformer T$r$10. The latter is provided with two secondaries one of which is connected with the corresponding switches in box RC$h$II. Relays and switches in box RC$h$II bear the same numerals as the corresponding relays and switches in box RC$h$I but are affixed with the latter "$a$.") Pulsating relays RYX and RYX$a$ intermittently close switches S10, S10$s$ and S10$a$, S10$sa$, respectively. During each closing of switches S10$s$ and S10$sa$, relays RYXIII and RYXIV for the angle generators of telescopes T1 and T2 are, in turn, actuated via sequence switches SSW21 and SSW22 (see lines $l$10$s$ and $l$10$sa$), these sequence switches being "patched" to telescopes T1 and T2 respectively, for this particular sequence. The circuits shown for telescope T1 in the broken line box CT1 are the same for telescopes T2, T3 and T4 in boxes CT2, CT3 and CT4, respectively, which have been left blank in order to simplify the drawing. (The drivemotor, solenoids and limit switch of each telescope which have been shown in previous drawings, bear their same previous designations in the present drawing. However, if it is necessary, here or elsewhere in this specification, to identify these parts as control system components of one particular telescope, their respective designations are affixed with numeral 1, 2, 3 or 4 in accordance with the corresponding numeral which identifies each individual telescope T1, T2, T3 or T4.) Whenever relay RYXIII is actuated, i.e., whenever a pulse from function or path channel I grounds the 28 v. supply of this relay through sequence switch SSW21 and switch S10$s$, contacts CF$s$, FF$s$ and S$sw$ in box CT1 of telescope T1 will be closed. (Switch S$sw$ is designed to close after the closing of contacts CF$s$ and FF$s$.) In identical fashion, each pulse from function channel II closes the corresponding contacts in box CT2 of telescope T2 for the duration of each pulse (i.e., by grounding the 28 v. supply of relay RYXIV through sequence switch SSW22 via line $l$10$sa$ and switch S10$sa$). Proper sense of rotation of altitude drive motors M$o$1 and M$o$2 is secured from foil channels I and II of playback F$d$ (sign change channels I and II) via relays RYXI and RYXI$a$. Relays RYXI and RYXI$a$ differ from all other relays shown in the drawing in that they are designed to assume two alternate stationary positions: If a pulse from a sign change channel causes this type of relay to close a switch, such as relay RYXI closing switch S11, the switch is held closed by the relay until the next pulse changes the relay to its alternate position in which it holds the switch open. Assuming that a foil channel pulse has closed switch S11 at the onset of the first tracking period of telescope T1 (or that this switch is originally closed before the beginning of the ACN-flight), relay RYXII is thereby held energized, causing switches S$a$12 and S$b$12 to supply phase $\phi$10 of the 400 cycle power source via line "CF 400" through sequence switch SSW26 (patched to the telescope T1 channel for this sequence) and through non-energized relay RYXX to the control field CF of motor M$o$1. (Limit switch L$sw$1, here shown open, is normally closed.) If phase $\phi$10 drives the motor, say, clockwise, and if clockwise motor rotation results in an increase of the prism elevation angle, each altitude function pulse from channel I will under these conditions produce a step-increase in the elevation angle of telescope T1.

If at the same time switch S11a in box RChII is held open, the reverse phase, or phase $\phi 20$, will be applied to the CF-coils of motor Mo2 (via sequence switch SSW27, patched to the telescope T2 channel, and via non-energized relay RYXXI), causing a step decrease in the elevation angle of telescope T2 for each function pulse emanating from channel II. Any sign-change pulse applied during the tracking period reverses the prevailing sense of prism angle change. (Relays RYXXI, RYXXII and RYXXIII, shown in box form, correspond to relay RYXX and supply the CF-currents for telescopes T2, T3 and T4 in boxes CT2, CT3 and CT4, respectively, as long as these relays remain non-energized.) The fixed fields FF of motors Mo are constantly supplied from the 400 cycle source of transformer T11 through contacts FFs and capacitors cap, the latter being provided for adjusting the necessary 90 degree phase difference between the fixed fields and the control fields. Switch Lsw1 represents the telescope T1 limit switch, identical with switch Lsw shown in the diagram of FIGURE 27 which applies to any one of the four telescopes. Stepping solenoid Ss1 (solenoid Ss in FIGURE 27) is connected to a 28 volt power source through contact Ssw of relay RYXIII. From the functional analysis of the altitude angle generator and resetting counter given in connection with FIGURE 27 (Division V, Section a) and FIGURE 37 (Division V, Section c) respectively, it will be remembered that counter solenoid sol1 (solenoid sol in FIGURE 43) as well as slewing solenoid Sls1 (solenoid Sls in FIGURE 27) remain inactive during the presently discussed periods of tracking of telescopes T1 and T2. These solenoids are supplied from a 28 volt D.C.-power source through sequence switch SSW25, the connections to counter solenoid sol1 passing through switches S17 of relay RYXVII which remain normally closed. For the sequence step under observation, sequence switch SSW25 remains "open," i.e., it contains no "patch" (=no connection via jumper cable cbj of FIGURE 65) so that both solenoids sol1 and Sls1 remain inoperative.

It is now assumed, as stated above, that at the scheduled moment of the first star changeover, telescope T4 "picks up" its first star and tracks this star, while telescope T2 resets to a new altitude angle for its next tracking function and telescope T1 continues to track its first star, telescope T3 remaining in waiting condition for its first star "pick-up." This scheduled changeover is initiated by a sequence pulse from pulse channel IV of playback Fd which advances all sequence switches by one step and establishes different circuit connections wherever such changes are needed for the new sequence, as previously explained in connection with FIGURE 65. Thus, in the present case, sequence switch SSW21 receiving signals from pulse channel I (for telescope T1) is again patched to relay RYXII, while sequence switch SSW22 advances to a new patch connection which feeds the channel II pulse signal (now carrying function pulses for telescope T4) to relay RYXVI. The proper CF-phase from the 400 cycle power source to motor Mo4 in box CT4 is supplied from sign change channel II via a new patch on sequence switch SSW27 which now feeds through non-energized relay RYXXIII. Sequence switch SSW26 remains patched to telescope T1 via relay RYXX. Sequence switch SSW28, previously open, advances to a patch which actuates relay coil RYXIV, holding contacts CFs, FFs and Ssw of box CT2 closed (previous connection from sequence switch SSW22 having been cut "off"). Sequence switch SSW29, previously open and now advanced to a patch which energizes relay RYXXI, thus making a "forward" contact in the relay which corresponds to a contact with the upper switch pole shown at relay RYXX, causes slewing power from source Tr11 to reach the CF-coils of motor Mo2 via sequence switches SSW23 and SSW24. The correct 400 cycle slewing phase is secured by proper patching of sequence switch SSW23 for this sequential step, sequence switch SSW24 being patched to telescope T2 (relay RYXXI) for this same step. FF-power is again connected to motor Mo2 through contact FFs, and stepping solenoid Ss2 is actuated from a 28 volt D.C. source through contact Ssw as before. Notice that for the duration of this slewing period, contacts CFs, FFs and Ssw remain constantly closed (in contrast with the intermittent actuation during the previous tracking period of telescope T2). Sequence switch SSW25 is now patched to counter solenoid sol2 (via closed switch S17 of relay RYXVII) and to slewing solenoid Sls2, grounding the 28 volt D.C.-source through these solenoids and thereby activating the respective mechanisms in the manner explained in Division V, Section a and Division V, Section c with reference to FIGURES 27 and 37, respectively.

The time required for slewing telescope T2 from the terminal angle of its first tracking period to the initial altitude angle of its second tracking period can be roughly estimated. If $x$ seconds are required for rotating the prism through the maximum angle change which is feasible in practice, and if a 50% time safety factor is added, the slewing period can be considered concluded after a time period of $3/2 \times$ seconds. Thus, in a preferred method of operation, a sequence pulse appears in pulse channel IV $3/2 \times$ seconds after the initiating pulse which enacted the star changeover. This pulse cuts the power from the telescope T2 altitude angle generator whereupon telescope T2 remains ready in its new altitude setting for the next tracking period assigned to it. As telescopes T1 and T4 must continue in their tracking operation while the cut-off pulse for telescope T2 occurs, the switching schedule established for this latest sequence step requires that sequences switches SSW21, SSW22, SSW26 and SSW27 remain "patched" to the same circuits but that the circuit connections from sequence switches SSW25, SSW28 and SSW29 be interrupted (no patches) so as to de-energize solenoids Sls2, sol2 and relays RYXIV and RYXXI, respectively.

The above described sequence control is typical for the initiation of any tracking or slewing periods. Therefore, in the adopted example, the switching procedure for the subsequent tracking period of telescope T3 and for the resetting or slewing period of telescope T1 etc. can be traced out with the help of FIGURE 67 without any further explanation.

Star changeover may also be carried out simultaneously on two telescopes. This simultaneous operation can likewise be traced out in FIGURE 67. However, since such a program of simultaneous changeovers is seldom scheduled in practice, the slight circuit modifications required are not shown on FIGURE 67. It is, for example, possible to execute simultaneous switchovers to two alternate telescopes in conjunction with the resetting of one of the abandoned telescopes. After termination of the resetting process, the same sequence pulse which cuts the power from the elevation drive motor of the reset telescope can be used to initiate the resetting of the second abandoned telescope. One additional sequence pulse is needed in this procedure for stopping the second elevation drive motor. This sequence pulse must not affect the operation of the two tracking telescopes. In an alternate method which permits simultaneous resetting of two telescopes (no additional sequence pulse), sequence switches SSW25, SSW28 and SSW29 of FIGURE 67 are patched to two telescopes simultaneously, and the set-up of sequence switches SSW23 and SSW24 is duplicated so as to provide means for simultaneous slewing of two telescopes either at phase $\phi 10$ or at phase $\phi 20$.

If desired, automatic control can be over-taken by manual switches (located in master controller panel of FIGURE 66). The essential circuitry for manual operation has been drawn into the diagram of FIGURE 67 where numerals SLS1, SLS2 and PSlE designate the "ganged" manual switches described in connection with FIGURE 66. These switches remain in their neutral positions (marked with "o") when the telescopes are tracking. Switch SLS2 serves to connect the circuitry either for "manual slewing" (positions marked "1") or for "manual stepping" (positions marked "2" of the altitude angle mechanism, the contacts marked "1," "2," "3" and "4" of the switch assembly SLS1 being used to select one of the four telescopes for the mode of actuation selected by switch SLS2. The ganged switch PS/E to the right is used for application of the necessary power to enact the selected manual control. For example, if it is desired to slew telescope T2 "manually" to a higher altitude angle, switches SLS1 and SLS2 are set as shown in the drawing, and switch PS/E is pulled to the lower contacts (phase $\phi 10$ driving the prism "up,"as previously assumed). 28 volts D.C. is thereby applied to the slewing solenoid S$ls$2 of telescope T2 (box CT2) and to relay RYXVII, the latter acting to open switches S17, thus preventing the power to reach counter solenoid $sol$2 and therefore leaving the setting of the reset-counter of FIGURE 37 undisturbed. Simultaneously, relay RYXIV and RYXXI are grounded, permitting the phase $\phi 10$-400 cycle power supply to reach the CF-coils of drive motor M$o$2, the 400 cycle FF-power and the 28 v. D.C. power being at the same time admitted to the fixed field coils of motor M$o$2 and to stepping solenoid S$s$2, respectively.

Similarly, the selected telescope can be "manually stepped" in measured increments if switch SLS2 is connected to contacts marked "2," slewing solenoid S$ls$ remaining disconnected during this operation and manual power switch PS/E being actuated for brief moments at a time.

The coil-arrangement shown in the dotted box $fpc$1 (upper right corner of FIGURE 67) represents the two solenoids associated with the channel I path pulse counter $fpc$1. These solenoids are here designated with numerals S$n$3 and S$n$4 and correspond to solenoids S$n$8$a$ and S$n$8$b$ described in connection with FIGURES 60, 61 and 62 in the general discussion of the working principles of the two-way ratchet drive which is here adapted to drive the path pulse counters as explained with reference to FIGURE 66. It can be seen that according to the position of relay RYXII, 28 volts D.C. will be grounded through coil S$n$3 or coil S$n$4 whenever a pulse from the function pulse channel I of playback F$d$ closes switch S10. Therefore, one unit will be added to or subtracted from the number on the indicating dial of path pulse counter $fpc$1 (FIGURE 66) according to whether the tracking telescope T1 or T3 increases or decreases its altitude angle by one function step. Box $fpc$2 contains the identical units for the function pulse channel II counter $fpc$2 as those described for box $fpc$1. This counter registers the altitude function pulses destined for telescope T2 or T4 and operates in identical fashion as counter $fpc$1.

Letters D1S and PCH designate a Direction Indicator Switch and a Path Change Switch, respectively. These switches are located in the left lower corner of the master controller panel (belonging to the group of switches designated summarily with "CS$w$" in FIGURE 66). The upper contacts of both switches connect to function pulse channel I and the lower contact to function pulse channel II. When switch D1S is momentarily held in its upper or channel I-position, it will cause function pulse counter $fpc$1 to add or subtract a number according to whether switch S12 is held against its upper or lower contact by one of the two stationary positions of relay RYXII. Thus, in the absence of function pulses from function channel I, switch D1S will reveal the position of relay RYXII and thereby indicate whether this relay is set for a function pulse increase (addition) or a function pulse decrease (subtraction) of the prism altitude angle. Any number of pulses added-to or subtracted from counter $fpc$1 by operation of switch D1S does not affect the actual prism position (switch S10$s$ remaining open) and can be cancelled from the indicated counter number by appropriate manual rotation of winged knob $c$ through the respective number of digits. The same principles apply to the channel II-position (lower contact) of switch D1S. Switch PCH permits arbitrary actuation of relay RYXII, thereby providing means for reversing the sense of direction of the function pulses from channel I or channel II.

(3) TELESCOPE AZIMUTH MOTOR CONTROL (MOTOR DRIVE SEQUENCE CONTROL CIRCUITRY)

The sequence-control circuitry for pre-setting and re-setting the telescopes to the pre-calculated azimuth angles relative to the platform, in one of its preferred forms of execution, comprises essentially an A.C. bridge which must be so pre-adjusted that balance of the bridge is established when the telescopes are in the correct specified azimuth position. The principles of this telescope azimuth motor drive are illustrated in the simplified circuit diagram of FIGURE 69.

A review of FIGURE 31 shows that a helipot H$e$ is provided in the vicinity of each telescope barrel T$b$, whose contact arm is linked with shaft $sh$, the latter being geared to the telescope barrel T$b$ (via worm-and ring-gears) and to azimuth drive motor A$zm$. The position of the contact link along the resistive member of helipot H$e$, through rotation of motor A$zm$, shaft $sh$ and telescope barrel T$b$, becomes a function of the azimuth position of the line of sight of the telescope prism. In the master controller unit M$cs$ (see FIGURE 66), a series of helipots H$p$, similar to those geared to the telescope azimuth drive motors, is mounted in such a fashion that according to the setting of the associated sequence switches, either one of these helipots may be utilized in combination with one of the four telescopes. In the simplified diagram of FIGURE 68, resistive bridge member H$p$ represents one of the helipots of master controller MC$s$ and is shown connected across a 60-cycle power source in parallel with the resistive bridge member or helipot H$e$ of the associated telescope azimuth drive system represented by dashed box $a$T containing the azimuth drive motor A$zm$. Contact point $c$H$e$ indicates the position of the movable link member along the resistive bridge-member of helipot H$e$. Contact-point or arm $c$H$p$ of helipot H$p$ is manually adjusted, its successive positions along the resistive bridge member being calibrated so as to read in terms of azimuth degrees covering a scale of plus and minus 50 degrees from a central zero point. (See calibrated knobs, H$p$1, H$p$2, H$p$3 or H$p$4 in FIGURE 66.) The potential across both contact points $c$H$p$ and $c$H$e$ is fed to a phase responsive circuit $phr$ with associated power amplifier (slewing amplifier) $sla$ whose output varies in magnitude and reverses its phase in accordance with the magnitude and sense of unbalance existing across points $c$H$p$ and $c$H$e$ of the bridge system. Such an unbalance develops whenever the azimuth position of the associated telescope does not correspond to that represented by the azimuth setting of helipot H$p$, the motions of contact arm $c$H$e$ being so calibrated that for a range of azimuth rotation of the telescope of 50 degrees on either side of its zero position on platform P$l$, the contact arm moves to either side of a zero position on resistive bridge member H$e$ in exact correspondence with the calibrated motion of contact $c$H$p$ on helipot H$p$. In other words, the bridge system is so balanced that whenever the angular settings of helipot H$p$ and of the telescope are identical, current flow to unit $phr$ ceases, and the output from amplifier $sl$A which feeds the control fields of the telescope azimuth drive motor A$zm$ is reduced to zero, bringing the motor to a stop. Whenever the telescope azimuth deviates from the azimuth setting of helipot H$p$, the bridge-unbalance causes telescope rotation in the proper sense so as to nullify the unbalance. The azimuth setting of any particular telescope is thus "slewed" to the setting of the particular helipot H$p$ which happens to be "patched" to it by one of the sequence switches, provided of course that the latter is in the correct sequence position so as to establish the necessary connections to the helipot and thereby to complete the above described bridge control system. Each of the helipots H$p$ in the master controller MC$s$ is connected to a pre-selected telescope through appropriate "patching" of the corresponding sequence switches. One of the preferred methods of automatic telescope azimuth angle pre-setting and resetting control will now be described with reference to the circuit diagram of FIGURE 69. This diagram presents a more detailed layout of the bridge type servo system of FIGURE 68 and includes all necessary switching controls for automatic and manual operation.

A plurality of master-controller-helipots $hp1$, $hp2$, $hp3$, $hp4$ and a center-tapped resistive member $mvd$ to the left of the diagram, as well as four telescope azimuth drive helipots H$e1$, H$e2$, H$e3$ and H$e4$ to the right of the same diagram can be seen connected in parallel across the secondary of transformer T$r12$ in the upper center of the drawing whose primary is supplied from a 60 cycle power source. (Boxes $aT2$, $aT3$ and $aT4$ to the right of the diagram contain the identical components as those drawn into box $aT1$, each of the four boxes representing essentially the right-hand portion of the bridge system of FIGURE 68, i.e., part of the azimuth drive control system associated with each one of the four telescopes T1, T2, T3 and T4, respectively.) Parts A$zm$, H$e$ and $sh$ of FIGURE 31 are here provided with the appended numerals "1," "2," "3" or "4" (see boxes $aT1$, $aT2$, $aT3$ and $aT4$) in order to identify them as components of the azimuth drive system of telescopes T1, T2, T3 and T4, respectively. The same applies to contact points $cHe$ and $cHp$ of FIGURE 68. Phase $\phi 10$ of the voltages in the secondary of transformer T$r12$ is here assumed to operate in a sense so as to drive azimuth motor A$zm$ clockwise (CW), the opposite phase $\phi 20$ causing counterclockwise (CCW) motor rotation. (In the present circuitry, phase $\phi 10$ identifies the condition of current flow between points $cHp$ and $cHe$ in which the voltages at $cHp$ are higher than at $cHe$, such as when contact $cHp$ in the drawing is closer to the upper end of helipot resistor H$p$ than contact $cHe$ relative to the upper end of helipot resistor H$e$. The opposite phase, or phase $\phi 20$, prevails between points $cHp$ and $cHe$ when the voltage level at $cHe$ is higher than that at $cHp$.) A prerequisite for this condition of motor rotation is the proper phase of the voltages in the fixed field coils FF of motors A$zm$ which are constantly supplied from power source P$w10$ through limit switches L$swa$ (source P$w10$ being actually the same as that of transformer T$r12$ but 90 degrees phase-shifted by means not shown). By way of the switching system to be described below, one of the contact points $cHp$ (master controller) is connected to input line $l10$, and one contact point $cHe$ (telescope azimuth drive) is connected to input line $l11$ of phase sensitive amplifier $phr$. The output from slewing amplifier $sla$, in turn, is fed to the control field CF of the particular azimuth drive motor A$zm$ to which it is "patched" by one of the sequence switches (i.e., to the same motor whose helipot contact $cHe$ is at the same time connected to unit $phr$). Any output from slewing amplifier $sla$ originating from the comparative setting of contacts $cHp$ and $cHe$, i.e., originating from an unbalanced bridge setting which causes current flow of phase $\phi 10$ or $\phi 20$ through the input circuits to phase sensitive amplifier $phr$, will drive the corresponding motor A$zm$ in a direction which moves contact $cHe$ (through shaft $sh$) towards the balance point of the bridge system as previously explained with reference to FIGURE 68. This motor actuation simultaneously rotates the prism into the azimuth position prescribed by the setting of contact point $cHp$, and when this position has been reached, contact point $cHe$ will have advanced to the balance point, eliminating the error voltages from lines $l10$ and $l11$ and bringing motor A$zm$ to a stop.

Operation of the switching system or sequence control can best be illustrated by following through the example of an assumed operating condition. Let telescopes T1 and T2 be tracking while telescope T3 is being reset, telescope T4 remaining in a waiting condition. Hence:

(a) Sequence switch SSW15 having been actuated (advanced to a new "patch") by a sequence pulse from the playback unit (not shown in the present drawing) at the initiation of the present operating sequence, now connects the output from tracking amplifier $trA$ (which receives azimuth tracking error signals from telescope T1 over line A$zc$ of FIGURE 31) through closed relay RYV to the control field CF of the telescope T1 azimuth drive motor A$zml$. (Telescope T2, as will be remembered, remains stationary relative to the platform during tracking. Its azimuth tracking error signals are fed to the yoke torque motor Y$m$ as shown in FIGURE 25.)

(b) Sequence switch SSW17, through the same sequence pulse, now connects the output from slewing amplifier $sla$ to the control field CF of the azimuth drive motor A$zm3$ of telescope T3.

(c) Sequence switch SSW18 now connects contact $cHp3$ of master controller-helipot H$p3$ through upper zero-contact (marked "o") of ganged manual power switch PS$lA$ to input line $l10$ of phase sensitive amplifier $phr$.

(d) Sequence switch SSW19 now connects contact point $cHe3$ of the telescope T3 helipot H$e3$ through the zero-contact (marked "o") of the central portion of manual slewing switch SLS2 to input line $l11$ of phase sensitive amplifier $phr$. Thus, azimuth motor A$zm3$ of telescope T3 rotates the telescope clockwise or counterclockwise according to whether it receives phase $\phi 10$ or phase $\phi 20$ currents from amplifier $sla$, until contact point $cHe3$ of the telescope T3 helipot reaches the balance point whereupon output from unit $sla$ ceases, leaving the telescope in the correct azimuth waiting position of the helipot H$p3$ setting, ready for its next tracking period.

If it is now assumed that a star-changeover takes place in which telescope T2 ceases its tracking functions and is ready to be reset for a future tracking period while the task of tracking a new primestar is transferred to telescope T4 and telescope T1 continues to track its star, telescope T3 remaining in waiting condition. Hence:

a) Sequence switch SSW15, through another sequence pulse, is advanced to a "patch" which maintains the previous connections to the telescope T1 drive.

(b) Sequence switch SSW17, through the same second sequence pulse, now connects output from slewing amplifier $sla$ to the telescope T2 azimuth drive.

(c) Sequence switch SSW18 now connects contact arm $cHp2$ of master controller helipot H$p2$ to input terminal $l10$ of unit $phr$.

(d) Sequence switch SSW19 now connects contact $cHe2$ of the telescope T2 helipot to input terminal $l11$ of unit $phr$. Telescope T2 is thereby driven in azimuth until it reaches the correct waiting position determined by the balance point preselected through the setting of master controller helipot H$p2$. (Telescope T4, as previously telescope T2, remains stationary relative to the platform while it is tracking its star, the azimuth tracking errors of this telescope likewise being fed to the yoke torquer.)

Provisions are made for bypassing the various sequence switch control channels for the telescope azimuth drives. In one mode of this independent control, the helipot bridge system is utilized prior to the actual flight for slewing each telescope to the initial azimuth tracking position which it is to occupy at the onset of its first tracking period. In a second mode of independent control, the bridge system is also bypassed so that any one telescope can be rotated clockwise or counterclockwise by remote control in complete independence from the setting of the helipots in the master controller. For the first mentioned mode of operation (so called "helipot slewing"), the circuits are so arranged that one of the master controller helipots, such as helipot H$p$4 of FIGURE 69, can be used for pre-setting each of the four telescopes to its first initial azimuth tracking angle. This is done simply by first switching telescope selector switch SLS1 to contacts "1" (telescope T1) and slewing mode selector switch SLS2 to contacts "2" ("helipot slewing") and by adjusting helipot H$p$4 to the desired pre-set azimuth angle of telescope T1 before applying power through slewing power control switch PS$l$A. The circuit diagram of FIGURE 69 shows that with this switch setting, helipot contacts $c$H$p$4 and $c$H$e$1 are placed across the input lines $l$10 and $l$11 respectively, of phase sensitive amplifier $phr$, and the output from slewing amplifier $sla$ is connected to the control field CF of the telescope T1 azimuth drive motor A$zm$1. Switch PS$l$A, in this case, may be turned either way, the phase of the voltages across lines $l$10 and $l$11 depending on the relative setting of bridge points $c$H$p$4 and $c$H$e$1 and not on the $\phi$10 or $\phi$20 setting of switch PS$l$A. The index needle on an indicator dial not shown in the present drawing (see dial HPI in FIGURE 66) interprets the sense of azimuth rotation of the telescope during actuation of switch PS$l$A and also shows when the telescope has reached its desired position. After turning switch SLS1 successively to contacts 2, 3 and 4, the above described process of azimuth pre-setting is repeated on telescopes T2, T3 and T4, respectively, switch SLS2 remaining in position "2" throughout and helipot H$p$4 being used for all four telescopes. (See step-by-step description of this procedure given in Division V, Section $i$, B with reference to FIGURE 66.) Helipots H$p$1, H$p$2, H$p$3 and H$p$4, thereafter, are manually adjusted to the azimuth reset angles which, in accordance with the pre-computed trajectory schedule, are to become effective at the onset of the second tracking periods of the respective telescopes. (In the circuits presented in FIGURE 69, only four helipots H$p$ are provided. It is understood that additional helipots and switching facilities may be used for resetting the telescopes to their third initial azimuth tracking angles if third tracking periods are contemplated in the flight schedule.)

In the second above mentioned mode of control (so called "manual slewing"), any one of the four telescopes may be rotated at will after first turning switch SLS2 to contacts "1." The center tap of voltage divider $mvd$ across the secondary of transformer T$r$12 is now connected to line $l$11. If telescope selector switch SLS1 is turned to the selected telescope, the output from slewing amplifier $sla$ feeds to the control field CF of the selected azimuth drive motor A$zm$. With switch SLS2 in position "1," phase $\phi$10 or $\phi$20 is made available at the contacts of switch PS$l$A from source T$r$12 via lines $l$12 and $l$13 respectively. Hence, if switch PS$l$A is turned to the $\phi$10 contact, the voltage (12) across the top half of fixed voltage divider $mvd$ which is now placed across input lines $l$10 and $l$11 of unit $phr$, will be of such a phase as to cause slewing amplifier $sla$ to drive the selected telescope azimuth drive motor A$zm$ clockwise (CW) irrespective of the relative settings of the bridge contacts $c$H$p$ and $c$H$e$ which pertain to the same selected telescope. When switch PS$l$A is turned to the $\phi$20 contact, A.C. voltages from line $l$13 are connected to line $l$10, and since they are referred to the center point of divider $mvd$ which is still joined with line $l$11, the phase of the voltages across lines $l$10 and $l$11 is now opposite to that of the previous switch contact so that unit $sla$ now causes the corresponding telescope azimuth drive motor to turn counterclockwise (CCW). This "manual" control voltage is of fixed magnitude and will rotate the selected telescope in the desired direction as long as switch PS$l$A is held in one of its active positions and as long as the telescope stays within the normal limits of its permissible azimuth excursions from zero. If these limits are exceeded, limit switch L$sw$a will cut off the power supply from source P$w$10 through the fixed field coils FF. (See limit switch L$sw$a in box $a$T1 which is normally closed but here shown in open position. Similar limit switches are provided for all four telescopes but not separately shown in boxes $a$T2, $a$T3 and $a$T4.) If desired, limit switch L$sw$a can be "overridden" by switch O$r$S$w$ as shown in the drawing. This override switch O$r$S$w$ simultaneously shorts out the limit switches of telescopes T1 and T2 or of telescopes T3 and T4. Since switch O$r$S$w$ becomes operative only when current flows through the control fields CF of the telescopes to which it is connected, and since the azimuth motor of telescope T2 or telescope T4 is always inoperative when telescope T1 or telescope T3, respectively, is tracking or in the process of being slewed, "overriding" of a limit switch becomes effective only on one telescope at a time.

When switch SLS2 is turned to position "1," it is also possible to "manually slew" a selected telescope into any desired azimuth position while this telescope is on tracking duty. Assuming that such a control action is desired while telescope T1 is tracking, it can be seen that if switch SLS1 is turned to contacts "1" (selecting telescope T1), the azimuth tracking error correction signal from tracking amplifier $tr$A which is channeled through sequence switch SSW15 ("patched" to telescope T1 for the present sequence) and through the normally closed relay RYV, will be cut off from control field CF of motor A$zm$l due to the opening of relay RYV, provided sequence switch SSW16 has been previously patched for this type of emergency action so that at the sequential step, during which telescope T1 is scheduled to track, the 28 v. power source from switch PS$l$A (lower portion) is channeled to the service circuit which feeds contact "1" of switch SLS1 (second segment from bottom). Since all segments of switch SLS1 are turned to contacts "1," relay RYV will be actuated during this telescope T1 tracking sequence (via the second and third switch-segments) whenever slewing power switch PS$l$A is actuated. Whatever azimuth position telescope T1 may occupy at this moment, it will be caused to rotate clockwise when switch PS$l$A is turned to contact "$\phi$10" (marked "CW" on the dial of this switch in FIGURE 66) and clockwise when the switch is turned to the opposite contact (bottom contact "$\phi$20" in FIGURE 69). Part $res$ is a load resistor which "carries" the tracking signal voltages from part $tr$A when any one of relays RYV, RYVI, RYVII or RYVIII becomes operative during a tracking period.

For any sequencing schedule in which simultaneous star changeovers are contemplated, the circuit arrangement of FIGURE 69 does not provide facilities for simultaneous resetting of azimuth angles on two telescopes. However, a similar procedure may be followed as the one previously recommended for the resetting of prism-altitude angles. One additional sequence pulse is used in this case at a safe time interval after the resetting of the first abandoned telescope. Again, this sequence pulse must leave all circuit connections unchanged with the exception of those associated with the helipot slewing of the second abandoned telescope to its next initial azimuth tracking position. Simultaneous resetting of two azimuth angles (elimination of additional sequence pulse) is possible only if two channels to and from units $phr$ and $sla$ of FIGURE 69 are provided.

DIVISION VI—SUPERVISED CELESTIAL NAVIGATION (INCLUDING SUMMARY ON INITIAL GUIDANCE)

Various methods of preliminary guidance have been conceived for the initial, ground controlled portion of flight to the departure point for ACN guidance of the craft. These methods have reached a high degree of automatism in their present stage of development and will be briefly mentioned inasmuch as, in one form or another, they constitute a prerequisite for the successful application of the ACN system of the present invention. Certain functions of the initial guidance program merit a more detailed analysis since they have a direct bearing on the subsequent performance of the craft under ACN-control. As a whole, however, the preliminary guidance systems do not enter the realm of the subject matter of this specification and are therefore treated in a summary fashion. This applies also to systems involving the so-called "terminal guidance" phase which are omitted entirely from the present specification. Matters which are concerned with preliminary adjustments and with prepositioning of portions of the automatic sextant for the initial guidance phase have been dealt with in the respective preceding sections which cover the various components of the automatic sextant.

The initial guidance program is essentially divided into two parts (see left hand portion of flight plan profile sketch of FIGURE 70): The command guidance phase and the supervised celestial navigation phase (=SCN-phase). The command guidance phase begins shortly after take-off (TF=take-off point). During the initial portion of this phase (i.e., between points 06 and 010), the craft climbs to the prescribed altitude, levels out and orients itself so as to fly at constant speed along a straight line in the prescribed direction of the trajectory; shortly thereafter (point 010), the telescopes begin to track the navigational stars in azimuth and elevation. This second portion of the command guidance phase is called the Star-Acquisition phase during which the bubble signals are still disconnected from the auto-pilot. During the command guidance phase, the craft is controlled by incremental banked turn and airspeed commands from a ground control station (point 07). However, the craft's climb to altitude (25,000 feet) during this initial phase is executed automatically (no thrust commands from ground) through an airborne rate-of-climb controller, activated by a sequence signal from the playback (point 06). The star tracking functions likewise are initiated automatically by a playback sequence signal (point 010) which also swings the bubble turret into azimuth alignment with the trajectory but leaves the bubble signals disconnected from the craft's flight control system until the onset of the SCN-phase.

Two representative types of ground control systems employing presently developed command guidance facilities will be briefly outlined below with reference to the block diagrams in FIGURES 72 and 73.

Transition to the SCN-phase is carried out at some predetermined time after star acquisition when the craft's positional errors relative to the trajectory can be expected to have been reduced to an acceptable minimum value and after the platform and the bubble turret have "settled" in their desired positions, respectively. (Point 011.) This transition again is initiated automatically in the guided craft by a sequence signal from the playback system. On the ground, the transition is made manually. During the SCN-phase, the craft is under control of the ACN-equipment (i.e., the bubble error signals are switched to the automatic flight control system), but will receive supervision in the form of acceleration correction commands from a ground-based computer to which data relating to the difference between the specified and the radar-observed positional coordinates of the craft are fed. (See below.) Any velocity errors of the craft which may be present at the onset of the SCN-phase, are determined with the aid of this ground computer and are reduced to an acceptable minimum by means of the above mentioned acceleration commands. A precise control of the craft is thereby effected immediately prior to the midcourse (ACN) phase of the flight, and 84-minute oscillations of the craft due to initial position-and velocity-errors at the departure point are thus minimized or eliminated. This system of supervised automatic celestial navigation control is more intimately related to the subject matter of this specification and will therefore be explained in greater detail with reference to the drawings in FIGURES 74, 75 76, 77 and 78. (See text following the two ensuing paragraphs on representative overall initial guidance systems.)

The above outlined initial guidance program is summarized below with reference to the sketch in FIGURE 71 which is intended to serve as a complement to FIGURE 70 in as much as it shows additional features not given in the latter figure, the numerals of FIGURE 70 applying also to FIGURE 71. In FIGURE 71, points along an imaginary preliminary flight path *fpt* from the take-off field TF to the departure point DP marked by numerals 01 to 012 represent the following sequence of actuations which constitute one preferred form of procedure (in which the craft is understood to be manned by observers) and which take place at the indicated locations, the latter also suggesting the approximate time separation of these actuations (assuming, for example, a total time of flight from TF to DP of 20 minutes):

Numeral:
  01: Engage autopilot
  02: Level off (15000 feet)
  03: Start playback unit. (Stop-watch method; see Division IV, Section *c*.)
  04: Manual turn. (These 4 steps are the only manual operations aboard. All subsequent actuations are automatically initiated by programmed sequence pulses.)
  05: First sequence signal from playback unit: Airspeed—and altitude control "on." (See Division VII. The first sequence signal moves the sequence switches from contacts No. 1 to contacts No. 2 of FIGURE 65. Before the flight, the sequence switches are set to contacts No. 1 in which the necessary connections for precelestial platform-control are established. Switchover to contacts No. 2 at point 05 of FIGURES 70 and 71, as well as the next following sequence switch advances to contacts No. 3, 4 and 5 at points 06, 07 and 09, respectively, do not alter these particular connections since precelestial platform control is maintained from take-off to the beginning of the star-acquisition period.)
  06: Automatic climb-control "on." (See Division VII.)
  07: Command guidance "on."
  08: Ground controlled turn.
  09: End of climb (25,000 feet). "Maintain altitude" control "on." (See Division VII.)
  10: Star tracking system starts functioning: Platform azimuth (axis X3) control switched from flux valve to azimuth tracking error channel from telescopes T2 or T4. Platform attitude control control (axis X1 and X2 torquers) switched from bubble signal channels to elevation tracking error channels from the two tracking telescopes. Azimuth tracking errors from telescopes T1 or T3 are fed to respective axes X4. Bubble turret swings into alignment with trajectory, but bubble error signals remain still disconnected from craft's automatic control system. (From 010 to 011: Star acquisition phase.)
  011: SCN-phase initiated: Bubble acceleration error signals are switched to automatic flight control system. Acceleration command step-signals from ground computer become operative as bubble-signal bias (acceleration corrections) in bubble signal channels. (See text below in separate chapter under heading "Supervised Celestial Navigation.")
  012: Departure point: Full ACN-control initiated. Altitude angle generators of tracking telescopes begin to receive function pulses from playback unit. Bubble turret azimuth, likewise, passes under control of function pulses from playback unit. Acceleration command signals from ground computer cease.

The remaining portion of FIGURE 70 to the right of 012 is self-explanatory, continuation of the flight plan profile beyond the extreme right end of the drawing entering the "terminal guidance" phase of flight which is excluded from the present specification.

*Radar Link Initial Guidance System.—(See FIGURE 72)*

In the block diagram of FIGURE 72 which illustrates the essential operating principles of this initial guidance system, a central ground control station CCS is assumed to be located near the take-off field, and a radar tracking site RTrS is strategically located in the vicinity of the ACN-departure point. These stations cooperate with airborne units AU. In a further perfected version of the ground control facilities, the equipments of CCS and RTrS are combined into compact mobile units which are stationed in a single location near the projected ACN-departure point. In this latter arrangement, the radio links between CCS and RTrS are eliminated.

An automatic tracking Radar TrR at radar site RTrS receives response pulses from the airborne radar beacon RBe which affect the position of automatic range, azimuth and elevation tracking devices in ground radar TrR according to the instantaneous position of the airborne craft relative to the radar site. A three channel telemetering system (see below) relays the corresponding range, azimuth and elevation data via transmitter TeTr to the CCS-receiver TeRv which feeds these data to indicating dials RAE and to an automatic resolver Rlv (see below), the latter channel being utilized only during the SCN-phase of the initial flight and the elevation data being omitted from this channel. (Elevation data are of value to the CCS-personnel but are not directly used in this type of control system in which, according to FIGURES 70 and 71, climb to altitude as well as subsequent flight at constant altitude are controlled automatically aboard the craft.)

During the command guidance phase, the dial RAE-range and azimuth data are used for plotting the craft's actual track on plotting board *plb*. This plot of the track made-good is compared with a pre-specified plot of the desired track. Deviations of the crafts actual positions from its specified positions are counteracted by manual turn-and throttle-step commands which aim to reduce the range and azimuth errors shown in the plot and are applied on knobs *kb9* and *kb10* of ground control unit *grC*. Flight control unit *fcu*, during this phase, is connected to unit *grC*. (See key above diagram.) One of the knobs of unit *grC* serves for turn control (two knob motions: left or right), the other for thrust control (two knob motions: slow or fast). When released, each knob returns to its neutral (inoperative) position. According to the position in which knob *kb9* or *kb10* is held (one knob actuated at a time), one of the four available audio tone modulated channels of VHF transmitter *vhTr* (each channel corresponding to one of the commands "left," "right," "slow" or "fast") is made operative at regularly stepped brief intervals by a timing motor which drives a stepping pulse cam, the latter in turn actuating the respective stepping relay which gates the selected transmitter channel. (This system whose components are not shown in FIGURE 72, permits 38 possible increments of control, 19 increments on either side of the neutral point for both, turbo boost-and rate of turn-control.) RTrS-receiver *coRv* relays the tone command pulse to one of the four input circuits of pulse rate control unit PRC. (PR=pulse rate.) Tracking radar TrR operates normally on a frequency of 640 pulses per second (p.p.s.); however, under the influence of a command signal from transmitter *vhTr* in one of the four input channels to unit PRC, this latter unit switches the radar's PR temporarily (for a 0.1 sec. period) to one of four different PR's (viz. to 442 p.p.s., 398 p.p.s., 357 p.p.s. or 322 p.p.s.). Control section BeC of airborne beacon RBe responds to this shift in the radar's pulse rate and, accordingly, provides one of four incremental output signals which actuates the corresponding channel in the automatic control system of the craft. (See FIGURES 79 and 83 and text in Division VII for further details.)

As previously pointed out and as indicated in the present block diagram, the switchover from command guidance to SCN occurs in the guided craft under the influence of a sequence pulse from the trajectory playback system (see airborne control box CoB which provides the necessary connections to the automatic flight control system AFC of Division VII. Compare with box CoB in FIGURES 79 and 83) while flight control unit *fcu* at ground control station CCS is manually turned to command computer CoCP. This switchover is synchronized to the airborne switchover by timing control means not shown in the present drawing which also start groundborn SCN-trajectory playback unit *gFd*. SCN-playback unit *gFd* contains precomputed intelligence in the form of range and azimuth values representing the correct time-wise positional relationship of the craft with respect to the site of tracking radar TrR. These specified data are computed and recorded on playback tape by the same type of equipment which is used to compute and record the star altitude functions for playback during the ACN-flight. The present playback signals serve to drive two shaft angle generators which act as input devices for a mechanical resolver in unit Rlv. The latter extracts the craft's positional errors from a comparison of the playback data with those simultaneously furnished by the telemeter link via receiver TeRv. (Range and azimuth data from receiver TeRv reach resolver Rlv also in the form of input shaft positions, the axial rotation angles of these shafts matching those of the range-and azimuth output-shafts of tracking radar TrR from which the telemeter intelligence has been derived. The telemeter system employs a 3000 cycle subcarrier which modulates a conventional VHF or microwave carrier, the subcarrier being shared sequentially by a synchronizing signal and three intelligence channels. The intelligence channels are identified by the order in which they follow the synchronizing signal, and the intelligence proper is imparted on the subcarrier during each intelligence channel period by adjusting the phase of the channel subcarrier relative to the phase of the subcarrier which prevails during the synchronizing period. East intelligence channel phase is controlled by a two-phase selsyn which is geared to the range, azimuth and elevation shafts, respectively, of the tracking radar. In receiver TeRv, a servo system drives the shafts of three selsyns, two of which form the input shafts to unit Rlv. The angular position or phase angle of these shafts matches the phase of the signals in the respective intelligence channels, i.e., the phase of the telemetered range and azimuth signals.)

The range and azimuth errors of the craft registering in unit Rlv are now resolved upon the coordinate system of the specified trajectory, i.e., they are converted into longitudinal and lateral positional errors (relative to the specified positions on the trajectory) which are expressed in terms of D.C. voltages. (See further details by referring to the text accompanying FIGURES 74 and 76. At the present time, this conversion is carried out in a semi-automatic manner to be described below.) As will be shown in greater detail, elements of command computer *coCp* are manually matched to these longitudinal and lateral positional error voltages at the onset of the SCN-phase, whereby an initial condition is established in the computer which originates acceleration commands in its output to which flight control unit *fcu* is connected at the moment of switchover to the SCN-phase. The acceleration commands are step voltages similar to those previously issued under manual control (in this case they represent precisely apportioned plus or minus longitudinal or lateral bubble acceleration-correction signals which follow through the four above mentioned transmitter $vhTr$-and radar site receiver $coRv$-channels into pulse rate unit PRC where they cause the PR of tracking radar $TrR$ to be momentarily shifted to one of the four command or acceleration signal pulse rates, each of these rates corresponding to one of the four command (acceleration) signal channels described before. The airborne control section $BeC$ of radar beacon $RBe$ responds to these PR-shifts as in the case of the previously received manual command signal. However, at the switchover to the SCN-phase, the output from control section $BeC$ is transferred to acceleration controller $AcC$, from which the acceleration controller $AcC$, from which the acceleration command signals issue as plus or minus longitudinal or lateral D.C.-bias voltages which are fed into the respective longitudinal or lateral bubble signal (velocity) channels of the automatic sextant. (See feedline $acs$ to control box $CoB$ and feedline $acsa$ from box $CoB$ to computer unit COM in FIGURE 79. See also feedlines $acsa1$ and $acsa2$ to first integrators $aIn$-$la$ and $aIn$-$lo$ respectively, in FIGURES 81 and 83.) A repeat-back signal from the output of unit $AcC$ is returned to control section $BeC$ where it causes radar beacon $RBe$ to transmit a repeat-back pulse a few microseconds after each normal response pulse. The length of the period of time between the transmission of the response pulse and transmission of the repeat-back pulse indicates which type of acceleration signal—left, right, slow, fast (viz. plus or minus lateral and plus or minus longitudinal)—has been received aboard the craft. Command repeat-back unit $coRb$ at the radar site is triggered by the normal beacon response pulses received by radar $TrR$ and "gates" any repeat-back pulses that follow them, into one of its four output circuits. The period of time between the normal response pulses and the repeat-back pulses determines the output channel into which the repeat-back pulses are channeled. Transmitter $RbTr$ and receiver $RbRv$ operate on the same principles as their counter parts in units $vhTr$ and $coRv$, respectively, and the repeat-back voltages are ultimately fed back into command computer $coCp$ from flight control unit $fcu$. The purpose of this repeat-back loop is to let computer $coCp$ know the nature of acceleration signals actually received by the airborne automatic flight control system. At present, certain manual operations on flight control unit $fcu$ not shown in FIGURE 72 but briefly discussed below in connection with FIGURE 76 serve to determine the rate of change of the craft's positional errors from successive observations of the magnitude of the lateral and longitudinal error voltages which issue from resolver $Rly$ at regular intervals, and to establish this same rate of change for the matched elements of computer $coCp$. (Refer to FIGURE 76.) This method of simulating the craft's motion in the computer permits not only to resolve the unknown velocity component in the craft's initial positional errors, but also to develop the most suitable acceleration program for minimizing these errors in the shortest possible time. At the instant of arrival of the craft at the specified departure point for the ACN-flight, the ground control functions cease, and the craft continues to fly under full control of the ACN-system.

*Shoran Type Initial Guidance System.—*
*(See FIGURE 73)*

In this highly precise automatic initial guidance system, shown in the simplified block diagram of FIGURE 73, airborne automatic Shoran equipment supplies measured positional data (in the form of ranges to each of the two ground stations $STr1$ and $STr2$) to resolver $RvS$ which compares the measured data with specified data received from the magnetic film playback system $FdS$ and resolves the craft's positional errors onto the coordinate system of the specified trajectory. The output of the resolver is fed to the automatic flight control system and is used to guide the craft over the specified initial guidance course. The Shoran base stations $STr1$ and $STr2$ are placed approximately 50 miles on each side of the specified trajectory on a "baseline" that is roughly perpendicular to the specified trajectory. (See "NOTE" following next paragraph.) The sequence of the events during the initial guidance phase is as follows:

The craft takes off at a point located approximately 50 miles from (ahead of) the baseline and flies on autopilot along the specified trajectory until it comes within radio range (line of sight) of the ground stations. At this time, control is switched to the automatic Shoran equipment which initiates turn and throttle commands, and a period of approximate navigation is started. During this period, magnetic azimuth reference is used. Because of the complexity of the problem of resolving positional errors in the vicinity of the baseline, Shoran guidance is discontinued shortly before the craft crosses the baseline, and control is returned to the autopilot which holds the last Shoran heading. As soon as the craft emerges from the baseline area, Shoran guidance is resumed.

(NOTE: In a modification of this type of initial guidance system, the two Shoran beacon-stations are set up 100 miles apart on a baseline which is parallel with the specified direction of the craft's trajectory. Extremely accurate positional data are here obtained over a larger, continuous range.)

When the plane which has been climbing at an optimum rate since take-off reaches altitude (25,000 feet), the navigational stars are acquired and control is switched to the ACN-system. A period of precise navigation follows. During this period, the bubble output signals from the automatic sextant (velocity error signals) are biased by signals from a small airborne computer (not shown) in such a way as to minimize the craft's positional and velocity errors as measured by the Shoran equipment and the airborne computer. When all errors are acceptably small, use of the Shoran equipment is discontinued. At this time, the craft has reached a maximum distance of 225 miles from the Shoran base stations. (Interrogator $Irr$ and automatic range tracker $aRT$ are parts of a modified Banshee equipment, not to be described here.)

*Supervised Celestial Navigation*

The analysis of SCN-control given below with reference to FIGURES 74, 75, 76, 77 and 78 serves to further clarify the important function of this system of precise flight supervision which is applied immediately prior to the ACN-phase of flight, and to give additional data on the performance of resolver $Rlv$ and command computer $coCp$ of FIGURE 72 whose general operational principles have just been described.

In the upper portion of FIGURE 74, point DP—SCN on trajectory $Tr$ indicates the specified location on the desired flight path at which the switchover to supervised celestial navigation is scheduled to take place. Point $pt0$ is the actual location of the craft at the specified instant, this point being defined by the craft's longitudinal positional error $+\phi 6$ (parallel with trajectory $Tr$) and the craft's lateral positional error $-\lambda 6$ (perpendicular to $Tr$). Both these errors are determined from radar observation. (See text below. The positive sign is here affixed to $\phi 6$ and $\lambda 6$ for positions ahead of the specified point and south of the trajectory, respectively, south being taken to lie below $Tr$ in the drawing. The craft is assumed to approach $pt0$ on a course $pTr$ parallel with $Tr$).

It has been stated in the introductory text of this specification that if at any instant the vertical or plumb bob, observed aboard the craft, coincides with the vertical specified for that instant, the craft is either at the specified position on the trajectory, or it is accelerating towards that position. If the craft is initially displaced from the specified position as in FIGURE 74, and if its subsequent motion is controlled so that the observed and specified verticals always coincide, i.e., so that the bubble acceleration signals measured in the specified platform plane continually are reduced to zero, then the craft will swing about the specified moving position at an 84 minute period as if it were an earth's radius pendulum. This condition is represented schematically in the drawing by the above specified components $\phi 6$ and $\lambda 6$ of error vector $\mu 6$, the latter directed from the successively observed positions $pt0$, $pt1$, $pt2$, $pt3$, $pt4$ . . . $pt8$ towards the respective specified positions on $Tr$ which the craft should occupy at instants of time $t_0$, $t_1$, $t_2$, $t_3$, $t_4$ . . . $t_8$, these instants here being arbitrarily separated by equal time intervals of 10.5 minutes. It is seen, that at time $t_8$, viz. after eight such intervals ($t_0$ to $t_8$=84 minutes), the error vector components $\phi 6$ and $\lambda 6$ resume the same magnitude and direction as at time $t_0$, and after four intervals, they are of equal magnitude as those of time $t_0$ but pointing in the opposite direction. At time $t_2$ and $t_6$, i.e., halfway between time $t_0$ and $t_4$, and halfway between time $t_4$ and $t_8$, they pass through zero values. The periodic variations in magnitude and sense of these error vector components are assumed to be in phase since, at the onset of the SCN-period, the longitudinal and lateral bubble acceleration error signals exhibited by these vectors become operative simultaneously. (It must be remembered that the craft has been approaching point $pt0$ at constant altitude and speed. Vertical accelerations, therefore, can be assumed to be non-existent, and the observed vertical can be taken as being held in a state of equilibrium when the craft reaches $pt0$.) A curve joining the locations $pt0$ to $pt8$ of the craft represents one period of a 84 minute compound oscillation of the craft about the specified positions on the trajectory (lateral and longitudinal variations combined in one curve). The amplitude of these oscillations depends on the initial values of $\phi 6$ and $\lambda 6$ at time $t_0$. In order to show briefly how this 84 minutes-periodicity can be derived, the resultant error vector $\mu 6$ of FIGURE 74 for position $pt0$ at time $t_0$ is represented in the sketch of FIGURE 77 as the (greatly exaggerated) distance "$xx$" between the observed instantaneous position at $pt0$ and the specified instantaneous position at DP—SCN above the profile of the earth's surface $Ea$ as seen in a cross-sectional plane through the (gravity) center of the earth. In both positions, platform $Pl$ is held in the specified horizontal plane. The specified vertical $Vs$ at DP—SCN is shown coincident with the observed vertical $Vo$, here represented as the local gravity vertical pointing at the (gravity) center $g0$ of the earth; at $pt0$, $Vs$ forms an angle $\theta 6$ against the local vertical $Vo$ (viz., against the vertical at equilibruim observed aboard at time $t_0$) which equals the angle subtended at $g0$ by the earth radius vectors $\overline{R}$ from $g0$ to DP—SCN and from $g0$ to $pt0$, respectively.

If the guided craft were suspended at $g0$ as a simple pendulum with its position of equilibrium at DP—SCN (drawing of FIGURE 77 turned upside-down), a condition for simple harmonic motion would prevail if the craft were displaced to position $pt0$. (Displacement angle $\theta 6$ small, acceleration forces directed towards the position of equilibrium at DP—SCN, becoming effective at the craft in position $pt0$, are negatively proportional to the displacement "$xx$" from position DP—SCN.) Such a condition is actually present at the craft since the error "$xx$" in the craft's position is compensated by an acceleration of the craft directed towards the correct position DP—SCN (vector $\mu 6$ of FIGURE 74) which is proportional to the displacement "$xx$" of the craft from DP—SCN. The magnitude of this acceleration is approximately $$\frac{g}{\overline{R}}$$

times the displacement "$xx$" from DP—SCN (where $g$=acceleration of gravity=32.2 ft./sec.² and where $\overline{R}$=radius of earth=4000 miles=4000×5280 ft.).

The bubble acceleration error signal $\gamma 6$ resulting from this displacement, can be expressed in units of acceleration as follows:

$$\gamma 6 = \frac{d^2xx}{dt^2} + g \sin \theta 6$$

where $g \sin \theta 6$=horizontal component of acceleration of gravity $$\sin \theta 6 = \frac{xx}{\overline{R}}$$

The acceleration of the craft, in accordance with a previous statement, is such that:

$$\gamma 6 = \frac{d^2xx}{dt^2} + \frac{g}{\overline{R}}xx = 0$$

$$\frac{g}{\overline{R}} = \frac{32.2 \text{ ft./sec.}^2}{(4000 \times 5280) \text{ ft.}} \simeq \frac{1}{800^2} \text{ sec.}^{-2}$$

If $\omega 6$ represents the angular velocity of the swinging pendulum and T6 the period of harmonic motion, then:

$$\omega 6 = \sqrt{\frac{g}{\overline{R}}} = \frac{1}{800} \text{ sec.}^{-1}$$

$$T6 = \frac{2\pi}{\omega 6} = 2\pi \times 800 \text{ sec.} = 83.7 \simeq 84 \text{ minutes}$$

Such an oscillatory motion can be present with the specified and observed verticals remaining constantly in coincidence as demonstrated in the sketch of FIGURE 78 where a pendulum $Pnd$ (actually of earth's radius length) is assumed to be suspended from the platform $Pl$ which remains in its specified horizontal position throughout the craft's oscillatory motion ($Vs$=specified vertical). If the craft is initially (at time $t_0$ of FIGURE 74) in position, $pt0$, and its specified position is at DP—SCN (=specified equilibrium position) with $Vs$ here pointing at the gravity center $g0$ of the earth $Ea$, the craft's acceleration in the direction of arrow $acc$, through action of the bubble error signals, is of such magnitude as to displace pendulum $Pnd$ from its observed equilibrium position $oQ$ (coinciding with $Vo$) to position $sQ$ which coincides with $Vs$. This is tantamount to an assumed instantaneous reduction to zero of the bubble acceleration error signals by action of the craft's automatic rudder and thrust control. As the pendulum begins to swing back towards its equilibrium position $oQ$, it remains coincident with $Vs$, its tendency to swing to the left of $Vs$ being nullified by the craft's acceleration towards DP—SCN. When the craft "swings" through position DP—SCN, and as the pendulum is carried past its position of equilibrium, an opposite acceleration force begins to build up at the pendulum which reaches a maximum at time $t_4$ in position $pt4$ (in the direction of arrow $acc1$), causing the pendulum to reverse its direction of swing. This opposite acceleration force slows the motion of the pendulum from DP—SCN towards $pt4$, resulting in a tendency of the pendulum to lag behind the craft's motion and thus to move to the right of $Vs$. This tendency of the observed pendulum to move to the right of $Vs$ is here tantamount to a negative bubble acceleration error signal (i.e., a signal in opposition to that originated at $pt0$) which results in a corresponding negative acceleration of the craft. This slowing motion of the craft prevents the pendulum from swinging to the right of $Vs$. If the bubble error is thus constantly nullified, and the control action is taken to be instantaneous, the pendulum remains virtually coincident with $Vs$, the negative acceleration of the craft reaching its maximum also at $pt4$, causing a reversal of the craft's motion in synchronism with that of the observed pendulum. To an observer aboard the craft, the pendulum thus appears in equilibrium in the specified vertical direction whereas, in actuality, it swings about the unknown position of equilibrium $oQ$ in exact synchronism with the craft's (unknown) oscillatory motion about the specified position.

Returning to FIGURE 74, it becomes evident after the beforesaid that while the automatic rudder-and thrust-control system operates to hold the craft onto the specified trajectory by constantly reducing the bubble acceleration error signals to zero, it does not, by itself, detect and eliminate 84-minute oscillatory deviations from the specified track which are introduced by an initial position (or velocity) error. Such initial trajectory errors of the craft cannot readily be determined aboard the craft, and the nature and magnitude of ensuing 84-minute oscillations therefore remain unknown quantities as long as these initial errors are unknown.

So far, attention has been directed only to the effect of initial positional errors of the craft. Briefly, these errors are no more serious than to cause an 84-minute oscillation of amplitude proportional to the initial error as stated above. Initial errors in velocity, however, contribute 84-minute oscillations of amplitude roughly 800 units for each unit per second of initial velocity error. The problem of determining the initial positional errors is not serious since radar fixes are accurate to within the sensitivity of the guidance system. Velocity measurements from radar data have the inherent disadvantage that the process of differentiation accentuates random error. This effect, coupled with the extreme sensitivity of the ACN-system to initial velocity error, makes control of initial velocity directly from radar data impracticable.

However, since after inception of the SCN-phase of initial flight, velocity data of the required accuracy are present in the automatic sextant's output (bubble error signals after the first integrators $aIn-la$ and $aIn-lo$ in FIGURE 81, Division VII), it is possible to make available to the SCN-system here described two measurements of the craft's motion, viz., position from radar and acceleration (actually acceleration difference) from ACN, and to control the craft under a prescribed acceleration program which fully utilizes the inherent accuracy of both measurements. (It should be also noted that integration tends to reduce the effects of random error.) As already pointed out previously, this is done by biasing the inputs to the above cited acceleration integrators $aIn-lo$ and $aIn-la$ shown in block form in FIGURE 81. Determination of the optimum acceleration program is reduced to a single quasi-automatic computation with radar data smoothed over a long period of time so as to diminish random errors. The method of deriving the magnitude of the initial position-and velocity-errors and of damping out ensuing 84 minute oscillations will now be further described with reference to FIGURES 74, 76 and 75.

The bottom portion of FIGURE 74 is a projection on an enlarged scale of the initial time intervals $t_0$ to $t_3$ of the top portion of the drawing onto the same trajectory $Tr$. Range (distance) and azimuth (direction) from radar site $RTrS$ (FIGURE 72) of specified SCN-starting point DP—SCN and of the actual SCN-starting point $pt0$ occupied at the specified instant $t_0$ are represented by vectors $R_s$, $R_0$ and azimuth angles $\psi_s$, $\psi_0$, respectively, angles $\psi_s$ and $\psi_0$ being measured clockwise from the normal to $Tr$ through $RTrS$, the latter assumed to be located south of the initial portion of the trajectory. Conversion of positional errors in azimuth and range, as measured at $RTrS$, into longitudinal ($\theta6$) and lateral ($\lambda6$) positional errors from the specified position on trajectory $Tr$ is carried out by auxiliary electronic computing devices in units $Rlv$ and $coCp$ of the block diagram in FIGURE 72. These computing circuits operate to solve the following equations:

$$\lambda6 = R_0\Delta\psi \sin \psi_s - \Delta R \cos \psi_s$$

and $$\phi6 = \Delta R \sin \psi_s + R_0\Delta\psi \cos \psi_s$$

which have been derived by trigonometry for expressing $\lambda6$ and $\phi6$ in terms of the known measured quantities $\Delta R = R_0 - R_s$ and $\Delta\psi = \psi_0 - \psi_s$, these latter data being extracted in unit $Rlv$ in the manner previously described with reference to FIGURE 72. At the present time, this process of conversion of range and azimuth error data into longitudinal and lateral trajectory error data is carried out in a semi-automatic manner in which a manually operated resolver takes the place of the automatic resolver $Rlv$ shown in the diagram of FIGURE 72. (Omit input shafts from facilities $gFd$ and $TeRv$ shown in the same diagram.) The operators are provided with a pre-computed time table from which they can read the quantities $R_s$ and $\psi_s$ which apply to given instances separated by regular intervals, say by 17 seconds each (or more, if necessary). Observed data $R_0$ and $\psi_s$ are read from dials RAE of FIGURE 72 at these predetermined intervals, and compared with those of the time-table readings which apply to the same instant of time.

Three dials are provided on the front panel of the resolver: one dial is set to the value $\Delta R$ from a mental computation of the difference between the $R_s$ and $R_0$ readings which becomes effective at the beginning of a given 17-seconds-interval; the second dial is set to the value of the $\psi_s$-reading specified for this same instant. The third dial is set to the value $R_0\Delta\psi$ after mentally subtracting $\psi_s$ from $\psi_0$ and multiplying $\Delta\psi$ with the corresponding value of the $R_0$ reading. These dial settings provide D.C. output voltages of corrseponding magnitude which are fed to an auxiliary computer in command computer $coCp$. The second dial ($\psi_s$-data) actuates two sine potentiometers in unit $Rlv$ which deliver the quantities $\sin \psi_s$ and $\cos \psi_s$ as proportionate D.C. voltages. From the input data $\Delta R$, $R_0\Delta\psi$, $\sin \psi_s$ and $\cos \psi_s$, the auxiliary computer first derives the products $R_0\psi \sin \psi_s$, $\Delta R \cos \psi_s$, $\Delta R \sin \psi_s$ and $R_0\Delta\psi \cos \psi_s$ and then proceeds to add and subtract these products in order to satisfy the above equations for $\lambda6$ and $\phi6$. Electronic circuitry is used for these computations, and the quantities $\lambda6$ and $\phi6$ reach the command computer $coCp$ as corresponding D.C. voltages.

In the simplified block diagram of FIGURE 76, the airborne and radar site-units of the overall system of FIGURE 72 are shown as blocks AU and $RTrS$, and the output from resolver $Rlv$ of ground control station CCS which is fed to the command computer $coCp$ is assumed to be in the resolved form $\lambda6$ and $\phi6$ of the radar positional errors, the final $\lambda6$ and $\phi6$ data being actually derived in the auxiliary computer contained in the command computer unit $coCp$ as mentioned in the previous paragraph. Only one channel of command computer $coCp$ is shown, such as the lateral error ($\lambda6$) channel, the second channel (longitudinal error $\phi6$) being of identical construction. The computer channel is presented in a simple functional diagram in order to facilitate a summary description of the essential operating principles involved. For the same reason, the associated control circuits in flight control unit $fcu$ (same designation as in FIGURE 72) are shown in block-form only.

As briefly stated before, command computer $coCp$ essentially serves to determine the amount of acceleration corrections necessary to (critically) damp the 84 minute oscillatory motion of the craft about the specified trajectory which results from errors in the position and motion of the craft at the onset of the SCN-period. Three idealized curves $Flp1$, $Flp2$ and $Flp1a$ in the bottom portion of FIGURE 74 illustrate the paths which the controlled craft may follow from point $pt0$ under the influence of the command computer's acceleration program. Curves $Flp1$ and $Flp1a$ depict the effects of a perfectly executed acceleration correction program which results in a flight path that may be called a "critically damped" oscillatory motion. Curve $Flp2$ shows the next best approach to the perfect solution of curve $Flp1$ which results in a path of "rapidly decaying" oscillatory motion. In the case of curves $Flp1$ and $Flp2$, the craft is assumed to approach point $pt0$ on a path parallel with trajectory $Tr$ (see arrow $pTr$) so that under the sole influence of the bubble acceleration signals from the automatic sextant which become effective at point $pt0$, it would alter its course and continue to fly along a curve such as that indicated by dashed path $Flp0$ which is an enlarged replica of the initial portion of the 84 minute oscillatory path described in connection with the top portion of this same drawing. In the case of curve $Flp1a$, the craft is assumed to approach $pt0$ in the direction of arrow $pTr1$.

Any deviations from the craft's specified motion, viz. errors in the direction of motion and speed of the craft, are unknown to the observer at time $t_0$ but can be determined from successive observations of the positional errors of the craft. (Rate of change of positional errors along the $\phi 6$ and $\lambda 6$ coordinates are here defined as velocity errors of the craft.) Hence, it is possible thereafter properly to evaluate the necessary acceleration corrections which must be made effective aboard the craft in order to force the craft into one of the desired paths illustrated in FIGURE 74 (i.e., to evaluate magnitude and sense of the acceleration corrections which must be "superposed" upon the acceleration signals from the automatic sextant in order to counteract the latter's tendency to guide the craft along the undesirable oscillatory path $Fpo$). This evaluation of acceleration corrections is carried out by way of simulation of the craft's error of motion in computer $coCp$ and by making the computer's acceleration output a function of this error. The acceleration output voltages of the computer regulate magnitude and sense of the acceleration command signals from tracking radar $TrR$ (FIGURE 72) which, in turn, act to control the related airborne units in a sense so as to reduce the craft's errors to zero, thereby also tending to nullify the acceleration output of the computer. Computer $coCp$ is to be perfected to the point of carrying out such corrective accelerations by entirely automatic means. At the present time, however, it is assisted in this task by an operator who manually performs this function of allocating or "weighing" the proper corrective voltages which aid the computer in determining the desirable acceleration output. The following description of a preferred semi-automatic operating procedure of this type will be limited to a general outline of the functional principles involved, and all reference to constructional details will be omitted. Computer $coCp$ has been designed as an analogue computer whose integrators, summers etc., are made up of so-called D.C. operational amplifiers which are well known in the art. Certain parameters of these amplifiers must be preadjusted in adaptation to the type, size and performance characteristics of the craft which is to be remotely controlled.

In accordance with the operational outline for resolver $Rlv$ given above, and following the previous reference to FIGURE 76, it is assumed that lateral positional error $-\lambda 6$ in the input line in to computer $coCp$ appears at regular 17 second intervals. The observer at flight control unit $fcu$ closes computer correction switch $Crr$ at measured intervals (17 sec.) for brief moments at a time and each time reads from dial $dld$ the error difference voltage $\Delta y$ between the actual position error $\lambda 6$ of the craft and the computer's position error $y6$ which appears in the output of position error summer $pes$. At the instant of initial closing of switch $Crr$ at time $t_{01}$, the computer's integrators $ain$ and $vin$ and computed error summer $ces$ are at zero voltage, time $t_{01}$ here being taken to represent the instant in which the first error data $\lambda 6$ which apply to time $t_0$ of FIGURE 74 become available at computer $coCp$. Position error summer $pes$, therefore, initially yields a voltage $\Delta y = 0 - (-\lambda 6) = +\lambda 6$ which registers on dial $dld$. Additional switches are provided at the panel of flight control unit $fcu$ (not shown) which permit connecting the difference voltage of dial $dld$ either to both, "weighed" position correction line $Pc$ and "weighed" velocity correction line $Vc$, or to the latter ($Vc$) only, or in case of zero voltage on dial $dld$, to provide a separate measurable and reversible voltage source for these lines. Line $Pc$ connects to velocity integrator $vin$ and line $Vc$ to acceleration integrator $ain$. A potentiometer (not shown) in series with line $Vc$ starts to rotate at uniform speed when switch $Crr$ is opened so as to represent time for the intervals between each successive operation of switch $Crr$.

As stated above, each time a signal voltage enters the computer from resolver $Rlv$ and charges unit $pes$ to the value $\lambda 6$ of the craft's lateral error, switch $Crr$ is closed. At that instant, the potentiometer stops rotating, its resistance having diminished linearly with time from a maximum at the previous release of switch $Crr$ to a minimum (equivalent to zero) at the present closing of this switch. The potentiometer is held in this minimum position until switch $Crr$ is again released whereupon it returns to its zero interval time position of maximum resistance. In the example under observation, the initial reading at time $t_{01}$ finds the potentiometer in a maximum position, i.e., in it's correct starting position since it has not been previously rotating. Therefore, with the dial $dld$ voltage first connected to both lines, $Pc$ and $Vc$, only a negligible portion of the initial $\Delta y$-voltage of value $+\lambda 6$ will enter line $Vc$, while line $Pc$ receives the total $+\lambda 6$-voltage. In order to simplify the presentation, let it be assumed that any voltage entering line $Vc$ will not become effective in the $y6$-channel of the computer at the time of the reading in which it is applied to line $Vc$, but that it will build up to it's full value during the interval between readings which follows release of switch $Crr$. Evidently, if this switch is held closed long enough to allow the output from (i.e., the charge on) velocity integrator $vin$ to reach the (negative) magnitude of the $\lambda 6$-voltage in line $Pc$ ($y6 = -\lambda 6$), voltage $\Delta y$ from unit $pes$, and with it the dial $Crr$-reading, will be reduced to zero. The value of the $y6$-charge resulting from closing of switch $Crr$ at time $t_{01}$ can be considered the initial computed position error of the craft which contains virtually no velocity component during the first closing of switch $Crr$. Since there is practically zero velocity voltage in the $\dot{y}6$-bypass line $bp6$ to computed error summer $ces$, the sense and magnitude of the $Y6$-voltage in the output from unit $ces$ will at this imital momennt alone determine the sense and total magnitude of acceleration voltages to be "triggered off" from command relay unit $coRy$. The acceleration commands issuing from this relay $coRy$ (contained in unit $fcu$) are apportioned in quantities which range from plus or minus 0.2 ft./sec.$^2$ acceleration to $\pm 20$ ft./sec.$^2$ acceleration per longitudinal command signal, and from $\pm 0.4$ ft./sec.$^2$ acceleration to $\pm 40$ ft./sec.$^2$ acceleration per lateral command signal, depending on the type of craft to be remotely controlled. At present, the acceleration command-signals or -steps are held at a fixed magnitude throughout a particular control period, such as $\pm 0.2$ ft./sec.$^2$ longitudinal acceleration and $\pm 0.4$ ft./sec.$^2$ lateral acceleration per step command for one specific type of craft. Whenever the output from unit $ces$, here designated with numeral $\alpha 6$, exceeds a specified value, the acceleration commands are transmitted automatically. The initial SCN-command signals have an additive effect, i.e., they are directed in the same sense as the acceleration error signals from the automatic sextant with which they are combined, the algebraic sum of these signals becoming effective as corrective steering and thrust control means virtually from the onset of the SCN-phase of flight. In the present example (FIGURE 74), this combined effect is directed so as to reduce the initial lateral positional error $\lambda 6$ at a maximum allowable rate (i.e., without regard to the yet unknown velocity error and commensurate with all factors which limit the maneuverability of the specific type of controlled craft). A feedback voltage on acceleration command line $acC$ which is returned to acceleration integrator $ain$ of the computer in exact proportion to the value of the transmitted command signals, operates at the same time in a sense so as to diminish the computed initial position error $y6$. (NOTE: In the summarily described advanced overall control system of FIGURE 72, line $acC1$ in box CCS takes the place of line $acC$ in FIGURE 76. As previously stated, the present operational description refers to a semi-automatic method of ground control in which the acceleration output from computer $coCp$ is "tapped off" into feedback line $acC$. By means not shown in FIGURE 76, the operator at flight control unit $fcu$ may "match" the feedback voltages in line $acC$ with the amount of acceleration commands actually received at the craft in case the latter is manned by observers.)

It can be visualized with the help of FIGURE 75 that after the first interval of time between the initial release of switch $Crr$ at time $t_{02}$ and the next closing of switch $Crr$ at time $t_{11}$ approximately the following conditions will prevail: In the top portion of FIGURE 75, the horizontal line $Tr$ represents the specified trajectory, and vector $-\lambda 6$ at the left shows the craft's initial lateral positional error of FIGURE 74 at point $pt0$ (discounting the time elapsed between the instant of initial closing of switch at time $t_{01}$ which is here assumed to be coincident with time $t_0$ of FIGURE 74, and the instant of switch release at time $t_{02}$ shown in FIGURE 75). Due to the above-referred-to combined action of the bubble acceleration signals and the acceleration command signals from computer $coCp$ which for illustrative purposes are here shown as having been initiated at time $t_{02}$, the initial error $-\lambda 6$ of the craft will have been decreased to the (arbitrarily chosen) value of vector $-\lambda 6_1$ at the instant $t_{11}$ of the second closing of switch $Crr$. The rate of decrease (shown as a linear rate; slope greatly exaggerated) is represented by the negative velocity slope $vls$ resulting from the bubble signal accelerations and the command accelerations, both given in double-integrated values $\mu\mu 6$ and $\alpha\alpha 6$, respectively, in opposition to the direction of $-\lambda 6_1$, at time $t_{11}$. The computed positional error, $y6=-\lambda 6$, shown in the bottom portion of FIGURE 75 (line $Tr_s$ representing the zero voltage axis of the computer which simulates trajectory $Tr$) will have decreased to the value of $y6_1=y6-\alpha\alpha 6$ under the sole influence of the feedback signals from line $acC$ (FIGURE 76) whose total double-integrated value $\alpha\alpha 6$ is shown subtracted from the initial computed position error $y6$, resulting in slope $vlc$. The difference in slopes $vls$ and $vlc$ represents the error in the estimated velocity error $y6$ of the first reading at time $t_{02}$. This error is represented by the hitherto unknown quantity $\gamma\gamma 6$ which can be determined at the second closing of switch $Crr$ as the $\Delta y$-voltage equal to $\lambda 6_1 - y6_1$. This new difference voltage, again, appears on dial $dld$ (FIGURE 76). Since the previously mentioned potentiometer, representing the time elapsed since the last release of switch $Crr$, is stopped at its minimum value at time $t_{11}$, the total $\Delta y$ voltage equivalent to magnitude $-\gamma\gamma 6$ will now appear in line $Vc$ as a proportional velocity error correction. The same voltage $\Delta y$ in line $Pc$ will correct the computer's $y6_1$—error to a new value $y6_{1c}=-\lambda 6_1$. After release of switch $Crr$ (i.e., from time $t_{12}$ on), the velocity correction voltage from line $Vc$, according to the before-mentioned assumption, will build up in channel $y6$ to it's full value $\Delta y$ or $\gamma\gamma 6$ at time $t_{21}$. It can be seen that if the rate of change of the craft's positional error between the first few 17 sec. time intervals is taken as a linear decrease, and if the error magnitude is such that the acceleration commands remain unchanged, it is reasonable to predict that a similar slope $vls1$ (equal to $vls$) will appear for the time interval $t_{12}$ to $t_{21}$ as shown in the right top portion of FIGURE 75. Since the computed positional error, at time $t_{21}$, has been corrected (decreased) by the velocity component $\gamma\gamma 6$ (from line $Vc$) and by acceleration command component $\alpha\alpha 6$ ($\gamma\gamma 6$ having reached its full value at the end of the second time interval between readings as pointed out above), there will appear practically no error difference $\Delta y$ at the second reading of dial $dld$ at time $t_{21}$ (slope $vlc1$ equal to slope $vls1$ or $y6_2$ equal to $-\lambda 6_2$). If any further $\Delta y$-voltage persists, however, additional corrections which are executed in the manner just described, will hold the computer's position error $y6$ close to the actual error of the craft. Once this latter condition is established, the craft's position and velocity errors are known quantities, and this knowledge enables the operator to evaluate the amount of correction voltages to be fed to lines $Pc$ and $Vc$ in order to pursue an acceleration program which tends to reduce both errors to zero in the shortest possible time. This evaluation procedure need not be described here as it is left to the discretion of the operator to adapt his actions to the demands of the individual case. It can be deduced from the sketch of FIGURE 75 that if the error $-\lambda 6_2$ at time $t_{21}$ were to decrease at the rate of slope $vls1$, (which, in actual practice is not likely to occur in this conspicous fashion at the beginning of the readings), zero-positional error would be attained in a brief interval of time, but the velocity error contained in slope $vls1$ would rapidly carry the craft beyond the trajectory point. However, if a velocity correction in the opposite sense is injected into line $Vc$ at time $t_{21}$, the sense of acceleration commands will be reversed as soon as the computed velocity error $\dot{y}6$ in error summer $ces$ (from by-pass line $bp6$) becomes distinctly larger than the computed position error $y6$. In consequence, the acceleration commands, henceforth, will tend to "flatten-out" the velocity slopes. Since the acceleration commands cease when error $y6$ decreases below a threshold value, the velocity correction must be inserted at the proper time and of sufficient magnitude to sustain the commands. If the (negative) velocity slope $vlc$ is nearly parallel with $Trs$, and if the positional error $y6$ is still relatively large, a judicious amount of velocity correction must be maintained in order to balance the computer's acceleration forces against those of the craft's guidance system such that the positional error decreases at the proper rate. It is possible with this system to reduce initial positional and velocity errors of the craft to a minimum within less than 10 minutes so that if a period of time of approximately 20 minutes is apportioned to the SCN-phase, ample opportunity is provided to carry out this correction program before the craft reaches the specified departure point for full ACN-control. [In FIGURE 74, the SCN-phase between point DP—SCN at time $t_0$ and point DP—ACN (=departure point for ACN-guidance) near time $t_3$ is shown extended over a period of approximately 30 minutes. This has been done in order to improve the presentation of the various flight paths. Curve $Flp1$, however, can be seen to fall within a period of about 15 minutes, minimum error having been reached after 10 minutes approximately. Time intervals between $t_0$ and $t_1$, $t_1$ and $t_2$ etc. are of 10.5 minutes duration, each.]

DIVISION VII—AUTOMATIC FLIGHT CONTROL SYSTEM

A preferred automatic flight control system will be briefly described below which in addition to it's continuous function of stabilizing the craft in flight has been shown by successful experimentation to be capable of accurately performing the following navigational functions:

During the command guidance phase (climb to altitude, start acquisition):

(1) to provide an automatic climb program;
(2) to control rate of turn and airspeed in response to command guidance signals from the ground.

During the SCN-phase and the ACN-phase:

(1) to maintain constant altitude;
(2) to control heading and airspeed in response to acceleration signals from the automatic sextant so as to hold the craft onto the time-specified trajectory.

The basic components of this preferred system are shown in the right-hand portion of the greatly simplified overall signal-flow diagram of FIGURE 79. (See large broken-line box AFC.) The remainder of this same diagram portrays the signal flow through the essential supply channels of this system from the automatic sextant, from the master (sequence) controller and from the ground based radar station. Each signal flow channel is separately identified as to the period of flight in which it becomes operative. (See key in upper right hand corner of drawing.) All components in this general flow diagram as well as in the diagrams of FIGURES 81, 82 and 83 are designated by their functions as well as by their individual numerals of identification so as to facilitate independent interpretation of each diagram. Components of the ground-based facilities as well as the airborne units RBe, BeC, AcC and CoB shown in FIGURE 79 are identical with those bearing the same numerals in FIGURE 72. These components have been described in the preceding Division VI and do not require any further comment. The same applies to the component units of the airborne timing system and of the automatic sextant appearing in boxform in the left hand portion of FIGURE 79. Track keeper TK shown in the bubble signal output channel from the bubble turret BT is an auxiliary unit omitted from the present specification which may be added to the airborne unit if it is desired to determine aboard the craft the instantaneous positional and velocity errors of the craft and and to make a continuous record thereof. It must be supplied from the ground with data concerning the initial positional and velocity errors of the craft. The effects of transient disturbances (gusts of wind etc.) upon the track made good (injected 84 minutes oscillations) can be studied with this device.

The automatic flight control system of box AFC in FIGURE 79 which is further broken down in the flow diagrams of FIGURES 81, 82 and 83, is shown to be built around an Auto-pilot AP, commercially known as Sperry's A12, which is here preferably used in conjunction with Minneapolis Honeywell's type B7 manifold pressure regulator turbo boost control TBC. Local stability about the pitch and roll axes is obtained from the autopilot's gravity erected vertical gyro unit (not shown in FIGURE 79) which supplies correction signals for pitch and roll to the servo systems for the elevators and ailerons. (See parts Gyv, EFA, AFA, ES, EtrS, AiS and related flowlines in FIGURE 82.) Standard pressure altitude control is incorporated in the system with certain modifications in the control signal flow to be briefly mentioned below. (Altitude control shown in separate box, together with airspeed control.) Further units in box AFC required for navigational control include:

The computer unit COM which transforms bubble acceleration error signals (received from the automatic sextant) into suitable form for trajectory control of the craft. Smooth proportional control is secured in both the lateral and longitudinal channels (see computer unit COM in "broken down" flow diagram of FIGURE 81) by using velocity and position errors (integrated from the bubble acceleration errors) as control signals. Lateral position and velocity errors are combined to control the turn channel of the autopilot. (See signal flow lines in lateral control channel of unit COM in FIGURE 81 from detector and amplifier unit DA–*la* through first and second integrators, viz. acceleration integrator a*In–la* and velocity integrator v*In–la*, to lateral position and velocity error summer PVS.) Longitudinal position errors control pitch reference, and longitudinal velocity errors control thrust. (See signal flow lines in longitudinal control channel of unit COM in FIGURE 81 from detector and amplifier unit DA–*lo* via acceleration integrator a*In–lo* and velocity integrator v*In–lo* to unit LCU which appears "broken down" in FIGURE 82. Note separate flow lines *lo*V and *lo*Po which are also shown in FIGURE 82.

The altitude-airspeed control unit *AlAs* which uses altitude and airspeed transducer servo systems to establish reference altitude and reference airspeed. Airspeed reference may be changed by the command guidance signals. Altitude reference is programmed by the rate-of-climb controller to provide an optimum climb-to-altitude-program. (Further details to follow.)

The longitudinal control unit LCU through which are routed all signals requiring longitudinal motion. During the SCN and ACN-phases, the output pitch reference signal (in line *pi*AP) is the sum of longitudinal position error and altitude error ("shaped"), and the thrust reference signal (in line *t*H) is the sum of longitudinal velocity error and altitude error. (Further details to follow.)

A sequencing control- and interlock-unit CSQ which provides programmed switching of a variety of relays in response to sequencing signals from playback unit F*d* which advance the sequence switches in master controller MC to the proper circuit connection at the correct time so as to adapt all units concerned to their different modes of operation. (See dotted lines emanating from unit CSQ.)

*The Basis for Trajectory Control*

The control signals for steering the craft along the prescribed trajectory during the ACN-phase of flight are solely derived from the error signals of the bubble accelerometers in the automatic sextant. They are made available to the automatic flight control system in the form of bubble angles, representing acceleration errors for both, lateral and longitudinal accelerations.

The magnitude of the bubble angle is given by the approximate relation:

$$\gamma 6_r = \frac{\epsilon}{R} + \frac{\ddot{\epsilon}}{g}$$

where $\gamma 6_r$ = bubble angle in radians
$\epsilon$ = positional error from the specified trajectory in feet $$\ddot{\epsilon} = \frac{d^2\epsilon}{dt^2}$$

$R$ = radius of earth in feet
$g$ = acceleration of gravity in f.p.s.²

FIGURE 80 illustrates this relation by a frequency plot. For a control system analysis, this may be considered the frequency characteristic of the error-detecting element in which the error signal, $\gamma 6_r$, available to the control system for a unit positional error, $\epsilon$, is plotted against the error frequency. Note that an error of a given magnitude at frequencies below $10^{-3}$ rad./sec. provides a signal to the control system which is 120 db lower in level than the signal available if the same magnitude of error occurs at the natural frequency of the aircraft, here fixed at the value of 1.2 rad./sec. The component of trajectory error of the frequency $1.2 \times 10^{-3}$ rad./sec. is of particular interest. This error, which is an oscillation of 84-minute period, can neither be detected by the navigation system in its present configuration nor corrected by the control system. It is as though all input information to the control system were passed through a highly-selective filter having the gain characteristics shown in FIGURE 80. These characteristics of the navigation system are unalterable in its present configuration.

For trajectory control, the nature of the navigation system requires that the control system be extremely sensitive to low-frequency and static errors and relatively insensitive to errors in the range of the craft's natural frequency. The control system is required to respond only to the average values of the higher-frequency bubble signals.

An analysis of the configurations which have led to the design of the above outlined automatic flight control system and which are based on the characteristics of the bubble output signals from the automatic sextant, as well as proof for the practicability of this type of trajectory control will not be given here as they lie beyond the scope of this specification. Detailed discussions of component units of this automatic flight control system will form the subject matter of separate patent applications. The summary description of these units given above, as well as additional details to be briefly discussed in connection with FIGURES 81, 82 and 83, serve to round out the overall presentation of the entire automatic celestial navigation system submitted in these pages.

The component units contained in box AFC of FIGURE 79 ae shown in greater detail in FIGURES 81 and 82 in such a way that the computer unit COM and the altitude-airspeed control unit A/As of FIGURE 79 (left half of general block AFC) appear "broken down" in FIGURE 81, whereas the autopilot AP, the longitudinal control unit LCU and the turbo boost control unit TBC of FIGURE 79 (right half of general block AFC) appear "broken-down" in FIGURE 82, both flow diagrams (FIGURE 81 and 82) showing all important signal channels from and to the remaining component units. The altitude and airspeed control unit of FIGURE 81 is shown in still greater detail in the diagram of FIGURE 83 which also contains components of control box CoB as well as portions of the computer unit COM, both of FIGURE 81.

The altitude and airspeed control unit (FIGURE 81) includes self-synchronous systems composed of transducers and reference "synchros" with related servo systems for positioning the reference synchro-shafts. The transducers (boxes $tdAi$ and $tdAl$) are operated as control transformers which produce a 400 cycle output (in airspeed- and altitude-error flowlines $aif$ and $alf$, respectively) proportional to the difference between the positions of the aneroid-operated shafts in the transducers, shown as altitude and airspeed arrows $ast$ and $api$ (from the static- and Pitot-tubes, respectively), and the positions of the reference shafts of the associated selsyn generators shown as flowlines $sai$ and $sal$ marked "specified airspeed" and "specified altitude," respectively, which connect boxes $aifo$ (airspeed reference and follow-up system) and $alfo$ (altitude reference and follow-up system) with the transducers. Programmed guiding (illustratively represented as boxes $aico$ and $alco$, respectively) is provided so that ther eference drive systems may be operated in one of the following modes:

(1) As self-synchronous systems,
(2) In the mode to "maintain altitude and/or airspeed,"
(3) In the mode to execute a programmed automatic climb,
(4) In the mode to carry out airspeed guidance-commands.

These modes of operation will be described below with reference to the detailed block diagram of FIGURE 83.

The longitudinal control unit (FIGURE 82) has been designed so as to separate the control of altitude from the control of airspeed through coordination of pitch and thrust. In other words, this control system causes an airspeed error to change airspeed without affecting altitude or, conversely, to act so that an altitude error produces a change in altitude without affecting airspeed. Thus, for example, in the case of altitude control, a thrust change and a pitch-reference change must operate together so as to effect an altitude change without change in airspeed (i.e., so as to hold a transient airspeed change to zero). Essentially, the following functional requirements are satisfied in this unit:

(1) It contains a fade-in circuit in the input channels from flowlines $aif$ and $alf$ in order to prevent the occurrence of large transients when automatic altitude and airspeed control of the craft is initiated or terminated. (See boxes $aiFD$ and $alFD$, both provided with control relays not shown.)

(2) It demodulates the error signals so that D.C. shaping amplifiers and summers (mixers) may be used.

(3) It provides the necessary "shaping" circuits in the airspeed pitch and altitude pitch channels. (See flowlines $aish$ and $alsh$ to boxes $aiIn$ and $alIn$ from boxes $aiFD$ and $alFD$, respectively.) (Essentially, the airspeed error integrator $aiIn$ in the airspeed pitch channel prevents overcorrection of pitch due to the inertia of the craft, and the altitude error rate damping circuits, represented by box $alDn$, eliminate hunting.)

(4) It sums the altitude and airspeed error signals to form the composite pitch and thrust signals. (See flowlines $aish1$ and $alsh1$ to box T$shm$ and flowlines $aishi$ and $alshd$ to box P$ism$.) During ACN control, longitudinal displacement-or-positional errors (flowline $loPo$ of FIGURE 81) and differentiated altitude errors (flowline $alshd$) are summed to form the composite pitch signals, and longitudinal velocity errors (flowline $loV$ of FIGURE 81) and altitude errors (flowlines $alsh1$) are summed to form the composite thrust signal. (Attenuators in both channels as well as control relays, switches etc. are omitted from the drawing.)

(5) It re-modulates the composite pitch and thrust signals (boxes P$ism$ and T$hsm$) to be applied to the autopilot and turbo-boost-systems. (See flowlines $piAP$ and $tH$, respectively.)

(6) It limits increase-thrust commands to prevent excessive manifold pressure. (Limiter contained in box T$hsm$.)

(7) It limits the rate of change of thrust commands to prevent excessive manifold pressure surges.

(8) Thrust and pitch signals are interlocked to prevent large craft transients in the event of high-voltage power supply failures. (Parts involved not shown.)

Turn control (FIGURE 82) via turn commands in flowline $tC$ from control box CoB or via lateral position- and velocity-error signals (ACN-control) in flowline PV-$la$ from computer unit COM can be traced through the lower portion of box AP where for the sake of simplicity the autopilot's Gyrosyn compass control system which establishes the yaw reference, is represented as a single block GyCc with flowline $yC$ feeding into rudder flight amplifier RFA, the latter forming part of the autopilot's coordinated turn control system which is also shown in greatly simplified blockform. (See turn-signal channels via bank integrator $bIn$ to aileron flight amplifier AFA and via crossfeed modulator CRM and turn generator TG to rudder flight amplifier RFA and rudder servo R$u$S.) During manual turn control, switch S20 is connected to turn knob K$n$T (located on so-called pedestal controller of autopilot which also contains pitch- and aileron-knobs not shown in the present drawing). A sequence signal from the playback unit turns switch S20 to feedline $tC$ when the command guidance phase is initiated (see point 07 in FIGURE 71). At the onset of the SCN-phase, another sequence pulse connects this switch to feedline PV-$la$. This latter contact is maintained throughout the SCN- and ACN-phases of flight.

Parts $u5$ through $u10$ in turbo boost control unit TB$c$ constitute portions of a turbo boost servo control system which will not be described, selector $u5$ being used for manual control only.

For further clarification, the previously listed modes of operation of the altitude and airspeed control circuits (FIGURE 81) will now be described in somewhat greater detail with reference to FIGURE 83.

*Altitude Control.—(See Also Previous Text Referring to FIGURE 81)*

During self-synchronous operation, the output from altitude transducer $tdAl$ in line $alf$ is connected to the servo circuits of reference selsyn $alsg$, viz. to servo-amplifier $am8$ which drives two-phase motor $m8$ and reduction gear G8 (switches S21, S22, S23, S24 and S25 held in "off" position, as shown in the drawing), forming a closed loop in which rotor R8 of unit $alsg$ (shown as input shaft to this unit) is slaved to the aneroid-operated rotor of unit *tdAl* (shown as input line *anst* from the static tube connection), thereby holding the output in line *alf* at zero regardless of variations in the craft's altitude. (Transducer *tdAl* is essentially a sealed bellows assembly, mechanically linked with the rotor of the selsyn control transformer previously referred to—also a part of unit *tdAl*—and enclosed in an airtight case whose interior opens into the static pressure line of the craft; as the craft climbs or descends, barometric pressure variations change the static pressure inside the airtight case, resulting in expansion or contraction of the sealed bellows and proportional rotation of the selsyn rotor via the above mentioned link.)

With this type of stand-by operation, the mode of altitude control previously listed as "maintain altitude" control may be established at any convenient altitude. (Self-synchronous operation is employed from take-off to point 05 of FIGURE 71.)

During "maintain altitude" operation, the altitude follow-up servo is disabled (switches S21 and S22 in "on" position but switches S23, S24 and S25 still remaining in "off" position), causing the reference shaft of unit *alsg* to remain stationary. Under these conditions, the altitude error signal in line *alf* (always connected to the altitude fade-in circuits in unit *alFD* of the longitudinal control system LCU of FIGURE 82) is proportional to the craft's altitude deviation from the reference altitude established by the position of rotor shaft R8 held at the instant in which the follow-up servo system has been disabled. ("Maintain altitude" control is switched "on" at point 05 of FIGURE 71. Attenuator A*tn* suppresses the *e*06-voltage from rate generator *rG* during this and the preceding mode of control. See text below.)

During "programmed automatic climb" operation, the altitude follow-up system is connected as a velocity servo. (Switches S21, S22, S23, S24 and S25 are now all in "on" position.) The altitude control system (error signal in output line *alf*), as before, causes the craft's altitude *h*6 to follow the reference altitude *ho*6 of the rotor in unit *alsg*. The value of *ho*6, however, now changes at a rate proportional to the rate voltage *e*6 of the input line *l*20 to the velocity servo. Therefore, the rate of climb *hr* of the craft will also be proportional to this rate voltage *e*6. Voltage Δ*e* in the output from differential D*f* always drives the follow-up system so that the voltage *e*06 from rate generator *rG* in line *l*21, which is representative of the rotational rate of the output shaft from motor *m*8, tends to equal voltage *e*6 from the pickoff-contact *pk* of linear helipot H*e*8 in line *l*20. This pickoff contact *pk* is geared to the reference shaft R8 (=output shaft from 5000:1 gear G8) by 4:1 gear G9. The magnitude of voltage *e*6 is determined by the settings of contacts *ct*1 and *ct*2 on calibrated potentiometers *pm*1 and *pm*2, respectively, as well as by the instantaneous position of helipot H*e*8-pickoff contact *pk*. The settings of contacts *ct*1 and *ct*2 are adjusted prior to take-off in accordance with the climb capacities of the craft, the voltage at contact *ct*1 corresponding to the rate of climb (R/C) limit of the craft at sea level, and the voltage at contact *ct*2 corresponding to the R/C-limit of the craft at 40,000 feet altitude. These R/C-limit settings, thus, determine the slope (viz. magnitude and rate of change) of the *e*6-voltage during the shifting of pick-off-contact *pk* from a pre-set contact point representing the R/C limit at altitude *hst* where the "programmed automatic climb" is initiated (such as 15,000 feet at point 06 of FIGURE 71) to the contact point representing the R/C limit at the altitude *hte* where the "programmed automatic climb" is terminated (such as 25,000 feet at point 09 of FIGURE 71). The rate voltage slope is negative (decelerating), the magnitude of the pick-off voltage *e*6 decreasing linearly from it's value at *hst* to it's value at *hte*. It can be seen that means are herewith provided for causing the craft to execute a climb in accordance with it's capabilities in such a manner that the rate of change of the reference (=change in the rate of climb of the craft) between two predetermined altitude limits is inversely proportional to the altitude. The time *tt* required for a programmed climb between altitudes *hst* and *hte* can be calculated from an equation relating climb rate *hr* and altitude from which *tt* may be derived in terms of the values of the limit settings at contacts *ct*1 and *ct*2 as shown further below. The travel of pick-off-contact *pk* is limited to ten turns of shaft R9 which corresponds to 40 turns of reference shaft R8. For each revolution of shaft R8, the altitude reference changes 1000 feet so that the total travel of contact *pk* on helipot H*e*8 covers an altitude change of 40,000 feet. During this total travel, the pick-off contact moves from one end point of the helipot where the pick-off voltage is equal to the rate voltage *e*6 at sea level, to the other end point where the pick-off voltage is equal to the rate voltage *e*6 at 40,000 feet altitude. The rate of motion of the pick-off contact is dictated by the magnitude of the pick-off voltages, the initial and terminal values of voltage *e*6 defining the desired limits in the rotational speed of shaft R9 between which the linearly decreasing rate of climb must be executed in a particular type of craft. Hence, if the climb capacity of the craft at 15,000 feet is taken to be 2000 feet per minute, the rate voltage *e*6, at the onset of the programmed climb (i.e., at the contact point on helipot resistor H8 representing the R/C-rate at altitude *hst*), would have to rotate shaft R9 at the rate of ½ turn per minute (shaft R8 making 2 turns per minute). If at the end of the programmed climb or near the 25,000 foot level, the R/C-limit were 500 feet per minute, the *e*6-voltage at the helipot point representative of the R/C-rate at altitude *hte* would have to be such as to reduce the rotational speed R9 to the rate of ⅛ turn per minute (shaft R8 rotating at ½ turn per minute). The total rotation of shaft R9 between points *hst* and *hte* would amount to 2½ turns. Time *tt* required to complete these 2½ turns can be derived from the formula $$tt = \frac{1}{m} \log \frac{mhte + ra1}{mhst + ra1}$$

where

*ra*1 = R/C- or *e*6-value at sea level
*ra*2 = R/C- or *e*6-value at 40,000 feet $$m = \frac{ra2 - ra1}{40,000}$$

If in the example here given an average rate of ¼ turn per minute were assumed for shaft R9, it would take 10 minutes to complete the climb from altitude *hst* to altitude *hte*. The exact time-span is pre-computed and inserted into the time-schedule of the trajectory tape record so that the beginning and termination of the programmed climb period can be time-controlled by sequence signals from the master controller, while during the same period, the r.p.m.'s of motor *m*8 are timed by the *e*6-voltages from potentiometers *pm*1 and *pm*2.

Hence, at the end of the time period *tt*, the reference altitude *ho*6 of the rotor in unit *alsg* has reached the *htc* level position (=25,000 feet at point 09 in FIGURE 71) at which time a sequence signal from the master controller switches the altitude control back to it's "maintain altitude" operation, causing the craft to remain at the 25,000 foot level.

*Airspeed Control.*—(*See Also Previous Text Referring to FIGURE 81*)

During self-synchronous operation, the output from airspeed (A/S) transducer *tdAi* (a unit similar to altitude transducer *tdAl* in which Pitot pressure line *apr* is connected to the inside of the previously mentioned bellows or diaphragm) in line *aif* is connected to the servo-input of reference selsyn *aisg* (via servo amplifier *am*7, two phase motor *m*7 and reduction gear G10, with ganged switch S19 in "off" position), forming a closed loop in which reference shaft or rotor R10 of unit *aisg* is slaved to the rotor of the control transformer of unit *tdAi*, viz., to the craft's A/S, holding the error output in line *aif* constantly at zero regardless of variations in the craft's A/S. An additional loop is used to hold a reference bridge balanced. The reference bridge is composed of a three turn helipot He9 with pick-off contact *pk*1 geared to reference shaft R10 by 1:3 gear G11, the helipot forming one half of the bridge circuit, and of an A/S-reference potentiometer He10 (in control box CoB) which forms the other half of the bridge. In the bridge loop (ganged switch S19 and switch S18 in unit CoB in "off" position), phase sensor *phs* controls polarized relay RY2 which, in turn, applies 28 v.-pulses to one or the other solenoid (*sol*8 or *sol*9) of reversible stepper *rlS* in control box Cob. Interrupter relay IRY constantly delivers pulses to relay RY2 which remain ineffective, however, as long as the latter remains in it's central "off" position, i.e., as long as the reference bridge is balanced (viz. as long as there is zero output from units D*f*1 and *phs*). Any unbalance signal from unit D*f*1 moves relay RY2 to one or the other side of it's "off" position (depending on the phase of the unbalance signal) causing either solenoid *sol*8 or *sol*9 to be pulsated. Stepper *rlS* is geared to the A/S reference potentiometer He10 whose pick-off contact *pk*2 follows the position of contact *pk*1 on helipot H9 through action of this second (reference bridge) servo loop and thus keeps the bridge circuit balanced since unit *phs* receives a signal from differential D*f*1 whenever the voltage in line *br*10 is not equal to the voltage in line *br*9. With this system, a standby-operation is established which permits switch-over to "maintain airspeed" control at any convenient airspeed. (Self-synchronous operation is maintained from take-off to point 05 of FIGURE 71.)

During "maintain airspeed" operation, both of the above described follow-up loops are disabled. Instead, the output from differential D*f*1 is connected to the servo input of reference selsyn *aisg* (ganged switch S19 in "on" position), holding reference rotor R10 and pick-off-contact *pk*1 in a stationary position which corresponds to that of the stationary contact *pk*2 of reference potentiometer He10, the reference bridge having been left in a balanced condition at the moment of switch-over to "maintain A/S" operation in which the output from unit D*f*1 is zero. Under these conditions, the A/S error signal in line *aif* is proportional to the craft's deviation from the reference A/S in unit *aisg*. ("Maintain airspeed"-control becomes operative at point 05 of FIGURE 71 and is terminated at point 011.) Switch S18 is also turned "on" during this phase of operation, but normally no A/S-command signals are received during the "programmed automatic climb" phase of flight during which "maintain airspeed" control is operative.

If during any other period of the command guidance phase, A/S command guidance signals are received, reference potentiometer He10 is driven by stepper *rls* as in the case of self-synchronous operation, but the step voltages are now delivered in the form of pulsed "tone" commands from the ground station, such as the command signals from units RB*e* and B*e*C of FIGURES 72 or 79 via line *cos* and relay RY3. (Relay RY3 switched to line *cos* and switch S18 in "on" position.) The reference-follow-up system (ganged switch S19 in "on" position) is in the same operating condition as during "maintain A/S"-control except that an unbalance voltage now appears in the output from unit D*f*1. The A/S-error signal in line *aif*, therefore, continues to be proportional to the craft's deviation from the reference A/S. The latter, however, is now varied in accordance with the command signals received, since the reference selsyn follow-up system always rotates reference rotor R10 until contact *pk*1 reaches the position of contact *pk*2.

Stepper *rl*S1 and potentiometer He12 in control box CoB serve for rudder-command control during the command guidance phase (see FIGURE 82). Operation is similar to that of units *rl*S and He10, described above. Bias relays RY-*lo* and RY-*la* in computer unit COM connect acceleration correction voltages from lines *acsa*2 and *acsa*1 to first integrators *aIn-lo* and *aIn-la* in the longitudinal and lateral computer channels, respectively, when switch-over to SCN-control takes place. (Relay RY3 switched to line *acs*. Compare with FIGURES 72 and 79.) The essential functions of these channels have already been described in previous sections.

FIGURE 84, in an imaginary sketch, shows a pilotless missile SK, turbo-jet propelled, flying over the earth E*a* on a predetermined trajectory T*r* under the control of the guidance system herein disclosed. The two stars $S_1$ and $S_2$, tracked by two telescopes of the automatic sextant which is mounted in the missile below observation window O*b*, cooperate as herein described in determining the orientation in space of successive instantaneous dynamic verticals, such as $V_s$, which continuously serve as a reference for automatic guidance of the missile along the predetermined path. The missile shown is the Northrop SNARK, having swept back wings 84*sb* and control surfaces 84*cl* as is well known in the art for aerodynamic configurations of this type.

What is claimed is:

1. A celestial navigation system for aircraft comprising a platform freely mounted in gimbals on said aircraft, a pair of optical systems mounted on said platform, each of said optical systems having at least a portion thereof movable in altitude, a magnetic tape carried by said aircraft, said magnetic tape having impressed thereon magnetic pulses representing a predetermined time specified sequence of start altitude angles for each of said optical systems with respect to the plane of said platform, a magnetic tape playback unit for playing back said record during flight of said aircraft at a time controlled constant linear playback speed to generate electrical control pulses for each of said optical systems, and means for moving the movable portion of each of said optical systems in altitude in accordance with the respective altitude control pulses.

2. A celestial navigation system for aircraft, comprising a platform freely mounted in gimbals on said aircraft, a pair of optical systems mounted on said platform, each of said optical systems having at least a portion thereof movable in altitude, a magnetic tape carried by said aircraft, said magnetic tape having impressed thereon magnetic pulses representing a predetermined time specified sequence of chosen star altitude angles for each of said optical systems with respect to the plane of said platform, a magnetic tape playback unit for playing back said record during flight of said aircraft at a time controlled constant linear playback speed to generate precomputed electrical control pulses for each of said optical systems, means for moving the movable portion of each of said optical systems in altitude in accordance with the respective altitude control pulses, and servo means for maintaining the optical axes of said telescopes in coincidence with the star light rays from said chosen stars whereby the angle of the plane of said platform with respect to the incident rays of said chosen stars is changed in accordance with the changes in altitude of said movable portions.

3. In a celestial navigation system for aircraft, means for observing a star comprising a platform gimballed on said craft, an optical system mounted on said platform and having at least a portion thereof movable in altitude, a record carried by said craft, said record having recorded therein signals representing a time specified sequence of star altitude angles with respect to the plane of said platform, means for playing back said record in time controlled relation to the time specification of said record to generate star altitude angle signals, and means for moving the movable portion of said optical system in altitude in accordance with said signals.

4. In a celestial navigation system for aircraft, means for observing a star comprising a platform gimballed on said craft, an optical system mounted on said platform and having at least a portion thereof movable in altitude, a record carried by said craft, said record having recorded therein signals representing a time specified sequence of star altitude angles with respect to the plane of said platform, means for playing back said record during flight of said craft in time controlled relation to the time specification of said record to generate star altitude angle signals, means for moving the movable portion of said optical system in altitude in accordance with said signals, and means for slaving said optical system to said platform.

5. In a celestial navigation system for aircraft, means for observing a star comprising a platform gimballed on said craft, a pair of optical systems mounted on said platform, each of said optical systems having at least a portion thereof movable in altitude, a record carried by said craft, said record having recorded therein signals representing altitude angles of two stars for each successive instant of a predetermined time specified trajectory between two locations at a constant altitude, means for playing back said record during flight of said craft in time controlled relation to the time specification of said record to generate star altitude angle signals for each of said optical systems, means for moving the movable portion of each of said optical systems in altitude in accordance with the respective altitude angle signals, means for causing each of said optical systems to track one of said predetermined stars, and means for slaving said optical systems to said platform to tilt said platform in accordance with the instantaneous prespecified altitude angles of said optical systems.

6. In apparatus of the character described, a platform mounted to move in gimbals, a telescope mounted on said platform with its optical axis normal thereto, said telescope being free to rotate about its optical axis with respect to said platform, a prism rotatably mounted on the top of said telescope on an axis parallel to said platform, the incident light rays from a star being picked up by said prism and reflected into said telescope, the position of said prism determining the altitude angle of the line of sight to said star with respect to the plane of said platform, a record having recorded therein signals representing a time specified sequence of star altitude angles with respect to the plane of said platform, means for playing back said record in time controlled relation to the time specification of said record to generate star altitude angle signals, means for rotating said prism in accordance with said altitude angle signals, means for generating error signals representing altitude and azimuth deviations of a star image from the optical axis of said telescope, means responsive to altitude error signals for tilting said platform in altitude around an axis at right angles to the platform axis on which said telescope is mounted and means responsive to azimuth error signals for rotating said telescope on its optical axis on said platform, whereby as said telescope tracks said star, said platform is oriented in accordance with signals from said record.

7. In a celestial navigation system for aircraft, a platform gimballed on said craft, a pair of optical systems mounted on said platform on two orthogonal axes in the plane of said platform with their optical axes normal to said plane, each of said optical systems having at least a portion thereof movable in altitude, a record carried by said craft, said record having recorded therein signals representing a time specified sequence of star altitude angles for each of said optical systems with respect to the plane of said platform, means for playing back said record during flight of said craft in time controlled relation to the time specification of said record to generate star altitude angle signals for each of said optical systems, and means for moving the movable portion of each of said optical systems in altitude in accordance with the respective altitude angle signals, means associated with each telescope for generating signals representing altitude and azimuth deviations of a star image from the optical axis of each telescope, means responsive to the azimuth error signals of each telescope to orient the respective telescopes in azimuth with respect to the plane of said platform, and means for tilting said platform around each one of said axes in accordance with the altitude error signals from the telescope mounted on the other of said axes.

8. In a celestial navigation system for a craft, means for defining a reference plane comprising a platform gimballed on said craft, a pair of optical systems mounted on said platform on two orthogonal axes in the plane of said platform with their optical axes normal to said plane, each of said optical systems having at least a portion thereof movable in altitude, a record carried by said craft, said record having recorded therein signals representing a precomputed time specified sequence of star altitude angles for each of two stars for each instant of time over a predetermined trajectory between two locations at a constant altitude, said angles defining a specified apparent horizontal plane for each instant of said trajectory, means for playing back said record during flight of said craft over said trajectory in time controlled relation to the time specification of said record to generate star altitude angle signals for each of said optical systems, and means for moving the movable portion of each of said optical systems in altitude in accordance with the respective altitude angle signals from said record, means associated with each telescope for generating signals representing altitude and azimuth deviations of a star image from the optical axis of each telescope, means responsive to the azimuth error signals of each telescope to orient the lines of sight of the respective telescopes in azimuth with respect to the plane of said platform, and means for tilting said platform around each one of said axes in accordance with the altitude error signals from the telescope mounted on the other of said axes, whereby when said craft is in the proper position at the right time in said trajectory said platform will be in the prespecified apparent horizontal plane.

9. Apparatus in accordance with claim 8 wherein said record has recorded thereon signal channels representing a precomputed time specified sequence of star altitude angles of two different pairs of stars, and also has recorded thereon a sequence signal channel, and means responsive to signals reproduced at a predetermined time from said sequence signal channel to change the altitude angles of the lines of sight of said telescopes from one pair of stars to the angles of the lines of sight of the other pair of stars.

10. Apparatus in accordance with claim 8 wherein said record has recorded thereon a plurality of signal channels including a first signal channel having recorded therein said altitude angle signals for one pair of stars, a second signal channel having recorded therein said altitude angle signals for a second pair of stars, the signals in said first signal channel defining the specified apparent horizontal plane for one portion of said trajectory, the signals in said second signed channel defining the specified apparent horizontal plane for a subsequent portion of said trajectory, and a third sequence signal channel, and means responsive to signals reproduced at a predetermined time from said sequence signal channel to change the altitude angles of the lines of sight of said telescopes from one pair of stars to the angles of the lines of sight of the other pair of stars to maintain said platform in the desired specified apparent horizontal plane over both portions of said trajectory.

11. In a celestial navigation system for aircraft, a platform gimballed on said craft, a pair of telescopes having optical systems mounted on said platform on two orthogonal axes in the plane of said platform with their optical axes normal to said plane, each of said optical systems having at least a portion thereof movable in altitude, each of said telescopes being rotatable in azimuth on said platform, a record carried by said craft, said record having recorded therein signals representing a time specified sequence of star altitude angles of a separate star for each of said optical systems with respect to the plane of said platform, means for playing back said record during flight of said craft in time-controlled relation to the time specification of said record to generate star altitude angle signals for each of said optical systems, means for moving the movable portion of each of said optical systems in altitude in accordance with the respective altitude-angle signals, means associated with each telescope for generating signals representing altitude and azimuth deviations of a star image from the optical axis of each telescope, means responsive to the azimuth error signals of one telescope to orient said one telescope in azimuth with respect to the plane of said platform, means for tilting said platform around each one of said axes in accordance with the altitude error signals from the telescope mounted on the other of said axes, the other of said telescopes being locked to said platform in azimuth, means for applying azimuth error signals from the other of said telescopes to turn said platform in azimuth to correct the said azimuth error in said other telescope thereby orienting said platform in azimuth in accordance with said record signals, a third telescope mounted on one of said orthogonal axes with the optical axis normal to the plane of said platform, said third telescope having an optical system with a portion movable in altitude, said record also having recorded thereon signals representing a time-specified sequence of altitude and azimuth angles of a third star, means operating in advance of a predetermined time for orienting the movable portion of the optical system of said third telescope in altitude, and for orienting said third telescope in azimuth in accordance with record signals for said third star, to place said third telescope in star-tracking relation to said third star, and means operable at said predetermined time for locking said third telescope to said platform and for substituting altitude and azimuth error signals from said third telescope for the signals from said other telescope.

12. In apparatus of the character described, a tiltable platform, a telescope mounted on said platform with its optical axis normal thereto, said telescope being free to rotate about its optical axis with respect to said platform, a prism rotatably mounted on the top of said telescope on an axis parallel to said platform, the incident light rays from a star picked up by said prism and reflected into said telescope, means for changing the angle of said prism with respect to the plane of said platform which includes a record having recorded thereon star altitude angle signals representing a time specified sequence of star altitude angles with respect to the plane of said platform, means for playing back said record in time controlled relation to the time specification of said record to generate star altitude angle signals, means for applying said signals to change the angle of said prism, error sensing means in said telescope responsive to the position of a star image to produce signals representing azimuth and altitude deviations of a star image from the optical axis of said telescope, means for rotating said telescope on said platform in accordance with azimuth error signals, and means for tilting said platform in accordance with altitude error signals in a direction to return said star image to said optical axis.

13. In apparatus of the character described, a tiltable platform, a telescope mounted on said platform with its optical axis normal thereto, said telescope being free to rotate about its optical axis with respect to said platform, a prism rotatably mounted on the top of said telescope on an axis parallel to said platform, the incident light rays from a star picked up by said prism and reflected into said telescope, means for changing the angle of said prism with respect to the plane of said platform which includes a record having recorded thereon star altitude angle signals representing a time specified sequence of star altitude angles with respect to the plane of said platform, means for playing back said record in time controlled relation to the time specification of said record to generate star altitude angle signals, means for applying said signals to change the angle of said prism, error sensing means in said telescope responsive to produce signals representing altitude deviations of a star image from the optical axis of said telescope, and means for tilting said platform in accordance with said error signals in a direction to return said star image to said optical axis.

14. In apparatus of the character described, a platform, a telescope mounted on said platform with its optical axis normal thereto, said telescope being free to rotate about its optical axis with respect to said platform, a prism rotatably mounted on the top of said telescope on an axis parallel to said platform, the incident light rays from a star picked up by said prism and reflected into said telescope, means for changing the angle of said prism with respect to the plane of said platform which includes a record having recorded thereon star altitude angle signals representing a time specified sequence of star altitude angles with respect to the plane of said platform, means for playing back said record in time controlled relation to the time specification of said record to generate star altitude angle signals, means for applying said signals to change the angle of said prism, error sensing means in said telescope responsive to a deviation of a star image from the optical axis thereof to produce error signals, and servo means responsive to said error signals connected to change the position of said platform in a direction directing said star image toward said optical axis.

References Cited in the file of this patent

UNITED STATES PATENTS

| | | |
|---|---|---|
| 2,077,398 | Clark | Apr. 20, 1937 |
| 2,389,142 | Esval | Nov. 20, 1945 |
| 2,410,424 | Brown | Nov. 5, 1946 |
| 2,444,933 | Jasperson | July 13, 1948 |
| 2,513,367 | Scott | July 4, 1950 |
| 2,526,682 | Mulberger | Oct. 24, 1950 |
| 2,532,402 | Herbold | Dec. 5, 1950 |
| 2,566,312 | Cable | Sept. 4, 1951 |
| 2,647,707 | Hill | Aug. 4, 1953 |
| 2,713,134 | Eckweiler | July 12, 1955 |
| 2,762,123 | Schultz | Sept. 11, 1956 |